US009031130B2

(12) United States Patent
Suzuki et al.

(10) Patent No.: US 9,031,130 B2
(45) Date of Patent: May 12, 2015

(54) IMAGE PREDICTION/ENCODING DEVICE, IMAGE PREDICTION/ENCODING METHOD, IMAGE PREDICTION/ENCODING PROGRAM, IMAGE PREDICTION/DECODING DEVICE, IMAGE PREDICTION/DECODING METHOD, AND IMAGE PREDICTION DECODING PROGRAM

(75) Inventors: Yoshinori Suzuki, Saitama (JP); Choong Seng Boon, Yokohama (JP); Thiow Keng Tan, Singapore (SG)

(73) Assignee: NTT DoCoMo, Inc., Tokyo (JP)

( * ) Notice: Subject to any disclaimer, the term of this patent is extended or adjusted under 35 U.S.C. 154(b) by 1433 days.

(21) Appl. No.: 12/595,242

(22) PCT Filed: Apr. 8, 2008

(86) PCT No.: PCT/JP2008/056950
§ 371 (c)(1),
(2), (4) Date: Dec. 4, 2009

(87) PCT Pub. No.: WO2008/126843
PCT Pub. Date: Oct. 23, 2008

(65) Prior Publication Data
US 2010/0091846 A1  Apr. 15, 2010

(30) Foreign Application Priority Data

Apr. 9, 2007 (JP) ................................ 2007-102154
May 18, 2007 (JP) ................................ 2007-133315
Sep. 18, 2007 (JP) ................................ 2007-241242

(51) Int. Cl.
*H04N 19/105* (2014.01)
*H04N 19/139* (2014.01)
(Continued)

(52) U.S. Cl.
CPC ........... *H04N 19/593* (2014.11); *H04N 19/105* (2014.11); *H04N 19/139* (2014.11); *H04N 19/176* (2014.11); *H04N 19/46* (2014.11); *H04N 19/61* (2014.11)

(58) Field of Classification Search
CPC .................. H04N 19/00781; H04N 19/00024; H04N 19/00278; H04N 19/00684; H04N 19/00151; H04N 19/00587; H04N 19/00687; H04N 7/26861; H04N 7/2684; G06T 2207/20021; G06T 2207/2013
USPC ....................................................... 375/240.12
See application file for complete search history.

(56) References Cited

U.S. PATENT DOCUMENTS 5,737,022 A * 4/1998 Yamaguchi et al. ..... 375/240.15
(Continued)

FOREIGN PATENT DOCUMENTS

CN         1843038       10/2006
(Continued)

OTHER PUBLICATIONS

Extended European Search Report issued Apr. 17, 2012 in Patent Application No. 11190490.0.
(Continued)

*Primary Examiner* — Mehrdad Dastouri
*Assistant Examiner* — Obafemi Sosanya
(74) *Attorney, Agent, or Firm* — Oblon, McClelland, Maier & Neustadt, L.L.P.

(57) ABSTRACT

An objective is to provide an image predictive encoding device, image predictive encoding method, image predictive encoding program, image predictive decoding device, image predictive decoding method, and image predictive decoding program for selecting a plurality of candidate prediction signals, without increase in information amount. A weighting unit 234 and an adder 235 process pixel signals extracted by a prediction adjacent region extractor 232 by a predetermined synthesis method, for example, by averaging to generate a comparison signal to an adjacent pixel signal for each combination. A comparison-selection unit 236 selects a combination with a high correlation between the comparison signal generated by the weighting unit 234 and others and the adjacent pixel signal acquired by a target adjacent region extractor 233. A prediction region extractor 204, weighting unit 205, and adder 206 generate candidate prediction signals and process them by a predetermined synthesis method to generate a prediction signal.

22 Claims, 60 Drawing Sheets

(51) Int. Cl.
*H04N 19/46* (2014.01)
*H04N 19/61* (2014.01)
*H04N 19/176* (2014.01)
*H04N 19/593* (2014.01)

(56) References Cited

U.S. PATENT DOCUMENTS

| | | | |
|---|---|---|---|
| 6,259,739 B1 | 7/2001 | Kondo | |
| 6,289,052 B1 | 9/2001 | Faryar et al. | |
| 6,625,215 B1 | 9/2003 | Faryar et al. | |
| 6,765,964 B1 | 7/2004 | Conklin | |
| 7,003,035 B2 | 2/2006 | Tourapis et al. | |
| 2003/0165271 A1* | 9/2003 | Boon | 382/238 |
| 2006/0126952 A1* | 6/2006 | Suzuki et al. | 382/233 |
| 2007/0009044 A1 | 1/2007 | Tourapis et al. | |
| 2007/0047648 A1 | 3/2007 | Tourapis et al. | |
| 2009/0116759 A1 | 5/2009 | Suzuki et al. | |

FOREIGN PATENT DOCUMENTS

| | | |
|---|---|---|
| JP | 2 62180 | 3/1990 |
| JP | 6 217150 | 8/1994 |
| JP | 2001 28756 | 1/2001 |
| JP | 2001 77700 | 3/2001 |
| JP | 2007 43651 | 2/2007 |
| JP | 2007 503775 | 2/2007 |
| JP | 2007 503777 | 2/2007 |
| WO | 2007 004678 | 1/2007 |

OTHER PUBLICATIONS

Sugimoto, Kazuo et al., "Inter Frame Coding with Template Matching Spatio-Temporal Prediction", Image Processing, International Conference on Image Processing, ICIP, vol. 1, pp. 465-468, (Oct. 24-27, 2004).

Office Action issued Nov. 13, 2012 in Japanese Patent Application No. 2007-133315 (with English-language translation).

Office Action issued Nov. 13, 2012 in Japanese Patent Application No. 2007-241242 (with English-language translation).

Extended European Search Report issued May 19, 2011, in Patent Application No. 08740053.7.

Thiow Keng Tan, et al., "Intra Prediction by Template Matching", Image Processing, IEEE International Conference On, XP 31048981, Oct. 1, 2006, pp. 1693-1696.

Johannes Ballé, et al., "Extended Texture Prediction for H.264 Intra Coding", ITU-Telecommunications Standardization Sector, Study Group 16 Question 6, Video Coding Experts Group (VCEG), XP 30003514, Jan. 15-16, 2007, pp. 1-7.

Siu-Leong Yu, et al., "New Intra Prediction using Intra-Macroblock Motion Compensation", Joint Video Team (JVT) of ISO/IEC MPEG & ITU-T VCEG (ISO/IEC JTC1/SC29/WG11 and ITU-T SG16 Q.6), XP 30005267, May 6-10, 2002, 10 pages.

Gary J. Sullivan, "Multi-Hypothesis Motion Compensation for Low Bit-Rate Video Coding", IEEE International Conference on Acoustics, Speech, and Signal Processing, vol. 5, XP 10110896, Apr. 27, 1993, pp. 437-440.

Markus Flierl, et al., "Generalized B Pictures and the Draft H.264/AVC Video-Compression Standard", IEEE Transactions on Circuits and Systems for Video Technology, vol. 13, No. 7, XP 11099251, Jul. 2003, pp. 587-597.

Markus Flierl, et al., "Rate-Constrained Multihypothesis Prediction for Motion-Compensated Video Compression", IEEE Transactions on Circuits and Systems for Video Technology, vol. 12, No. 11, XP 11071889, Nov. 2002, pp. 957-969.

Extended European Search Report issued Feb. 15, 2013 in European Patent Application No. 12189422.4.

Office Action issued on Mar. 29, 2013 in the corresponding Taiwan Patent Application No. 097112868 (with English Translation).

Korean Office Action issued Jun. 14, 2013 in Korean Patent Application No. 10-2011-7012289 with English translation, 7 pages.

Office Action issue Sep. 24, 2013 in European Patent Application No. 12 189 422.4-1908, 8 pages.

Korean Final Office Action issued Dec. 18, 2013 in Korean Patent Application No. 10-2011-7012289 (with English translation), 5 page.

Office Action issued Feb. 5, 2014 in European Patent Application No. 12 189 422.4.

Communication pursuant to Article 94(3) EPC issued Jun. 18, 2014, in European Patent Application No. 12 189 422.4.

Thiow Keng Tan, et al., "Intra Prediction by Averaged Template Matching Predictors", Consumer Communications and Networking Conference, XP-031087817, Jan. 13, 2007, pp. 405-409.

European Office Action issued Mar. 3, 2015 in EP Patent Application No. 12189422.4 in English.

* cited by examiner

*Fig.26*

|  |  | LSAD$_n$ | | | | | |
|---|---|---|---|---|---|---|---|
|  |  | 0 | 1-7 | 8-15 | 16-31 | 32-47 | 48- |
| LSAD$_0$ | 0-7 | 32 | 16 | 8 | 4 | 2 | 2 |
|  | 8-25 | 16 | 12 | 8 | 4 | 2 | 1 |
|  | 16-31 | 8 | 6 | 5 | 4 | 1 | 1 |
|  | 32-47 | 4 | 4 | 3 | 3 | 2 | 1 |
|  | 48- | 2 | 2 | 2 | 1 | 1 | 1 |

*Fig.59*

| REFERENCE IMAGE IDENTIFICATION NUMBER | MOTION VECTOR |
|---|---|
| 1 | MV1<br>MV2 |
| 2 | MV3<br>MV4<br>MV5 |
| 3 | — |
| 4 | MV6<br>MV7<br>MV8<br>MV9 |
| 5 | MV10 |

MINIMUM MOTION VECTOR

→ SMV1

→ SMV4

→ SMV6

→ SMV10

IMAGE PREDICTION/ENCODING DEVICE, IMAGE PREDICTION/ENCODING METHOD, IMAGE PREDICTION/ENCODING PROGRAM, IMAGE PREDICTION/DECODING DEVICE, IMAGE PREDICTION/DECODING METHOD, AND IMAGE PREDICTION DECODING PROGRAM

TECHNICAL FIELD

The present invention relates to an image predictive encoding device, image predictive encoding method, image predictive encoding program, image predictive decoding device, image predictive decoding method, and image predictive decoding program and, more particularly, to an image predictive encoding device, image predictive encoding method, image predictive encoding program, image predictive decoding device, image predictive decoding method, and image predictive decoding program for predictive encoding and decoding using an image synthesis method.

BACKGROUND ART

The compression encoding technology is used for efficiently performing transmission and storage of still image and dynamic image data. Widely used systems for dynamic images are MPEG-1 to 4 and ITU (International Telecommunication Union) H.261 to H.264.

In these encoding systems, an image as a target to be encoded is first divided into a plurality of blocks and then the encoding-decoding processing is carried out. In intra-picture predictive encoding, a prediction signal is generated using an adjacent previously-reproduced image signal (restored signal from compressed image data) present in the same picture as a target block, the generated prediction signal is subtracted from a signal of the target block to generate a residual signal, and the residual signal is then encoded. In inter-picture predictive encoding, a compensation for motion is made with reference to an adjacent previously-reproduced image signal present in a picture different from that of the target block, to generate a prediction signal, the prediction signal is subtracted from the signal of the target block to generate a residual signal, and the residual signal is then encoded.

For example, the intra-picture predictive encoding of H.264 adopts a method of extrapolating previously-reproduced pixel values adjacent to a block as a target of encoding in a predetermined direction to generate a prediction signal. FIG. 14 (FIG. 46) is a schematic diagram for explaining the intra-picture prediction method used in ITUH.264. In FIG. 14 (A) (FIG. 46 (A)), a target block 1702 is a block as a target of encoding and a pixel group 1701 consisting of pixels A to M adjacent to a border of the target block 1702 is an adjacent region and image signal reproduced previously in past processing.

In this case, the prediction signal is generated by extending the pixel group 1701 being adjacent pixels located immediately above the target block 1702, downwards. In FIG. 14 (B) (FIG. 46 (B)), the prediction signal is generated by extending previously-reproduced pixels (I to L) located left to the target block 1704, rightward. A difference is calculated between the pixel signal of the target block and each of nine prediction signals generated by the methods shown in FIG. 14 (A) (FIG. 46 (A) to (I) as described above, and the prediction signal to provide a minimum difference is defined as an optimal prediction signal. The prediction signals can be generated by extrapolating pixels as described above. The above contents are described in Patent Document 1 below.

In ordinary inter-picture predictive encoding, the prediction signal is generated by a method of, for a block as a target of encoding, searching a previously-reproduced picture for a signal similar to a pixel signal of the target block. Then encoded are a motion vector, which is a spatial displacement amount between the target block and a region composed of the signal obtained by the search, and a residual signal between the prediction signal and the pixel signal of the target block. The technique of searching for a motion vector for each block as described above is called block matching. FIG. 15 (or FIG. 47) is a schematic diagram for explaining the block matching processing. The below will describe a procedure of generating the prediction signal, using an example of target block 1402 on a picture 1401 as an encoding target. A picture 1403 in FIG. 15 (a) (or FIG. 47 (a)) is a previously-reproduced picture and a region 1404 indicated by a dashed line is a region located at the same spatial position as the target block 1402. In the block matching, a search region 1405 surrounding the region 1404 is first set, and a region 1406 is detected as one with a minimum sum of absolute differences from the pixel signal of the target block 1402 within the pixel signal of the search region. A pixel signal of the region 1406 is defined as a prediction signal and a displacement amount from the region 1404 to the region 1406 is detected as a motion vector. ITUH.264 prepares a plurality of prediction types with different block sizes for encoding of motion vector, in order to support variations of local characteristics of images. The prediction types of ITUH.264 are described, for example, in Patent Document 2.

In compression encoding of dynamic image data, an encoding order of frames is arbitrary. For the inter-picture prediction to generate the prediction signal with reference to the previously-reproduced picture, therefore, there are three types of techniques as to the encoding order. The first technique is forward prediction to generate the prediction signal with reference to a past reproduced picture in a reproduction order, the second technique backward prediction to generate the prediction signal with reference to a future reproduced picture in the reproduction order, and the third technique bidirectional prediction to perform both the forward prediction and backward prediction and average two prediction signals. The types of inter-picture prediction are described, for example, in Patent Document 3.

Patent Document 1: U.S. Pat. No. 6,765,964
Patent Document 2: U.S. Pat. No. 7,003,035
Patent Document 3: U.S. Pat. No. 6,259,739

DISCLOSURE OF THE INVENTION

Problem to be Solved by the Invention

In the conventional technology, the prediction signal of each pixel is generated by copying a reproduced pixel value containing strain due to encoding (e.g., quantization noise), and thus the prediction signal also includes the encoding strain. The prediction signal polluted by the encoding strain in this manner can cause reduction in encoding efficiency such as increase in code length of the residual signal and deterioration of quality of the reproduced image.

The influence of encoding strain can be suppressed by smoothing of the prediction signal, but this technique requires additional information for designating a plurality of candidate prediction signals as targets of smoothing, thereby increasing an information amount.

An objective of the present invention is therefore to provide an image predictive encoding device, image predictive encoding method, image predictive encoding program, image predictive decoding device, image predictive decoding method, and image predictive decoding program to select a plurality of candidate prediction signals without increase in information amount.

Means for Solving the Problem

For solving the above-described problem, an image predictive encoding device according to the present invention is an image predictive encoding device comprising: region dividing means for dividing an input image into a plurality of regions; prediction signal generating means for generating a prediction signal for a target pixel signal of a target region being a processing target out of the plurality of regions resulting from the dividing by the region dividing means; residual signal generating means for generating a residual signal between the target pixel signal and the prediction signal generated by the prediction signal generating means; and encoding means for encoding the residual signal generated by the residual signal generating means, wherein the prediction signal generating means is configured to: search a search region comprising a previously-reproduced image, for a plurality of prediction adjacent regions highly correlated to a target adjacent region consisting of a previously-reproduced adjacent pixel signal adjacent to the target region consisting of the target pixel signal; derive at least two arbitrary combinations of prediction adjacent regions including at least one of the plurality of prediction adjacent regions obtained by the search, process pixel signals of the prediction adjacent regions belonging to the derived combinations, by a predetermined synthesis method, thereby generating a comparison signal to the adjacent pixel signal for each of the derived combinations, and select a combination with a high correlation between the comparison signal and the adjacent pixel signal; and generate at least one candidate prediction signal for the target pixel signal, based on the prediction adjacent regions belonging to the selected combination, and process the candidate prediction signal by a predetermined synthesis method, thereby generating the prediction signal.

According to the present invention, the image predictive encoding device is configured to search the search region comprising the previously-reproduced image, for a plurality of prediction adjacent regions highly correlated to the target adjacent region consisting of the previously-reproduced adjacent pixel signal adjacent to the target region consisting of the target pixel signal, derive at least two arbitrary combinations of prediction adjacent regions including at least one of the plurality of prediction adjacent regions obtained by the search, and process the pixel signals of the prediction adjacent regions belonging to the combinations, by the predetermined synthesis method, thereby generating the comparison signal to the adjacent pixel signal for each combination. The device is further configured to select a combination with a high correlation between the comparison signal and the adjacent pixel signal, generate at least one candidate prediction signal for the target pixel signal, based on the prediction adjacent regions belonging to the selected combination, and process the candidate prediction signal by the predetermined synthesis method to generate the prediction signal. A residual signal is generated between the thus generated prediction signal and the target pixel signal and the generated residual signal is then encoded.

This configuration permits the device to select a combination of candidate prediction signals suitable for smoothing, without increase in information amount, using the target adjacent region consisting of the previously-reproduced adjacent pixel signal adjacent to the target block, whereby the device can generate the prediction signal with efficient consideration to local noise characteristics.

In the image predictive encoding device of the present invention the prediction signal generating means is preferably configured to select a combination with a lowest sum of absolute differences between the comparison signal and the adjacent pixel signal.

According to this invention, the device is configured to select the combination with the lowest sum of absolute differences between the comparison signal and the adjacent pixel signal, whereby it can select the combination of candidate prediction signals more suitable for smoothing.

In the image predictive encoding device of the present invention the prediction signal generating means is preferably configured to perform weighted averaging of pixel signals of the prediction adjacent regions belonging to each of the combinations, thereby generating the comparison signal.

According to this invention, the device is configured to generate the comparison signal by weighted averaging of the pixel signals of the prediction adjacent regions belonging to the combination, whereby it can generate the comparison signal appropriate for selection of the combination of candidate prediction signals more suitable for smoothing.

In the image predictive encoding device of the present invention the prediction signal generating means is preferably configured so that each of the combinations of prediction adjacent regions includes prediction adjacent regions as many as 2 to the power of n in decreasing order of correlation to the target adjacent region, or is preferably configured so that a value of the foregoing n is an integer of not less than 0.

According to this invention, the combination of prediction adjacent regions includes the prediction adjacent regions as many as 2 to the power of n in decreasing order of correlation to the target adjacent region, whereby the operation can be carried out by addition and shift operation only, and implemented by a simple configuration.

An image predictive decoding device according to the present invention is an image predictive decoding device comprising: data decoding means for decoding encoded data of a residual signal concerning a target region being a processing target in compressed data; residual signal restoring means for restoring a reproduced residual signal from a signal obtained by the decoding by the data decoding means; prediction signal generating means for generating a prediction signal for a target pixel signal of the target region; and reproduced image signal generating means for adding the prediction signal generated by the prediction signal generating means to the reproduced residual signal restored by the residual signal restoring means, thereby generating a reproduced image signal, wherein the prediction signal generating means is configured to: search a search region comprising a previously-reproduced image, for a plurality of prediction adjacent regions highly correlated to a target adjacent region consisting of a previously-reproduced adjacent pixel signal adjacent to the target region consisting of the target pixel signal; derive at least two arbitrary combinations of prediction adjacent regions including at least one of the plurality of prediction adjacent regions obtained by the search, process pixel signals of the prediction adjacent regions belonging to the derived combinations, by a predetermined synthesis method, thereby generating a comparison signal to the adjacent pixel signal for each of the derived combinations, and select a combination with a high correlation between the comparison signal and the adjacent pixel signal; and generate at least one candidate prediction signal for the target pixel signal, based on the prediction adjacent regions belonging to the selected combination, and process the candidate prediction signal by a predetermined synthesis method, thereby generating the prediction signal.

According to this invention, the image predictive decoding device is configured to decode the encoded data of the residual signal concerning the target region being a processing target in compressed data, and restore the reproduced residual signal from the decoded signal. On the other hand, the device is configured to generate the prediction signal for the target pixel signal of the target region being the processing target, and add the generated prediction signal to the restored reproduced residual signal, thereby generating the reproduced image signal. Then the device is configured to search the search region comprising the previously-reproduced image, for a plurality of prediction adjacent regions highly correlated to the target adjacent region consisting of the previously-reproduced adjacent pixel signal adjacent to the target region consisting of the target pixel signal. The device is configured to derive at least two arbitrary combinations of prediction adjacent regions including at least one of the plurality of prediction adjacent regions obtained by the search, process the pixel signals of the prediction adjacent regions belonging to the combinations, by the predetermined synthesis method, thereby generating the comparison signal to the adjacent pixel signal for each combination, and select a combination with a high correlation between the comparison signal and the adjacent pixel signal. The device is configured to generate at least one candidate prediction signal for the target pixel signal, based on the prediction adjacent regions belonging to the selected combination, and process the candidate prediction signal by the predetermined synthesis method to generate the prediction signal.

This configuration permits the device to select a combination of candidate prediction signals suitable for smoothing, without increase in information amount, using the target adjacent region consisting of the previously-reproduced adjacent pixel signal adjacent to the target block, whereby the device can generate the prediction signal with efficient consideration to local noise characteristics.

In the image predictive decoding device of the present invention the prediction signal generating means is preferably configured to generate the comparison signal to the adjacent pixel signal and select a combination with a lowest sum of absolute differences between the comparison signal and the adjacent pixel signal.

According to this invention, the device is configured to select the combination with the lowest sum of absolute differences between the comparison signal and the adjacent pixel signal, whereby it can select the combination of candidate prediction signals more suitable for smoothing.

In the image predictive decoding device of the present invention the prediction signal generating means is preferably configured to perform weighted averaging of pixel signals of the prediction adjacent regions belonging to each of the combinations, thereby generating the comparison signal.

According to this invention, the device is configured to generate the comparison signal by weighted averaging of the pixel signals of the prediction adjacent regions belonging to the combination, whereby it can generate the comparison signal appropriate for selection of the combination of candidate prediction signals more suitable for smoothing.

In the image predictive decoding device of the present invention the prediction signal generating means is preferably configured so that each of the combinations of prediction adjacent regions includes prediction adjacent regions as many as 2 to the power of n in decreasing order of correlation to the target adjacent region, or is preferably configured so that a value of the foregoing n is an integer of not less than 0.

According to this invention, the combination of prediction adjacent regions includes the prediction adjacent regions as many as 2 to the power of n in decreasing order of correlation to the target adjacent region, whereby the operation can be carried out by addition and shift operation only, and implemented by a simple configuration.

Another image predictive encoding device according to the present invention is an image predictive encoding device comprising: region dividing means for dividing an input image into a plurality of regions; prediction signal generating means for generating a prediction signal for a target pixel signal of a target region being a processing target out of the plurality of regions resulting from the dividing by the region dividing means; residual signal generating means for generating a residual signal between the target pixel signal and the prediction signal generated by the prediction signal generating means; and encoding means for encoding the residual signal generated by the residual signal generating means, wherein the prediction signal generating means is configured to: search a search region comprising a previously-reproduced image, for a plurality of prediction adjacent regions highly correlated to a target adjacent region consisting of a previously-reproduced adjacent pixel signal adjacent to the target region consisting of the target pixel signal; calculate an evaluated value for evaluation of correlation among N candidate prediction signals by a predetermined method, using at least two signals from pixel signals of N prediction regions based on the target region out of the plurality of prediction adjacent regions obtained by the search or pixel signals of prediction adjacent regions among N prediction adjacent regions obtained by the search, or from the both signals; and if the evaluated value is smaller than a prescribed threshold, process the N candidate prediction signals by a predetermined synthesis method, thereby generating the prediction signal.

According to the present invention, the image predictive encoding device is configured to search the search region comprising the previously-reproduced image, for a plurality of prediction adjacent regions highly correlated to the target adjacent region consisting of the previously-reproduced adjacent pixel signal adjacent to the target region, calculate the evaluated value for evaluation of correlation among the N candidate prediction signals by the predetermined method, using at least two signals from the pixel signals of the N prediction regions based on the target region out of the plurality of prediction adjacent regions obtained by the search or the pixel signals of the prediction adjacent regions among the N prediction adjacent regions obtained by the search, or from the both signals. Then the device is configured so that if the evaluated value is smaller than the prescribed threshold, it processes the N candidate prediction signals by the predetermined synthesis method to generate the prediction signal. The device generates the residual signal from the target pixel signal, using the generated prediction signal, and encodes the residual signal.

This configuration permits the device to generate the appropriate prediction signal based on the plurality of candidate prediction signals. This is effective, particularly, to the candidate prediction signals which are different only in noise components but similar in signal components.

In the image predictive encoding device of the present invention the prediction signal generating means is preferably configured to: prepare a plurality of candidates for a value of said N, calculate the evaluated value for a maximum of the candidates for the value of N, and, if the evaluated value is smaller than the prescribed value, process the N candidate prediction signals by the predetermined synthesis method, thereby generating the prediction signal; and, if the evaluated value is larger than the threshold, reduce the value of N to update N to a next largest value, and again carry out the calculation of the evaluated value and comparison with the prescribed threshold.

According to this invention, if the evaluated value is larger than the threshold, the value of N is reduced and updated to the next largest value, and the calculation of the evaluated value and the comparison with the prescribed threshold are again carried out, thereby selecting an effective number of candidate prediction signals.

In the image predictive encoding device of the present invention the prediction signal generating means is preferably configured to calculate a sum of absolute differences between a pixel signal of a prediction region adjacent to a prediction adjacent region with a highest correlation to the target adjacent region and a pixel signal of a prediction region adjacent to a prediction adjacent region with an N-th highest correlation to the target adjacent region, out of the N prediction adjacent regions obtained by the search, or between a pixel signal of the prediction adjacent region with the highest correlation to the target adjacent region and a pixel signal of the prediction adjacent region with the N-th highest correlation to the target adjacent region, or between signals as combinations of the foregoing pixel signals, and define the sum of absolute differences as the evaluated value.

According to this invention, the device is configured to calculate the sum of absolute differences between the pixel signal of the prediction region adjacent to the prediction adjacent region with the highest correlation to the target adjacent region and the pixel signal of the prediction region adjacent to the prediction adjacent region with the N-th highest correlation to the target adjacent region, out of the N prediction adjacent regions obtained by the search, or between the pixel signal of the prediction adjacent region with the highest correlation to the target adjacent region and the pixel signal of the prediction adjacent region with the N-th highest correlation to the target adjacent region, or between the signals as combinations of the foregoing pixel signals, and define the sum of absolute differences as the evaluated value. This configuration permits the device to calculate the appropriate evaluated value.

Another image predictive decoding device according to the present invention is an image predictive decoding device comprising: data decoding means for decoding encoded data of a residual signal concerning a target region being a processing target in compressed data; residual signal restoring means for restoring a reproduced residual signal from a signal obtained by the decoding by the data decoding means; prediction signal generating means for generating a prediction signal for a target pixel signal of the target region; and reproduced image signal generating means for adding the prediction signal generated by the prediction signal generating means to the reproduced residual signal restored by the residual signal restoring means, thereby generating a reproduced image signal, wherein the prediction signal generating means is configured to: search a search region comprising a previously-reproduced image, for a plurality of prediction adjacent regions highly correlated to a target adjacent region consisting of a previously-reproduced adjacent pixel signal adjacent to the target region consisting of the target pixel signal; calculate an evaluated value for evaluation of correlation among N candidate prediction signals by a predetermined method, using at least two signals from pixel signals of N prediction regions based on the target region out of the plurality of prediction adjacent regions obtained by the search or pixel signals of prediction adjacent regions among N prediction adjacent regions obtained by the search, or from the both signals; and if the evaluated value is smaller than a prescribed threshold, process the N candidate prediction signals by a predetermined synthesis method, thereby generating the prediction signal.

According to this invention, the device is configured to decode the encoded data of the residual signal concerning the target region being a processing target in compressed data, and restore the reproduced residual signal from the decoded signal. On the other hand, the device is configured to generate the prediction signal for the target pixel signal of the target region being the processing target, and add the generated prediction signal to the restored reproduced residual signal, thereby generating the reproduced image signal.

Furthermore, the device performs the following processing for generating the prediction signal. The device searches the search region comprising the previously-reproduced image, for a plurality of prediction adjacent regions highly correlated to the target adjacent region consisting of the previously-reproduced adjacent pixel signal adjacent to the target region. Then the device calculates the evaluated value for evaluation of correlation among the N candidate prediction signals by the predetermined method, using at least two signals from the pixel signals of the N prediction regions based on the target region out of the plurality of prediction adjacent regions obtained by the search or the pixel signals of the prediction adjacent regions among the N prediction adjacent regions obtained by the search, or from the both signals. If the evaluated value is smaller than the prescribed threshold, the device then processes the N candidate prediction signals by the predetermined synthesis method to generate the prediction signal.

This configuration permits the device to generate the appropriate prediction signal based on the plurality of candidate prediction signals. This is effective, particularly, to the candidate prediction signals which are different only in noise components but similar in signal components.

In the image predictive decoding device of the present invention the prediction signal generating means is preferably configured to: prepare a plurality of candidates for a value of the foregoing N, calculate the evaluated value for a maximum of the candidates for the value of N, and, if the evaluated value is smaller than the prescribed value, process the N candidate prediction signals by the predetermined synthesis method, thereby generating the prediction signal; and if the evaluated value is larger than the threshold, reduce the value of N to update N to a next largest value, and again carry out the calculation of the evaluated value and comparison with the prescribed threshold.

According to this invention, if the evaluated value is larger than the threshold, the value of N is reduced and updated to the next largest value, and the calculation of the evaluated value and the comparison with the prescribed threshold are again carried out, thereby selecting an effective number of candidate prediction signals.

In the image predictive decoding device of the present invention the prediction signal generating means is preferably configured to calculate a sum of absolute differences between a pixel signal of a prediction region adjacent to a prediction adjacent region with a highest correlation to the target adjacent region and a pixel signal of a prediction region adjacent to a prediction adjacent region with a lowest correlation to the target adjacent region, out of the N prediction adjacent regions obtained by the search, or between a pixel signal of the prediction adjacent region with the highest correlation to the target adjacent region and a pixel signal of a prediction adjacent region with an N-th highest correlation to the target adjacent region, or between signals as combinations of the foregoing pixel signals, and define the sum of absolute differences as the evaluated value.

According to this invention, the device is configured to calculate the sum of absolute differences between the pixel signal of the prediction region adjacent to the prediction adjacent region with the highest correlation to the target adjacent region and the pixel signal of the prediction region adjacent to the prediction adjacent region with the N-th highest correlation to the target adjacent region, out of the N prediction adjacent regions obtained by the search, or between the pixel signal of the prediction adjacent region with the highest correlation to the target adjacent region and the pixel signal of the prediction adjacent region with the N-th highest correlation to the target adjacent region, or between the signals as combinations of the foregoing pixel signals, and define the sum of absolute differences as the evaluated value. This configuration permits the device to calculate the appropriate evaluated value.

Another image predictive encoding device according to the present invention is an image predictive encoding device comprising: region dividing means for dividing an input image into a plurality of regions; prediction signal generating means for generating a prediction signal for a target pixel signal of a target region being a processing target out of the plurality of regions resulting from the dividing by the region dividing means; residual signal generating means for generating a residual signal between the target pixel signal and the prediction signal generated by the prediction signal generating means; and encoding means for encoding the residual signal generated by the residual signal generating means, wherein the prediction signal generating means is configured to: acquire a plurality of prediction adjacent regions of the same shape as the target adjacent region, from each search region comprising a previously-reproduced image; derive an arbitrary combination of prediction adjacent regions including at least two prediction adjacent regions out of the plurality of prediction adjacent regions acquired, and derive at least two sets of weighting factors for weighted averaging of pixel signals of the prediction adjacent regions belonging to the combination; perform, for the combination, the weighted averaging of the pixel signals of the prediction adjacent regions belonging to the combination using the sets of weighting factors, thereby generating at least two comparison signals to the adjacent pixel signal; select a set of weighting factors with a high correlation between the comparison signal and the adjacent pixel signal; and generate at least two candidate prediction signals for the target pixel signal from the previously-reproduced image, based on the prediction adjacent regions belonging to the combination, and perform weighted averaging of the candidate prediction signals using the selected set of weighting factors, thereby generating the prediction signal.

According to this invention, the device is configured to acquire a plurality of prediction adjacent regions of the same shape as the target adjacent region from each search region comprising the previously-reproduced image, and derive an arbitrary combination of prediction adjacent regions including at least two prediction adjacent regions out of the plurality of prediction adjacent regions acquired. The device is configured then to derive at least two sets of weighting factors for weighted averaging of pixel signals of the prediction adjacent regions belonging to the combination, and perform, for the combination, the weighted averaging of the pixel signals of the prediction adjacent regions belonging to the combination, using the sets of weighting factors, thereby generating at least two comparison signals to the adjacent pixel signal. The device is configured then to select a set of weighting factors with a high correlation between the comparison signal and the adjacent pixel signal, generate at least two candidate prediction signals for the target pixel signal from the previously-reproduced image, based on the prediction adjacent regions belonging to the combination, and perform the weighted averaging of the candidate prediction signals using the selected set of weighting factors, thereby generating the prediction signal. Then the device generates the residual signal from the target pixel signal using the generated prediction signal and encodes the residual signal. This enables the device to select the set of weighting factors, without additional information, for each target block.

Another image predictive encoding device according to the present invention is an image predictive encoding device comprising: region dividing means for dividing an input image into a plurality of regions; prediction signal generating means for generating a prediction signal for a target pixel signal of a target region being a processing target out of the plurality of regions resulting from the dividing by the region dividing means; residual signal generating means for generating a residual signal between the target pixel signal and the prediction signal generated by the prediction signal generating means; and encoding means for encoding the residual signal generated by the residual signal generating means, wherein the prediction signal generating means is configured to: acquire a plurality of prediction adjacent regions of the same shape as a target adjacent region, from each search region comprising a previously-reproduced image; derive at least two arbitrary combinations of prediction adjacent regions including at least one of the plurality of prediction adjacent regions acquired; derive, for each of combinations including at least two prediction adjacent regions, at least two sets of weighting factors for weighted averaging of pixel signals of the prediction adjacent regions belonging to the combination, perform the weighted averaging of the pixel signals of the prediction adjacent signals using the sets of weighting factors, thereby generating at least two comparison signals to the adjacent pixel signal, and select a set of weighting factors with a high correlation between the comparison signal and the adjacent pixel signal; perform, for the combinations, the weighted averaging of the pixel signals of the prediction adjacent regions using the selected set of weighting factors for the pixel signals of the prediction adjacent regions belonging to the combinations, thereby generating at least two comparison signals to the adjacent pixel signal, and select a combination with a high correlation between the comparison signal and the adjacent pixel signal; and generate at least one candidate prediction signal for the target pixel signal from the previously-reproduced image, based on the prediction adjacent regions belonging to the selected combination, and perform weighted averaging of the candidate prediction signal using the previously selected set of weighting factors for the selected combination, thereby generating the prediction signal.

According to this invention, the device is configured to acquire a plurality of prediction adjacent regions of the same shape as the target adjacent region, from each search region comprising the previously-reproduced image, and derive at least two arbitrary combinations of prediction adjacent regions including at least one of the acquired prediction adjacent regions. The device is configured then to derive, for each combination including at least two prediction adjacent regions, at least two sets of weighting factors for weighted averaging of the pixel signals of the prediction adjacent regions belonging to the combination, and perform the weighted averaging of the pixel signals of the prediction adjacent regions using the sets of weighting factors to generate at least two comparison signals to the adjacent pixel signal. Then the device selects a set of weighting factors with a high correlation between the comparison signal and the adjacent pixel signal, performs, for the combinations, the weighted averaging of the pixel signals of the prediction adjacent regions using the selected set of weighting factors for the pixel signals of the prediction adjacent regions belonging to the combinations, to generate at least two comparison signals to the adjacent pixel signal, and selects a combination with a high correlation between the comparison signal and the adjacent pixel signal. The device is configured then to generate at least one candidate prediction signal for the target pixel signal from the previously-reproduced image, based on the prediction adjacent regions belonging to the selected combination, and perform the weighted averaging of the candidate prediction signal using the set of weighting factors selected previously for the selected combination, thereby generating the prediction signal. Then the device generates the residual signal from the target pixel signal, using the generated prediction signal, and encodes the residual signal. This enables the device to select the combination of candidate prediction signals and the set of weighting factors effective to generation of the prediction signal, without additional information, for each target block.

In the image predictive encoding device of the present invention the prediction signal generating means is preferably configured to calculate at least one of the sets of weighting factors so that a smaller weighting factor is set with increase in a sum of absolute differences between the adjacent pixel signal and the pixel signals of the prediction adjacent regions belonging to the combination.

According to this invention, the device is configured to calculate at least one set of weighting factors, based on the sum of absolute differences between the adjacent pixel signal and the pixel signals of the plurality of prediction adjacent regions belonging to the combination, whereby it can calculate the appropriate set of weighting factors.

In the image predictive encoding device of the present invention the prediction signal generating means is preferably configured to preliminarily prepare a set of weighting factors determined according to a number of the prediction adjacent regions belonging to the combination, and derive at least one set of weighting factors by the prepared set of weighting factors.

According to this invention, the device is configured to preliminarily prepare the set of weighting factors determined according to the number of prediction adjacent regions belonging to the combination and derive at least one set of weighting factors by the prepared set of weighting factors, whereby it can calculate the appropriate set of weighting factors.

In the image predictive encoding device of the present invention the prediction signal generating means is preferably configured to prepare a correspondence table in which a set of weighting factors is determined with respect to sums of absolute differences between the adjacent pixel signal and pixel signals of prediction adjacent regions belonging to the combination, and derive at least one set of weighting factors using the correspondence table.

According to this invention, the device is configured to prepare the correspondence table in which a set of weighting factors is determined with respect to the sums of absolute differences between the adjacent pixel signal and the pixel signals of the prediction adjacent regions belonging to the combination, and derive at least one set of weighting factors using the correspondence table, whereby it can calculate the appropriate set of weighting factors.

Another image predictive decoding device according to the present invention is an image predictive decoding device comprising: data decoding means for decoding encoded data of a residual signal concerning a target region being a processing target in compressed data; residual signal restoring means for restoring a reproduced residual signal from a signal obtained by the decoding by the data decoding means; prediction signal generating means for generating a prediction signal for a target pixel signal of the target region; and reproduced image signal generating means for adding the prediction signal generated by the prediction signal generating means to the reproduced residual signal restored by the residual signal restoring means, thereby generating a reproduced image signal, wherein the prediction signal generating means is configured to: acquire a plurality of prediction adjacent regions of the same shape as a target adjacent region, from each search region comprising a previously-reproduced image; derive an arbitrary combination of prediction adjacent regions including at least two prediction adjacent regions out of the plurality of prediction adjacent regions acquired, and derive at least two sets of weighting factors for weighted averaging of pixel signals of the prediction adjacent regions belonging to the combination; perform, for the combination, the weighted averaging of the pixel signals of the prediction adjacent regions belonging to the combination using the sets of weighting factors, thereby generating at least two comparison signals to the adjacent pixel signal; select a set of weighting factors with a high correlation between the comparison signal and the adjacent pixel signal; and generate at least two candidate prediction signals for the target pixel signal from the previously-reproduced image, based on the prediction adjacent regions belonging to the combination, and perform weighted averaging of the candidate prediction signals using the selected set of weighting factors, thereby generating the prediction signal.

According to this invention, the device is configured to decode the encoded data of the residual signal concerning the target region being a processing target in compressed data, and restore the reproduced residual signal from the decoded signal. On the other hand, the device is configured to generate the prediction signal for the target pixel signal of the target region being the processing target, and add the generated prediction signal to the restored reproduced residual signal, thereby generating the reproduced image signal.

Furthermore, the device performs the following processing for generating the prediction signal. Namely, according to this invention, the device is configured to acquire a plurality of prediction adjacent regions of the same shape as the target adjacent region from each search region comprising the previously-reproduced image, and derive an arbitrary combination of prediction adjacent regions including at least two prediction adjacent regions out of the plurality of prediction adjacent regions acquired. The device is configured then to derive at least two sets of weighting factors for weighted averaging of pixel signals of the prediction adjacent regions belonging to the combination, and perform, for the combination, the weighted averaging of the pixel signals of the prediction adjacent regions belonging to the combination, using the sets of weighting factors, thereby generating at least two comparison signals to the adjacent pixel signal. The device is configured then to select a set of weighting factors with a high correlation between the comparison signal and the adjacent pixel signal, generate at least two candidate prediction signals for the target pixel signal from the previously-reproduced image, based on the prediction adjacent regions belonging to the combination, and perform the weighted averaging of the candidate prediction signals using the selected set of weighting factors, thereby generating the prediction signal. This enables the device to select the set of weighting factors, without additional information, for each target block.

Another image predictive decoding device according to the present invention is an image predictive decoding device comprising: data decoding means for decoding encoded data of a residual signal concerning a target region being a processing target in compressed data; residual signal restoring means for restoring a reproduced residual signal from a signal obtained by the decoding by the data decoding means; prediction signal generating means for generating a prediction signal for a target pixel signal of the target region; and reproduced image signal generating means for adding the prediction signal generated by the prediction signal generating means to the reproduced residual signal restored by the residual signal restoring means, thereby generating a reproduced image signal, wherein the prediction signal generating means is configured to: acquire a plurality of prediction adjacent regions of the same shape as a target adjacent region, from each search region comprising a previously-reproduced image; derive at least two arbitrary combinations of prediction adjacent regions including at least one of the plurality of prediction adjacent regions acquired; derive, for each of combinations including at least two prediction adjacent regions, at least two sets of weighting factors for weighted averaging of pixel signals of the prediction adjacent regions belonging to the combination, perform the weighted averaging of the pixel signals of the prediction adjacent signals using the sets of weighting factors, thereby generating at least two comparison signals to the adjacent pixel signal, and select a set of weighting factors with a high correlation between the comparison signal and the adjacent pixel signal; perform, for the combinations, the weighted averaging of the pixel signals of the prediction adjacent regions using the selected set of weighting factors for the pixel signals of the prediction adjacent regions belonging to the combinations, thereby generating at least two comparison signals to the adjacent pixel signal, and select a combination with a high correlation between the comparison signal and the adjacent pixel signal; and generate at least one candidate prediction signal for the target pixel signal from the previously-reproduced image, based on the prediction adjacent regions belonging to the selected combination, and perform weighted averaging of the candidate prediction signal using the previously selected set of weighting factors for the selected combination, thereby generating the prediction signal.

According to this invention, the device is configured to decode the encoded data of the residual signal concerning the target region being a processing target in compressed data, and restore the reproduced residual signal from the decoded signal. On the other hand, the device is configured to generate the prediction signal for the target pixel signal of the target region being the processing target, and add the generated prediction signal to the restored reproduced residual signal, thereby generating the reproduced image signal.

Furthermore, the device performs the following processing for generating the prediction signal. Namely, according to this invention, the device is configured to acquire a plurality of prediction adjacent regions of the same shape as the target adjacent region, from each search region comprising the previously-reproduced image, and derive at least two arbitrary combinations of prediction adjacent regions including at least one of the acquired prediction adjacent regions. The device is configured then to derive, for each combination including at least two prediction adjacent regions, at least two sets of weighting factors for weighted averaging of the pixel signals of the prediction adjacent regions belonging to the combination, and perform the weighted averaging of the pixel signals of the prediction adjacent regions using the sets of weighting factors to generate at least two comparison signals to the adjacent pixel signal. Then the device selects a set of weighting factors with a high correlation between the comparison signal and the adjacent pixel signal, performs, for the combinations, the weighted averaging of the pixel signals of the prediction adjacent regions using the selected set of weighting factors for the pixel signals of the prediction adjacent regions belonging to the combinations, to generate at least two comparison signals to the adjacent pixel signal, and selects a combination with a high correlation between the comparison signal and the adjacent pixel signal. The device is configured then to generate at least one candidate prediction signal for the target pixel signal from the previously-reproduced image, based on the prediction adjacent regions belonging to the selected combination, and perform the weighted averaging of the candidate prediction signal using the set of weighting factors selected previously for the selected combination, thereby generating the prediction signal. This enables the device to select the combination of candidate prediction signals and the set of weighting factors effective to generation of the prediction signal, without additional information, for each target block.

In the image predictive decoding device the prediction signal generating means is preferably configured to calculate at least one of the sets of weighting factors so that a smaller weighting factor is set with increase in a sum of absolute differences between the adjacent pixel signal and the pixel signals of the prediction adjacent regions belonging to the combination.

According to this invention, the device is configured to calculate at least one set of weighting factors, based on the sum of absolute differences between the adjacent pixel signal and the pixel signals of the plurality of prediction adjacent regions belonging to the combination, whereby it can calculate the appropriate set of weighting factors.

In the image predictive decoding device the prediction signal generating means is preferably configured to preliminarily prepare a set of weighting factors determined according to a number of the prediction adjacent regions belonging to the combination, and derive at least one set of weighting factors by the prepared set of weighting factors.

According to this invention, the device is configured to preliminarily prepare the set of weighting factors determined according to the number of prediction adjacent regions belonging to the combination and derive at least one set of weighting factors by the prepared set of weighting factors, whereby it can calculate the appropriate set of weighting factors.

In the image predictive decoding device the prediction signal generating means is preferably configured to prepare a correspondence table in which a set of weighting factors is determined with respect to sums of absolute differences between the adjacent pixel signal and pixel signals of prediction adjacent regions belonging to the combination, and derive at least one set of weighting factors using the correspondence table.

According to this invention, the device is configured to prepare the correspondence table in which a set of weighting factors is determined with respect to the sums of absolute differences between the adjacent pixel signal and the pixel signals of the prediction adjacent regions belonging to the combination, and derive at least one set of weighting factors using the correspondence table, whereby it can calculate the appropriate set of weighting factors.

Incidentally, the present invention cannot be described only as the invention of the image predictive encoding apparatus or image predictive decoding apparatus as described above, but can also be described as the invention of image predictive encoding methods, image predictive decoding methods, image predictive encoding programs, and image predictive decoding programs as described below. These are different only in category but substantially the same invention, with the same action and effect.

Specifically, an image predictive encoding method according to the present invention is an image predictive encoding method comprising: a region dividing step of dividing an input image into a plurality of regions; a prediction signal generating step of generating a prediction signal for a target pixel signal of a target region being a processing target out of the plurality of regions resulting from the dividing by the region dividing step; a residual signal generating step of generating a residual signal between the target pixel signal and the prediction signal generated by the prediction signal generating step; and an encoding step of encoding the residual signal generated by the residual signal generating step, wherein the prediction signal generating step is configured to: search a search region comprising a previously-reproduced image, for a plurality of prediction adjacent regions highly correlated to a target adjacent region consisting of a previously-reproduced adjacent pixel signal adjacent to the target region consisting of the target pixel signal; derive at least two arbitrary combinations of prediction adjacent regions including at least one of the plurality of prediction adjacent regions obtained by the search, process pixel signals of the prediction adjacent regions belonging to the derived combinations, by a predetermined synthesis method, thereby generating a comparison signal to the adjacent pixel signal for each of the derived combinations, and select a combination with a high correlation between the comparison signal and the adjacent pixel signal; and generate at least one candidate prediction signal for the target pixel signal, based on the prediction adjacent regions belonging to the selected combination, and process the candidate prediction signal by a predetermined synthesis method, thereby generating the prediction signal.

An image predictive decoding method according to the present invention is an image predictive decoding method comprising: a data decoding step of decoding encoded data of a residual signal concerning a target region being a processing target in compressed data; a residual signal restoring step of restoring a reproduced residual signal from a signal obtained by the decoding by the data decoding step; a prediction signal generating step of generating a prediction signal for a target pixel signal of the target region; and a reproduced image signal generating step of adding the prediction signal generated by the prediction signal generating step to the reproduced residual signal restored by the residual signal restoring step, thereby generating a reproduced image signal, wherein the prediction signal generating step is configured to: search a search region comprising a previously-reproduced image, for a plurality of prediction adjacent regions highly correlated to a target adjacent region consisting of a previously-reproduced adjacent pixel signal adjacent to the target region consisting of the target pixel signal; derive at least two arbitrary combinations of prediction adjacent regions including at least one of the plurality of prediction adjacent regions obtained by the search, process pixel signals of the prediction adjacent regions belonging to the derived combinations, by a predetermined synthesis method, thereby generating a comparison signal to the adjacent pixel signal for each of the derived combinations, and select a combination with a high correlation between the comparison signal and the adjacent pixel signal; and generate at least one candidate prediction signal for the target pixel signal, based on the prediction adjacent regions belonging to the selected combination, and process the candidate prediction signal by a predetermined synthesis method, thereby generating the prediction signal.

An image predictive encoding program according to the present invention is an image predictive encoding program comprising: a region dividing module for dividing an input image into a plurality of regions; a prediction signal generating module for generating a prediction signal for a target pixel signal of a target region being a processing target out of the plurality of regions resulting from the dividing by the region dividing module; a residual signal generating module for generating a residual signal between the target pixel signal and the prediction signal generated by the prediction signal generating module; and an encoding module for encoding the residual signal generated by the residual signal generating module, wherein the prediction signal generating module is configured to: search a search region comprising a previously-reproduced image, for a plurality of prediction adjacent regions highly correlated to a target adjacent region consisting of a previously-reproduced adjacent pixel signal adjacent to the target region consisting of the target pixel signal; derive at least two arbitrary combinations of prediction adjacent regions including at least one of the plurality of prediction adjacent regions obtained by the search, process pixel signals of the prediction adjacent regions belonging to the derived combinations, by a predetermined synthesis method, thereby generating a comparison signal to the adjacent pixel signal for each of the derived combinations, and select a combination with a high correlation between the comparison signal and the adjacent pixel signal; and generate at least one candidate prediction signal for the target pixel signal, based on the prediction adjacent regions belonging to the selected combination, and process the candidate prediction signal by a predetermined synthesis method, thereby generating the prediction signal.

An image predictive decoding program according to the present invention is an image predictive decoding program comprising: a data decoding module for decoding encoded data of a residual signal concerning a target region being a processing target in compressed data; a residual signal restoring module for restoring a reproduced residual signal from a signal obtained by the decoding by the data decoding module; a prediction signal generating module for generating a prediction signal for a target pixel signal of the target region; and a reproduced image signal generating module for adding the prediction signal generated by the prediction signal generating module to the reproduced residual signal restored by the residual signal restoring module, thereby generating a reproduced image signal, wherein the prediction signal generating module is configured to: search a search region comprising a previously-reproduced image, for a plurality of prediction adjacent regions highly correlated to a target adjacent region consisting of a previously-reproduced adjacent pixel signal adjacent to the target region consisting of the target pixel signal; derive at least two arbitrary combinations of prediction adjacent regions including at least one of the plurality of prediction adjacent regions obtained by the search, process pixel signals of the prediction adjacent regions belonging to the derived combinations, by a predetermined synthesis method, thereby generating a comparison signal to the adjacent pixel signal for each of the derived combinations, and select a combination with a high correlation between the comparison signal and the adjacent pixel signal; and generate at least one candidate prediction signal for the target pixel signal, based on the prediction adjacent regions belonging to the selected combination, and process the candidate prediction signal by a predetermined synthesis method, thereby generating the prediction signal.

Another image predictive encoding method according to the present invention is an image predictive encoding method comprising: a region dividing step of dividing an input image into a plurality of regions; a prediction signal generating step of generating a prediction signal for a target pixel signal of a target region being a processing target out of the plurality of regions resulting from the dividing by the region dividing step; a residual signal generating step of generating a residual signal between the target pixel signal and the prediction signal generated by the prediction signal generating step; and an encoding step of encoding the residual signal generated by the residual signal generating step, wherein the prediction signal generating step is configured to: search a search region comprising a previously-reproduced image, for a plurality of prediction adjacent regions highly correlated to a target adjacent region consisting of a previously-reproduced adjacent pixel signal adjacent to the target region consisting of the target pixel signal; calculate an evaluated value for evaluation of correlation among N candidate prediction signals by a predetermined method, using at least two signals from pixel signals of N prediction regions based on the target region out of the plurality of prediction adjacent regions obtained by the search or pixel signals of prediction adjacent regions among N prediction adjacent regions obtained by the search, or from the both signals; and if the evaluated value is smaller than a prescribed threshold, process the N candidate prediction signals by a predetermined synthesis method, thereby generating the prediction signal.

Another image predictive decoding method according to the present invention is an image predictive decoding method comprising: a data decoding step of decoding encoded data of a residual signal concerning a target region being a processing target in compressed data; a residual signal restoring step of restoring a reproduced residual signal from a signal obtained by the decoding by the data decoding step; a prediction signal generating step of generating a prediction signal for a target pixel signal of the target region; and a reproduced image signal generating step of adding the prediction signal generated by the prediction signal generating step to the reproduced residual signal restored by the residual signal restoring step, thereby generating a reproduced image signal, wherein the prediction signal generating step is configured to: search a search region comprising a previously-reproduced image, for a plurality of prediction adjacent regions highly correlated to a target adjacent region consisting of a previously-reproduced adjacent pixel signal adjacent to the target region consisting of the target pixel signal; calculate an evaluated value for evaluation of correlation among N candidate prediction signals by a predetermined method, using at least two signals from pixel signals of N prediction regions based on the target region out of the plurality of prediction adjacent regions obtained by the search or pixel signals of prediction adjacent regions among N prediction adjacent regions obtained by the search, or from the both signals; and if the evaluated value is smaller than a prescribed threshold, process the N candidate prediction signals by a predetermined synthesis method, thereby generating the prediction signal.

Another image predictive encoding method according to the present invention is an image predictive encoding method comprising: a region dividing step of dividing an input image into a plurality of regions; a prediction signal generating step of generating a prediction signal for a target pixel signal of a target region being a processing target out of the plurality of regions resulting from the dividing by the region dividing step; a residual signal generating step of generating a residual signal between the target pixel signal and the prediction signal generated by the prediction signal generating step; and an encoding step of encoding the residual signal generated by the residual signal generating step, wherein the prediction signal generating step is configured to: acquire a plurality of prediction adjacent regions of the same shape as a target adjacent region adjacent to the target region, from each search region comprising a previously-reproduced image; derive an arbitrary combination of prediction adjacent regions including at least two prediction adjacent regions out of the plurality of prediction adjacent regions acquired, and derive at least two sets of weighting factors for weighted averaging of pixel signals of the prediction adjacent regions belonging to the combination; perform, for the combination, the weighted averaging of the pixel signals of the prediction adjacent regions belonging to the combination using the sets of weighting factors, thereby generating at least two comparison signals to the adjacent pixel signal; select a set of weighting factors with a high correlation between the comparison signal and the adjacent pixel signal; and generate at least two candidate prediction signals for the target pixel signal from the previously-reproduced image, based on the prediction adjacent regions belonging to the combination, and perform weighted averaging of the candidate prediction signals using the selected set of weighting factors, thereby generating the prediction signal.

Another image predictive encoding method according to the present invention is an image predictive encoding method comprising: a region dividing step of dividing an input image into a plurality of regions; a prediction signal generating step of generating a prediction signal for a target pixel signal of a target region being a processing target out of the plurality of regions resulting from the dividing by the region dividing step; a residual signal generating step of generating a residual signal between the target pixel signal and the prediction signal generated by the prediction signal generating step; and an encoding step of encoding the residual signal generated by the residual signal generating step, wherein the prediction signal generating step is configured to: acquire a plurality of prediction adjacent regions of the same shape as a target adjacent region adjacent to the target region, from each search region comprising a previously-reproduced image; derive at least two arbitrary combinations of prediction adjacent regions including at least one of the plurality of prediction adjacent regions acquired; derive, for each of combinations including at least two prediction adjacent regions, at least two sets of weighting factors for weighted averaging of pixel signals of the prediction adjacent regions belonging to the combination, perform the weighted averaging of the pixel signals of the prediction adjacent signals using the sets of weighting factors, thereby generating at least two comparison signals to the adjacent pixel signal, and select a set of weighting factors with a high correlation between the comparison signal and the adjacent pixel signal; perform, for the combinations, the weighted averaging of the pixel signals of the prediction adjacent regions using the selected set of weighting factors for the pixel signals of the prediction adjacent regions belonging to the combinations, thereby generating at least two comparison signals to the adjacent pixel signal, and select a combination with a high correlation between the comparison signal and the adjacent pixel signal; and generate at least one candidate prediction signal for the target pixel signal from the previously-reproduced image, based on the prediction adjacent regions belonging to the selected combination, and perform weighted averaging of the candidate prediction signal using the previously selected set of weighting factors for the selected combination, thereby generating the prediction signal.

Another image predictive decoding method according to the present invention is an image predictive decoding method comprising: a data decoding step of decoding encoded data of a residual signal concerning a target region being a processing target in compressed data; a residual signal restoring step of restoring a reproduced residual signal from a signal obtained by the decoding by the data decoding step; a prediction signal generating step of generating a prediction signal for a target pixel signal of the target region; and a reproduced image signal generating step of adding the prediction signal generated by the prediction signal generating step to the reproduced residual signal restored by the residual signal restoring step, thereby generating a reproduced image signal, wherein the prediction signal generating step is configured to: acquire a plurality of prediction adjacent regions of the same shape as a target adjacent region adjacent to the target region, from each search region comprising a previously-reproduced image; derive an arbitrary combination of prediction adjacent regions including at least two prediction adjacent regions out of the plurality of prediction adjacent regions acquired, and derive at least two sets of weighting factors for weighted averaging of pixel signals of the prediction adjacent regions belonging to the combination; perform, for the combination, the weighted averaging of the pixel signals of the prediction adjacent regions belonging to the combination using the sets of weighting factors, thereby generating at least two comparison signals to the adjacent pixel signal; select a set of weighting factors with a high correlation between the comparison signal and the adjacent pixel signal; and generate at least two candidate prediction signals for the target pixel signal from the previously-reproduced image, based on the prediction adjacent regions belonging to the combination, and perform weighted averaging of the candidate prediction signals using the selected set of weighting factors, thereby generating the prediction signal.

Another image predictive decoding method according to the present invention is an image predictive decoding method comprising: a data decoding step of decoding encoded data of a residual signal concerning a target region being a processing target in compressed data; a residual signal restoring step of restoring a reproduced residual signal from a signal obtained by the decoding by the data decoding step; a prediction signal generating step of generating a prediction signal for a target pixel signal of the target region; and a reproduced image signal generating step of adding the prediction signal generated by the prediction signal generating step to the reproduced residual signal restored by the residual signal restoring step, thereby generating a reproduced image signal, wherein the prediction signal generating step is configured to: acquire a plurality of prediction adjacent regions of the same shape as a target adjacent region adjacent to the target region, from each search region comprising a previously-reproduced image; derive at least two arbitrary combinations of prediction adjacent regions including at least one of the plurality of prediction adjacent regions acquired; derive, for each of combinations including at least two prediction adjacent regions, at least two sets of weighting factors for weighted averaging of pixel signals of the prediction adjacent regions belonging to the combination, perform the weighted averaging of the pixel signals of the prediction adjacent signals using the sets of weighting factors, thereby generating at least two comparison signals to the adjacent pixel signal, and select a set of weighting factors with a high correlation between the comparison signal and the adjacent pixel signal; perform, for the combinations, the weighted averaging of the pixel signals of the prediction adjacent regions using the selected set of weighting factors for the pixel signals of the prediction adjacent regions belonging to the combinations, thereby generating at least two comparison signals to the adjacent pixel signal, and select a combination with a high correlation between the comparison signal and the adjacent pixel signal; and generate at least one candidate prediction signal for the target pixel signal from the previously-reproduced image, based on the prediction adjacent regions belonging to the selected combination, and perform weighted averaging of the candidate prediction signal using the previously selected set of weighting factors for the selected combination, thereby generating the prediction signal.

An image predictive encoding program according to the present invention is an image predictive encoding program comprising: a region dividing module for dividing an input image into a plurality of regions; a prediction signal generating module for generating a prediction signal for a target pixel signal of a target region being a processing target out of the plurality of regions resulting from the dividing by the region dividing module; a residual signal generating module for generating a residual signal between the target pixel signal and the prediction signal generated by the prediction signal generating module; and an encoding module for encoding the residual signal generated by the residual signal generating module, wherein the prediction signal generating module is configured to: search a search region comprising a previously-reproduced image, for a plurality of prediction adjacent regions highly correlated to a target adjacent region consisting of a previously-reproduced adjacent pixel signal adjacent to the target region consisting of the target pixel signal; calculate an evaluated value for evaluation of correlation among N candidate prediction signals by a predetermined method, using at least two signals from pixel signals of N prediction regions based on the target region out of the plurality of prediction adjacent regions obtained by the search or pixel signals of prediction adjacent regions among N prediction adjacent regions obtained by the search, or from the both signals; and if the evaluated value is smaller than a prescribed threshold, process the N candidate prediction signals by a predetermined synthesis method, thereby generating the prediction signal.

An image predictive encoding program according to the present invention is an image predictive decoding program comprising: a data decoding module for decoding encoded data of a residual signal concerning a target region being a processing target in compressed data; a residual signal restoring module for restoring a reproduced residual signal from a signal obtained by the decoding by the data decoding module; a prediction signal generating module for generating a prediction signal for a target pixel signal of the target region; and a reproduced image signal generating module for adding the prediction signal generated by the prediction signal generating module to the reproduced residual signal restored by the residual signal restoring module, thereby generating a reproduced image signal, wherein the prediction signal generating module is configured to: search a search region comprising a previously-reproduced image, for a plurality of prediction adjacent regions highly correlated to a target adjacent region consisting of a previously-reproduced adjacent pixel signal adjacent to the target region consisting of the target pixel signal; calculate an evaluated value for evaluation of correlation among N candidate prediction signals by a predetermined method, using at least two signals from pixel signals of N prediction regions based on the target region out of the plurality of prediction adjacent regions obtained by the search or pixel signals of prediction adjacent regions among N prediction adjacent regions obtained by the search, or from the both signals; and if the evaluated value is smaller than a prescribed threshold, process the N candidate prediction signals by a predetermined synthesis method, thereby generating the prediction signal.

Another image predictive encoding program according to the present invention is an image predictive encoding program comprising: a region dividing module for dividing an input image into a plurality of regions; a prediction signal generating module for generating a prediction signal for a target pixel signal of a target region being a processing target out of the plurality of regions resulting from the dividing by the region dividing module; a residual signal generating module for generating a residual signal between the target pixel signal and the prediction signal generated by the prediction signal generating module; and an encoding module for encoding the residual signal generated by the residual signal generating module, wherein the prediction signal generating module is configured to: acquire a plurality of prediction adjacent regions of the same shape as a target adjacent region adjacent to the target region, from each search region comprising a previously-reproduced image; derive an arbitrary combination of prediction adjacent regions including at least two prediction adjacent regions out of the plurality of prediction adjacent regions acquired, and derive at least two sets of weighting factors for weighted averaging of pixel signals of the prediction adjacent regions belonging to the combination; perform, for the combination, the weighted averaging of the pixel signals of the prediction adjacent regions belonging to the combination using the sets of weighting factors, thereby generating at least two comparison signals to the adjacent pixel signal; select a set of weighting factors with a high correlation between the comparison signal and the adjacent pixel signal; and generate at least two candidate prediction signals for the target pixel signal from the previously-reproduced image, based on the prediction adjacent regions belonging to the combination, and perform weighted averaging of the candidate prediction signals using the selected set of weighting factors, thereby generating the prediction signal.

Another image predictive encoding program according to the present invention is an image predictive encoding program comprising: a region dividing module for dividing an input image into a plurality of regions; a prediction signal generating module for generating a prediction signal for a target pixel signal of a target region being a processing target out of the plurality of regions resulting from the dividing by the region dividing module; a residual signal generating module for generating a residual signal between the target pixel signal and the prediction signal generated by the prediction signal generating module; and an encoding module for encoding the residual signal generated by the residual signal generating module, wherein the prediction signal generating module is configured to: acquire a plurality of prediction adjacent regions of the same shape as a target adjacent region adjacent to the target region, from each search region comprising a previously-reproduced image; derive at least two arbitrary combinations of prediction adjacent regions including at least one of the plurality of prediction adjacent regions acquired; derive, for each of combinations including at least two prediction adjacent regions, at least two sets of weighting factors for weighted averaging of pixel signals of the prediction adjacent regions belonging to the combination, perform the weighted averaging of the pixel signals of the prediction adjacent signals using the sets of weighting factors, thereby generating at least two comparison signals to the adjacent pixel signal, and select a set of weighting factors with a high correlation between the comparison signal and the adjacent pixel signal; perform, for the combinations, the weighted averaging of the pixel signals of the prediction adjacent regions using the selected set of weighting factors for the pixel signals of the prediction adjacent regions belonging to the combinations, thereby generating at least two comparison signals to the adjacent pixel signal, and select a combination with a high correlation between the comparison signal and the adjacent pixel signal; and generate at least one candidate prediction signal for the target pixel signal from the previously-reproduced image, based on the prediction adjacent regions belonging to the selected combination, and perform weighted averaging of the candidate prediction signal using the previously selected set of weighting factors for the selected combination, thereby generating the prediction signal.

Another image predictive decoding program according to the present invention is an image predictive decoding program comprising: a data decoding module for decoding encoded data of a residual signal concerning a target region being a processing target in compressed data; a residual signal restoring module for restoring a reproduced residual signal from a signal obtained by the decoding by the data decoding module; a prediction signal generating module for generating a prediction signal for a target pixel signal of the target region; and a reproduced image signal generating module for adding the prediction signal generated by the prediction signal generating module to the reproduced residual signal restored by the residual signal restoring module, thereby generating a reproduced image signal, wherein the prediction signal generating module is configured to: acquire a plurality of prediction adjacent regions of the same shape as a target adjacent region adjacent to the target region, from each search region comprising a previously-reproduced image; derive an arbitrary combination of prediction adjacent regions including at least two prediction adjacent regions out of the plurality of prediction adjacent regions acquired, and derive at least two sets of weighting factors for weighted averaging of pixel signals of the prediction adjacent regions belonging to the combination; perform, for the combination, the weighted averaging of the pixel signals of the prediction adjacent regions belonging to the combination using the sets of weighting factors, thereby generating at least two comparison signals to the adjacent pixel signal; select a set of weighting factors with a high correlation between the comparison signal and the adjacent pixel signal; and generate at least two candidate prediction signals for the target pixel signal from the previously-reproduced image, based on the prediction adjacent regions belonging to the combination, and perform weighted averaging of the candidate prediction signals using the selected set of weighting factors, thereby generating the prediction signal.

Another image predictive decoding program according to the present invention is an image predictive decoding program comprising: a data decoding module for decoding encoded data of a residual signal concerning a target region being a processing target in compressed data; a residual signal restoring module for restoring a reproduced residual signal from a signal obtained by the decoding by the data decoding module; a prediction signal generating module for generating a prediction signal for a target pixel signal of the target region; and a reproduced image signal generating module for adding the prediction signal generated by the prediction signal generating module to the reproduced residual signal restored by the residual signal restoring module, thereby generating a reproduced image signal, wherein the prediction signal generating module is configured to: acquire a plurality of prediction adjacent regions of the same shape as an target adjacent region adjacent to the target region, from each search region comprising a previously-reproduced image; derive at least two arbitrary combinations of prediction adjacent regions including at least one of the plurality of prediction adjacent regions acquired; derive, for each of combinations including at least two prediction adjacent regions, at least two sets of weighting factors for weighted averaging of pixel signals of the prediction adjacent regions belonging to the combination, perform the weighted averaging of the pixel signals of the prediction adjacent signals using the sets of weighting factors, thereby generating at least two comparison signals to the adjacent pixel signal, and select a set of weighting factors with a high correlation between the comparison signal and the adjacent pixel signal; perform, for the combinations, the weighted averaging of the pixel signals of the prediction adjacent regions using the selected set of weighting factors for the pixel signals of the prediction adjacent regions belonging to the combinations, thereby generating at least two comparison signals to the adjacent pixel signal, and select a combination with a high correlation between the comparison signal and the adjacent pixel signal; and generate at least one candidate prediction signal for the target pixel signal from the previously-reproduced image, based on the prediction adjacent regions belonging to the selected combination, and perform weighted averaging of the candidate prediction signal using the previously selected set of weighting factors for the selected combination, thereby generating the prediction signal.

For solving the aforementioned problem, an image predictive encoding device according to the present invention is an image predictive encoding device comprising: region dividing means for dividing an input image into a plurality of regions; prediction signal generating means for generating a prediction signal for a target pixel signal of a target region being a processing target out of the plurality of regions resulting from the dividing by the region dividing means; residual signal generating means for generating a residual signal between the target pixel signal and the prediction signal generated by the prediction signal generating means; and encoding means for encoding the residual signal generated by the residual signal generating means, wherein the prediction signal generating means is configured to: search a search region comprising a previously-reproduced image, for a plurality of prediction adjacent regions highly correlated to a target adjacent region consisting of a previously-reproduced adjacent pixel signal adjacent to the target region consisting of the target pixel signal; select at least one prediction adjacent region from the plurality of prediction adjacent regions obtained by the search, using coordinate information indicating at least positions of the prediction adjacent regions; and generate at least one candidate prediction signal for the target pixel signal, based on the selected prediction adjacent region, and process the candidate prediction signal by a predetermined synthesis method, thereby generating the prediction signal.

According to this invention, the device is configured to search the search region comprising the previously-reproduced image, for a plurality of prediction adjacent regions highly correlated to the target adjacent region, select at least one prediction adjacent region from the plurality of prediction adjacent regions obtained by the search, using the coordinate information indicating at least the positions of the prediction adjacent regions, generate at least one candidate prediction signal for the target pixel signal, based on the selected prediction adjacent region, and process the candidate prediction signal by the predetermined synthesis method, thereby generating the prediction signal. This configuration permits the device to select the combination of candidate prediction signals suitable for smoothing while providing them with diversity, without increase in information amount, using the target adjacent region consisting of the previously-reproduced adjacent pixel signal adjacent to the target region, whereby the prediction signal can be generated with efficient consideration to local noise characteristics, thereby enabling efficient encoding.

Another image predictive encoding device according to the present invention is an image predictive encoding device comprising: region dividing means for dividing an input image into a plurality of regions; prediction signal generating means for generating a prediction signal for a target pixel signal of a target region being a processing target out of the plurality of regions resulting from the dividing by the region dividing means; residual signal generating means for generating a residual signal between the target pixel signal and the prediction signal generated by the prediction signal generating means; and encoding means for encoding the residual signal generated by the residual signal generating means, wherein the prediction signal generating means is configured to: search a search region comprising a previously-reproduced image, for a plurality of prediction adjacent regions highly correlated to a target adjacent region consisting of a previously-reproduced adjacent pixel signal adjacent to the target region consisting of the target pixel signal; set a number of prediction adjacent regions to be selected; select the set number of prediction adjacent regions from the search region, using coordinate information indicating at least positions of the prediction adjacent regions; and generate the set number of candidate prediction signals for the target pixel signal, based on the selected prediction adjacent regions, and process the candidate prediction signals by a predetermined synthesis method, thereby generating the prediction signal.

According to this invention, the device is configured to search the search region comprising the previously-reproduced image, for a plurality of prediction adjacent regions highly correlated to the target adjacent region, set the number of prediction adjacent regions to be selected, select the set number of prediction adjacent regions from the search region, using the coordinate information indicating at least the positions of the prediction adjacent regions, generate the set number of candidate prediction signals for the target pixel signal on the basis of the selected prediction adjacent regions, and process the candidate prediction signals by the predetermined synthesis method, thereby generating the prediction signal. This configuration permits the device to select the combination of candidate prediction signals suitable for smoothing while providing them with diversity, without increase in information amount, using the target adjacent region consisting of the previously-reproduced adjacent pixel signal adjacent to the target region, whereby the prediction signal can be generated with efficient consideration to local noise characteristics, thereby enabling efficient encoding.

Another image predictive encoding device according to the present invention is an image predictive encoding device comprising: region dividing means for dividing an input image into a plurality of regions; prediction signal generating means for generating a prediction signal for a target pixel signal of a target region being a processing target out of the plurality of regions resulting from the dividing by the region dividing means; residual signal generating means for generating a residual signal between the target pixel signal and the prediction signal generated by the prediction signal generating means; and encoding means for encoding the residual signal generated by the residual signal generating means, wherein the prediction signal generating means is configured to: search a search region comprising a previously-reproduced image, for a plurality of prediction adjacent regions highly correlated to a target adjacent region consisting of a previously-reproduced adjacent pixel signal adjacent to the target region consisting of the target pixel signal; generate at least two combinations of prediction adjacent regions including different numbers of prediction adjacent regions, using coordinate information indicating at least positions of the prediction adjacent regions; process pixel signals of the prediction adjacent regions belonging to the combinations, by a predetermined synthesis method, thereby generating comparison signals to the adjacent pixel signal, and select a combination of prediction adjacent regions with a high correlation between the comparison signal and the adjacent pixel signal out of the generated combinations of prediction adjacent regions; and generate at least one candidate prediction signal for the target pixel signal, based on the prediction adjacent regions belonging to the selected combination, and process the candidate prediction signal by a predetermined synthesis method, thereby generating the prediction signal.

According to this invention, the device is configured to search the search region comprising the previously-reproduced image, for a plurality of prediction adjacent regions highly correlated to the target adjacent region, generate at least two combinations of prediction adjacent regions including different numbers of prediction adjacent regions, using the coordinate information indicating at least the positions of the prediction adjacent regions, process the pixel signals of the prediction adjacent regions belonging to the combinations, by the predetermined synthesis method, to generate the comparison signals to the adjacent pixel signal, select a combination of prediction adjacent regions with a high correlation between the comparison signal and the adjacent pixel signal, generate at least one candidate prediction signal for the target pixel signal, based on the prediction adjacent regions belonging to the selected combination, and process the candidate prediction signal by the predetermined synthesis method to generate the prediction signal. This configuration permits the device to select the combination of candidate prediction signals suitable for smoothing while providing them with diversity, without increase in information amount, using the target adjacent region consisting of the previously-reproduced adjacent pixel signal adjacent to the target region, whereby the prediction signal can be generated with efficient consideration to local noise characteristics, thereby enabling efficient encoding.

In the image predictive encoding device of the present invention, the prediction signal generating means is preferably configured to select the prediction adjacent regions, using coordinate information containing temporal or spatial position information, or spatial-temporal position information.

According to this invention, the device is configured to select the prediction adjacent regions, using the coordinate information containing the temporal or spatial position information, or the spatial-temporal position information, whereby it can select the combination of candidate prediction signals suitable for smoothing with diversity and without increase in information amount.

In the image predictive encoding device of the present invention, the prediction signal generating means is preferably configured to perform processing using coordinate information containing an identification number of a reference image to which the prediction adjacent regions belong.

According to this invention, the device is configured to perform the processing using the coordinate information containing the identification number of the reference image to which the prediction adjacent regions belong, whereby it can select the combination of candidate prediction signals suitable for smoothing with diversity and without increase in information amount.

In the image predictive encoding device of the present invention, the prediction signal generating means is preferably configured to select the prediction adjacent regions, using coordinate information containing spatial position information on a reference image to which the prediction adjacent regions belong.

According to this invention, the device is configured to select the prediction adjacent regions, using the coordinate information containing the spatial position information on the reference image to which the prediction adjacent regions belong, whereby it can select the combination of candidate prediction signals suitable for smoothing with diversity and without increase in information amount.

In the image predictive encoding device of the present invention, the prediction signal generating means is preferably configured to select the prediction adjacent regions, using coordinate information containing motion vectors indicating spatial position relations between the target region and the prediction adjacent regions.

According to this invention, the device is configured to select the prediction adjacent regions, using the coordinate information containing the motion vectors of the prediction adjacent regions, whereby it can select the combination of candidate prediction signals suitable for smoothing with diversity and without increase in information amount.

An image predictive decoding device according to the present invention is an image predictive decoding device comprising: data decoding means for decoding encoded data of a residual signal concerning a target region being a processing target in compressed data; residual signal restoring means for restoring a reproduced residual signal from a signal obtained by the decoding by the data decoding means; prediction signal generating means for generating a prediction signal for a target pixel signal of the target region; and reproduced image signal generating means for adding the prediction signal generated by the prediction signal generating means to the reproduced residual signal restored by the residual signal restoring means, thereby generating a reproduced image signal, wherein the prediction signal generating means is configured to: search a search region comprising a previously-reproduced image, for a plurality of prediction adjacent regions highly correlated to a target adjacent region consisting of a previously-reproduced adjacent pixel signal adjacent to the target region consisting of the target pixel signal; select at least one prediction adjacent region from the plurality of prediction adjacent regions obtained by the search, using coordinate information indicating at least positions of the prediction adjacent regions; and generate at least one candidate prediction signal for the target pixel signal, based on the selected prediction adjacent region, and process the candidate prediction signal by a predetermined synthesis method, thereby generating the prediction signal.

According to this invention, the device is configured to search the search region comprising the previously-reproduced image, for a plurality of prediction adjacent regions highly correlated to the target adjacent region, select at least one prediction adjacent region from the plurality of prediction adjacent regions obtained by the search, using the coordinate information indicating at least the positions of the prediction adjacent regions, generate at least one candidate prediction signal for the target pixel signal, based on the selected prediction adjacent region, and process the candidate prediction signal by the predetermined synthesis method, thereby generating the prediction signal. This configuration permits the device to select the combination of candidate prediction signals suitable for smoothing while providing them with diversity, without increase in information amount, using the target adjacent region consisting of the previously-reproduced adjacent pixel signal adjacent to the target region, whereby the prediction signal can be generated with efficient consideration to local noise characteristics. This enables the device to decode the encoded data efficiently using the thus generated prediction signal.

Another image predictive decoding device according to the present invention is an image predictive decoding device comprising: data decoding means for decoding encoded data of a residual signal concerning a target region being a processing target in compressed data; residual signal restoring means for restoring a reproduced residual signal from a signal obtained by the decoding by the data decoding means; prediction signal generating means for generating a prediction signal for a target pixel signal of the target region; and reproduced image signal generating means for adding the prediction signal generated by the prediction signal generating means to the reproduced residual signal restored by the residual signal restoring means, thereby generating a reproduced image signal, wherein the prediction signal generating means is configured to: search a search region comprising a previously-reproduced image, for a plurality of prediction adjacent regions highly correlated to a target adjacent region consisting of a previously-reproduced adjacent pixel signal adjacent to the target pixel signal; set a number of prediction adjacent regions to be selected; select the set number of prediction adjacent regions from everywhere in the search region, using coordinate information indicating at least positions of the prediction adjacent regions; and generate the selected number of candidate prediction signals for the target pixel signal, based on the selected prediction adjacent regions, and process the candidate prediction signals by a predetermined synthesis method, thereby generating the prediction signal.

According to this invention, the device is configured to search the search region comprising the previously-reproduced image, for a plurality of prediction adjacent regions highly correlated to the target adjacent region, set the number of prediction adjacent regions to be selected, select the set number of prediction adjacent regions from the search region, using the coordinate information indicating at least the positions of the prediction adjacent regions, generate the set number of candidate prediction signals for the target pixel signal on the basis of the selected prediction adjacent regions, and process the candidate prediction signals by the predetermined synthesis method, thereby generating the prediction signal. This configuration permits the device to select the combination of candidate prediction signals suitable for smoothing while providing them with diversity, without increase in information amount, using the target adjacent region consisting of the previously-reproduced adjacent pixel signal adjacent to the target region, whereby the prediction signal can be generated with efficient consideration to local noise characteristics. This enables the device to decode the encoded data efficiently using the prediction signal generated as described above.

Another image predictive decoding device according to the present invention is an image predictive decoding device comprising: data decoding means for decoding encoded data of a residual signal concerning a target region being a processing target in compressed data; residual signal restoring means for restoring a reproduced residual signal from a signal obtained by the decoding by the data decoding means; prediction signal generating means for generating a prediction signal for a target pixel signal of the target region; and reproduced image signal generating means for adding the prediction signal generated by the prediction signal generating means to the reproduced residual signal restored by the residual signal restoring means, thereby generating a reproduced image signal, wherein the prediction signal generating means is configured to: search a search region comprising a previously-reproduced image, for a plurality of prediction adjacent regions highly correlated to a target adjacent region consisting of a previously-reproduced adjacent pixel signal adjacent to the target pixel signal; select a number of prediction adjacent regions to be selected; generate at least two combinations of prediction adjacent regions including different numbers of prediction adjacent regions, using coordinate information indicating at least positions of the prediction adjacent regions; process pixel signals of the prediction adjacent regions belonging to the combinations, by a predetermined synthesis method, thereby generating comparison signals to the adjacent pixel signal, and select a combination with a high correlation between the comparison signal and the adjacent pixel signal out of the generated combinations of prediction adjacent regions; and generate at least one candidate prediction signal for the target pixel signal, based on the prediction adjacent regions belonging to the selected combination, and process the candidate prediction signal by a predetermined synthesis method, thereby generating the prediction signal.

According to this invention, the device is configured to search the search region comprising the previously-reproduced image, for a plurality of prediction adjacent regions highly correlated to the target adjacent region, generate at least two combinations of prediction adjacent regions including different numbers of prediction adjacent regions, using the coordinate information indicating at least the positions of the prediction adjacent regions, process the pixel signals of the prediction adjacent regions belonging to the combinations, by the predetermined synthesis method, to generate the comparison signals to the adjacent pixel signal, select a combination of prediction adjacent regions with a high correlation between the comparison signal and the adjacent pixel signal, generate at least one candidate prediction signal for the target pixel signal, based on the prediction adjacent regions belonging to the selected combination, and process the candidate prediction signal by the predetermined synthesis method to generate the prediction signal. This configuration permits the device to select the combination of candidate prediction signals suitable for smoothing while providing them with diversity, without increase in information amount, using the target adjacent region consisting of the previously-reproduced adjacent pixel signal adjacent to the target region, whereby the prediction signal can be generated with efficient consideration to local noise characteristics. This permits the device to decode the encoded data efficiently using the prediction signal generated as described above.

In the image predictive decoding device of the present invention, the prediction signal generating means is preferably configured to select the prediction adjacent regions, using coordinate information containing temporal or spatial position information, or spatial-temporal position information.

According to this invention, the device is configured to perform the processing using the coordinate information containing the identification number of the reference image to which the prediction adjacent regions belong, whereby it can select the combination of candidate prediction signals suitable for smoothing with diversity and without increase in information amount.

In the image predictive decoding device of the present invention, the prediction signal generating means is preferably configured to perform processing using coordinate information containing an identification number of a reference image to which the prediction adjacent regions belong.

According to this invention, the device is configured to select the prediction adjacent regions, using the coordinate information containing the spatial position information on the reference image to which the prediction adjacent regions belong, whereby it can select the combination of candidate prediction signals suitable for smoothing with diversity and without increase in information amount.

In the image predictive decoding device of the present invention, the prediction signal generating means is preferably configured to select the prediction adjacent regions, using coordinate information containing spatial positions on a reference image to which the prediction adjacent regions belong.

According to this invention, the device is configured to select the prediction adjacent regions, using the coordinate information containing the spatial position information on the reference image to which the prediction adjacent regions belong, whereby it can select the combination of candidate prediction signals suitable for smoothing with diversity and without increase in information amount.

In the image predictive decoding device of the present invention, the prediction signal generating means is preferably configured to select the prediction adjacent regions, using coordinate information containing motion vectors indicating spatial position relations between the target region and the prediction adjacent regions.

According to this invention, the device is configured to select the prediction adjacent regions, using the coordinate information containing the motion vectors of the prediction adjacent regions, whereby it can select the combination of candidate prediction signals suitable for smoothing with diversity and without increase in information amount.

Incidentally, the present invention cannot be described only as the invention of the image predictive encoding apparatus or image predictive decoding apparatus as described above, but can also be described as the invention of image predictive encoding methods, image predictive decoding methods, image predictive encoding programs, and image predictive decoding programs as described below. These are different only in category but substantially the same invention, with the same action and effect.

Specifically, an image predictive encoding method according to the present invention is an image predictive encoding method comprising: a region dividing step of dividing an input image into a plurality of regions; a prediction signal generating step of generating a prediction signal for a target pixel signal of a target region being a processing target out of the plurality of regions resulting from the dividing by the region dividing step; a residual signal generating step of generating a residual signal between the target pixel signal and the prediction signal generated by the prediction signal generating step; and an encoding step of encoding the residual signal generated by the residual signal generating step, wherein the prediction signal generating step is configured to: search a search region comprising a previously-reproduced image, for a plurality of prediction adjacent regions highly correlated to a target adjacent region consisting of a previously-reproduced adjacent pixel signal adjacent to the target region consisting of the target pixel signal; select at least one prediction adjacent region from the plurality of prediction adjacent regions obtained by the search, using coordinate information indicating at least positions of the prediction adjacent regions; and generate at least one candidate prediction signal for the target pixel signal, based on the selected prediction adjacent region, and process the candidate prediction signal by a predetermined synthesis method, thereby generating the prediction signal.

An image predictive decoding method according to the present invention is an image predictive decoding method comprising: a data decoding step of decoding encoded data of a residual signal concerning a target region being a processing target in compressed data; a residual signal restoring step of restoring a reproduced residual signal from a signal obtained by the decoding by the data decoding step; a prediction signal generating step of generating a prediction signal for a target pixel signal of the target region; and a reproduced image signal generating step of adding the prediction signal generated by the prediction signal generating step to the reproduced residual signal restored by the residual signal restoring step, thereby generating a reproduced image signal, wherein the prediction signal generating step is configured to: search a search region comprising a previously-reproduced image, for a plurality of prediction adjacent regions highly correlated to a target adjacent region consisting of a previously-reproduced adjacent pixel signal adjacent to the target region consisting of the target pixel signal; select at least one prediction adjacent region from the plurality of prediction adjacent regions obtained by the search, using coordinate information indicating at least positions of the prediction adjacent regions; and generate at least one candidate prediction signal for the target pixel signal, based on the selected prediction adjacent region, and process the candidate prediction signal by a predetermined synthesis method, thereby generating the prediction signal.

An image predictive encoding program according to the present invention is an image predictive encoding program comprising: a region dividing module for dividing an input image into a plurality of regions; a prediction signal generating module for generating a prediction signal for a target pixel signal of a target region being a processing target out of the plurality of regions resulting from the dividing by the region dividing module; a residual signal generating module for generating a residual signal between the target pixel signal and the prediction signal generated by the prediction signal generating module; and an encoding module for encoding the residual signal generated by the residual signal generating module, wherein the prediction signal generating module is configured to: search a search region comprising a previously-reproduced image, for a plurality of prediction adjacent regions highly correlated to a target adjacent region consisting of a previously-reproduced adjacent pixel signal adjacent to the target region consisting of the target pixel signal; select at least one prediction adjacent region from the plurality of prediction adjacent regions obtained by the search, using coordinate information indicating at least positions of the prediction adjacent regions; and generate at least one candidate prediction signal for the target pixel signal, based on the selected prediction adjacent region, and process the candidate prediction signal by a predetermined synthesis method, thereby generating the prediction signal.

An image predictive decoding program according to the present invention is an image predictive decoding program comprising: a data decoding module for decoding encoded data of a residual signal concerning a target region being a processing target in compressed data; a residual signal restoring module for restoring a reproduced residual signal from a signal obtained by the decoding by the data decoding module; a prediction signal generating module for generating a prediction signal for a target pixel signal of the target region; and a reproduced image signal generating module for adding the prediction signal generated by the prediction signal generating module to the reproduced residual signal restored by the residual signal restoring module, thereby generating a reproduced image signal, wherein the prediction signal generating module is configured to: search a search region comprising a previously-reproduced image, for a plurality of prediction adjacent regions highly correlated to a target adjacent region consisting of a previously-reproduced adjacent pixel signal adjacent to the target region consisting of the target pixel signal; select at least one prediction adjacent region from the plurality of prediction adjacent regions obtained by the search, using coordinate information indicating at least positions of the prediction adjacent regions; and generate at least one candidate prediction signal for the target pixel signal, based on the selected prediction adjacent region, and process the candidate prediction signal by a predetermined synthesis method, thereby generating the prediction signal.

Effects of the Invention

According to the present invention, the combination of candidate prediction signals suitable for smoothing is selected without increase in information amount, using the target adjacent region consisting of the previously-reproduced adjacent pixel signal adjacent to the target region, whereby the prediction signal is generated with efficient consideration to local noise characteristics.

According to the present invention, the combination of candidate prediction signals suitable for smoothing is selected with diversity and without increase in information amount, using the target adjacent region consisting of the previously-reproduced adjacent pixel signal adjacent to the target region, whereby the prediction signal is generated with efficient consideration to local noise characteristics.

BRIEF DESCRIPTION OF THE DRAWINGS

FIG. 26 is an explanatory drawing showing a correspondence table for setting a set of weighting factors from differences between a pixel signal of a target adjacent region and pixel signals of prediction adjacent regions.

FIG. 59 is a conceptual diagram showing a processing concept of a motion vector evaluator 284X.

Figure 1:
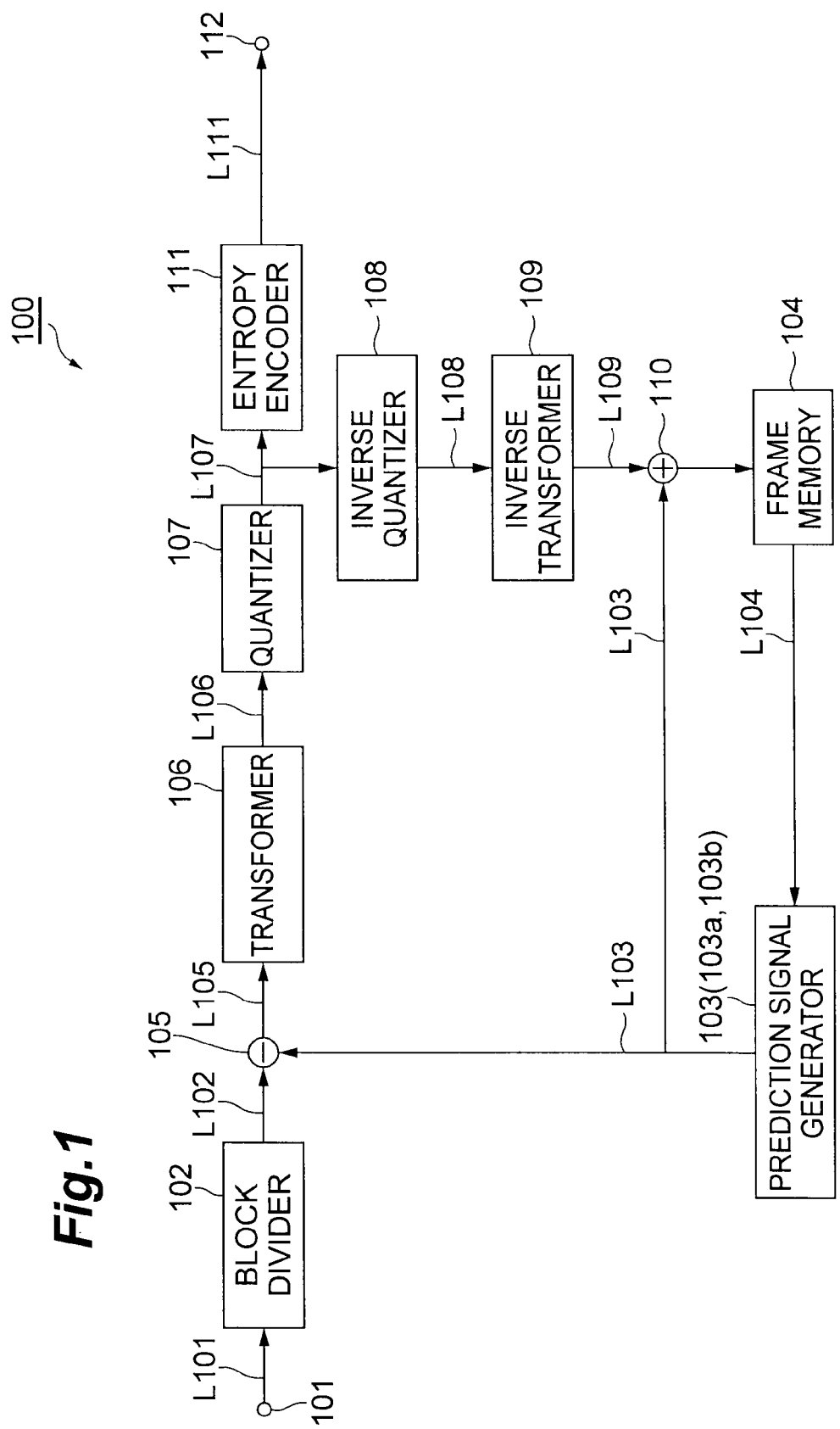
FIG. 1 is a block diagram showing an image predictive encoding device according to an embodiment of the present invention.

DESCRIPTION OF REFERENCE SYMBOLS 100 image predictive encoding device; 101 input terminal; 102 block divider; 103 prediction signal generator; 104 frame memory; 105 subtracter; 106 transformer; 107 quantizer; 108 inverse quantizer; 109 inverse transformer; 110 adder; 111 entropy encoder; 112 output terminal; 201 template matching unit; 202 coordinate information memory; 203 candidate prediction signal combination determiner; 204 prediction region extractor; 205 weighting unit; 206 adder; 211 target adjacent region extractor; 212 prediction adjacent region extractor; 213 comparator; 214 switch; 231 combination setter; 232 prediction adjacent region extractor; 233 target adjacent region extractor; 234 weighting unit; 235 adder; 236 comparison-selection unit; 300 image predictive decoding device; 301 input terminal; 302 entropy decoder; 303 inverse quantizer; 304 inverse transformer; 305 adder; 306 output terminal; 307 frame memory; 308 prediction signal generator; P100 image predictive encoding program; P102 block dividing module; P103 prediction signal generating module; P104 storage module; P105 subtraction module; P106 transform module; P108 inverse quantization module; P109 inverse transform module; P110 addition module; P111 entropy encoding module; P201 template matching module; P202 determination module, P203 prediction signal synthesis module; P300 image predictive decoding program; P302 entropy decoding module; P303 inverse quantization module; P304 inverse transform module; P305 addition module; P307 storage module; P308 prediction signal generating module; 1800 averaging number determiner; 1801 counter; 1802 selected prediction region extractor; 1803 correlation evaluated value calculator; 1804 threshold processor; 2200 candidate prediction signal combination determiner; 2201 weighting factor setter; 2202 weighted averaging unit; 2203 comparison-selection unit; 2204 weighted averaging unit; 2801 prediction region extractor; 100X image predictive encoding device; 101X input terminal; 102X block divider; 103X prediction signal generator; 104X frame memory; 105X subtracter; 106X transformer; 107X quantizer; 108X inverse quantizer; 109X inverse transformer; 110X adder; 111X entropy encoder; 112X output terminal; 201X template matching unit; 202X coordinate information memory; 203X candidate prediction signal combination determiner; 204X prediction region extractor; 205X weighting unit; 206X adder; 211X target adjacent region extractor; 212X prediction adjacent region extractor; 213X comparator; 214X switch; 230X prediction adjacent region setter; 231, 237, or 237dX combination setter; 232X prediction adjacent region extractor; 233X target adjacent region extractor; 234X weighting unit; 235X adder; 236X comparison-selection unit; 281X determiner to determine prediction adjacent regions as evaluation targets; 238X number-of-candidate-prediction-signals determiner; 282X counter; 283X reference image evaluator; 284X motion vector evaluator; 300X image predictive decoding device; 301X input terminal; 302X entropy decoder; 303X inverse quantizer; 304X inverse transformer; 305X adder; 306X output terminal; 307X frame memory; 308X prediction signal generator; P100X image predictive encoding program; P102X block dividing module; P103X prediction signal generating module; P104X storage module; P105X subtraction module; P106X transform module; P108X inverse quantization module; P109X inverse transform module; P110X addition module; P111X entropy encoding module; P201X template matching module; P202X determination module; P203X prediction signal synthesis module; P300X image predictive decoding program; P302X entropy decoding module; P303X inverse quantization module; P304X inverse transform module; P305X addition module; P307X storage module; P308X prediction signal generating module.

BEST MODE FOR CARRYING OUT THE INVENTION

The present invention can be readily understood in view of the following detailed description with reference to the accompanying drawings presented for an embodiment. Embodiments of the present invention will be described below with reference to the accompanying drawings. The same portions will be denoted by the same reference symbols as much as possible, without redundant description.

<First Embodiment>

FIG. 1 is a block diagram showing an image predictive encoding device 100 capable of executing an image predictive encoding method according to an embodiment of the present invention. This image predictive encoding device 100 is constructed with an input terminal 101, a block divider 102 (region dividing means), a prediction signal generator 103 (prediction signal generating means), a frame memory 104, a subtracter 105 (residual signal generating means), a transformer 106 (encoding means), a quantizer 107 (encoding means), an inverse quantizer 108, an inverse transformer 109, an adder 110, an entropy encoder 111, and an output terminal 112. The transformer 106 and quantizer 107 function as an encoding means.

The image predictive encoding device 100 constructed as described above will be described below as to its configuration.

The input terminal 101 is a terminal to which a signal of a dynamic image consisting of a plurality of pictures is input.

The block divider 102 divides an image as a target to be encoded, which is the signal of the dynamic image input from the input terminal 101, into a plurality of regions. In the embodiment according to the present invention, the image is divided into blocks each consisting of 8×8 pixels, but the image may also be divided in any other block size or shape.

The prediction signal generator 103 is a part that generates a prediction signal for a target region (target block) as a target of an encoding process. Specific processing of this prediction signal generator 103 will be described later.

The subtracter 105 is a part that subtracts the prediction signal generated by the prediction signal generator 103 and input via a line L103, from a pixel signal input via a line L102 and indicated by the target region obtained by the division by the block divider 102, to generate a residual signal. The subtracter 105 outputs the residual signal obtained by the subtraction, via a line L105 to the transformer 106.

The transformer 106 is a part that performs a discrete cosine transform of the residual signal obtained by the subtraction. The quantizer 107 is a part that quantizes transform coefficients obtained by the discrete cosine transform by the transformer 106. The entropy encoder 111 compressively encodes the transform coefficients quantized by the quantizer 107 and outputs the compressively-encoded compressed data via a line L111. The output terminal 112 outputs the compressed data being information input from the entropy encoder 111, to the outside.

The inverse quantizer 108 inversely quantizes the quantized transform coefficients and the inverse transformer 109 performs an inverse discrete cosine transform thereof to restore the encoded residual signal. The adder 110 adds the restored residual signal to the prediction signal fed through the line L103, to reproduce the signal of the target block to obtain a reproduced image signal, and stores this reproduced image signal in the frame memory 104. Although the present embodiment employs the transformer 106 and inverse transformer 109, these transformers may be replaced by any other transform processing; thus the transformer 106 and inverse transformer 109 are not always essential. For carrying out intra-picture prediction or inter-picture prediction for a subsequent target region, the compressed pixel signal of the target region is restored by the inverse process and the restored signal is stored in the frame memory 104 as described above.

The prediction signal generator 103 will be described below. The prediction signal generator 103 is a part that generates a prediction signal for a target region as a target of the encoding process (which will be referred to hereinafter as a target block). The present embodiment adopts three types of prediction methods. Namely, the prediction signal generator 103 generates the prediction signal by at least either one or both of an inter-picture prediction method and an intra-picture prediction method described later.

Figure 2:
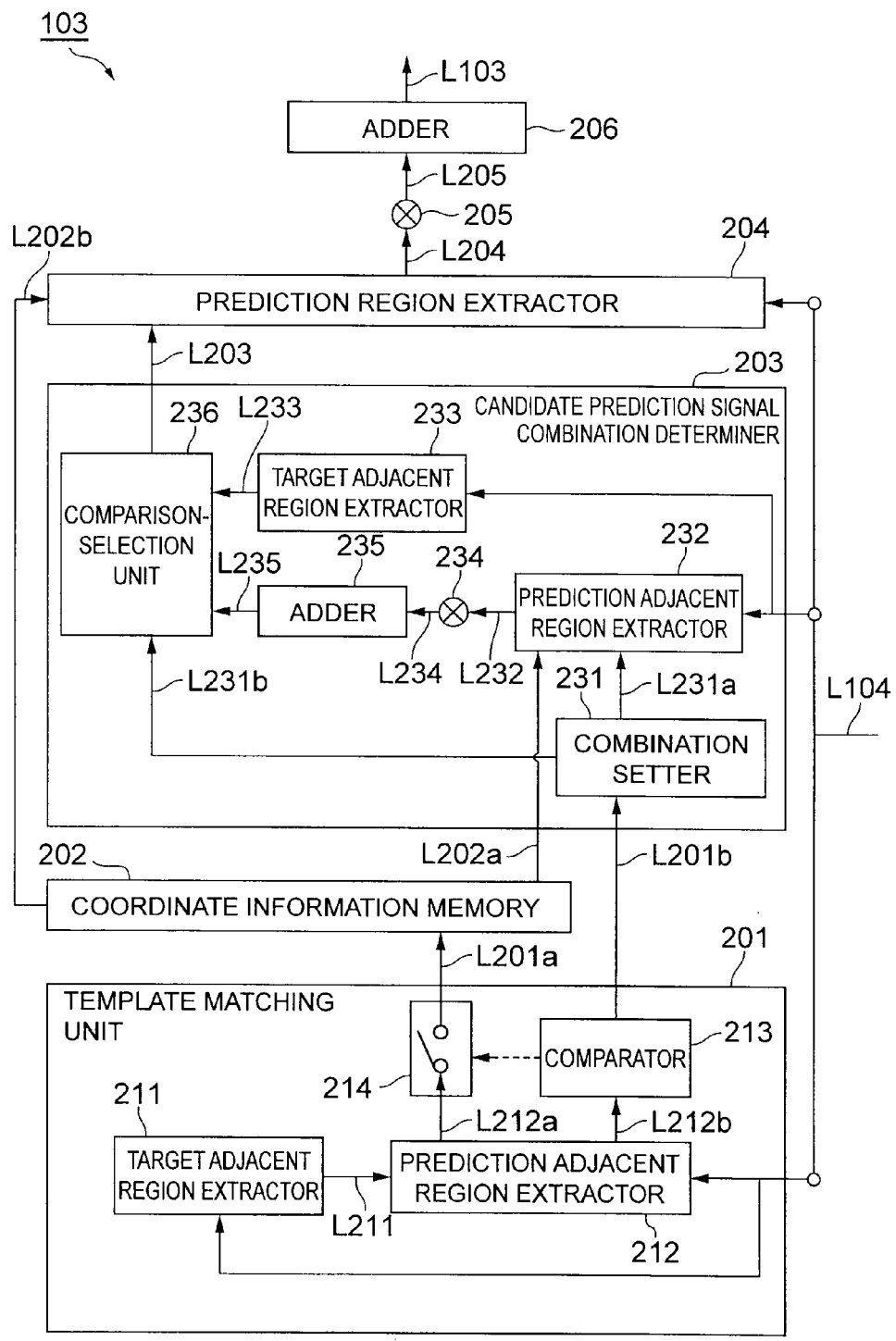
FIG. 2 is a block diagram showing a prediction signal generator 103 used in the image predictive encoding device.

The following will describe the processing of the prediction signal generator 103 in the present embodiment. FIG. 2 is a block diagram showing the prediction signal generator 103 used in the image predictive encoding device 100 according to the present embodiment, and the prediction signal generator 103 is constructed with a template matching unit 201, a coordinate information memory 202, a candidate prediction signal combination determiner 203, a prediction region extractor 204, a weighting unit 205, and an adder 206.

The template matching unit 201 receives an input image signal (reproduced image signal) previously reproduced by past processing, via a line L104 from the frame memory 104, searches for candidates for the prediction signal (candidate prediction signals) for the target pixel signal of the target region by after-described template matching, and outputs coordinate information for access to the candidate prediction signals obtained by the search, via a line L201a to the coordinate information memory 202. At the same time, the template matching unit 201 outputs difference data (corresponding to the sum of absolute differences (SAD) described later) indicating a relation between the target region and each candidate prediction signal, via a line L201b to the candidate prediction signal combination determiner 203.

The candidate prediction signal combination determiner 203 sets a plurality of combinations of candidate prediction signals by making use of the difference data input via the line L201b. Then the candidate prediction signal combination determiner 203 determines a combination of candidate prediction signals, using the pixel signals input via the line L104 from the frame memory in accordance with the coordinate information input via a line L202a from the coordinate information memory 202, and outputs the result as combination information of candidate prediction signals via a line L203 to the prediction region extractor 204.

The prediction region extractor 204 acquires via a line L202b the coordinate information of the candidate prediction signals belonging to this combination, in accordance with the combination information of candidate prediction signals input via the line L203. Then the prediction region extractor 204 acquires the candidate prediction signals corresponding to the acquired coordinate information, via the line L104 from the frame memory 104 and outputs them to the weighting unit 205 on demand. The weighting unit 205 multiplies each candidate prediction signal input via a line L204, by a weighting factor and outputs the result via a line L205 to the adder 206. The adder 206 successively adds the weighted candidate prediction signals and outputs the result as a prediction signal via the line L103 to the subtracter 105 shown in FIG. 1. The operation of the weighting unit can be, for example, a technique of multiplying each candidate prediction signal by 1/N where N is the number of candidate prediction signals, but it may be any other technique.

Figure 3:
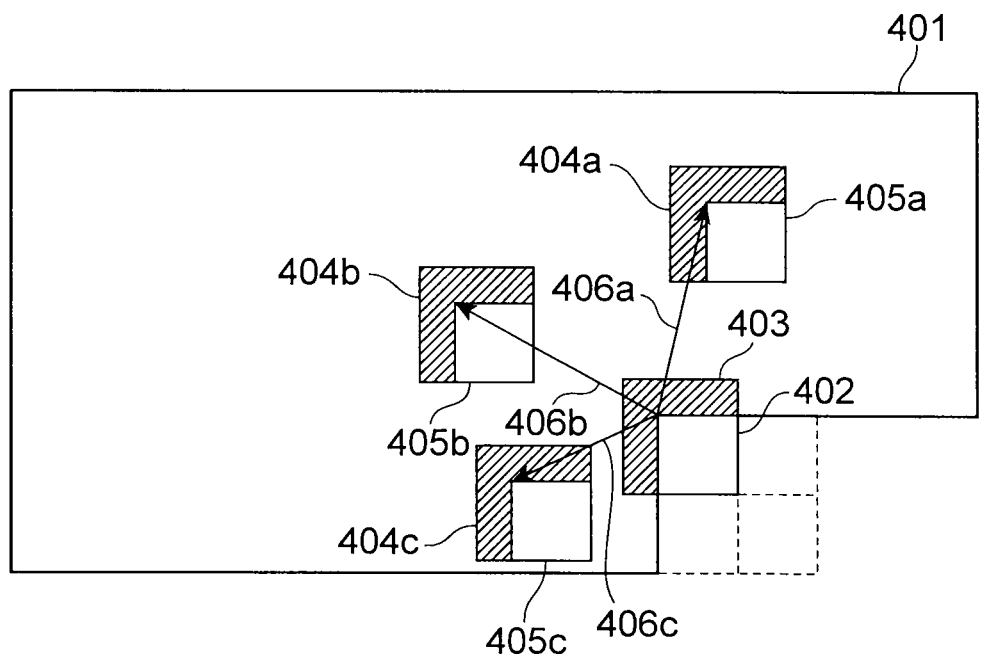
FIG. 3 is a schematic diagram for explaining a template matching process and a process of searching for candidates for prediction adjacent regions and prediction regions, in a template matching unit 201.
Figure 4:
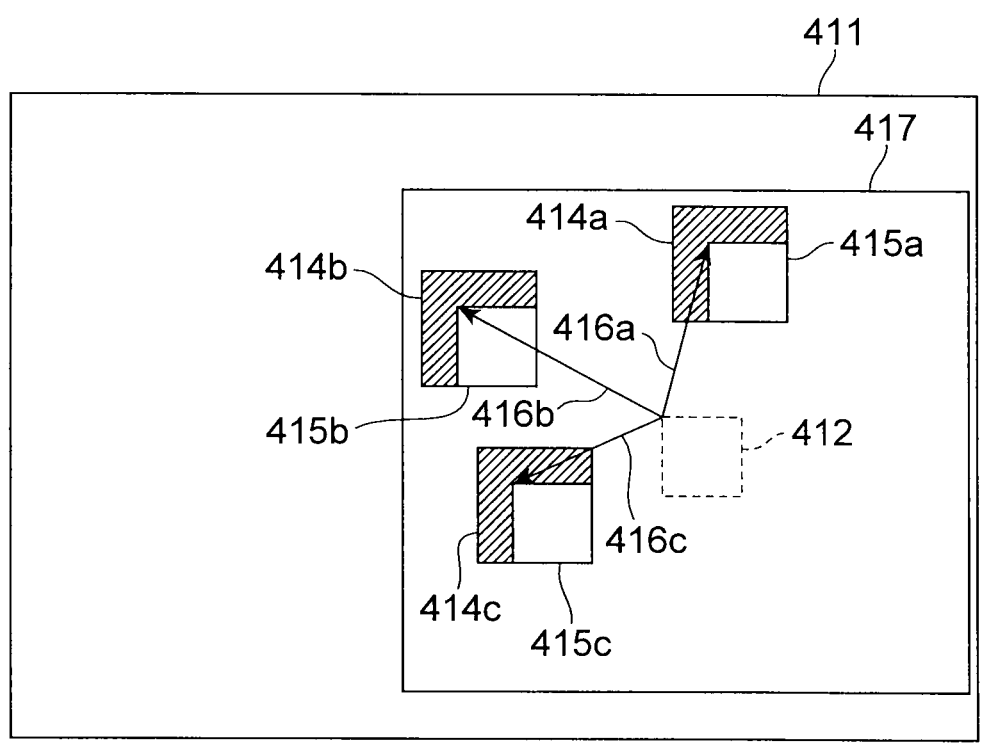
FIG. 4 is a second schematic diagram for explaining the template matching process and the process of searching for candidates for prediction adjacent regions and prediction regions, in the template matching unit 201.

Furthermore, each of the configurations of the template matching unit 201, candidate prediction signal combination determiner 203, and prediction region extractor 204 will be described blow in detail. First, the details of the processing in the template matching unit 201 will be described. The template matching unit 201 accesses the reproduced image signals stored in the frame memory 104, via the line L104 and performs matching processing. The below will describe this matching processing. FIG. 3 and FIG. 4 are schematic diagrams for explaining the template matching processing according to the embodiment of the present invention. The below will describe a process of generating candidate prediction signals for a target block 402.

The first step is to set a "target adjacent region" (also called a template) and a "search region" for the target block by a predetermined method. In FIG. 3, a search region 401 is set to be a part (or, possibly, the whole) of a reproduced image being in contact with the target block 402, reproduced earlier than it, and located within the same picture. The target block 402 herein is a subblock of 4×4 pixels obtained by dividing an encoding target block consisting of 8×8 pixels, but it may be divided in any other block size or shape or may not be divided.

Furthermore, in FIG. 4 a search region 417 is set to be a part of a reproduced image indicated by a picture 411 different from the target block 402. It is also possible to provide a search region in each of pictures different from the target block 402. A previously-reproduced pixel group (inverse L-shape region) 403 adjacent to the target block 402 is used as a "target adjacent region." In the present embodiment, the search regions are set in two pictures (FIG. 3 and FIG. 4), but the search regions may be set only in the same picture as the target block (FIG. 3) or only in the picture of pictures different from the target block (FIG. 4).

The search region 401 and the target block 402 do not have to be in contact with each other as shown in FIG. 3, but the search region 401 may be in no contact with the target block 402 at all. How to set the search region does not have to be limited to the way of setting the search region in one frame (frame 411 only) different from the target block as shown in FIG. 4, but the search region may be set in each of pictures (reference images which may include a future frame in a display order as long as it is a previously-reproduced one) different from the target block.

The target adjacent region 403 may be a region at least one pixel of which is in contact with the target block 402. The shape of the target adjacent region herein is an inverse L-shape, but is not limited to it. Therefore, the target adjacent region may have an optional shape and number of pixels, which should be preliminarily defined, as long as it is constructed of previously-reproduced pixels around the target block 402; the shape and size (number of pixels) of the template may be encoded in a sequence unit or in a frame unit or block unit.

The template matching unit 201 calculates the sum of absolute differences (SAD) between corresponding pixels, for each pixel group having the same shape as the target adjacent region 403, in the search region 401 and the search region 417 or in either one search region, searches for M regions from the lowest SAD, and defines them as "prediction adjacent regions." The accuracy of the search may be an integer pixel unit, or it is also possible to generate pixels of decimal accuracy such as half pixels or quarter pixels and perform the search in the decimal pixel accuracy. The value of M may be arbitrary as long as it is preliminarily set. As shown in FIGS. 3 and 4, M=6, and the search results in finding the prediction adjacent regions 404a, 404b, 404c, 414a, 414b, and 414c. Without determining the number of prediction adjacent regions to be obtained by the search, the value of M may be determined by searching for regions the SAD of which is smaller than a certain threshold, or the value of M may be determined to be the smaller between the number of regions smaller than the threshold and the set number. At this time, the threshold does not always have to be applied to the values of SAD themselves, but may be applied to differences between the lowest SAD and the second lowest and other SADs. In the latter case, the template matching unit 201 can search for many prediction adjacent regions, without change in the threshold, even if the lowest SAD is large. The upper limit and threshold of M may be preliminarily set, but appropriate values may be encoded in a sequence unit or in a frame unit or block unit.

Regions 405a, 405b, 405c, 415a, 415b, and 415c in contact with the prediction adjacent regions 404a, 404b, 404c, 414a, 414b, and 414c are determined as prediction regions for the target block 402 and pixel signals in the prediction regions are determined as candidate prediction signals. The positional relationship between the prediction adjacent regions and the prediction regions indicating the candidate prediction signals is the same as the positional relationship between the target region and the target adjacent region herein, but they may be different. In the present embodiment, the coordinate information to be stored in the coordinate information memory 202 is difference coordinates 406a, 406b, 406c, 416a, 416b, and 416c between the target adjacent region (and the target region) and the prediction adjacent regions (and the prediction regions) and identification numbers of the pictures (reference images) to which the prediction adjacent regions (and the prediction regions) belong, as access information for acquiring the respective prediction adjacent regions (and prediction regions) from the frame memory 104.

The configuration of the template matching unit 201 for carrying out the operation as described above will be described below. The template matching unit 201 is constructed with a target adjacent region extractor 211, a prediction adjacent region extractor 212, a comparator 213, and a switch 214. First, the target adjacent region extractor 211 acquires the target adjacent region 403 via the line L104 from the frame memory 104.

The prediction adjacent region extractor 212 successively acquires pixel signals of regions of the same shape as the target adjacent region from the search regions in the frame memory 104 via the line L104 and calculates their SAD values with respect to the pixel signal (adjacent pixel signal) of the target adjacent region acquired via a line L211 from the target adjacent region extractor 211. The comparator 213 receives the calculated SAD values input via a line L212b and compares each SAD value with the M-th lowest SAD out of SAD values acquired heretofore. When the comparator 213 determines that the input SAD value is smaller, the comparator 213 at the same time stores the SAD value falling within the M-th lowest, and deletes the SAD value becoming the (M+1)th lowest. The comparator 213 sets a sufficiently large value with respect to ordinary SAD, as an initial value of SAD at a start of processing.

As performing this processing, the prediction adjacent region extractor 212 outputs via a line L212 and L201a to the coordinate information memory 202 the coordinate information as information for access to the prediction adjacent regions (and prediction regions), under control on the switch 214 by the comparator 213. On this occasion, since the coordinate information for the (M+1)th SAD value becomes unnecessary, the new information may be written over it to be stored in the coordinate information memory 202. After completion of the search in the search regions by the prediction adjacent region extractor 212, the comparator 213 outputs the M SAD values stored at the same time, via the line L201b to the candidate prediction signal combination determiner 203.

Next, the operation of the candidate prediction signal combination determiner 203 will be described. The candidate prediction signal combination determiner 203 is constructed with a combination setter 231, a prediction adjacent region extractor 232, a target adjacent region extractor 233, a weighting unit 234, an adder 235, and a comparison-selection unit 236.

The combination setter 231 sets a plurality of combinations of prediction adjacent regions, based on the M SAD values input via the line L201b. The processing in the prediction adjacent region combination determiner 203 is, as detailed in the description of FIG. 6, to set a combination of N prediction adjacent regions from the lowest SAD among the input SAD values. The value of N is a power of 2 smaller than M, and in the case of M=6, three combinations with N=1, 2, or 4 are made.

By making use of the combination processing of candidate prediction signals according to the present invention as described above, it becomes feasible to determine strength of smoothing of candidate prediction signals appropriate for each target block, i.e., the number of prediction candidate signals to be averaged. In other words, the candidate prediction signals suitable for generation of the prediction signal can be selected without additional information from the M candidate prediction signals obtained by the search, by defining N with the lowest SAD between the adjacent pixel signal and a comparison signal resulting from averaging of pixel signals of N prediction adjacent regions with lowest SAD being the sum of absolute differences from the adjacent pixel signal. The reason why the value of N is a power of 2 is that consideration is given to execution of the averaging process of signals by addition and shift operation only.

It is noted that the value of M, the value of N, and the combinations of N prediction signal regions do not have to be limited to those described above. The number of prediction adjacent regions included in one combination can be optionally set among numbers from 1 to M. For example, in a case where a combination is composed of N prediction adjacent regions smaller than M, it is also possible to select N regions from the M regions and set all combinations thereof. On this occasion, the value of N may be fixed, or two or more numbers may be selected between 1 and M to set the combinations. However, in order to automatically select the same combination of prediction adjacent regions in the image predictive encoding device 100 being an encoder and in an after-described image predictive decoding device 300 being a decoder, it is necessary for the two devices to use the same combination setting method.

When the prediction adjacent region extractor 232 receives an input of combination information of prediction adjacent regions via a line L231, it acquires the coordinate information of the prediction adjacent regions included in the combination, via a line L202a from the coordinate information memory 202. Then the prediction adjacent region extractor 232 acquires the pixel signals of the prediction adjacent regions corresponding to the coordinate information, via the line L104 and outputs them to the weighting unit 234 on demand.

The weighting unit 234 multiplies the pixel signal of each prediction adjacent region input via a line L232, by a weighting factor and outputs the result via a line L234 to the adder 235.

The adder 235 cumulatively adds the weighted pixel signals of prediction adjacent regions to add them up to generate a comparison signal for comparison with the pixel signal of the target adjacent region (adjacent pixel signal), and outputs the generated comparison signal via a line L235 to the comparison-selection unit 236. The operation of the weighting unit 234 can be, for example, a technique of multiplying the pixel signal of each prediction adjacent region by 1/N where the number of prediction adjacent regions is N, but may be any other technique. For example, a conceivable method is such that differences (the sum of absolute differences, the sum of squared differences, variance, etc.) are calculated between the pixel signals of N prediction adjacent regions and the adjacent pixel signal and weighting factors for the respective prediction adjacent regions are determined based on a ratio of the differences.

When the same weighting method is applied to the weighting unit 205 and the weighting unit 234, an appropriate combination of candidate prediction signals (pixel signals of prediction regions) can be estimated using the prediction adjacent regions. Since the prediction adjacent regions can be shared between the encoder and the decoder, the after-described image predictive decoding device 300, which is the decoder using this technique, has an effect of being capable of acquiring the combination of candidate prediction signals selected by the image predictive encoding device 100 being the encoder, without any additional information. It is noted that the weighting method of the weighting unit 234 does not always have to be the same as that of the weighting unit 205. For example, an effective method for reduction in computation amount is such that a simple weighting process is applied to the weighting unit 234 and an adaptive weighting process according to a local signal feature is applied to the weighting unit 205.

The target adjacent region extractor 233 acquires the pixel signal of the target adjacent region (adjacent pixel signal) via the line L104 from the frame memory 104 and outputs it to the comparison-selection unit 236.

The comparison-selection unit 236 calculates SAD values between the adjacent pixel signal and the comparison signals corresponding to the plurality of combinations of prediction adjacent regions, and selects a combination of target adjacent regions with the lowest SAD value as a combination of candidate prediction signals. The selected combination of candidate prediction signals (acquired via L231) is output as the combination information of candidate prediction signals via the line L203 to the prediction region extractor 204.

As described above, the present embodiment enables a combination of candidate prediction signals effective to generation of the prediction signal to be selected from a plurality of candidate prediction signals, without additional information, for each target block.

Figure 5:
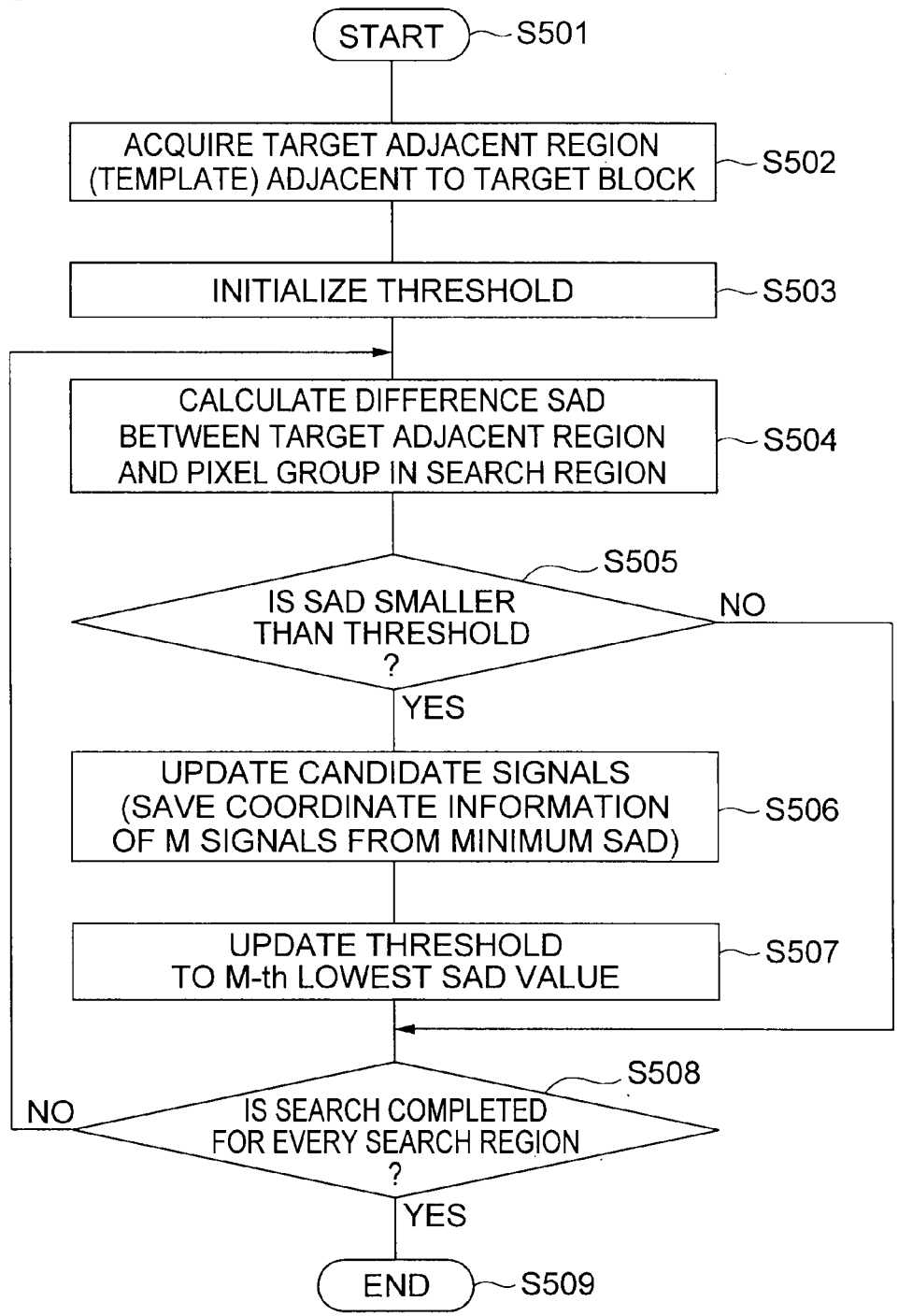
FIG. 5 is a flowchart for explaining a method of template matching and search for candidates for prediction adjacent regions and prediction regions in the template matching unit 201.

FIG. 5 is a flowchart showing a method of searching for a plurality of (M) candidate prediction signals for the pixel signal of the target region (target block) (target pixel signal)

and acquiring the coordinate information for access to the candidate prediction signals obtained by the search, in the template matching unit 201 according to the present embodiment. First, the target adjacent region extractor 211 acquires the target adjacent region (template signal) to the target block from the frame memory 104 (S502).

Next, the template matching unit 201 initializes the threshold for selection of M candidate prediction signals to a sufficiently large value (S503). The prediction adjacent region extractor 212 calculates the sum of absolute differences (SAD) between the target adjacent region and a pixel group of the same shape as the target adjacent region in a search region (S504). The comparator 213 in the template matching unit 201 compares the SAD value with the threshold (S505) and when the SAD value is determined to be smaller than the threshold, the processing flow goes to S506; otherwise, the processing flow goes to S508.

The comparator 213 in the template matching unit 201 compares the calculated SAD value with previous SAD values and when the calculated SAD value falls within the M-th rank from the lowest, the pixel group obtained by the search is added to the candidate prediction signals (and pixel signals of prediction adjacent regions), thereby updating the candidate signals. In the present embodiment, the coordinate information is updated by storing in the coordinate information memory 202, spatial-temporal coordinate information (spatial position and an identification number of a picture including the pixel group obtained by the search) for access to the candidate prediction signal (and the pixel signal of the prediction adjacent region), instead of the candidate prediction signal (and the pixel signal of the prediction adjacent region), based on a changeover control by the switch 214 (S506). At the same time, the template matching unit 201 updates the threshold to the M-th lowest SAD value (S507).

Thereafter, the prediction adjacent region extractor 212 checks whether the search is completed for every search region (S508). When it is determined that the search is not completed for every search region, the processing flow returns to S504 where the prediction adjacent region extractor 212 calculates the sum of absolute differences (SAD) between the target adjacent region and a next pixel group of the same shape as the target adjacent region in the search region.

After the search is completed for every search region, the template matching process for one target block is finished (S509).

In this manner the processing by the template matching unit 201 permits the device to specify the high-ranking M prediction adjacent regions including the pixel signals highly correlated to the pixel signal in the target adjacent region.

Figure 6:
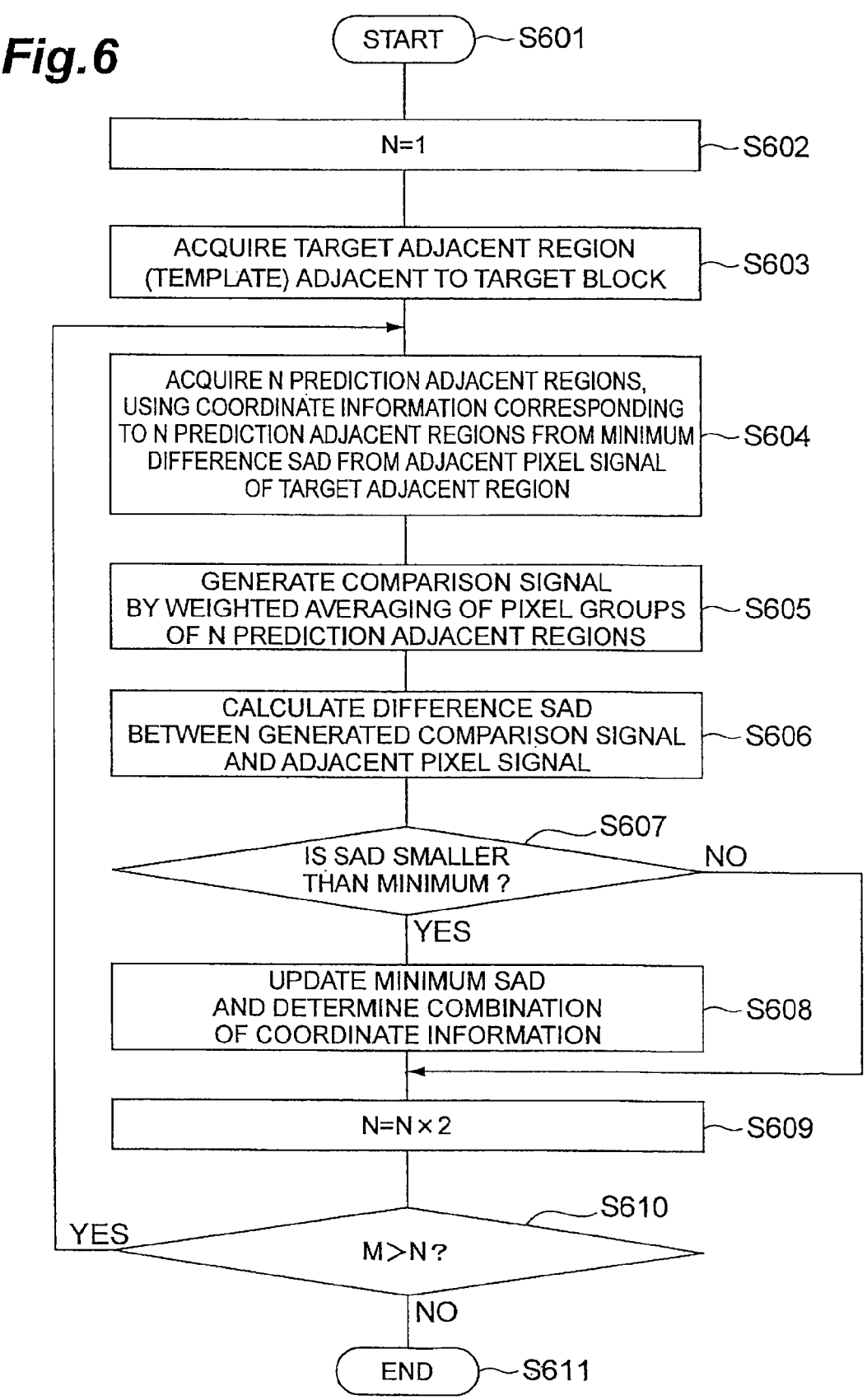
FIG. 6 is a flowchart for explaining a method of determining a combination of candidate prediction signals in a candidate prediction signal combination determiner 203.

Next, the processing of the candidate prediction signal combination determiner 203 will be described using the drawing. FIG. 6 is a flowchart showing a method of selecting a combination of N candidate prediction signals suitable for generation of the prediction signal by smoothing (weighted average) of a plurality of candidate prediction signals, in the candidate prediction signal combination determiner 203 according to the present embodiment. First, the combination setter 231 of the combination determiner 203 sets the number N of candidate prediction signals to 1 (S602). Next, the target adjacent region extractor 233 acquires the target adjacent region (template signal) to the target block from the frame memory 104 (S603).

Then the prediction adjacent region extractor 232 acquires N prediction adjacent regions belonging to a combination set by the combination setter 231, via the line L104. Specifically, the prediction adjacent region extractor 232 acquires from the coordinate information memory 202 the coordinate information corresponding to the N prediction adjacent regions with lowest SAD being the difference between the adjacent pixel signal of the target adjacent region to the target block and a pixel signal of each region (candidate for prediction adjacent region) of the same shape as the target adjacent region in the search region on the reference image. Then it acquires the N prediction adjacent regions corresponding to the acquired coordinate information from the frame memory 104 (S604).

Thereafter, the weighting unit 234 and adder 235 generate a comparison signal by averaging (which may be weighted averaging) of the pixel signals of the N prediction adjacent regions (S605) and the comparison-selection unit 236 calculates the SAD between the generated comparison signal and the adjacent pixel signal (S606). At the same time, the comparison-selection unit 236 compares the calculated SAD value with the current lowest SAD value (S607) and when the calculated SAD value is determined to be a minimum, the processing flow goes to S608; otherwise, the processing flow goes to S609. When it is determined in S607 that the calculated SAD value is the same as the current lowest SAD value, the processing flow goes to S609; however, the processing flow may be arranged to go to S608.

When the calculated SAD value becomes a new lowest SAD value, the comparison-selection unit 236 stores the combination of coordinate information acquired in S604 (S608).

Then the combination determiner 203 updates the value of N to double (S609). Then the updated N value is compared with M (S610) and when the updated N value is smaller than M, the processing flow returns to S604. When the updated N value is larger than M, the combination of coordinate information stored in S608 is determined as a combination of candidate prediction signals and the candidate prediction signal combination selecting process is then terminated (S611).

By making use of the candidate prediction signal combination process in the present embodiment as described above, it becomes feasible to determine strength of smoothing of candidate prediction signals appropriate for each target block, i.e., the number of prediction candidate signals to be averaged. In other words, the candidate prediction signals suitable for generation of the prediction signal can be selected without any additional information, from the M candidate prediction signals obtained by the search, by determining N with the lowest SAD between the adjacent pixel signal and the comparison signal resulting from averaging of pixel signals of N prediction adjacent regions with lowest SAD values being differences from the adjacent pixel signal.

The reason why the value of N is a power of 2 is that consideration is given to executing the averaging process of signals by addition and shift operation only. In the present embodiment, the value of N does not have to be limited to a power of 2. Furthermore, the method of setting the combinations of prediction adjacent regions is not limited to the method in FIG. 6. The number of prediction adjacent regions included in one combination can be optionally set out of the numbers from 1 to M. For example, where a combination is composed of prediction adjacent regions numbering in N smaller than M, it is possible to set all the combinations to select N regions from the M regions. On this occasion, the value of N may be fixed, or it is also possible to select two or more values between 1 and M and set combinations. For allowing the encoder and the decoder to automatically select the same combination of prediction adjacent regions, it is necessary for the two devices to use the same combination setting method.

Figure 7:
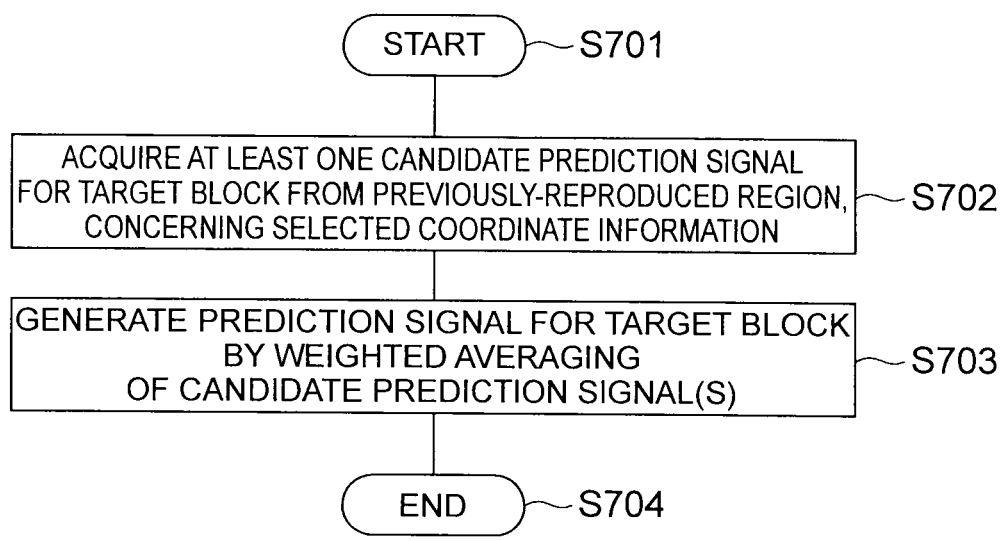
FIG. 7 is a flowchart for explaining a method of combining candidate prediction signals to generate a prediction signal.

FIG. 7 is a flowchart showing a method of generating a prediction signal by smoothing (weighted average) of candidate prediction signals according to the present embodiment.

The prediction region extractor 204 acquires one or more candidate prediction signals corresponding to a target block from the frame memory 104, in accordance with the selected coordinate information (S702). Then the weighting unit 205 and adder 206 perform weighted averaging of the acquired candidate prediction signals to generate a prediction signal for the target block (S703). This completes the process for one target block (S704).

Figure 8:
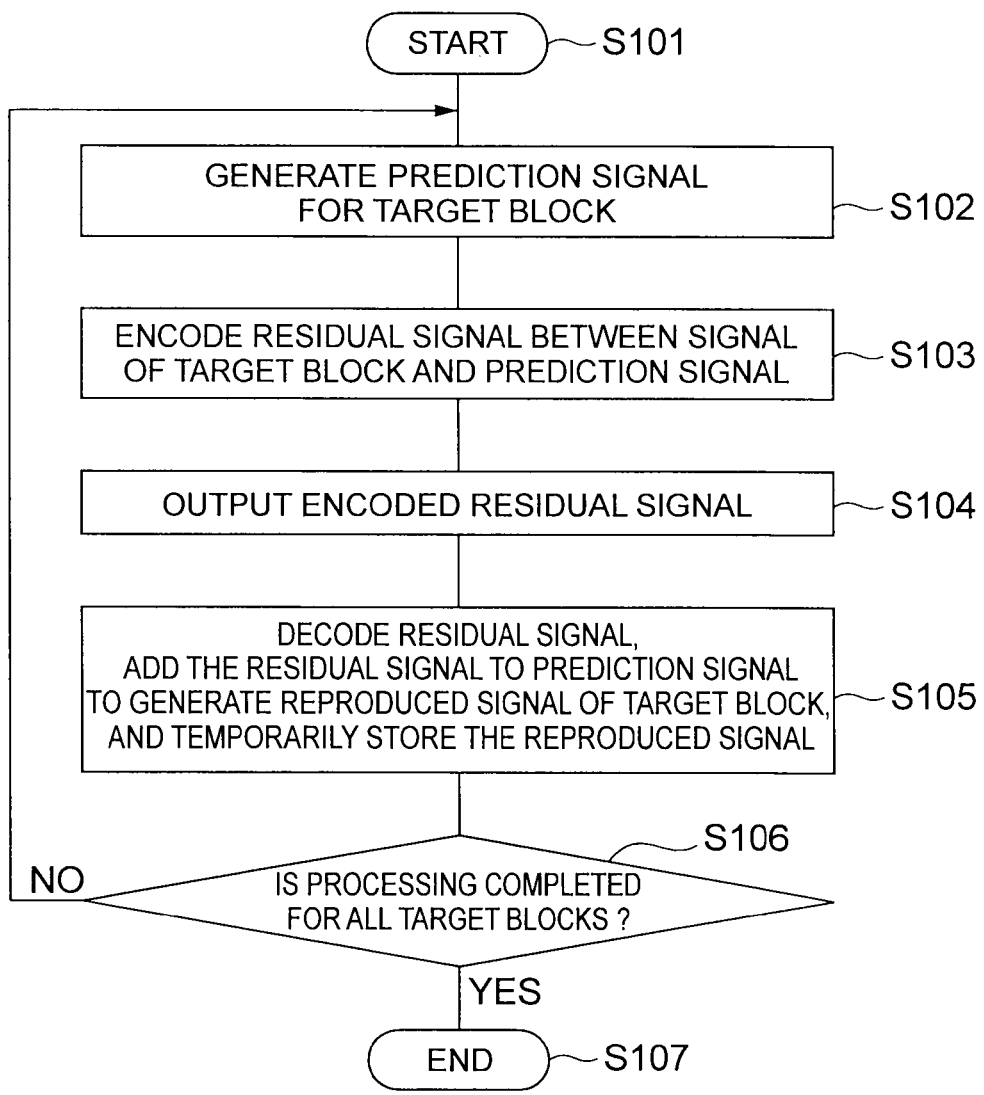
FIG. 8 is a flowchart showing an image predictive encoding method in the image predictive encoding device 100.

FIG. 8 is a flowchart showing the image predictive encoding method in the image predictive encoding device 100 according to the present embodiment. First, the prediction signal generator 103 in FIG. 2 generates the prediction signal for the target block (S102). Next, the transformer 106, quantizer 107, and entropy encoder 111 encode the residual signal indicating the difference between the signal of the target block and the prediction signal for the target block (S103). Then the encoded residual signal is output via the output terminal 112 (S105).

Thereafter, for predictive encoding of a subsequent target block, the encoded residual signal is decoded by the inverse quantizer 108 and inverse transformer 109. Then the adder 110 adds the prediction signal to the decoded residual signal to reproduce the signal of the target block and the reproduced signal is stored as a reference image in the frame memory 104 (S105). Unless the processing is completed for all target blocks, the processing flow returns to S102 to conduct the processing for the next target block; if the processing is completed, the processing is terminated (S107).

As described above, the image predictive encoding device 100 of the present embodiment is able to obtain the prediction signal resulting from the smoothing using the plurality of prediction signals, without use of additional information.

Figure 9:
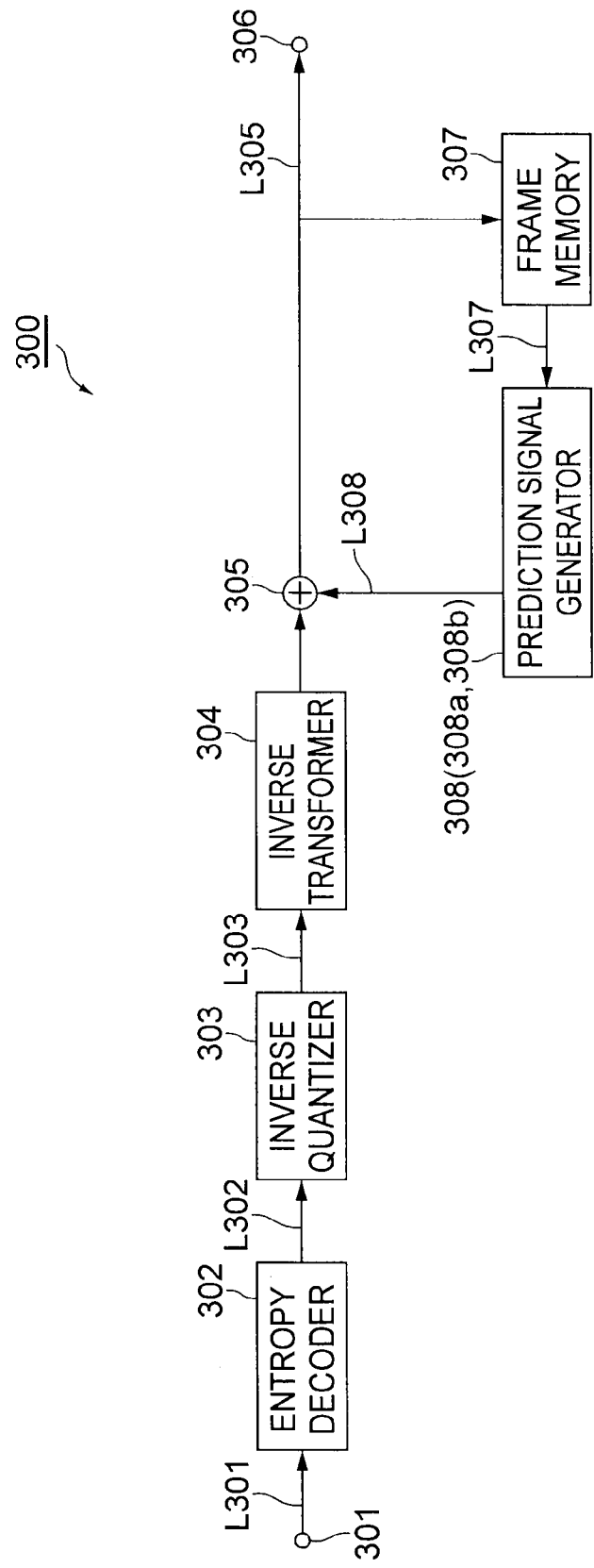
FIG. 9 is a block diagram showing an image predictive decoding device 300.

The below will describe an image predictive decoding method in the present embodiment. FIG. 9 is a block diagram showing the image predictive decoding device 300 according to the present embodiment. This image predictive decoding device 300 is constructed with an input terminal 301, an entropy decoder 302 (data decoding means), an inverse quantizer 303 (residual signal restoring means), an inverse transformer 304 (residual signal restoring means), an adder 305 (reproduced image signal generating means), an output terminal 306, a frame memory 307, and a prediction signal generator 308 (prediction signal generating means). The residual signal restoring means constituted by the inverse quantizer 303 and inverse transformer 304 may be any other means. The inverse transformer 304 is not indispensable. Each configuration will be described below.

The input terminal 301 is a terminal to which compressed data resulting from the compression encoding by the above-described image predictive encoding method is input. This compressed data contains the residual signal resulting from the prediction and encoding of the target block obtained by dividing an image into a plurality of blocks.

The entropy decoder 302 performs entropy decoding of the compressed data input through the input terminal 301, to decode the encoded data of the residual signal of the target block.

The inverse quantizer 303 receives the input of the residual signal of the target block decoded, via a line L302 and inversely quantizes the residual signal. The inverse transformer 304 performs an inverse discrete cosine transform of the inversely quantized data. The inverse quantizer 303 and inverse transformer 304 output respective signals obtained by the inverse quantization and the inverse discrete cosine transform, as a residual signal (reproduced residual signal).

The prediction signal generator 308 basically has the same configuration as the configuration shown in FIG. 2 or a function equivalent thereto, and generates a prediction signal by the same processing as that of the prediction signal generator 103 in FIG. 2. The prediction signal generator 308 generates the prediction signal from only previously-reproduced signals stored in the frame memory 307, and therefore is able to generate the same prediction signal as the prediction signal generator 103 in FIG. 1, by managing the input data into the frame memory 307 and the input data into the frame memory 104 in FIG. 1 by the same method. Since the details of the configuration of this prediction signal generator 308 are the same as those described in FIG. 2, the details are omitted herein. The prediction signal generator 308 to operate in this manner outputs the generated prediction signal via a line L308 to the adder 305.

The adder 305 adds the prediction signal generated by the prediction signal generator 308, to the residual signal (reproduced residual signal) restored by the inverse quantizer 303 and inverse transformer 304 and outputs the reproduced image signal of the target block via a line L305 to the output terminal 306 and the frame memory 307. Then the output terminal 306 outputs the image signal to the outside (e.g., a display).

The frame memory 307 stores the reproduced image output from the adder 305, as a reference image to be used as a reproduced image for reference for the subsequent decoding process. On this occasion, the reproduced image is managed by the same method as in the image predictive encoding device 100 in FIG. 1.

Figure 10:
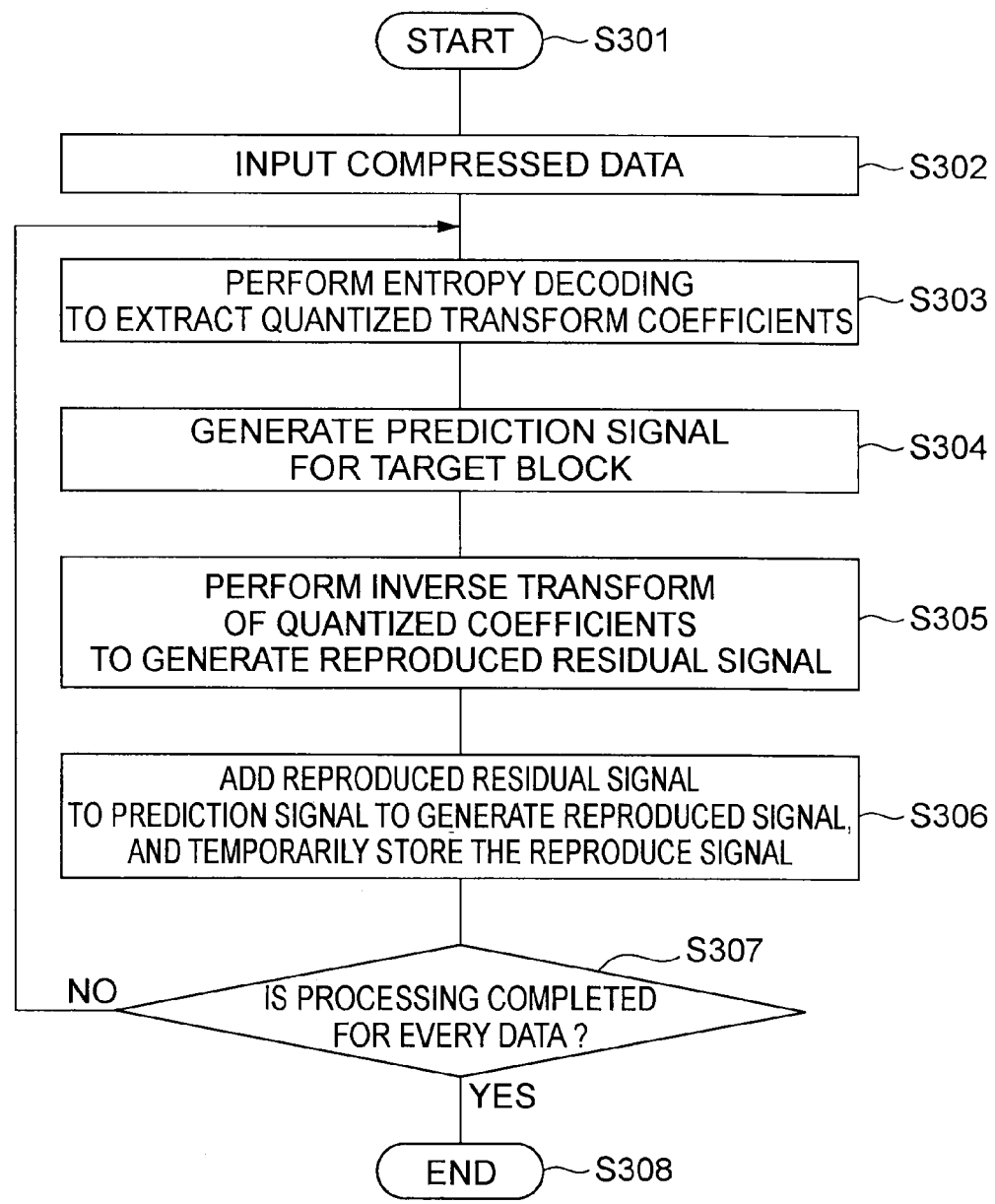
FIG. 10 is a flowchart showing an image predictive decoding method in the image predictive decoding device 300.

Next, the image predictive decoding method in the image predictive decoding device 300 according to the present embodiment will be described using FIG. 10. First, the compressed data resulting from compression is input through the input terminal 301 (S302). Then the entropy decoder 302 performs entropy decoding of the compressed data to extract quantized transform coefficients (S303). Then the prediction signal generator 308 generates a prediction signal (S304). The process of S304 is basically the same as the process S102 in FIG. 8, to carry out the processing procedures in FIGS. 5 to 7.

On the other hand, the inverse quantizer 303 inversely quantizes the quantized transform coefficients using a quantization parameter and the inverse transformer 304 performs an inverse transform of the transform coefficients to generate a reproduced residual signal (S305). Then the reproduced residual signal is added to the generated prediction signal to generate a reproduced signal, and the reproduced signal is stored in the frame memory, for reproduction of the next target block (S306). If there is next compressed data, this process is repeated (S307) and all the data is processed to the last (S308). The method may be configured to retrieve compressed data while returning to S302 as occasion may demand.

The image predictive encoding method and image predictive decoding method in the present embodiment can be provided in the form of a program as stored in a recording medium. Examples of such recording media include recording media such as a floppy disk (registered trademark), CD-ROM, DVD, or ROM, or semiconductor memories.

Figure 11:
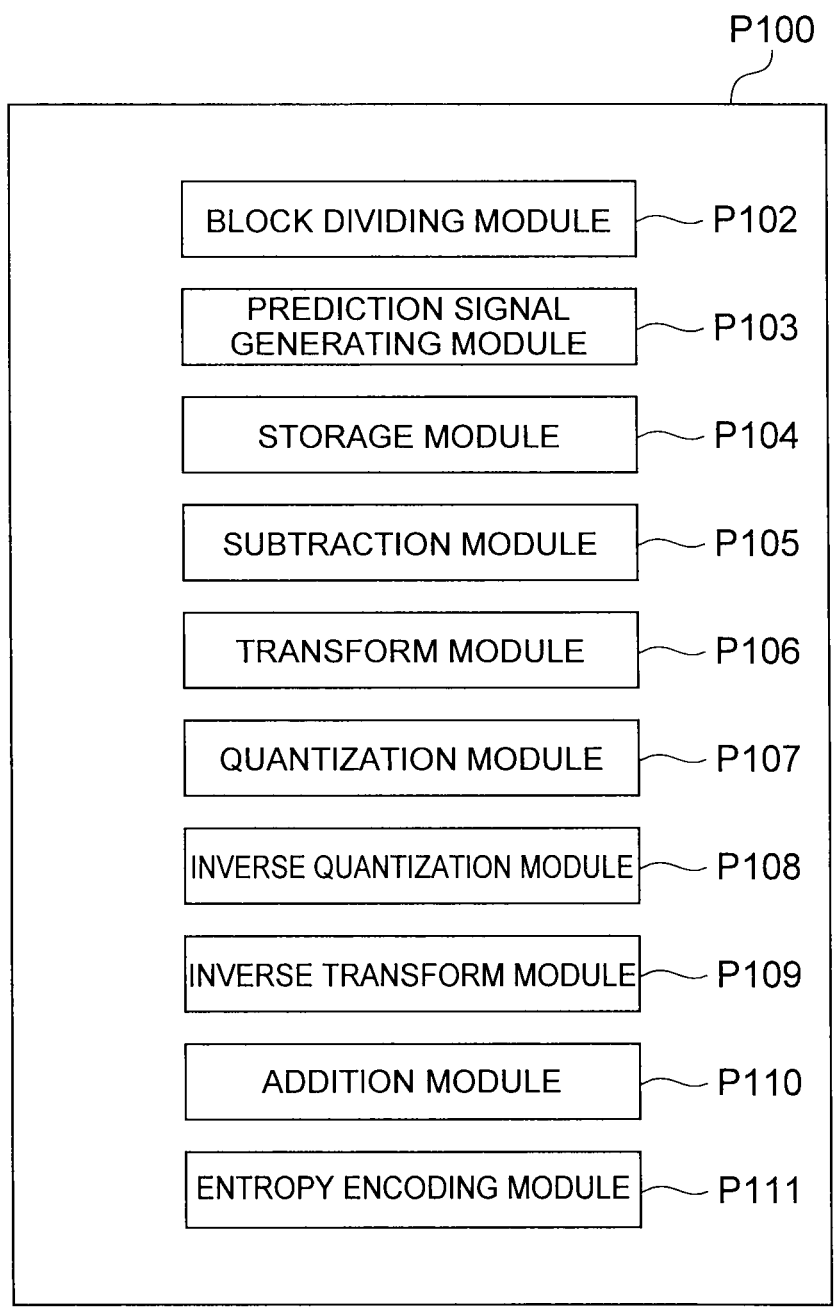
FIG. 11 is a block diagram showing modules of a program capable of executing the image predictive encoding method.
Figure 12:
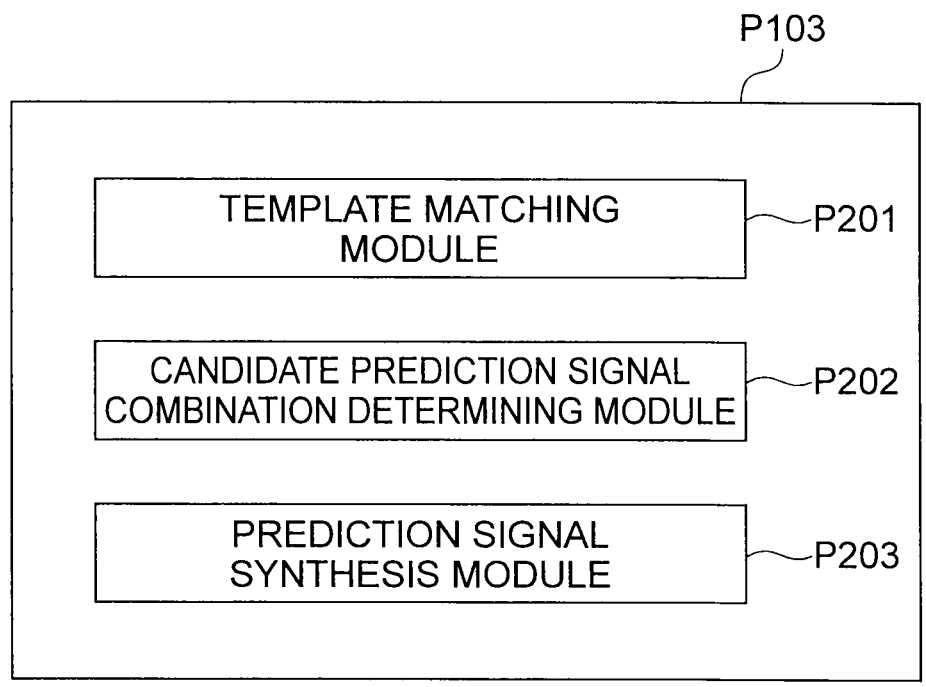
FIG. 12 is a block diagram showing modules of a prediction signal generating module P103.

FIG. 11 is a block diagram showing modules of a program capable of executing the image predictive encoding method. The image predictive encoding program P100 is constructed with a block dividing module P102, a prediction signal generating module P103, a storage module P104, a subtraction module P105, a transform module P106, a quantization module P107, an inverse quantization module P108, an inverse transform module P109, an addition module P110, and an entropy encoding module P111. The prediction signal generating module P103, as shown in FIG. 12, is constructed with a template matching module P201, a candidate prediction signal combination determining module P202, and a prediction signal synthesis module P203.

The functions implemented by execution of the respective modules are the same as those of the respective components of the aforementioned image predictive encoding device 100. Namely, the functions of the respective modules of the image predictive encoding program P100 are the same as the functions of the block divider 102, the prediction signal generator 103, the frame memory 104, the subtracter 105, the transformer 106, the quantizer 107, the inverse quantizer 108, the inverse transformer 109, the adder 110, and the entropy encoder 111, and the functions of the respective modules of the prediction signal generating module P103 are the same as the functions of the template matching unit 201, the candidate prediction signal combination determiner 203, and the prediction region extractor 204 to adder 206 for signal synthesis.

Figure 13:
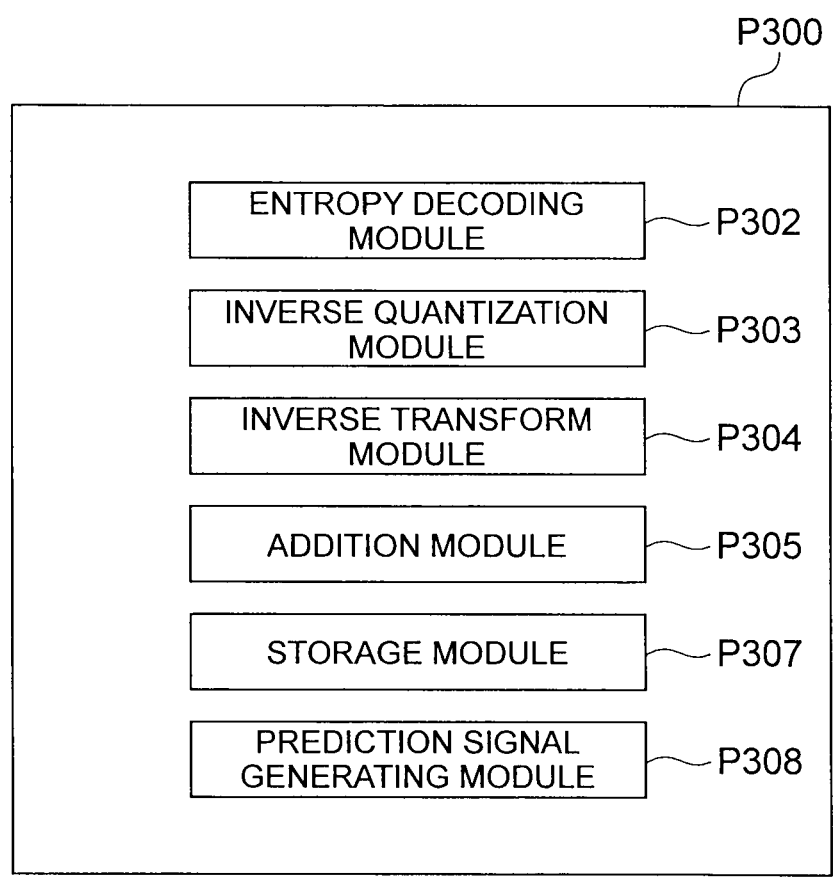
FIG. 13 is a block diagram showing modules of a program capable of executing the image predictive decoding method.
Figure 14:
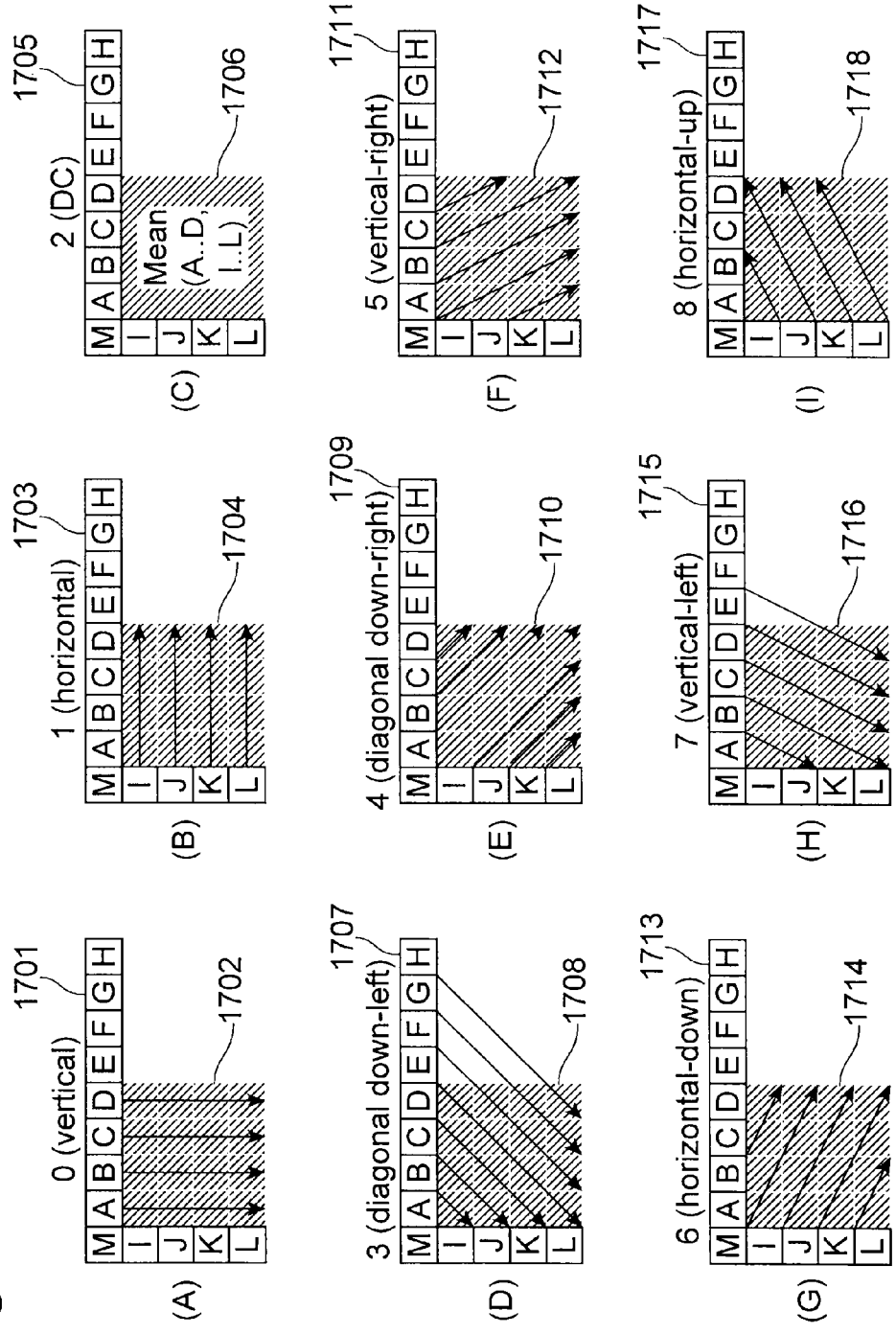
FIG. 14 is a schematic diagram for explaining an intra-picture prediction method.
Figure 15:
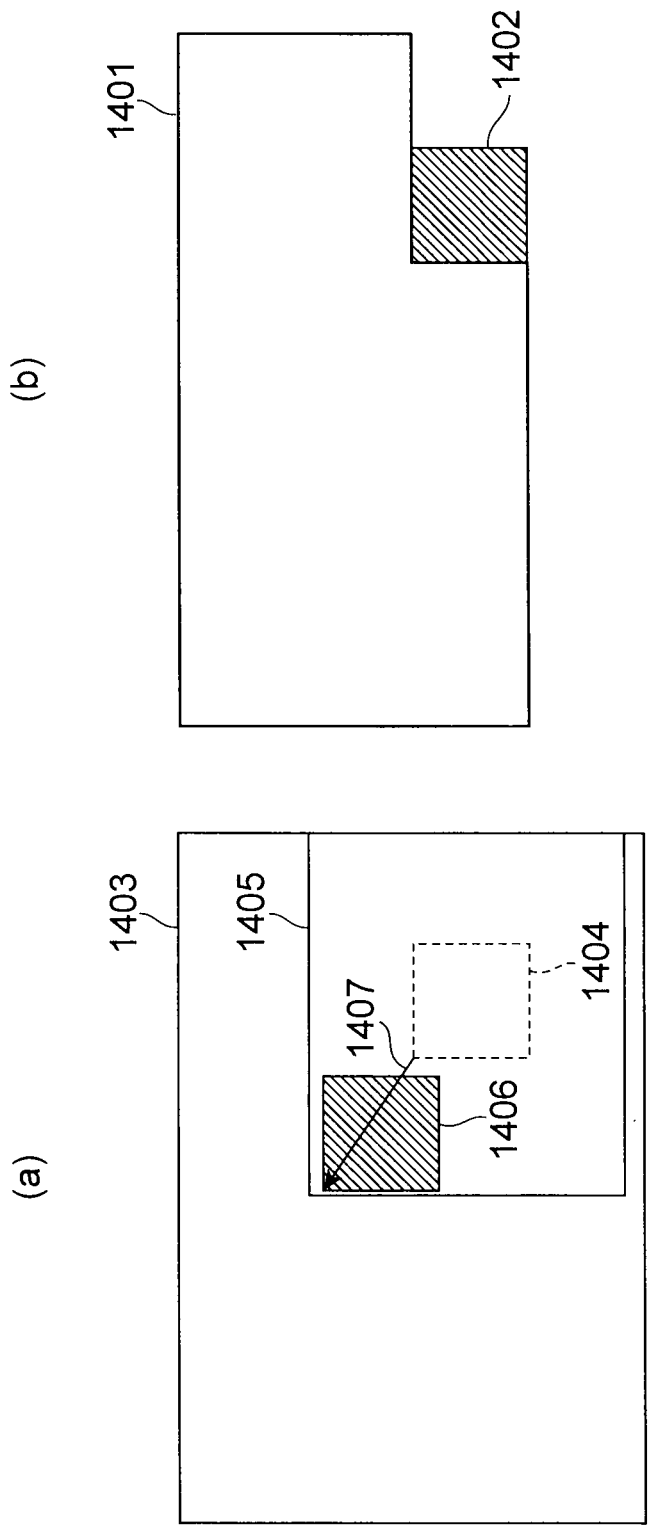
FIG. 15 is a schematic diagram for explaining a block matching process.

FIG. 13 is a block diagram showing modules of a program capable of executing the image predictive decoding method. The image predictive decoding program P300 is constructed with an entropy decoding module P302, an inverse quantization module P303, an inverse transform module P304, an addition module P305, a storage module P307, and a prediction signal generating module P308.

The functions implemented by execution of the respective modules described above are the same as those of the respective components of the aforementioned image predictive decoding device 300. Namely, the functions of the respective modules of the image predictive decoding program P300 are the same as the functions of the entropy decoder 302, inverse quantizer 303, inverse transformer 304, adder 305, and frame memory 307. The prediction signal generating module P308 has functions equivalent to those of the prediction signal generating module P103 in the image predictive encoding program P100, and is provided with the functions of the template matching unit 201, the candidate prediction signal combination determiner 203, and the prediction region extractor 204 to adder 206 for signal synthesis.

The image predictive encoding program P100 or image predictive decoding program P300 configured as described above is stored in a recording medium 10 and executed by a computer described below.

Figure 16:
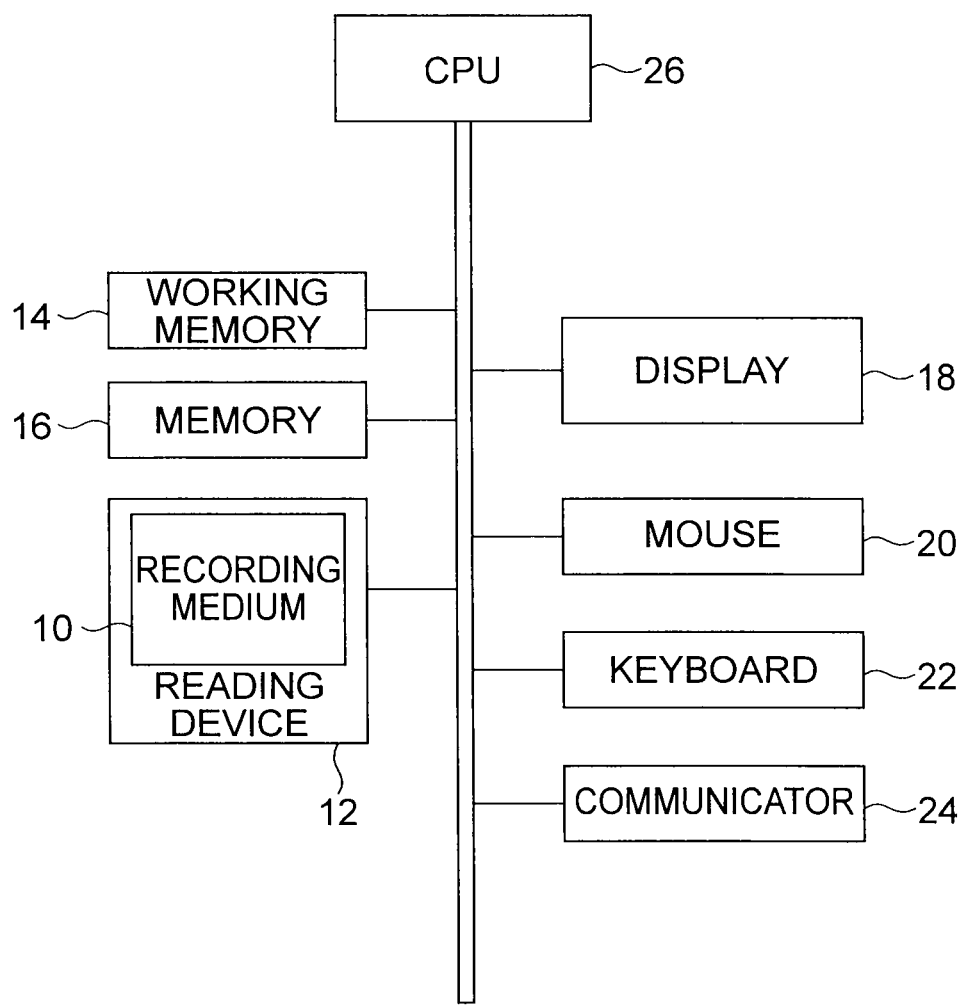
FIG. 16 is a drawing showing a hardware configuration of a computer for executing a program recorded in a recording medium.
Figure 17:
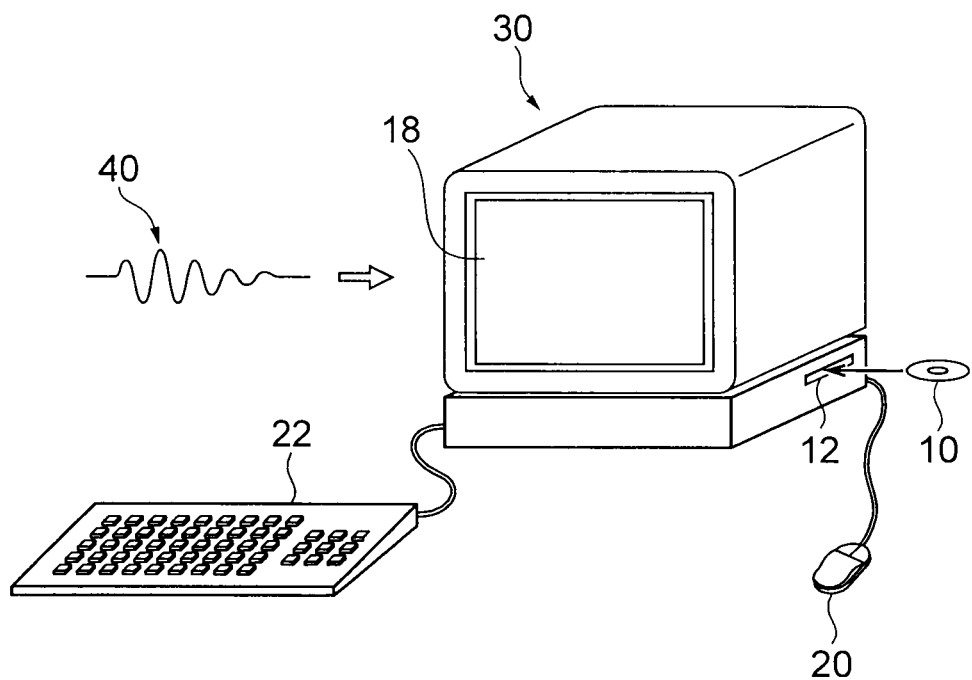
FIG. 17 is a perspective view of a computer for executing a program stored in a recording medium.

FIG. 16 is a drawing showing a hardware configuration of a computer for executing the program recorded in the recording medium and FIG. 17 a perspective view of the computer for executing the program stored in the recording medium. The computer embraces a DVD player, a set-top box, a cell phone, or the like provided with a CPU and configured to perform processing and control based on software.

As shown in FIG. 16, the computer 30 has a reading device 12 such as a floppy disk drive device (floppy is a registered trademark), a CD-ROM drive device, or a DVD drive device, a working memory (RAM) 14 on which an operating system is resident, a memory 16 for storing the program stored in the recording medium 10, a display device 18 such as a display, a mouse 20 and a keyboard 22 as input devices, a communication device 24 for transmitting and receiving data and others, and a CPU 26 for controlling execution of the program. When the recording medium 10 is inserted into the reading device 12, the computer 30 becomes accessible to the image predictive encoding program P100 or the image predictive decoding program P300 stored in the recording medium 10, through the reading device 12 and becomes able to operate as the image predictive encoding device 100 or the image predictive decoding device 300 in the present embodiment, based on the image predictive encoding program P100 or the image predictive decoding program P300.

As shown in FIG. 17, the image predictive encoding program P100 or the image predictive decoding program P300 may be one provided as a computer data signal 40 superimposed on a carrier wave, through a network. In this case, the computer 30 stores the image predictive encoding program P100 or the image predictive decoding program P300 received by the communication device 24, into the memory 16 and can execute the image predictive encoding program P100 or the image predictive decoding program P300.

The present embodiment described above may be modified as described below. The candidate prediction signal combination determiner 203 shown in FIG. 2 is configured to calculate the SAD value (the sum of absolute differences) being the difference between the pixel signal of the target adjacent region to the target block and the comparison signal resulting from weighted averaging of pixel signals of adjacent prediction regions and to determine an optimal combination of candidate prediction signals, based thereon, but the determination of combination can also be implemented using the sum of squared differences (SSD) or variance (VAR) of the residual signal, instead of SAD. Computation amounts for the three evaluation criteria increase in the order of SAD, SSD, and VAR, whereas the accuracy of evaluation increases, with an expected effect of reduction in a code length of an error signal.

If there are a plurality of combinations obtained with the same SAD value as the difference between the target adjacent signal and the comparison signal, it is effective to adopt a method of determining a final combination by applying SSD or VAR. Specifically, when the SAD value calculated by the prediction adjacent region extractor 232 coincides with the minimum calculated heretofore, the comparison-selection unit 236 further compares their values of SSD or VAR as a comparison target to select the smaller between them. A combination determined as one with the smaller SSD or VAR is stored as a combination with the minimum by the comparison-selection unit 236. In this case, the comparison-selection unit 236 calculates SSD or VAR as well as SAD and stores them at the same time.

Furthermore, it is also possible to adopt a method of calculating a variance for each of combinations of candidate prediction signals, instead of the pixel signals of the adjacent prediction regions, and using the calculation result for the determination of combination. Specifically, it can be implemented by replacing the prediction adjacent region extractor 232, weighting unit 234, and adder 235 in FIG. 2 by the prediction region extractor 204, weighting unit 205, and adder 206, respectively. This modification example does not have to perform the processing of the target adjacent region extractor 233 and enables the prediction signal to be output from the comparison-selection unit 236 to the subtracter 105 in FIG. 1, thus achieving an effect of reduction in circuit scale.

The comparator 213 of the template matching unit 201 also uses the SAD for the evaluation between the target adjacent region to the target block and the pixel group of the same shape as the target adjacent region, which is obtained by the search, but SAD may be replaced by SSD or VAR, with expectation of the same effect as in the above case of the candidate prediction signal combination determiner 203.

The prediction signal generator 103 in FIG. 1 (prediction signal generator 308 in FIG. 9) is not limited to the configuration in FIG. 2. For example, FIG. 2 shows the configuration wherein for a plurality of candidate prediction signals obtained by the search by the template matching unit, the coordinate information for access to the signals is stored in the coordinate information memory 202, but it is also possible to adopt a configuration wherein the candidate prediction signals and the pixel signals of the prediction adjacent regions are stored. This configuration increases the memory size in FIG. 2, but achieves an effect of reduction in access to the frame memory. The template matching unit 201 is configured to output the SAD values being the differences between the target adjacent region and the M prediction adjacent regions via the line L201b to the candidate prediction signal combination determiner 203, but when the SAD values as the differences are not used for setting the combinations, the line L201b is unnecessary.

In the present embodiment the target adjacent region is composed of previously-reproduced pixels, but it may be composed of a prediction signal of an adjacent block. This is effective to cases where the prediction regions are desired to be made smaller than an encoding block unit of an error signal and where the signal of the target adjacent region is desired to be generated without execution of the encoding or decoding process.

The present embodiment is applicable to a technique of searching for an unsettled number of candidate signals by template matching and selecting an appropriate number of candidate signals.

<Second Embodiment>

The first embodiment showed the method of determining a combination of candidate prediction signals (pixel signals of prediction regions) for generation of the prediction signal for the target region from a plurality of candidates, using the correlation between the prediction adjacent regions and the target adjacent region. The second embodiment shows a prediction signal generator 103a for determining a combination of candidate prediction signals for generation of the prediction signal of the target region from a plurality of candidates, using correlation among a plurality of candidate prediction signals. The second embodiment will illustrate a method of determining the number of candidate prediction signals, instead of the combination of candidate prediction signals. This embodiment shows a case wherein a combination of candidate prediction signal is uniquely determined according to the number of candidate prediction signals, and is just an example of the combination of candidate prediction signals. The second embodiment is also applicable to a method of determining a combination from candidate combinations of candidate prediction signals as the first embodiment is.

The below will describe the second embodiment of the present invention with reference to the modified accompanying drawing. The drawings and description redundant with those of the first embodiment will be omitted herein.

Figure 18:
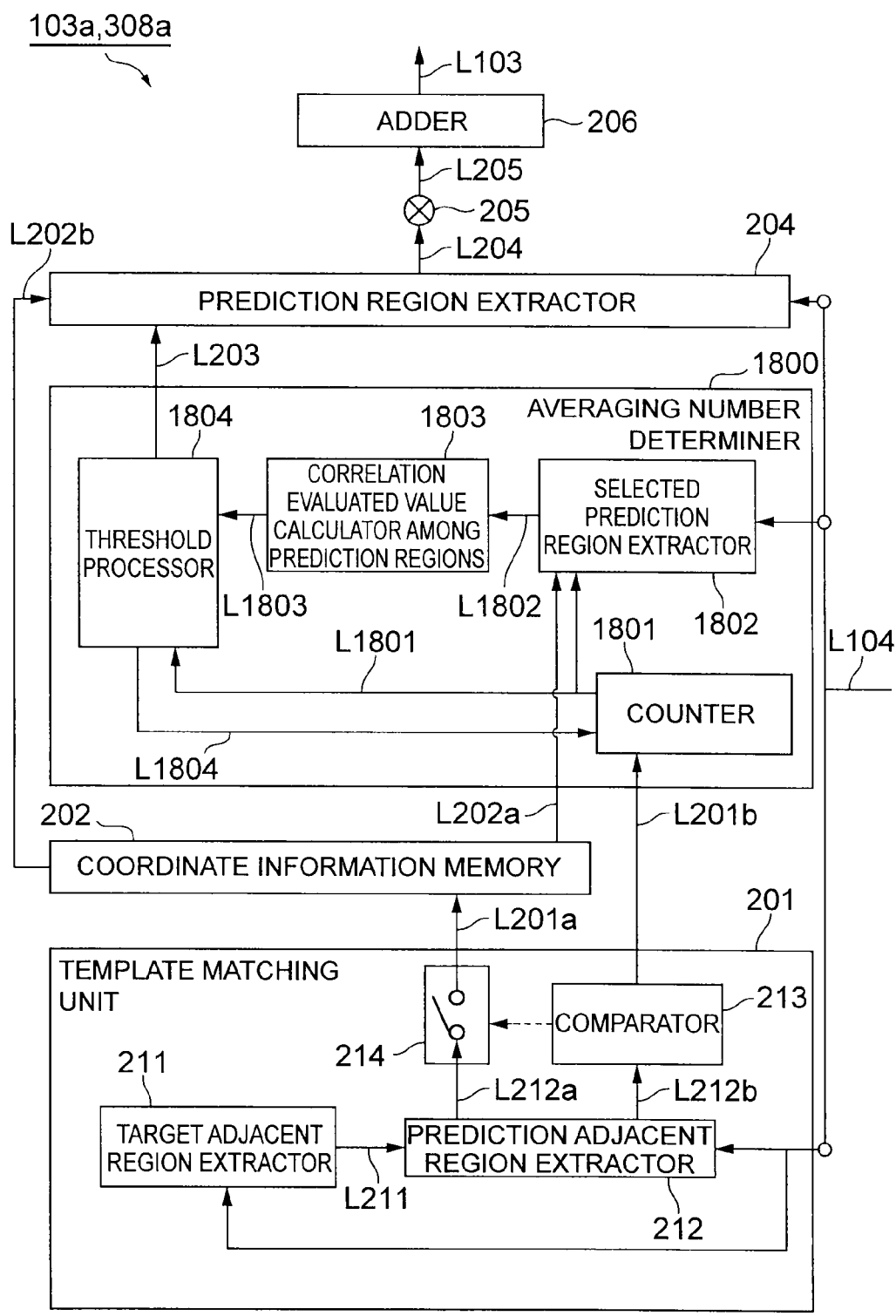
FIG. 18 is a block diagram of the prediction signal generator 103 used in the image predictive encoding device in the second embodiment.

The processing of the prediction signal generator 103a in the second embodiment will be described. It is noted that the same configuration and processing as in the prediction signal generator 103a are also carried out in a prediction signal generator 308a applied to the image predictive decoding device 300. When compared with the image predictive encoding device 100 in FIG. 1 and the image predictive decoding device 300 in FIG. 9, the operations in the prediction signal generators 103a and 308a are different from those in the first embodiment but the input/output relation of signals is the same as in the first embodiment; therefore the description thereof is omitted herein. FIG. 18 is a block diagram showing the prediction signal generator 103a used in the image predictive encoding device 100 according to the present embodiment and the prediction signal generator 103a is constructed with the template matching unit 201, the coordinate information memory 202, an averaging number determiner 1800, the prediction region extractor 204, the weighting unit 205, and the adder 206.

The processing of the template matching unit 201 is the same as in FIG. 2. Namely, the template matching unit 201 receives an input of an image signal (reproduced image signal) previously reproduced in the past processing, via the line L104 from the frame memory 104, searches for a plurality of candidates for the prediction signal (candidate prediction signals) for an target pixel signal of a target region by template matching described below, and outputs the coordinate information for access to the candidate prediction signals obtained by the search, via the line L201a to the coordinate information memory 202. At the same time, it outputs difference data (corresponding to the sum of absolute differences (SAD) described below) indicating the relation between the target region and each candidate prediction signal, via the line L201b to the averaging number determiner 1800. In the present embodiment, as in the first embodiment, the target region (target block) is a subblock of 4×4 pixels resulting from division of an encoding target block consisting of 8×8 pixels, but it may be divided in any other block size or shape or may not be divided.

The averaging number determiner 1800 acquires a plurality of candidate prediction signals, based on the coordinate information for access to the plurality of candidate prediction signals input via the line L202a, and determines the number of candidate prediction signals used for generation of the prediction signal for the target region with consideration to correlation among them. The number of candidate prediction signals thus determined is output as averaging number information of candidate prediction signals via the line L203 to the prediction region extractor 204.

The prediction region extractor 204 acquires the coordinate information of candidate prediction signals as many as the number determined by the averaging number determiner 1800, via the line L202b in accordance with the averaging number information of candidate prediction signals input via the line L203. Then the prediction region extractor 204 acquires the candidate prediction signals corresponding to the acquired coordinate information via the line L104 from the frame memory 104 and outputs them to the weighting unit 205 on demand. The weighting unit 205 multiplies each candidate prediction signal input via the line L204, by a weighting factor and outputs the result via the line L205 to the adder 206. The adder 206 successively adds up the weighted candidate prediction signals and outputs the result as a prediction signal via the line L103 to the subtracter 105 shown in FIG. 1. The operation of the weighting unit can be, for example, the technique of multiplying each candidate prediction signal by 1/N where N is the number of candidate prediction signals, but may be any other technique.

The operation of the template matching unit 201 in FIG. 18 is the same as in FIG. 2 and the detailed description thereof is thus omitted herein. Specifically, it searches the search region in the frame memory 104 for M prediction adjacent regions from the lowest SAD with respect to the pixel signal of the target adjacent region (adjacent pixel signal) and outputs the coordinate information being information for access to the M prediction adjacent regions (and prediction regions), via the line L201 to the coordinate information memory 202. It also outputs the calculated M SAD values via the line L201b to the averaging number determiner 1800.

The following will describe the operation of the averaging number determiner 1800 concerning the candidate prediction signals. The averaging number determiner 1800 is constructed with a counter 1801, a selected prediction region extractor 1802, a correlation evaluated value calculator 1803 among prediction regions, and a threshold processor 1804.

The counter 1801 sets a candidate N for an averaging number, based on M input via the line L201b. In the present embodiment, a maximum value of N is M and N is decreased until N becomes equal to 2. In the case of M=6, the value of N is output in the order of 6, 5, 4, 3, and 2 via a line L1801 to the selected prediction region extractor 1802 and the threshold processor 1804. The value of N in the counter 1801 is not limited to the above example. For example, the value of N may be a power of 2 smaller than M and in the case of M=6, the value of N is output in the order of 4 and 2 from the counter; or the value of N may be limited to a single number, e.g., N=4. For allowing the image predictive encoding device 100 of the encoder and the below-described image predictive decoding device 300 of the decoder to automatically select the same combination of prediction adjacent regions, it is necessary for the two devices to use the same combination setting method.

When the selected prediction region extractor 1802 receives an input of one candidate for the value of N, it acquires the coordinate information for access to N prediction regions from the lowest SAD between the pixel signal of the prediction adjacent region and the pixel signal of the target adjacent region (adjacent pixel signal) out of the M prediction regions obtained by the search by the template matching unit 201, via the line L202a from the coordinate information memory 202. Then it uses this coordinate information to acquire the pixel signals of the predetermined prediction regions from the frame memory 104. In the present embodiment, the selected prediction region extractor 1802 acquires the pixel signal $p_0(i,j)$ of the prediction region with the lowest SAD between the pixel signal of the prediction adjacent region and the pixel signal of the target adjacent region (adjacent pixel signal) and the pixel signal $p_{N-1}(i,j)$ of the prediction region with the N-th lowest SAD and outputs them via a line L1802 to the correlation evaluated value calculator 1803 between the prediction regions. It is noted herein that (i,j) represents a pixel position in a prediction region. Each of i and j is a value in the range of 0 to B−1 and in the case of the target region of 4×4, B=4.

When the correlation evaluated value calculator 1803 among prediction regions receives the input of the pixel signals of the two prediction regions (candidate prediction signals) via the line L1802, it calculates a correlation evaluated value $EV_N$ between the prediction regions for the N value in accordance with Formula (1) below and outputs it via a line L1803 to the threshold processor 1804.

[Formula 1]

$$EV_N = \sum_{i=0}^{B-1}\sum_{j=0}^{B-1} |p_{N-1}(i,j) - p_0(i,j)| \quad (1)$$

When the threshold processor 1804 receives the input of the correlation evaluated value between the prediction regions for the N value via the line L1803, it compares this correlation evaluated value $EV_N$ with a predetermined threshold th(N). In the present embodiment the value of the(N) is determined to be 32 independent of the value of N. If the correlation evaluated value for N is smaller than the predetermined threshold th(N), the averaging number AN of candidate prediction signals is determined to be N and the value of N is output as averaging number information of candidate prediction signals via the line L203 to the prediction region extractor 204. If the correlation evaluated value for N is larger than the predetermined threshold th(N), the counter 1801 is notified via a line L1804 that the value of N is to be updated to a smaller value. However, when the value of N is 2, the value of AN is determined to be 1 and it is output as the averaging number information of candidate prediction signals via the line L203 to the prediction region extractor 204. In the case of the averaging number determiner where the output value of the counter 1801 is a fixed value, the number of N is not updated even if the correlation evaluated value $EV_N$ for N is larger than the predetermined threshold th(N); the value of AN is determined to be a predetermined default value (e.g., 1) and it is output as the averaging number information of candidate prediction signals via the line L203 to the prediction region extractor 204.

As described above, the present embodiment permits the device to select the number of candidate prediction signals effective to generation of the prediction signal, without any additional information, for each target region (target block). Removal of noise by averaging of a plurality of candidate prediction signals is effective to cases where the candidate prediction signals are similar in signal components but only different in noise components. In the present invention, the degree of similarity between candidate prediction signals is evaluated whereby the number of candidate prediction signals for generation of the prediction signal can be determined for each target region.

The method of calculating the correlation evaluated value $EV_N$ between prediction regions is not limited to Formula (1). For example, differences among N candidate prediction signals are mutually evaluated using Formula (2) or Formula (3) below, and the sum thereof may be used as a correlation evaluated value. In this case, however, the selected prediction region extractor 1802 needs to acquire the N candidate prediction signals from the frame memory 104.

[Formula 2]

$$EV_N = \sum_{n=0}^{N-1}\sum_{i=0}^{B-1}\sum_{j=0}^{B-1} |p_n(i,j) - p_0(i,j)| \quad (2)$$

[Formula 3]

$$EV_N = \sum_{n=0}^{N-1}\sum_{l=0}^{N-1}\sum_{i=0}^{B-1}\sum_{j=0}^{B-1} |p_n(i,j) - p_l(i,j)| \quad (3)$$

The threshold th(N) is not limited to 32, either. For example, if the number of pixels in the target region varies, the threshold also needs to be modified. Furthermore, when the correlation evaluated value among prediction regions is calculated using Formula (2) or Formula (3), th(N) needs to be adaptively varied according to the value of N.

The value of the(N) needs to be set to the same value in the encoder and the decoder. It may be preliminarily determined, but it is also conceivable to adopt a method of encoding the threshold in a sequence unit or in a frame unit or slice (consisting of a plurality of blocks) unit and sending the encoded data to the decoder. Furthermore, it may also be sent in a block unit.

The following will describe the processing of the averaging number determiner 1800 between candidate prediction signals, using the drawing. Since the processing of the template matching unit 201 according to the present embodiment was already described with FIG. 5, the description thereof is omitted herein; it is, however, noted that FIG. 5 is the flowchart showing the method of searching for a plurality of (M) candidate prediction signals (and pixel signals of prediction adjacent regions) for the pixel signal (target pixel signal) of the target region (target block) and acquiring the coordinate information for access to the candidate prediction signals (and pixel signals of prediction adjacent regions) obtained by the search, and that the template matching unit 201 performs the process of searching a search region on a reference image for pixel signals of M prediction adjacent regions from the lowest SAD value with respect to the adjacent pixel signal of the target adjacent region adjacent to the target region.

Figure 19:
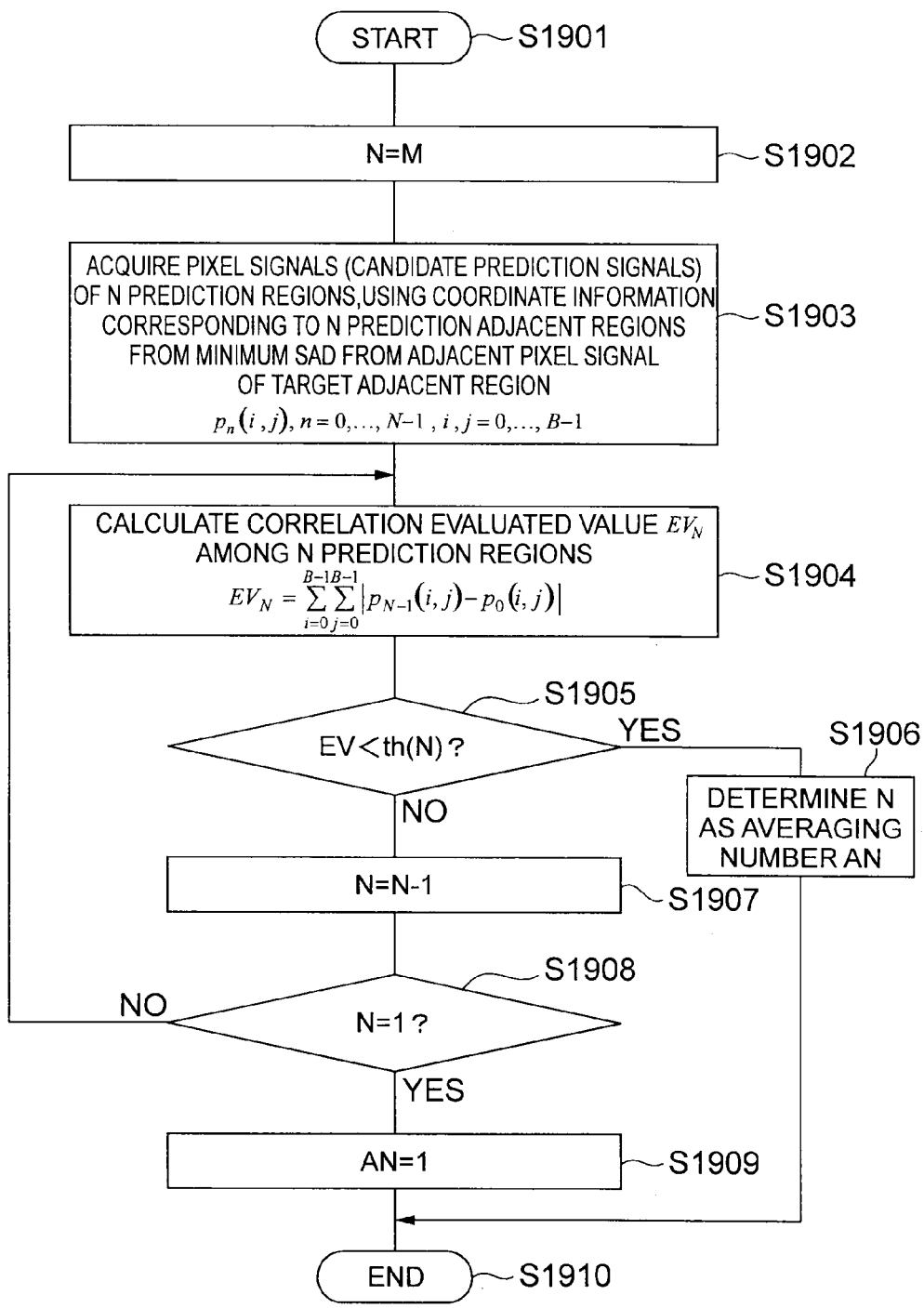
FIG. 19 is a flowchart for explaining a method of determining a combination of candidate prediction signals in an averaging number determiner 1800.

The following will describe the processing of the averaging number determiner 1800 for candidate prediction signals, using the drawing. FIG. 19 is a flowchart showing a method of selecting the number of candidate prediction signals suitable for generation of the prediction signal by smoothing (weighted averaging) of candidate prediction signals, in the averaging number determiner 1800 according to the present embodiment. First, the counter 1801 of the averaging number determiner 1800 sets the number N of candidate prediction signals to M (1902).

Next, the selected prediction region extractor 1802 acquires via the line L104, pixel signals (candidate prediction signals) of prediction regions as many as N set by the counter 1801. Specifically, concerning the N prediction adjacent regions from the lowest sum of absolute differences (SAD) with respect to the adjacent pixel signal of the target adjacent region adjacent to the target block, the selected prediction region extractor 1802 acquires the corresponding coordinate information from the coordinate information memory 202. Then it acquires the N prediction regions corresponding to the acquired coordinate information from the frame memory 104 (S1903).

Then the correlation evaluated value calculator 1803 among prediction regions calculates the correlation evaluated value $EV_N$ between the N prediction regions in accordance with Formula (1). Since Formula (1) uses only pixel signals of two prediction regions for the calculation of $EV_N$, the prediction regions to be acquired in the process S1903 may be only two regions in this case.

Thereafter, the threshold processor 1804 compares $EV_N$ with the predetermined threshold th(N) (32 in the present embodiment) (S1905) and when $EV_N$ is smaller than th(N), the averaging number AN of candidate prediction signals is determined to be N (S1906) and the processing is then terminated (S1910). If $EV_N$ is larger than th(N), the processing flow proceeds to S1907. Although the step S1905 is configured to move to S1907 if $EV_N$ is equal to th(N), the processing may be arranged to move to S1906. In S1907, the counter 1801 updates the value of N (S1907). On this occasion, if the value of N is 1 (S1908), the averaging number determiner 1800 determines AN as 1 (S1909) and terminates the processing. If the value of N is 2 or more, the processing flow returns to S1904. If the averaging number determiner 1800 is configured to fix the candidate for N to a single value, the fixed value is set in N in S1902 and the steps S1907 and S1908 are omitted.

As described above, the averaging number determining process of the present embodiment permits the device to select the number of candidate prediction signals effective to generation of the prediction signal, without any additional information, for each target region (target block). Removal of noise by averaging of a plurality of candidate prediction signals is effective to cases where the candidate prediction signals are similar in signal components but only different in noise components. In the present invention, the degree of similarity among candidate prediction signals is evaluated whereby the number of candidate prediction signals for generation of the prediction signal can be determined for each target region.

The method of calculating the correlation evaluated value among prediction regions is not limited to Formula (1). For example, it is also possible to adopt a method of mutually evaluating differences among N candidate prediction signals, using Formula (2) or Formula (3), and defining the sum thereof as the correlation evaluated value. In this case, however, the selected prediction region extractor 1802 needs to acquire the N candidate prediction signals from the frame memory 104.

The threshold th(N) is not limited to 32, either. For example, the threshold also needs to be modified when the number of pixels in the object region varies. Furthermore, when the correlation evaluated value among prediction regions is calculated using Formula (2) or Formula (3), th(N) needs to be adaptively varied according to the value of N.

The value of the(N) needs to be the same value in the encoder and the decoder. It may be preliminarily determined, but it is also conceivable to adopt a method of encoding the threshold in a sequence unit or in a frame unit and sending the encoded data.

In the present embodiment, in the case of M=6, candidates for N are 6, 5, 4, 3, and 2, but the present invention is not limited to this setting. For example, candidates for the value of N may be 4 and 2, which are powers of 2. This processing can be implemented by setting the value of N to 4 in S1902 and modifying S1907 to a process of halving the value of N (N=N/2) (in the case of M=6). However, the candidate setting method for N needs to be the same between the encoding process and the decoding process.

Figure 20:
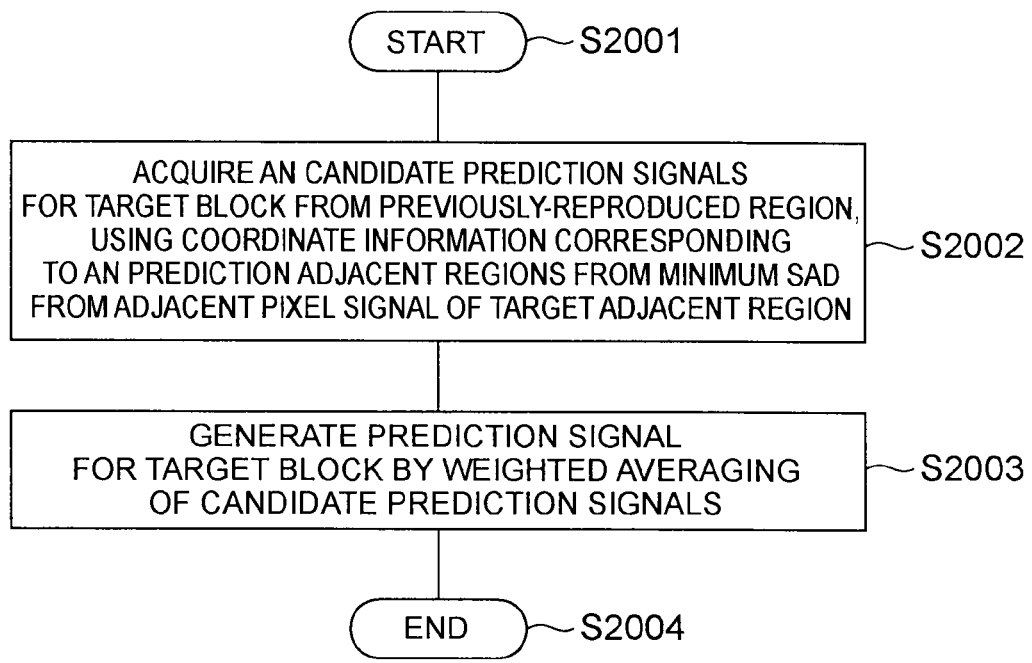
FIG. 20 is a flowchart showing a second method of combining candidate prediction signals to generate a prediction signal.

FIG. 20 is a flowchart showing a method of generating the prediction signal by smoothing (weighted averaging) of a plurality of candidate prediction signals according to the present embodiment.

The prediction region extractor 204 acquires AN candidate prediction signals corresponding to a target block from the frame memory 104, in accordance with the selected coordinate information and averaging number information of candidate prediction signals (S2002). Then the weighting unit 205 and adder 206 perform weighted averaging of the acquired candidate prediction signals to generate the prediction signal for the target block (S2003). This completes the processing for one target block (S2004).

The image predictive encoding method in the image predictive encoding device 100 and the image predictive decoding method according to the second embodiment are the same as the processing procedures of the flowcharts shown in FIGS. 8 and 9, and thus the description thereof is omitted herein.

Figure 21:
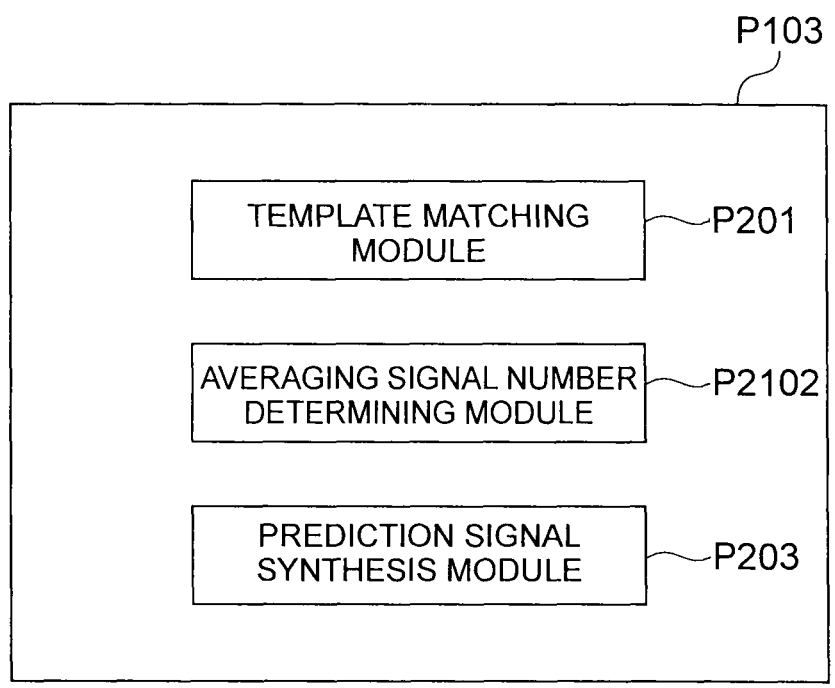
FIG. 21 is a block diagram showing a second module configuration of the prediction signal generating module P103.

The image predictive encoding method and the image predictive decoding method in this second embodiment can also be stored and provided in the form of a program in a recording medium. Examples of such recording media include recording media such as a floppy disk (registered trademark), CD-ROM, DVD, or ROM, or semiconductor memories. The configurations of modules of a program capable of executing the image predictive encoding method and modules of a program capable of executing the image predictive decoding method are the same as in the block diagrams shown in FIGS. 11 and 13, and thus the description thereof is omitted herein. The prediction signal generating module P103, as shown in FIG. 21, is constructed with the template matching module P201, an averaging signal number determining module P2102, and the prediction signal synthesis module P203. The hardware and computer for executing the program recorded in the recording medium were also described above with FIGS. 16 and 17 and thus the description thereof is omitted herein.

The embodiment described above may be modified as described below.

The above embodiment showed the example wherein the correlation evaluated value used for determination of the combination of candidate prediction signals was calculated using the pixel signals of prediction regions (candidate prediction signals), but the correlation evaluated value may also be calculated using pixel signals of prediction adjacent regions adjacent to the prediction regions, instead of the prediction regions. Furthermore, the correlation evaluated value may also be calculated using pixel signals of regions including both the prediction regions and the prediction adjacent regions (e.g., a region consisting of a prediction adjacent region 404b and a prediction region 405b in FIG. 3).

The above showed the example wherein the value of AN was determined by the averaging number determiner and the averaging number determining process, but it is also possible to adopt a combination in which the threshold processing of the present invention is carried out for only one or, two or three candidates for N and in which if the correlation evaluated value EV between prediction regions is larger than the threshold, AN is determined by another method. For example, it is conceivable to adopt a method of calculating $EV_N$ for one candidate for N, performing the threshold processing in the second embodiment, setting AN=N if $EV_N$ is smaller than th(N), and determining the value of AN by applying the combination determining processing of candidate prediction signals in the first embodiment if $EV_N$ is larger than th(N). Namely, for a plurality of candidates n for AN, it is conceivable to adopt a method of determining as AN, n with the lowest SAD between the adjacent pixel signal and the comparison signal resulting from averaging of pixel signals of n prediction adjacent regions.

The averaging number determiner 1800 in FIG. 2 was configured to calculate the correlation evaluated value of prediction regions using SAD (the sum of absolute differences) between pixel signals of prediction regions (candidate prediction signals), but it is also possible to use the sum of squared differences (SSD) or the variance (VAR) of the residual signal, instead of SAD. Computation amounts for the three evaluation criteria increase in the order of SAD, SSD, and VAR, whereas the accuracy of evaluation increases, with expectation of the effect of reduction in the code length of the error signal. It is also possible to use a mean of absolute differences (MAD) or a mean of squared errors (MSE), instead of SAD and SSD.

The modification example about the template matching in the first embodiment is also applicable to the second embodiment.

<Third Embodiment>

The first and second embodiments were described on the assumption that the weighted averaging in generating the prediction signal for the target region from a plurality of candidate prediction signals is a predetermined technique. However, by making use of the technique of selecting the combination of candidate prediction signals in the first embodiment of the present invention, it becomes feasible to select an appropriate set from a plurality of weighting factors prepared, without additional information, for each target region. This embodiment can be understood in view of modification of the drawings used in the foregoing description and the following description. The following will describe the third embodiment of the present invention with reference to the modified accompanying drawings. The drawings and description redundant to those in the first embodiment will be omitted from the description.

The below will describe the processing of the prediction signal generator 103b in the third embodiment. It is noted that the prediction signal generator 308b applied to the image predictive decoding device 300 has the same configuration and processing as the prediction signal generator 103b. As for the image predictive encoding device 100 in FIG. 1 and the image predictive decoding device 300 in FIG. 9, the operations in the prediction signal generators 103b and 308b are different from those in the first embodiment, but the input/output relation of signals is the same as in the first embodiment; therefore, the description thereof is omitted herein.

Figure 22:
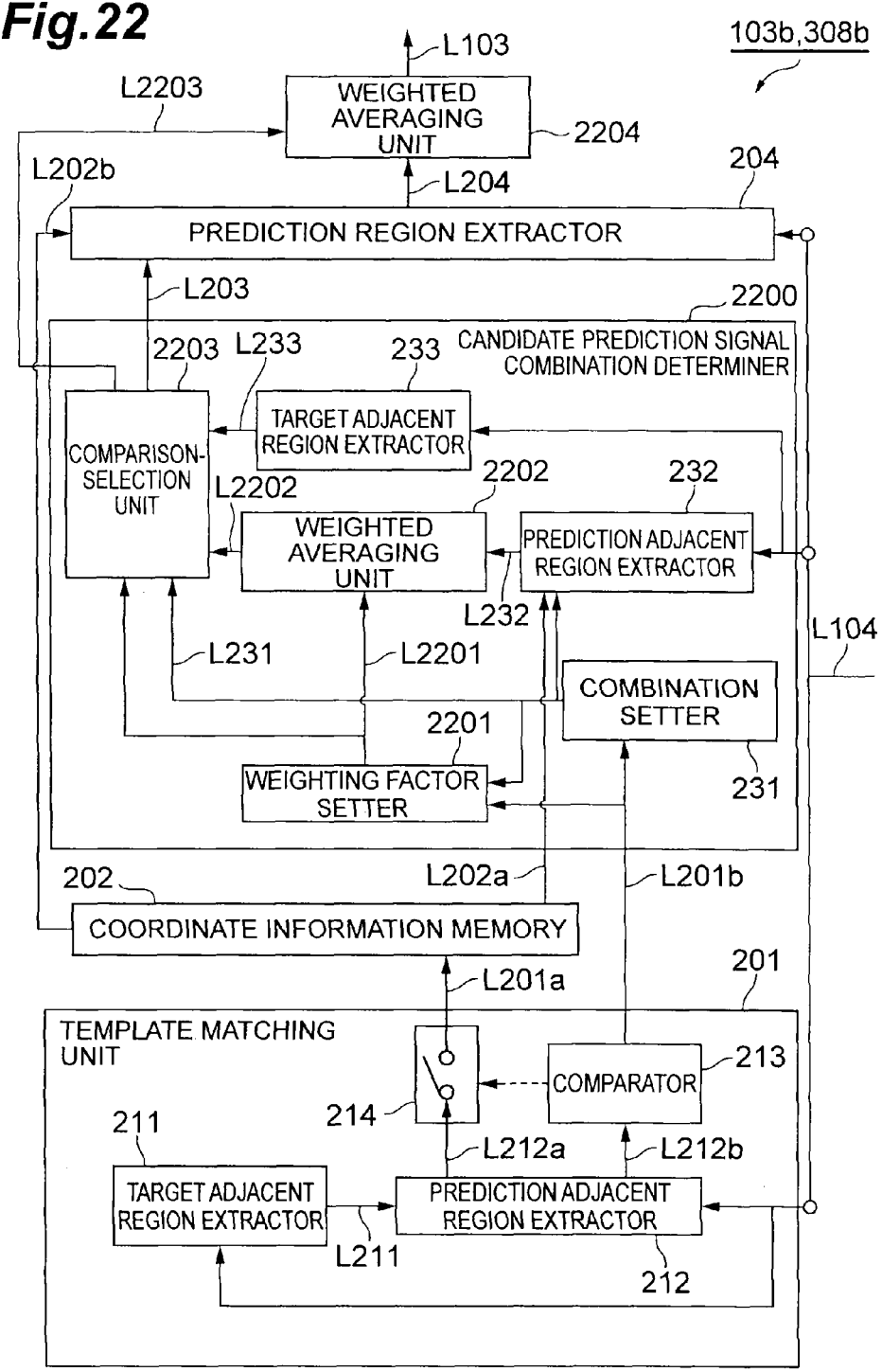
FIG. 22 is a block diagram showing the prediction signal generator 103 used in the image predictive encoding device in the third embodiment.

FIG. 22 is a block diagram showing the prediction signal generator 103b used in the image predictive encoding device 100 according to the present embodiment, and the prediction signal generator 103b is constructed with the template matching unit 201, the coordinate information memory 202, a candidate prediction signal combination determiner 2200, the prediction region extractor 204, and a weighted averaging unit 2204.

The processing of the template matching unit 201 is the same as in FIG. 2. Namely, the template matching unit 201 receives the input of the image signal previously reproduced in past processing (reproduced image signal) via the line L104 from the frame memory 104, searches for a plurality of candidates for the prediction signal (candidate prediction signals) for the target pixel signal of the target region by below-described template matching, and outputs the coordinate information for access to the candidate prediction signals obtained by the search, via the line L201a to the coordinate information memory 202. At the same time, the template matching unit 201 outputs the difference data (corresponding to the sum of absolute differences (SAD) described below) showing the relation between the target region and each candidate prediction signal, via the line L201b to the candidate prediction signal combination determiner 2200. In the present embodiment, as in the first embodiment, the target region (target block) is a subblock of 4×4 pixels resulting from division of the encoding target block consisting of 8×8 pixels, but it may be divided in any other block size or shape or may not be divided.

The candidate prediction signal combination determiner 2200 sets a plurality of combinations of candidate prediction signals, using the difference data input via the line L201b. Furthermore, it also uses the same difference data to set a plurality of weighting factors used in weighted averaging of candidate prediction signals. Then it determines a combination of candidate prediction signals and a set of weighting factors (weighting factor information of candidate prediction signals) used in weighted averaging of those candidate prediction signals, using the pixel signals input via the line L104 from the frame memory in accordance with the coordinate information input via the line L202a from the coordinate information memory 202. The combination information of candidate prediction signals is output via the line L203 to the prediction region extractor 204 and the weighting factor information of candidate prediction signals is output via L2203 to the weighted averaging unit 2204.

The prediction region extractor 204 acquires via the line L202b, the coordinate information of candidate prediction signals belonging to the combination, in accordance with the combination information of candidate prediction signals input via the line L203. Then the prediction region extractor 204 acquires the candidate prediction signals corresponding to the acquired coordinate information via the line L104 from the frame memory 104 and outputs them to the weighted averaging unit 2204 on demand. The weighted averaging unit 2204 multiplies each candidate prediction signal input via the line L204, by a weighting factor input via a line L2203 and successively adds up the weighted signals to calculate a weighted sum. At the same time, the weighted averaging unit 2204 adds up the weighting factors input via the line L2203. Then it divides the weighted sum by the sum of weighting factors and outputs the result as the prediction signal for the target region via the line L103 to the subtracter 105 in FIG. 1.

The procedure of generating the prediction signal Pb(i,j) for the target region, which is carried out in the prediction region extractor 204 and the weighted averaging unit 2204, reduce to Formula (4). The notation (i,j) herein represents coordinates of each pixel in the target region.

[Formula 4]

$$P_b(i,j) = (w_0 \times p_0(i,j) + w_1 \times p_1(i,j) + \ldots + w_{N-1} \times p_{N-1}(i,j)) / (w_0 + w_1 + \ldots + w_{N-1}) \quad (4)$$

In Formula (4), N represents the combination information of candidate prediction signals input via the line L203 into the prediction region extractor 204, and the prediction region extractor 204 acquires N candidate prediction signals $p_n(i,j)$ (n=0 to N−1) from the frame memory 104. Symbol $w_n$ represents a set of weighting factors (N factors) input via the line L2203 into the weighted averaging unit 2204. The n-th weighting factor $w_n$ is multiplied by each pixel in the n-th candidate prediction signal $p_n(i,j)$ by the weighted averaging unit 2204 and the weighted pixels of N candidate prediction signals are cumulatively added up. The sum of weighted candidate prediction signals resulting from this weighted addition is divided by the sum of weighting factors to obtain each pixel prediction signal Pb(i,j).

The operation of the template matching unit 201 in FIG. 22 is the same as in FIG. 2 and the detailed description thereof is therefore omitted herein; it is, however, noted that the template matching unit 201 searches the interior of the search region in the frame memory 104 for M prediction adjacent regions from the lowest SAD with respect to the pixel signal of the target adjacent region (adjacent pixel signal), and outputs the coordinate information being information for access to the M prediction adjacent regions (and prediction regions), via the line L202a to the coordinate information memory 202. It also outputs the calculated M SAD values via the line L201b to the candidate prediction signal combination determiner 2200.

The below will describe the operation of the candidate prediction signal combination determiner 2200. The candidate prediction signal combination determiner 203 is constructed with the combination setter 231, a weighting factor setter 2201, the prediction adjacent region extractor 232, the target adjacent region extractor 233, a weighted averaging unit 2202, and a comparison-selection unit 2203.

In the third embodiment, the combination setter 231 and the weighting factor setter 2201 first operate for the combination of candidate prediction signals and weighted averaging, in order to generate the prediction signal for the target region.

The combination setter 231 sets a plurality of combinations of prediction adjacent regions, based on the M SAD values input via the line L201b. In the present embodiment, a combination is set to be a set of N prediction adjacent regions from the lowest input SAD. The set combination is output via the line L231 to the prediction adjacent region extractor 232, the comparison-selection unit 2203, and the weighting factor setter 2201. The value of N is set to a power of 2 smaller than M and in the case of M=6, three combinations of N=1, 2, and 4 are made. It is noted that the value of M, the value of N, and the combinations of N prediction signal regions are not limited to this example. The number of prediction adjacent regions included in one combination can be optionally set in the range of 1 to M. For example, when a combination is composed of prediction adjacent regions as many as the number N smaller than M, it is also possible to select N regions from the M regions and set all combinations thereof. On this occasion, the value of N may be fixed, or it is also possible to select two or more values between 1 and M and set combinations thereof. There are no restrictions on the number of combinations as long as the number of combinations is at least one. However, for allowing the image predictive encoding device 100 of the encoder and the below-described image predictive decoding device 300 of the decoder to automatically select the same combination of prediction adjacent regions, it is necessary for them to use the same combination setting method.

The weighting factor setter 2201 sets a plurality of candidates for sets of weighting factors for weighted averaging of pixel signals of N prediction adjacent regions, based on the combination information of prediction adjacent regions input through the line L231 and the SAD values between the target adjacent region and the pixel signals of N prediction adjacent regions. In the present embodiment, four types are prepared as the candidates for sets of weighting factors. In the description below, q,n represents a weighting factor of type q (q=1-4) for the pixel signal of the n-th (n=0 to N−1) prediction adjacent region.

(1) q=1, Formula (6), and 1/N is set for each of the N weighting factors.

[Formula 6]

$$w_{1,n} = 1/N \quad (6)$$

(2) q=2, Formula (8), and the weighting factors are calculated based on SAD between the target adjacent region t(r) (r represents positions of R pixels in the target adjacent region) and N prediction adjacent regions $s_n(r)$ (n=0 to N−1) (LSAD$_n$, Formula (7)).

[Formula 7]

$$LSAD_n = \sum_{r=0}^{R-1} |s_n(r) - t(r)| \quad (7)$$

[Formula 8]

$$w_{2,n} = (LSAD_0 + LSAD_1 + \ldots + LSAD_N)/LSAD_n \quad (8)$$

(3) q=3, Formula (9), and a larger weighting factor is assigned to a pixel signal of a target adjacent region with a smaller SAD value.

[Formula 9]

$$w_{3,N} = N - n \quad (9)$$

(4) q=4, and values of $w_n$ are set from a relation of LSAD$_0$ and LSAD$_n$ (n=0 to N−1), based on a correspondence table shown in FIG. 26.

FIG. 26 is an explanatory drawing showing an example of the correspondence table for setting a set of weighting factors from differences between the pixel signal of the target adjacent region and the pixel signals of the prediction adjacent regions. LSAD$_n$ represents SAD between the target adjacent region t(r) (r represents positions of R pixels in the target adjacent region) and the N prediction adjacent regions $s_n(r)$ (n=0 to N−1), and $LSAD_O$ does SAD where n is 0. The weighting factors are uniquely determined based on respective SADs, using the correspondence table shown in FIG. 26. For example, when $LSAD_n$ is 6 and $LSAD_O$ is 17, the weighting factor is determined to be 6.

The method of setting the number of sets of weighting factors and candidate values is not limited to the four types described above.

The number of sets of weighting factors may be one. The method using the correspondence table in FIG. 26 is not limited to this table, either. It is also possible to prepare a table with an additional condition for separately handled cases like information shared between the encoding side and the decoding side, e.g., block size, quantization accuracy, and the number (N) of prediction adjacent regions for weighted averaging, in addition to the setting of thresholds and weight values in the table, or it is also possible to prepare a plurality of tables separated based on these conditions. However, for allowing the image predictive encoding device 100 of the encoder and the below-described image predictive decoding device 300 of the decoder to automatically select the same set of weighting factors, it is necessary for the two devices to use the same method of setting the set of weighting factors.

The set of weighting factors thus set is output via a line L2201 to each of the weighted averaging unit 2202 and the comparison-selection unit 2203.

When the prediction adjacent region extractor 232 receives one input of the combination information (N) of prediction adjacent regions via the line L231, it acquires the coordinate information corresponding to the N prediction adjacent regions included in the combination, via the line L202a from the coordinate information memory 202. Then the prediction adjacent region extractor 232 acquires the pixel signals of the N prediction adjacent regions corresponding to the coordinate information, via the line L104 and outputs them to the weighted averaging unit 2202 on demand.

The weighted averaging unit 2202 multiplies the pixel signals of the N prediction adjacent regions input via the line L232, by N weighting factors included in one set of weighting factors input via the line L2201 from the weighting factor setter 2201, and cumulatively adds up the multiplication results. Then it calculates the sum of N weighting factors and divides the cumulative sum of weighted pixel signals of the prediction adjacent regions by the sum of weighting factors to generate a comparison signal for comparison with the pixel signal of the target adjacent region (adjacent pixel signal).

The comparison signal is generated for each of the plurality of sets of weighting factors. Namely, the processing of the weighted averaging unit 2202 for the four types of sets of weighting factors set by the weighting factor setter 2201 is repeatedly carried out with one combination information (N) of prediction adjacent regions set by the combination setter 231.

The following will describe the means for generating the comparison signal, using Formula (5) below.

[Formula 5]

$$P_q(r) = (w_{q,0} \times s_0(r) + w_{q,1} \times s_1(r) + \ldots + w_{q,N-1} \times s_{N-1}(r)) / (w_{q,0} + w_{q,1} + \ldots + w_{q,N-1}) \quad (5)$$

Formula (5) represents the method of generating the comparison signal for the set of weighting factors of type q prepared for the combination information N of prediction adjacent regions. First, each of R pixels in the n-th prediction adjacent region $s_n(r)$ is multiplied by the n-th weighting factor $w_{q,n}$ in the set of weighting factors of type q. Second, the weighted N prediction adjacent regions $w_{q,n} \times s_n(r)$ are added up and the sum thereof is divided by the sum of N weighting factors $w_{q,n}$, for each of R pixels in the target adjacent region.

The target adjacent region extractor 233 acquires the pixel signal of the target adjacent region (adjacent pixel signal) via the line L104 from the frame memory 104 and outputs it to the comparison-selection unit 2203.

The comparison-selection unit 2203 receives the input of the pixel signal of the target adjacent region via the line L233 and receives the input of a plurality of comparison signals generated for the plurality of sets of weighting factors for one combination of prediction adjacent regions, via the line L2203. Then it calculates SAD between the adjacent pixel signal and the comparison signals corresponding to the plurality of sets of weighting factors, selects a set of weighting factors with a minimum SAD value, and saves it at the same time.

This processing to select a set of weighting factors (the processing of the weighting factor setter, the prediction adjacent region extractor, the adder, the weight divider, the target adjacent region extractor, and the comparison-selection unit for one combination information of prediction adjacent regions output from the combination setter) is carried out for a plurality of combinations of prediction adjacent regions (excluding the case where there is only one combination of prediction adjacent regions), to select the combination of prediction adjacent regions with the lowest SAD value calculated with respect to the adjacent pixel signal, and the set of weighting factors. The selected combination of prediction adjacent regions (acquired via L231) is output as combination information of candidate prediction signals via the line L203 to the prediction region extractor 204 and the selected set of weighting factors is output as weighting factor information of candidate prediction signals via L2203 to the weighted averaging unit 2204.

As described above, the present embodiment enables the device to select the combination of candidate prediction signals and the set of weighting factors effective to generation of the prediction signal, without any additional information, for each target block. If the combination of candidate prediction signals effective to generation of the prediction signal is preliminarily determined, it is effective to selection of the appropriate set of weighting factors.

The below will describe the processing of the candidate prediction signal combination determiner 2200, using the drawing. The processing of the template matching unit 201 according to the present embodiment was already described with FIG. 5 and the description thereof is thus omitted herein; it is, however, noted that FIG. 5 is the flowchart showing the method of searching for a plurality of (M) candidate prediction signals (and pixel signals of prediction adjacent regions) for the pixel signal (target pixel signal) of the target region (target block) and acquiring the coordinate information for access to the candidate prediction signals (and pixel signals of prediction adjacent regions) obtained by the search, and that the template matching unit 201 performs the processing of searching the search region on the reference image for pixel signals of M prediction adjacent regions from the lowest SAD with respect to the adjacent pixel signal of the target adjacent region adjacent to the target region.

Figure 23:
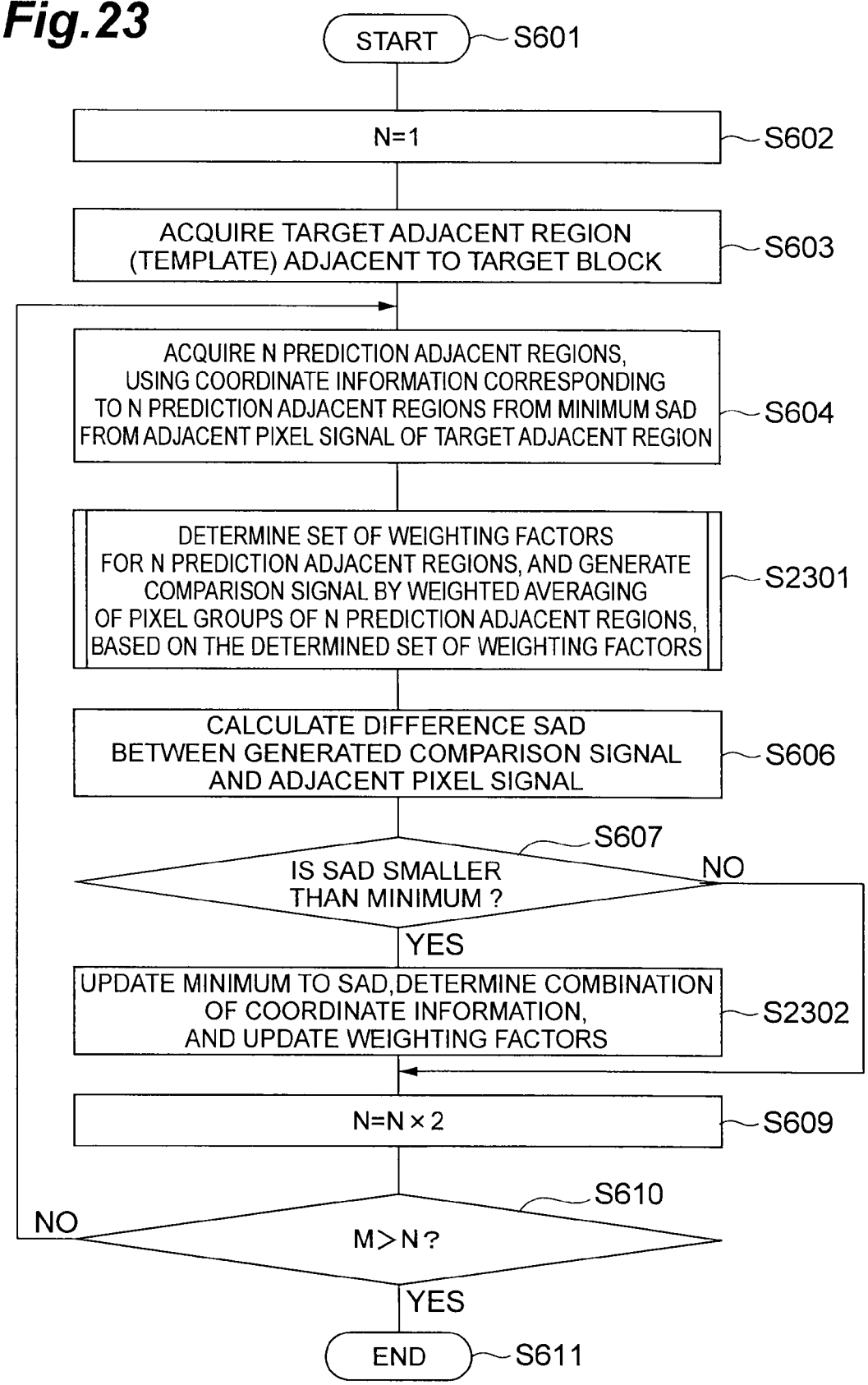
FIG. 23 is a flowchart for explaining a method of determining weighting factors for candidate prediction signals in a weighting factor setter 2201.

FIG. 23 is a flowchart showing the method of selecting the combination of N candidate prediction signals suitable for generation of the prediction signal for the target region and selecting the set of weighting factors for weighted averaging of the N candidate prediction signals, in the candidate prediction signal combination determiner 2200 according to the third embodiment. First, the combination setter 231 of the candidate prediction signal combination determiner 2200 sets the number N of candidate prediction signals to 1 (S602). Then the target adjacent region extractor 233 acquires the target adjacent region (template region) to the target block from the frame memory 104 (S603).

Then the prediction adjacent region extractor 232 acquires the N prediction adjacent regions belonging to the combination set by the combination setter 231, via the line L104. Specifically, the prediction adjacent region extractor 232 acquires from the coordinate information memory 202 the coordinate information corresponding to the N prediction adjacent regions from the lowest SAD between the adjacent pixel signal of the target adjacent region to the target block and a pixel signal of a region (candidate for prediction adjacent region) of the same shape as the target adjacent region in the search region on the reference image. Then it acquires the N prediction adjacent regions corresponding to the acquired coordinate information from the frame memory 104 (S604).

Next, the weighting factor setter 2201 sets a plurality of sets of weighting factors for the N prediction adjacent regions, based on SAD between the adjacent pixel signal and the N prediction adjacent regions, and the candidate prediction signal combination determiner 2200 determines the weighting factors for the N prediction adjacent regions by below-described processing (which will be described with FIG. 24). Then the weighted averaging unit 2202 performs weighted averaging of pixel groups of the N prediction adjacent regions, based on the determined weighting factors, to generate the comparison signal (S2301).

Thereafter, the comparison-selection unit 2203 calculates SAD being the difference between the generated comparison signal and the adjacent pixel signal (S606). At the same time, the comparison-selection unit 2203 compares the calculated SAD with the current minimum SAD (S607); if the calculated SAD is determined to be minimum, the processing flow goes to S2302; otherwise, the processing flow goes to S609. If in S607 the calculated SAD is equal to the current minimum SAD, the processing flow goes to S2302, but the processing flow may be configured to move to S608.

When the calculated SAD is a new minimum SAD, the comparison-selection unit 2203 stores the combination of coordinate information acquired in S604 and the set of weighting factors determined in S2301 (S2302).

The combination determiner 2200 updates the value of N to double (S609). Then it compares the new N with M (S610); if the new N value is smaller than M, the flow returns to S604. If the new N value is larger than M, the combination of coordinate information stored in S2302 is determined to be a combination of candidate prediction signals. Furthermore, the set of weighting factors stored in S2302 is determined to be "weighting factors to be used in weighted averaging of candidate prediction signals," and the candidate prediction signal combination selecting processing is terminated (S611).

Figure 24:
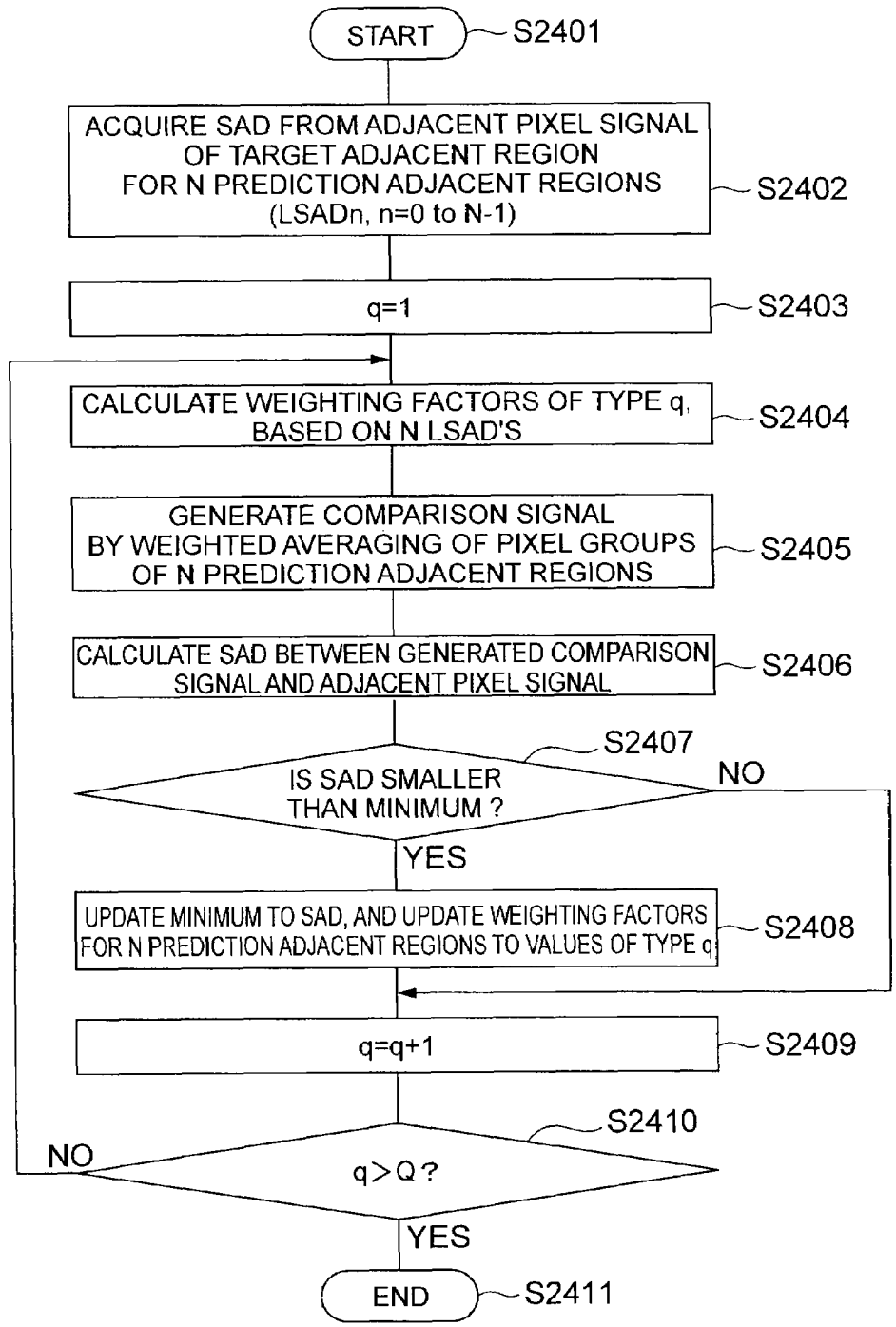
FIG. 24 is a flowchart for explaining a third method of determining a combination of candidate prediction signals in a candidate prediction signal combination determiner 2200.

FIG. 24 is a flowchart showing the method of selecting the set of weighting factors for weighted averaging of N candidate prediction signals, in the candidate prediction signal combination determiner 2200 according to the third embodiment. If the value of N is 1, the candidate prediction signal combination determiner 2200 skips this processing.

First, the candidate prediction signal combination determiner 2200 acquires SAD (LSADn, n=0 to N−1) with respect to the adjacent pixel signal of the target adjacent region, for the N prediction adjacent regions obtained by the search by the template matching unit 201 (S2402). Then the weighting factor setter 2201 sets the type q of weighting factors to 1 (S2403). The weighting factor setter 2201, thereafter, determines a set of weighting factors according to the set type (q) and the N value (S2404). In the present embodiment, the four types are prepared as candidates for the set of weighting factors as described below, but the method of setting the number of sets of weighting factors and candidate values is not limited to the four types.

(1) q=1, Formula (6), and 1/N is set for each of the N weighting factors.
(2) q=2, Formula (8), and the weighting factors are calculated based on SAD (LSAD$_n$, Formula (7)) between the target adjacent region t(r) (r represents positions of R pixels in the target adjacent region) and the N prediction adjacent regions s$_n$(r) (n=0 to N−1).
(3) q=3, Formula (9), and a larger weighting factor is assigned to a pixel signal of a target adjacent region with a smaller SAD value.
(4) q=4, and values of w$_n$ are set from the relation between LSAD$_O$ and LSAD$_n$ (n=0 to N−1), based on the table shown in FIG. 26.

After the set of weighting factors is set, the comparison signal is generated according to Formula (5), using the pixel signals of the N prediction adjacent regions acquired in S604 and the determined set of weighting factors (S2405). Formula (5) represents the method of generating the comparison signal, using the set of weighting factors of the type q prepared for the combination information N of prediction adjacent regions. First, each of R pixels in the n-th prediction adjacent region s$_n$(r) is multiplied by the n-th weighting factor w$_{q,N}$ in the set of weighting factors of the type q. Second, the weighted N prediction adjacent regions w$_{q,n \times sn}$(r) are added up and the sum thereof is divided by the sum of the N weighting factors w$_{q,n}$, for each of R pixels in the target adjacent region.

Thereafter, the comparison-selection unit 2203 calculates SAD being the difference between the generated comparison signal and the adjacent pixel signal of the target adjacent region (template region) to the target block acquired in S603 (S2406). At the same time, the comparison-selection unit 2203 compares the calculated SAD with the current minimum SAD (S2407); if the calculated SAD is determined to be minimum, the flow goes to S2408; otherwise, the flow goes to S2409. If in S2407 the calculated SAD is determined to be equal to the current minimum SAD, the flow goes to S2409, but the processing flow may be configured to move to S2408.

When the calculated SAD is smaller than the current minimum SAD, the minimum is updated to the calculated SAD and the weighting factors for N prediction adjacent regions are updated to values of type q (S2408).

Next, the weighting factor setter 2201 adds 1 to the value of q to update it (S2409). Then the updated q value is compared with the value of Q (the set number of sets of weighting factors, which is 4 in the present embodiment) (S2410); if the updated q value is smaller than or equal to Q, the processing flow returns to S2404. If the updated q value is larger than Q, the set of weighting factors stored in S2302 is determined to be a set of weighting factors for the combination of adjacent prediction regions (composed of N prediction adjacent regions) set by the combination setter 231, and the weighting factor selection processing is terminated (S2411). The value of Q is not limited to 4, but may be at least 1.

By making use of the candidate prediction signal combination processing of the present embodiment as described above, it becomes feasible to determine the set of weighting factors for averaging of the pixel signals of the N prediction adjacent regions (and the pixel signal of the target region, i.e., the candidate prediction signals), without any additional information.

Figure 25:
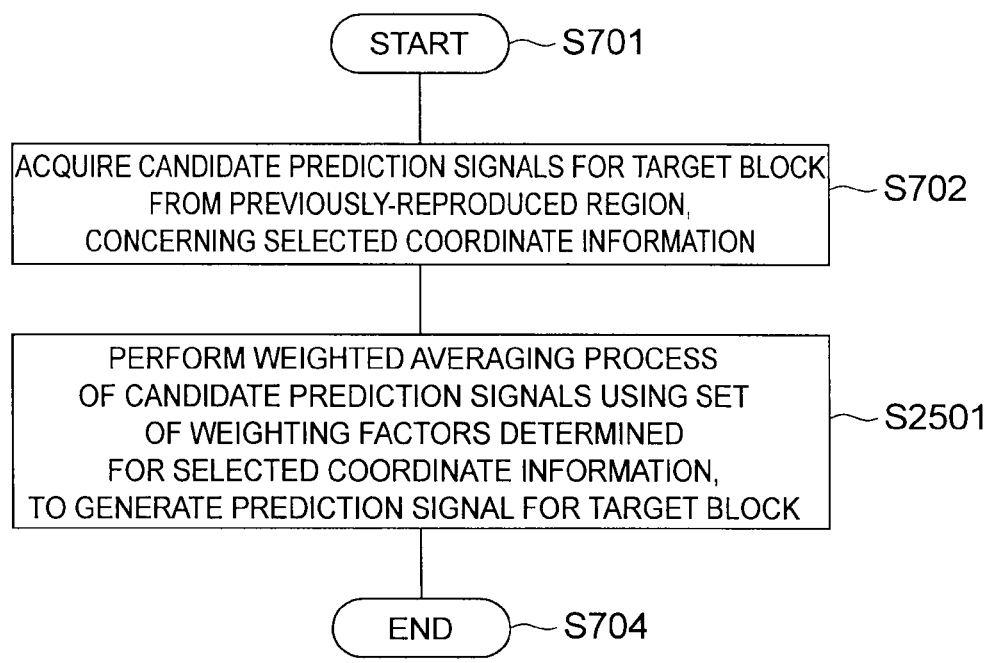
FIG. 25 is a flowchart showing a third method of combining candidate prediction signals to generate a prediction signal.

FIG. 25 is a flowchart showing the method of generating the prediction signal by smoothing (weighted averaging) of candidate prediction signals according to the present embodiment.

The prediction region extractor 204 acquires one or more candidate prediction signals corresponding to the target block from the frame memory 104, in accordance with the selected coordinate information (S2502). Then the weighted averaging unit 2204 carries out the weighted averaging processing of the candidate prediction signals, using the set of weighting factors selected for the acquired candidate prediction signals, to generate the prediction signal for the target block (S2501). This completes the processing for one target block (S704). On this occasion, the prediction signal Pb(i,j) is generated by calculation based on Formula (4). The notation (i,j) herein represents coordinates of each pixel in the target region. In Formula (4), N represents the combination information of candidate prediction signals input via the line L203 into the prediction region extractor 204, and the prediction region extractor 204 acquires N candidate prediction signals $p_n(i,j)$ (n=0 to N−1) from the frame memory 104. Symbol $w_n$ represents the set of weighting factors (N factors) input via the line L2203 into the weighted averaging unit 2204. The weighted averaging unit 2204 multiplies the n-th weighting factor $w_n$ by each pixel in the n-th candidate prediction signal $p_n(i,j)$ and the weighted pixels of N candidate prediction signals are cumulatively added up. The cumulative sum of candidate prediction signals resulting from the weighted addition is divided by the sum of the weighting factors to obtain a predicted value Pb(i,j) of each pixel.

The image predictive encoding method in the image predictive encoding device 100 and the image predictive decoding method according to the third embodiment are the same as the processing procedures of the flowcharts shown in FIGS. 8 and 9, and thus the description thereof is omitted herein.

The image predictive encoding method and the image predictive decoding method in this third embodiment can also be stored and provided in the form of a program in a recording medium. Examples of such recording media include recording media such as a floppy disk (registered trademark), CD-ROM, DVD, or ROM, or semiconductor memories. The configurations of modules of a program capable of executing the image predictive encoding method and modules of a program capable of executing the image predictive decoding method are the same as in the block diagrams shown in FIGS. 11 to 13, and thus the description thereof is omitted herein. The hardware and computer for executing the program recorded in the recording medium were also described above with FIGS. 16 and 17 and thus the description thereof is omitted herein. The prediction signal synthesis module P203 has the functions including the prediction region extractor 204 and the weighted averaging unit 2204.

The third embodiment described above may be modified as described below.

In the weighting process described with Formula (4) and Formula (5), the computational accuracy of weighting factors is real number accuracy. However, the present embodiment may be modified to carry out the weighted averaging process after conversion of each weighting factor to an integer. In the case where the weighting factors are real values, different arithmetic devices can derive different computational results; whereas this problem can be avoided if a rule for the conversion to integers is determined between the encoder and the decoder. On this occasion, if each weighting factor is multiplied by a certain value and then the resultant is converted into an integer, it becomes feasible to keep the computational accuracy of the weighting processing high.

The candidate prediction signal combination determiner 2200 in FIG. 22 is configured to calculate SAD (the sum of absolute differences) which is the difference between the pixel signal of the target adjacent region to the target block and the comparison signal resulting from weighted averaging of pixel signals of adjacent prediction regions, and to determine an optimal combination of candidate prediction signals, but the combination can also be determined using the sum of squared differences (SSD) or the variance (VAR) of the residual signal, instead of SAD. The computation amounts for the three evaluation criteria increase in the order of SAD, SSD, and VAR, whereas the accuracy of evaluation increases, with expectation of the effect of reduction in the code length of the error signal.

If there are a plurality of combinations obtained with the same SAD value as the difference between the target adjacent signal and the comparison signal, it is effective to adopt a method of determining a final combination by applying SSD or VAR. Specifically, when the SAD value calculated by the prediction adjacent region extractor 232 coincides with the minimum calculated heretofore, the comparison-selection unit 2203 further compares their values of SSD or VAR as a comparison target to select the smaller between them. A combination determined as one with the smaller SSD or VAR is stored as a combination with the minimum by the comparison-selection unit 2203. In this case, the comparison-selection unit 2203 calculates SSD or VAR as well as SAD and stores them at the same time.

The configuration of the prediction signal generator 103b (prediction signal generator 308b) is not limited to the configuration in FIG. 22. For example, FIG. 22 shows the configuration wherein for a plurality of candidate prediction signals obtained by the search by the template matching unit, the coordinate information for access to the signals is stored in the coordinate information memory 202, but it is also possible to adopt a configuration wherein the candidate prediction signals and the pixel signals of the prediction adjacent regions are stored. This configuration increases the memory size in FIG. 22, but achieves an effect of reduction in access to the frame memory.

<Fourth Embodiment>

In the third embodiment, the decoder searches for the prediction regions and the prediction adjacent regions adjacent thereto, based on the information added to the target adjacent region (e.g., the target adjacent signal). On the other hand, the present invention to determine the weighting factors applied to generation of the prediction signal for each target region, without additional information, from a plurality of candidates is also applicable to a case where the encoder encodes the coordinate information (e.g., coordinate information 416 in FIG. 4) for access to the prediction regions and prediction adjacent regions, i.e., the information added to the target region (a motion vector or an identification number of a reference image) and where the decoder acquires the prediction regions and prediction adjacent regions, based on the additional information.

Figure 27:
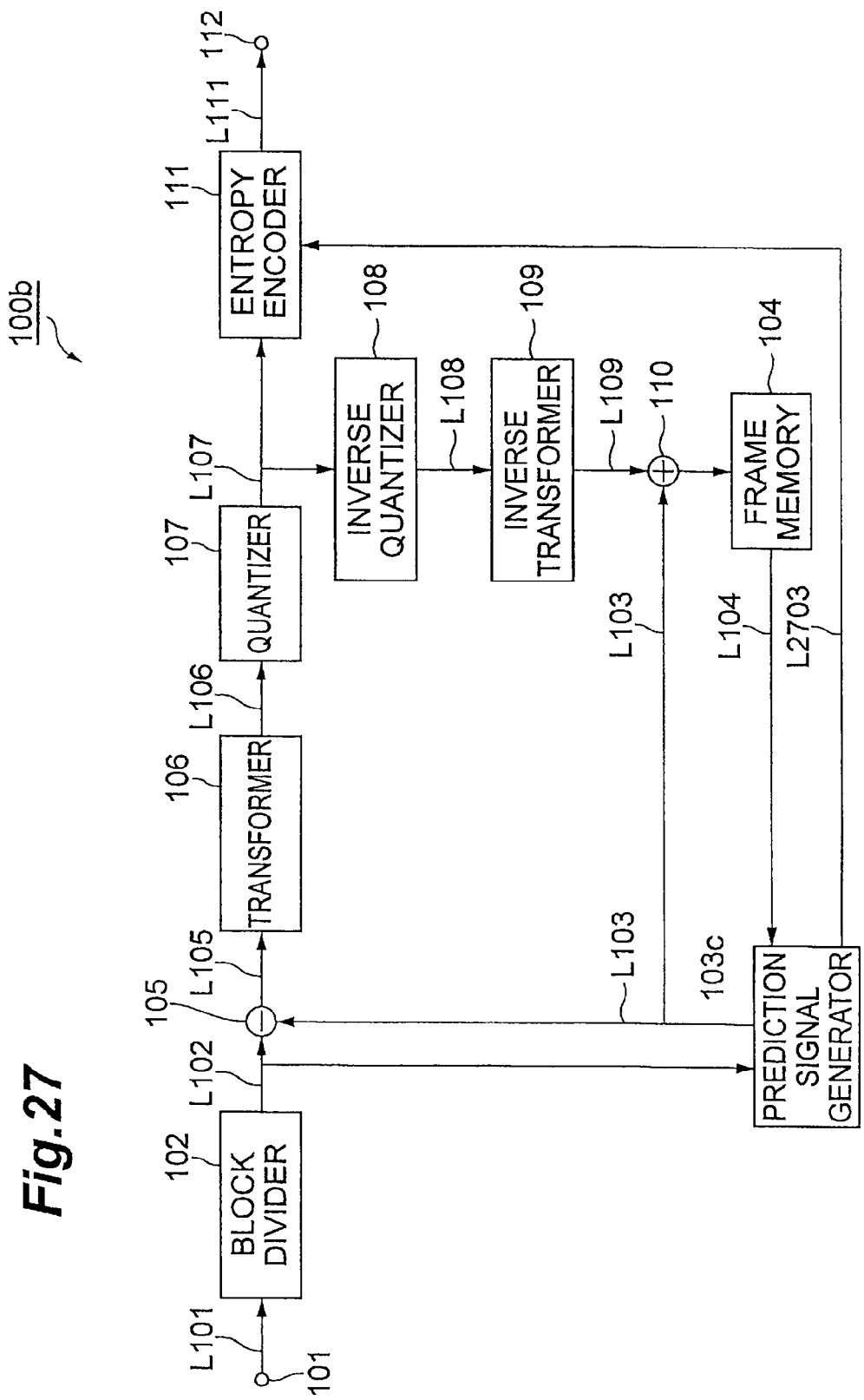
FIG. 27 is a block diagram showing the image predictive encoding device according to the fourth embodiment of the present invention.
Figure 28:
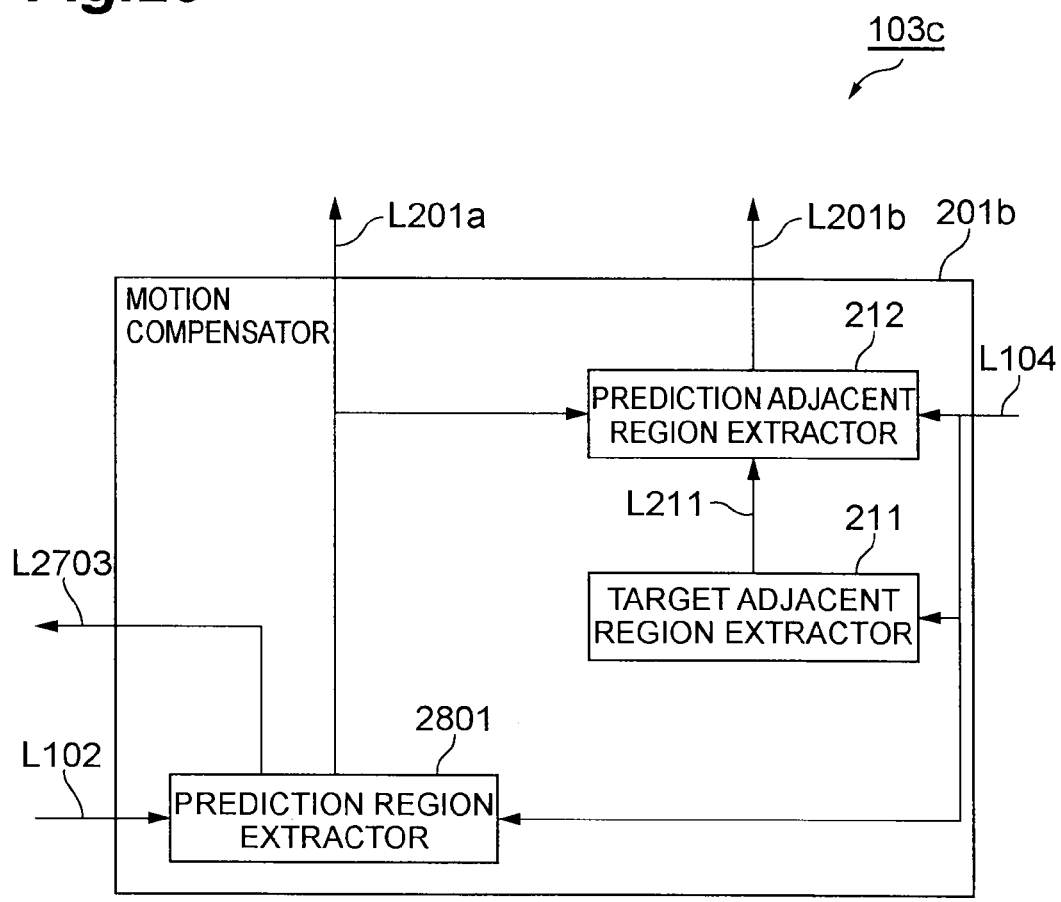
FIG. 28 is a block diagram showing a motion compensator 201b in the prediction signal generator 103c of the image predictive encoding device according to the fourth embodiment of the present invention.
Figure 30:
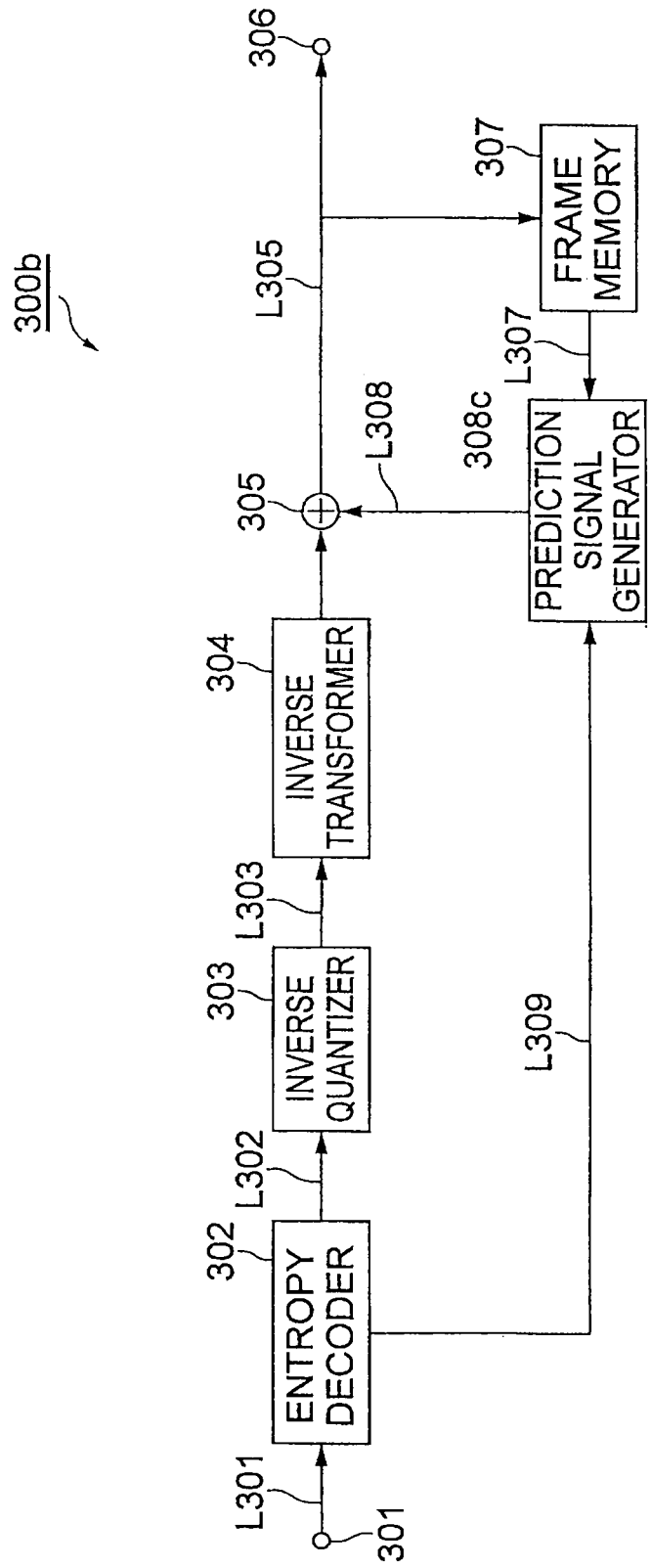
FIG. 30 is a block diagram showing the image predictive decoding device according to the fourth embodiment of the present invention.
Figure 31:
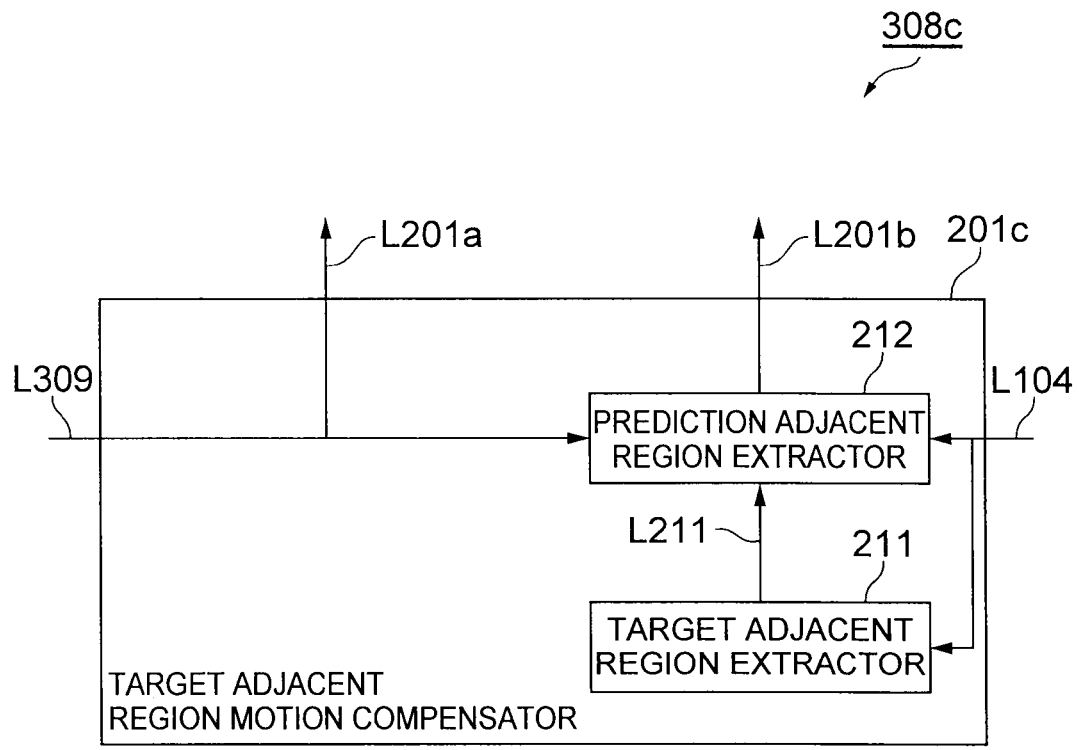
FIG. 31 is a block diagram showing a target adjacent region motion compensator 201c in the prediction signal generator 308c of the image predictive decoding device according to the fourth embodiment of the present invention.

The encoding device and decoding device according to the third embodiment can be implemented by changing the template matching unit in the prediction generator in FIG. 2 to a motion compensator in FIG. 28 or in FIG. 31. The encoding device and the decoding device are modified to those as shown in FIG. 27 and FIG. 30, for the encoding and decoding processing of the additional information of the target region. The encoding process and decoding process according to this modification example can be implemented by changing the template matching processing of FIG. 5 to motion compensation processes of FIG. 29 and FIG. 32. In the fourth embodiment, the number of candidate prediction signals is fixed to M and a set of M weighting factors is selected from a plurality of candidates.

FIG. 28 is a block diagram showing the image predictive encoding device 100b according to the fourth embodiment. The image predictive encoding device 100b is different in the input/output configuration of the prediction signal generator 103c from the image predictive encoding device 100 shown in the block diagram of the image predictive encoding device 100. Specifically, the pixel signal (target pixel signal) of the target region (target block) is input via L102 and the additional information of the target region containing the coordinate information for access to each of two or more prediction regions is output via L2703 to the entropy encoder 111. The additional information of the target region output from the prediction signal generator 103c, together with the transform coefficients quantized by the quantizer 107, is encoded by the entropy encoder 111.

The below will describe the prediction signal generator 103c in the image predictive encoding device 100b according to the fourth embodiment. The prediction signal generator herein is different from the prediction signal generator shown in FIG. 22, in that the template matching unit 201 is changed to a motion compensator.

FIG. 28 is a block diagram of the motion compensator 201b in the prediction signal generator 103c in the image predictive encoding device 100b according to the fourth embodiment.

The motion compensator 201b accesses the reproduced image signals stored in the frame memory 104, via the line L104 to perform the block matching processing. The block matching processing will be described below using FIGS. 3 and 4. The below will describe a process of generating candidate prediction signals for a target block 402.

First, a "search region" is set based on the information added to the target block and already-encoded adjacent blocks. In FIG. 3, a part (or, possibly, the whole) of a reproduced image being in contact with the target block 402, reproduced prior thereto, and located within the same picture is set as the search region 401. In this example the target block 402 is a subblock of 4×4 pixels resulting from division of an encoding target block consisting of 8×8 pixels, but the encoding target block may be divided in any other block size or shape or may not be divided.

Furthermore, in FIG. 4 a search region 417 is set as a part of a reproduced image indicated by a picture 411 different from the target block 402. In the present embodiment, the search regions are set in two pictures (FIG. 3 and FIG. 4), but the search regions may be set only in the same picture as the target block (FIG. 3) or only in a picture different from the target block (FIG. 4).

The search region 401 and the target block 402 so not have to be in contact with each other as shown in FIG. 3, but the search region 401 may be in no contact with the target block 402 at all. How to set the search region does not have to be limited to the way of setting the search region in one picture (only picture 411) different from the target block as shown in FIG. 4, but the search region may be set in each of pictures (reference images which may include a future frame in a display order as long as it is a previously reproduced one) different from the target block.

The motion compensator 201b calculates the sum of absolute differences (SAD) between corresponding pixels, between pixels in the target region 402 and pixel groups of the same shape as the target region 402, in the search regions of the search region 401 and search region 417 (of each reference frame) (or in any one of them), searches for M regions from the lowest SAD, and defines them as "prediction regions." Furthermore, inverse L-shaped regions adjacent to the prediction regions are defined as "prediction adjacent regions." The search accuracy may be the integer pixel unit, or it is also possible to generate pixels in decimal accuracy such as half pixel or quarter pixel and to perform the search in the decimal pixel accuracy. The value of M is preliminarily set and M=6 in FIGS. 3 and 4; the prediction regions obtained by the search herein are prediction regions 405a, 405b, 405c, 415a, 415b, and 415c. The prediction adjacent regions to these prediction regions are regions 404a, 404b, 404c, 414a, 414b, and 414c, and the additional information of the target region, i.e., the coordinate information for access to each prediction region and prediction adjacent region (motion vector and identification number of reference image) is indicated by vectors 406a, 406b, 406c, 416a, 416b, and 416c.

Furthermore, the motion compensator 201b calculates SAD between the pixel signal (target adjacent signal) of "target adjacent region 403" adjacent to the target block 402 and the pixel signals of the M prediction adjacent regions 404, 414 obtained by the search.

The below will describe a configuration of the motion compensator 201b for carrying out the operation as described above. The motion compensator 201b is constructed with the target adjacent region extractor 211, the prediction adjacent region extractor 212, and a prediction region extractor 2801.

The prediction region extractor 2801 successively acquires the pixel signals of the regions (prediction regions) of the same shape as the target region 402 (target block) from the search regions in the frame memory 104, via the line L104 and calculates SAD between the pixel signal (target pixel signal) of the target region 402 input via the line L102 and the pixel signals of the acquired prediction regions (including 405 and 415). Then it searches for M prediction regions from the lowest SAD from pixel groups in the search range. The coordinate information (406 and 416, motion vectors and identification numbers of reference images) for access to the M prediction regions (405 and 415) obtained by the search is output via a line L2703 to the entropy encoder 111. At the same time, the coordinate information of the M prediction regions is output via the line L201a to the coordinate information memory 202 and the prediction adjacent region extractor 212.

The target adjacent region extractor 211 acquires the target adjacent region 403 via the line L104 from the frame memory 104 and outputs it via the line L211 to the prediction adjacent region extractor 212.

When the prediction adjacent region extractor 212 receives the input of the coordinate information of the M prediction regions via the line L201a, it acquires M pixel signals of prediction adjacent regions being regions of the same shape as the target adjacent region 403 from the search regions in the frame memory 104, based on the coordinate information. Then it calculates SAD between the pixel signal (adjacent pixel signal) of the target adjacent region 403 obtained via the line L211 from the target adjacent region extractor 211 and the acquired pixel signals of M prediction adjacent regions, and outputs the result via the line L201b to the candidate prediction signal combination determiner 2200.

As described above, the motion compensator 201b searches for the M prediction regions and outputs the coordinate information for access to these prediction regions, as additional information of the target region to the entropy encoder. Then, for the M prediction regions obtained by the search, it generates SAD between the pixel signal of the prediction adjacent region adjacent to each prediction region and the pixel signal of the target adjacent region, and the coordinate information for access to each prediction adjacent region, and outputs them to the candidate prediction signal combination determiner 2200. Based on the input information, the candidate prediction signal combination determiner 2200 selects a set of weighting factors for weighted averaging of the pixel signals of the M prediction regions, from a plurality of candidates, as described in the third embodiment.

Figure 29:
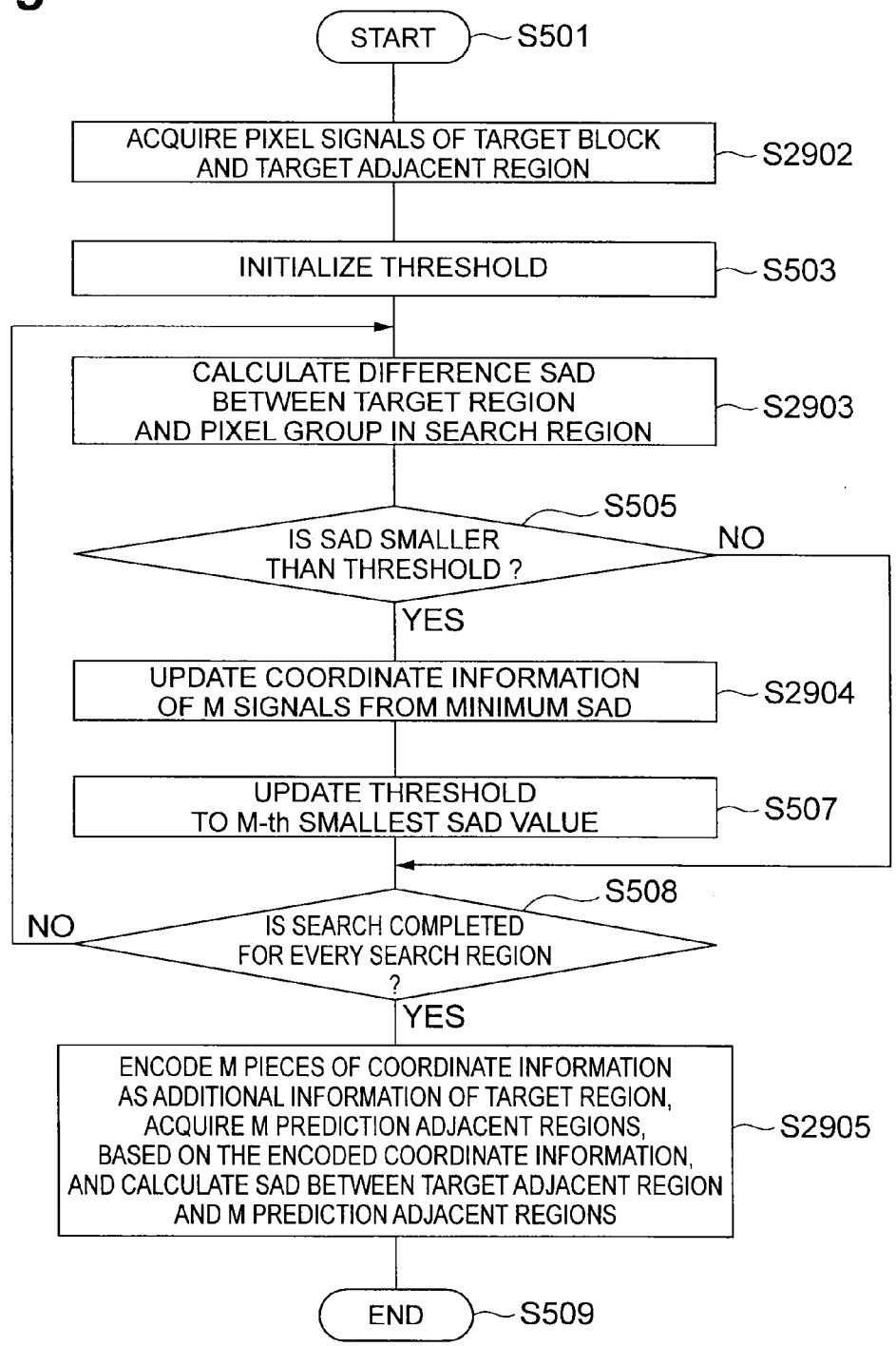
FIG. 29 is a flowchart showing a motion compensation method in the motion compensator 201b.

FIG. 29 is a flowchart showing the method of searching for a plurality of (M) candidate prediction signals for the pixel signal (target pixel signal) of the target region (target block) and acquiring the coordinate information for access to the candidate prediction signals obtained by the search, as additional information of the target region, in the motion compensator 201b according to the present embodiment.

First, the target adjacent region extractor 211 acquires the target adjacent region (template signal) to the target block from the frame memory 104. At the same time, the motion compensator 201b acquires the image signal of the target region from the frame memory storing the input image signals (S2902).

Next, the motion compensator 201b initializes the threshold for selection of M candidate prediction signals to a sufficiently large value (S503). The prediction region extractor 2801 acquires the prediction region from the search region and obtains the sum of absolute differences (SAD) between the pixel signals of the acquired prediction region and the target region (S2903). Furthermore, the SAD value is compared with a threshold (S505); if the SAD value is determined to be smaller than the threshold, the processing flow goes to S2904; otherwise, the processing flow goes to S508.

The process S2904 is to save and update the coordinate information for access to M prediction regions with lowest SAD values, among the SAD values calculated in the process S2903. At the same time, the motion compensator 201b updates the threshold to the M-th lowest SAD value (S507).

Thereafter, the prediction region extractor 2801 checks whether the search is completed for every search region (S508). When it is determined that the search is not completed for every search region, the flow returns to S2903; when the search is completed for every search region, the motion compensator 201b executes the process S2905 and terminates the motion compensation process (S509). The process S2905 is to encode the detected M pieces of coordinate information as additional information of the target region. Furthermore, the prediction adjacent region extractor 212 calculates SAD between the pixel signal of the target adjacent region acquired in the process S2902 and the pixel signals of the M prediction adjacent regions acquired based on the M pieces of coordinate information.

FIG. 30 is a block diagram showing the image predictive decoding device 300b according to the fourth embodiment. The image predictive decoding device 300b is different in the input configuration of the prediction signal generator 308c from the image predictive decoding device 300 shown in the block diagram of the image predictive decoding device 300b. Namely, the prediction signal generator 308c receives the input of the additional information of the target region containing the coordinate information for access to each of two or more prediction regions decoded by the entropy decoder 302.

The below will describe the prediction signal generator 302c in the image predictive encoding device 100b according to the fourth embodiment. It is different from the prediction signal generator shown in FIG. 22, in that the template matching unit 201 is changed to a target adjacent region motion compensator 201b.

FIG. 31 is a block diagram of the target adjacent region motion compensator 201c in the prediction signal generator 308c in the image predictive decoding device 300b according to the fourth embodiment.

The target adjacent region motion compensator 201c acquires pixel signals of M prediction adjacent regions 404, 414, based on the M pieces of coordinate information input via a line L309, and calculates SAD with respect to the pixel signal (target adjacent signal) of "target adjacent region 403" adjacent to the target block 402.

The configuration of the target adjacent region motion compensator 201c will be described. The motion compensator 201c is constructed with the target adjacent region extractor 211 and the prediction adjacent region extractor 212.

First, the coordinate information for access to M prediction regions input via the line L309 is input into the prediction adjacent region extractor 212 and is output to the candidate prediction signal combination determiner 2200.

The target adjacent region extractor 211 acquires the target adjacent region 403 via the line L104 from the frame memory 104 and outputs it via the line L211 to the prediction adjacent region extractor 212.

When the prediction adjacent region extractor 212 receives the input of the coordinate information of M prediction regions via the line L309, it acquires M pixel signals of prediction adjacent regions being regions of the same shape as the target adjacent region 403 from the search regions in the frame memory 104, based on the coordinate information. Then it calculates SAD between the pixel signal (adjacent pixel signal) of the target adjacent region 403 obtained via the line L211 from the target adjacent region extractor 211 and the acquired pixel signals of M prediction adjacent regions, and outputs the result via the line L201b to the candidate prediction signal combination determiner 2200.

As described above, the target adjacent region motion compensator 201c calculates SAD between the pixel signal of the prediction adjacent region adjacent to the respective M prediction regions and the pixel signal of the target adjacent region and outputs the result, together with the coordinate information for access to each prediction adjacent region, to the candidate prediction signal combination determiner 2200. Based on the input information, the candidate prediction signal combination determiner 2200 selects a set of weighting factors for weighted averaging of the pixel signals of M prediction regions from a plurality of candidates, as described in the third embodiment.

Figure 32:
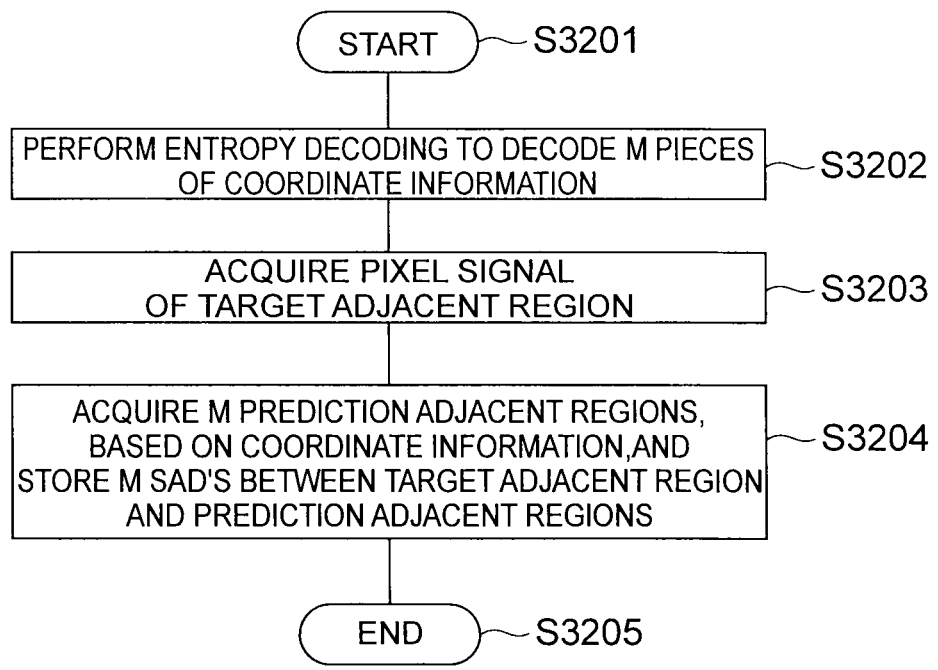
FIG. 32 is a flowchart showing a motion compensation method in the target adjacent region motion compensator 201c.

FIG. 32 is a flowchart showing the processing executed by the target adjacent region motion compensator 201c according to the present embodiment.

First, the entropy decoder 302 of the decoding device decodes the additional information of the target region to decode the coordinate information for access to M prediction regions (S3202). The target adjacent region extractor 211 acquires the target adjacent region (template signal) to the target block from the frame memory 307 (S3203).

Second, the prediction adjacent region extractor 212 calculates SAD between the pixel signal of the target adjacent region acquired in the process S3203 and the pixel signals of M prediction adjacent regions acquired based on the decoded M pieces of coordinate information (S3204), and the processing is then terminated (S3205).

As described above, in the case where the plurality of prediction regions are generated based on the information added to the target region, a set of weighting factors for generation of the prediction signal of the target region by the weighted averaging of these prediction regions can also be determined from a plurality of candidates, without additional information.

As in the first to the third embodiments, the image predictive encoding device 100 and the image predictive decoding device 300 of the fourth embodiment can be configured as a program or as a recording medium containing the program. Specific module configurations thereof are the same as those in FIG. 11 and FIG. 13. A module configuration corresponding to the prediction signal generator 103c is the same as in FIG. 12, but the template matching module P201 needs to be replaced by a motion compensation module having the function of the motion compensator 201b. Furthermore, a module configuration corresponding to the prediction signal generator 308c is the same as that shown in FIG. 12, but the template matching module P201 needs to be replaced by a target adjacent region motion compensation module corresponding to the target adjacent region motion compensator 201c.

The below will describe the action and effect of the image predictive encoding device 100 and the image predictive decoding device 300 of the embodiment.

In the image predictive encoding device 100 of the first embodiment, the template matching unit 201 searches the search regions 401 and 417 of previously-reproduced images for a plurality of prediction adjacent regions 404a-404c, 414a-414c highly correlated to the target adjacent region 403 consisting of the previously-reproduced adjacent pixel signal adjacent to the target region (target block) 402 consisting of the target pixel signal. The combination setter 231 in the candidate prediction signal combination determiner 203 derives at least two arbitrary combinations of prediction adjacent regions including at least one of the plurality of prediction adjacent regions 404a-404c, 414a-414c obtained by the search. Then the prediction adjacent region extractor 232 extracts the pixel signals of the prediction adjacent regions thus derived and the weighting unit 234 and adder 235 process the extracted pixel signals by the predetermined synthesis method, for example, by averaging to generate the comparison signal to the adjacent pixel signal for each combination. Then the comparison-selection unit 236 selects a combination with a high correlation between the comparison signal generated by the weighting unit 234 and others and the adjacent pixel signal acquired by the target adjacent region extractor 233. The prediction region extractor 204 generates at least one candidate prediction signal for the target pixel signal, based on the prediction adjacent regions belonging to the selected combination, and the weighting unit 205 and adder 206 process the candidate prediction signal by the predetermined synthesis method to generate the prediction signal. The subtracter 105 subtracts the prediction signal thus generated, from the target pixel signal acquired through the block divider 102 to generate the residual signal and the transformer 106, quantizer 107, and entropy encoder 111 encode the residual signal thus generated.

This operation allows the combination of candidate prediction signals suitable for smoothing to be selected without increase in information amount, using the target adjacent region consisting of the previously-reproduced adjacent pixel signal adjacent to the target block, whereby the prediction signal can be generated with efficient consideration to local noise characteristics.

The comparison-selection unit 236 in the image predictive encoding device 100 of the present embodiment selects a combination of prediction adjacent regions with lowest SAD being the sum of absolute differences between the comparison signal and the adjacent pixel signal, whereby it can select the combination of candidate prediction signals more suitable for smoothing.

The weighting unit 234 and adder 235 in the image predictive encoding device 100 of the present embodiment generate the comparison signal by the weighted averaging of the pixel signals of the prediction adjacent regions belonging to the combination set by the combination setter 231, whereby they can generate the comparison signal suitable for selection of the combination of candidate prediction signals more suitable for smoothing.

Since the combination of prediction adjacent regions set by the combination setter 231 in the image predictive encoding device 100 of the present embodiment contains the prediction adjacent regions as many as 2 to the power of n in decreasing order of correlation to the target adjacent region, the operation can be performed by addition and shift operation only and can be implemented by a simple configuration. The value of n is preferably an integer of not less than 0.

In the image predictive decoding device 300 of the present embodiment, the template matching unit 201 searches the search regions 401 and 417 of the previously-reproduced images for a plurality of prediction adjacent regions 404a-404c, 414a-414c highly correlated to the target adjacent region 403 consisting of the previously-reproduced adjacent pixel signal adjacent to the target region (target block) 402 consisting of the target pixel signal. The combination setter 231 in the candidate prediction signal combination determiner 203 derives at least two arbitrary combinations of prediction adjacent regions including at least one of the plurality of prediction adjacent regions 404a-404c, 414a-414c obtained by the search. Then the prediction adjacent region extractor 232 extracts the pixel signals of the prediction adjacent regions thus derived, and the weighting unit 234 and adder 235 process the extracted pixel signals by the predetermined synthesis method, for example, by averaging to generate the comparison signal to the adjacent pixel signal for each combination. Then the comparison-selection unit 236 selects a combination with a high correlation between the comparison signal generated by the weighting unit 234 and the others and the adjacent pixel signal acquired by the target adjacent region extractor 233. The prediction region extractor 204 generates at least one candidate prediction signal for the target pixel signal, based on the prediction adjacent regions belonging to the selected combination, and the weighting unit 205 and adder 206 process the candidate prediction signal by the predetermined synthesis method to generate the prediction signal.

Then the entropy decoder 302, inverse quantizer 303, and inverse transformer 304 restore the residual signal from the compressed data input through the input terminal 301, and the adder 305 adds the prediction signal generated as described above, to the restored residual signal to generate the reproduced image signal.

This operation permits the device to select the combination of candidate prediction signals suitable for smoothing without increase in information amount, using the target adjacent region consisting of the previously-reproduced adjacent pixel signal adjacent to the target block, whereby the prediction signal can be generated with efficient consideration to local noise characteristics.

The comparison-selection unit 236 in the image predictive decoding device 300 of the present embodiment selects the combination with lowest SAD being the sum of absolute differences between the comparison signal and the adjacent pixel signal, whereby it can select the combination of candidate prediction signals more suitable for smoothing.

The weighting unit 234 and adder 235 in the image predictive decoding device 300 of the present embodiment generate the comparison signal by weighted averaging of the pixel signals of the prediction adjacent regions belonging to the combination set by the combination setter 231, whereby they can generate the comparison signal suitable for selection of the combination of candidate prediction signals more suitable for smoothing.

Since the combination of prediction adjacent regions set by the combination setter 231 in the image predictive decoding device 300 of the present embodiment contains the prediction adjacent regions as many as 2 to the power of n in decreasing order of correlation to the target adjacent region, the operation can be performed by addition and shift operation only and can be implemented by a simple configuration. The value of n is preferably an integer of not less than 0.

In the image predictive encoding program P100 of the present embodiment, the template matching module P201 searches the search regions 401 and 417 of the previously-reproduced images for a plurality of prediction adjacent regions 404a-404c, 414a-414c highly correlated to the target adjacent region 403 consisting of the previously-reproduced adjacent pixel signal adjacent to the target region (target block) 402 consisting of the target pixel signal. The candidate prediction signal combination determining module P202 derives at least two arbitrary combinations of prediction adjacent regions including at least one of the plurality of prediction adjacent regions 404a-404c, 414a-414c obtained by the search. Then the candidate prediction signal combination determining module P202 extracts the pixel signals of the prediction adjacent regions thus derived and processes the extracted pixel signals by the predetermined synthesis method, for example, by averaging to generate the comparison signal to the adjacent pixel signal for each combination. Then the prediction signal synthesis module P203 selects a combination with a high correlation between the generated comparison signal and the acquired adjacent pixel signal. The candidate prediction signal combination determining module P202 generates at least one candidate prediction signal for the target pixel signal, based on the prediction adjacent regions belonging to the selected combination, and processes the candidate prediction signal by the predetermined synthesis method to generate the prediction signal. The subtraction module P105 subtracts the prediction signal thus generated, from the target pixel signal acquired through the block dividing module P102, to generate the residual signal and the transform module P106, quantization module P107, and entropy encoding module P111 encode the generated residual signal.

In the image predictive decoding program P300 of the present embodiment, the template matching module P201 searches the search regions 401 and 417 of the previously-reproduced images for a plurality of prediction adjacent regions 404a-404c, 414a-414c highly correlated to the target adjacent region 403 consisting of the previously-reproduced adjacent pixel signal adjacent to the target region (target block) 402 consisting of the target pixel signal. The prediction signal synthesis module P203 derives at least two arbitrary combinations of prediction adjacent regions including at least one of the plurality of prediction adjacent regions 404a-404c, 414a-414c obtained by the search. Then the prediction signal synthesis module P203 extracts the pixel signals of the prediction adjacent regions thus derived, and processes the extracted pixel signals by the predetermined synthesis method, for example, by averaging to generate the comparison signal to the adjacent pixel signal for each combination. Then the prediction signal synthesis module P203 selects a combination with a high correlation between the generated comparison signal and the acquired adjacent pixel signal. The prediction signal synthesis module P203 generates at least one candidate prediction signal for the target pixel signal, based on the prediction adjacent regions belonging to the selected combination, and the prediction signal synthesis module P203 processes the candidate prediction signal by the predetermined synthesis method to generate the prediction signal.

The entropy decoding module P302, inverse quantization module P303, and inverse transform module P304 then restore the residual signal from the input compressed data and the addition module P305 adds the prediction signal generated as described above, to the restored residual signal to generate the reproduced image signal.

The second embodiment to which the prediction signal generator 103a is applied in the image predictive encoding device 100, achieves the following action and effect. Namely, in the prediction signal generator 103a, the prediction adjacent region extractor 212 searches the search regions of the previously-reproduced images for a plurality of prediction adjacent regions highly correlated to the target adjacent region consisting of the previously-reproduced adjacent pixel signal adjacent to the target region. Then the selected prediction region extractor 1802 acquires two signals from the pixel signals of the N prediction regions based on the target region, out of the plurality of prediction adjacent regions obtained by the search, or the pixel signals of the prediction adjacent regions out of the N prediction regions obtained by the search, or from the signals of both.

Then the correlation evaluated value calculator 1803 among prediction regions calculates the evaluated value to evaluate the correlation among the N candidate prediction signals, by the predetermined method. The prediction region extractor 204 acquires N candidate prediction signals where the evaluated value is smaller than the prescribed threshold, and the weighting unit 205 and adder 206 process the N candidate prediction signals by the predetermined synthesis method to generate the prediction signal. Then the subtracter 105 subtracts the generated prediction signal from the target pixel signal to calculate the residual signal, the transformer 106, quantizer 107, and entropy encoder 111 encode the residual signal, and the output terminal 112 outputs the encoded residual signal.

This operation permits the device to generate the appropriate prediction signal based on the plurality of candidate prediction signals. It is particularly effective to the candidate prediction signals different only in noise components but similar in signal components.

In the prediction signal generator 103a, when the threshold processor 1804 determines that the evaluated value is larger than the threshold, the counter 1801 reduces the N value to update it to the next largest value, the selected prediction region extractor 1802 again acquires the combination of pixel signals, the correlation evaluated value calculator 1803 among prediction regions again calculates the evaluated value, and the threshold processor 1804 again performs the comparison between the calculated evaluated value and the prescribed threshold, whereby the prediction region extractor 204 can select the effective number of candidate prediction signals.

In the prediction signal generator 103a, the correlation evaluated value calculator 1803 among prediction regions calculates the sum of absolute differences between the pixel signal of the prediction region adjacent to the prediction adjacent region with the highest correlation to the target adjacent region and the pixel signal of the prediction region adjacent to the prediction adjacent region with the N-th highest correlation to the target adjacent region, out of the N prediction adjacent regions obtained by the search by the template matching unit 201, or between the pixel signal of the prediction adjacent region with the highest correlation to the target adjacent region and the pixel signal of the prediction adjacent region with the N-th highest correlation to the target adjacent region, or between signals as combinations of the foregoing pixel signals, and defines the sum of absolute differences as the evaluated value. This permits calculation of the appropriate evaluated value.

The case where the prediction signal generator 308a is applied in the image predictive decoding device 300 achieves the following action and effect. The prediction adjacent region extractor 212 searches the search regions of the previously-reproduced images for a plurality of prediction adjacent regions highly correlated to the target adjacent region consisting of the previously-reproduced adjacent pixel signal adjacent to the target region. Then the selected prediction region extractor 1802 acquires two signals from the pixel signals of the N prediction regions based on the target region, out of the plurality of prediction adjacent regions obtained by the search, or the pixel signals of the prediction adjacent regions out of the N prediction adjacent regions obtained by the search, or from the signals of both.

Then the correlation evaluated value calculator 1803 among prediction regions calculates the evaluated value to evaluate the correlation among the N candidate prediction signals by the predetermined method. The prediction region extractor 204 acquires the N candidate prediction signals where the evaluated value is smaller than the prescribed threshold, and the weighting unit 205 and adder 206 process the N candidate prediction signals by the predetermined synthesis method to generate the prediction signal.

On the other hand, the entropy decoder 302, inverse quantizer 303, and inverse transformer 304 restore the residual signal from the compressed data input through the input terminal 301 and the adder 305 adds the prediction signal generated as described above, to the restored residual signal to generate the reproduced image signal.

This operation permits the device to generate the appropriate prediction signal based on the plurality of candidate prediction signals. It is particularly effective to the candidate prediction signals different only in noise components but similar in signal components.

In the prediction signal generator 103a, when the threshold processor 1804 determines that the evaluated value is larger than the threshold, the counter 1801 reduces the N value to update it to the next largest value, the selected prediction region extractor 1802 again acquires the combination of pixel signals, the correlation evaluated value calculator 1803 among prediction regions again calculates the evaluated value, and the threshold processor 1804 again performs the comparison between the calculated evaluated value and the prescribed threshold, whereby the prediction region extractor 204 can select the effective number of candidate prediction signals.

In the prediction signal generator 103a, the correlation evaluated value calculator 1803 among prediction regions calculates the sum of absolute differences between the pixel signal of the prediction region adjacent to the prediction adjacent region with the highest correlation to the target adjacent region and the pixel signal of the prediction region adjacent to the prediction adjacent region with the N-th highest correlation to the target adjacent region, out of the N prediction adjacent regions obtained by the search by the template matching unit 201, or between the pixel signal of the prediction adjacent region with the highest correlation to the target adjacent region and the pixel signal of the prediction adjacent region with the N-th highest correlation to the target adjacent region, or between signals as combinations of the foregoing pixel signals, and defines the sum of absolute differences as the evaluated value. This permits calculation of the appropriate evaluated value.

The third embodiment in which the prediction signal generator 103b is applied to the image predictive encoding device 100, achieves the following action and effect. The template matching unit 201 acquires a plurality of prediction adjacent regions of the same shape as the target adjacent region from the search regions of the previously-reproduced images, based on the target region or the target adjacent region adjacent to the target region.

Then the combination setter 231 derives arbitrary combinations of prediction adjacent regions including at least two prediction adjacent regions out of the plurality of prediction adjacent regions acquired. Then the weighting factor setter 2201 derives at least two sets of weighting factors for weighted averaging of the pixel signals of the prediction adjacent regions belonging to the combinations and the weighted averaging unit 2202 performs weighted averaging of the pixel signals of the prediction adjacent regions belonging to these combinations, using the sets of weighting factors, for these combinations to generate at least two comparison signals to the adjacent pixel signal.

Next, the comparison-selection unit 2203 selects a set of weighting factors with a high correlation between the comparison signals and the adjacent pixel signal, the prediction region extractor 204 generates at least two candidate prediction signals for the target pixel signal from the previously-reproduced images, based on the prediction adjacent regions belonging to the combination, and the weighted averaging unit 2204 performs weighted averaging of the candidate prediction signals using the selected set of weighting factors to generate the prediction signal. Then the subtracter 105 subtracts the generated prediction signal from the target pixel signal to generate the residual signal and the transformer 106, quantizer 107, and entropy encoder 111 encode the residual signal. This enables the device to select the set of weighting factors, without additional information, for each target block.

In the image encoding device 100 of the third embodiment, the template matching unit 201 acquires a plurality of prediction adjacent regions of the same shape as the target adjacent region from the search regions of the previously-reproduced images, based on the target region or the target adjacent region adjacent to the target region.

Then the combination setter 231 derives arbitrary combinations of prediction adjacent regions including at least one prediction adjacent region out of the plurality of prediction adjacent regions thus acquired.

Then the weighting factor setter 2201 derives at least two sets of weighting factors for weighted averaging of pixel signals of prediction adjacent regions belonging to the combinations, for the combinations including at least two prediction adjacent regions, and the weighted averaging unit 2202 performs weighted averaging of pixel signals of prediction adjacent regions using the sets of weighting factors to generate at least two comparison signals to the adjacent pixel signal.

Next, the comparison-selection unit 2203 selects a set of weighting factors with a high correlation between the comparison signals and the adjacent pixel signal, the weighted averaging unit 2202 again performs the weighted averaging of pixel signals of prediction adjacent regions using the selected set of weighting factors, for the pixel signals of the prediction adjacent regions belonging to the selected combinations, to generate at least two comparison signals to the adjacent pixel signal, and the comparison-selection unit 2203 again selects a combination with a high correlation between the comparison signals and the adjacent pixel signal.

Then the prediction region extractor 204 generates at least one candidate prediction signal for the target pixel signal from the previously-reproduced images, based on the prediction adjacent regions belonging to the selected combination and the weighted averaging unit 2204 performs the weighted averaging of the candidate prediction signals using the set of weighting factors previously selected for the selected combination, to generate the prediction signal. Then the generated prediction signal is used to generate the residual signal from the target pixel signal and the residual signal is encoded. This enables the device to select the combination of candidate prediction signals and the set of weighting factors effective to generation of the prediction signal, without additional information, for each target block.

In the prediction signal generator 103*b*, the weighting factor setter 2201 calculates at least one set of weighting factors so that a smaller weighting factor is set with increase in the sum of absolute differences between the adjacent pixel signal and the pixel signals of the prediction adjacent regions belonging to the combination (e.g., as represented by Formula (7)), whereby it can calculate the appropriate set of weighting factors.

In the prediction signal generator 103*b*, the weighting factor setter 2201 preliminarily prepares the set of weighting factors determined according to the number of prediction adjacent regions belonging to the combination (e.g., as represented by Formula (6)), and derives at least one set of weighting factors based on the prepared set of weighting factors, whereby it can calculate the appropriate set of weighting factors.

In the prediction signal generator 103*b*, the weighting factor setter 2201 prepares the correspondence table to determine the set of weighting factors from the sum of absolute differences between the adjacent pixel signal and the pixel signals of the plurality of prediction adjacent regions belonging to the combination (e.g., as shown in FIG. 26) and derives at least one set of weighting factors using the correspondence table, whereby it can calculate the appropriate set of weighting factors.

The case where the prediction signal generator 308*b* is applied to the image predictive decoding device 300 achieves the following action and effect. The template matching unit 201 acquires a plurality of prediction adjacent regions of the same shape as the target adjacent region from the search regions of the previously-reproduced images, based on the target region or the target adjacent region adjacent to the target region.

Then the combination setter 231 derives arbitrary combinations of prediction adjacent regions including at least two prediction adjacent regions out of the plurality of prediction adjacent regions acquired. Then the weighting factor setter 2201 derives at least two sets of weighting factors for weighted averaging of the pixel signals of the prediction adjacent regions belonging to the combinations and the weighted averaging unit 2202 performs weighted averaging of the pixel signals of the prediction adjacent regions belonging to these combinations, using the sets of weighting factors, for these combinations to generate at least two comparison signals to the adjacent pixel signal.

Next, the comparison-selection unit 2203 selects a set of weighting factors with a high correlation between the comparison signals and the adjacent pixel signal, the prediction region extractor 204 generates at least two candidate prediction signals for the target pixel signal from the previously-reproduced images, based on the prediction adjacent regions belonging to the combination, and the weighted averaging unit 2204 performs the weighted averaging of the candidate prediction signals using the selected set of weighting factors to generate the prediction signal. Then the subtracter 105 subtracts the generated prediction signal from the target pixel signal to generate the residual signal and the transformer 106, quantizer 107, and entropy encoder 111 encode the residual signal. This enables the device to select the set of weighting factors, without additional information, for each target block.

In the image encoding device 100 of the third embodiment, the template matching unit 201 acquires a plurality of prediction adjacent regions of the same shape as the target adjacent region from the search regions of the previously-reproduced images, based on the target region or the target adjacent region adjacent to the target region.

Then the combination setter 231 derives arbitrary combinations of prediction adjacent regions including at least one prediction adjacent region out of the plurality of prediction adjacent regions thus acquired.

Then the weighting factor setter 2201 derives at least two sets of weighting factors for weighted averaging of pixel signals of prediction adjacent regions belonging to the combinations, for the combinations including at least two prediction adjacent regions, and the weighted averaging unit 2202 performs weighted averaging of pixel signals of prediction adjacent regions using the sets of weighting factors to generate at least two comparison signals to the adjacent pixel signal.

Next, the comparison-selection unit 2203 selects a set of weighting factors with a high correlation between the comparison signals and the adjacent pixel signal, the weighted averaging unit 2202 again performs the weighted averaging of pixel signals of prediction adjacent regions using the selected set of weighting factors, for the pixel signals of the prediction adjacent regions belonging to the selected combinations, to generate at least two comparison signals to the adjacent pixel signal, and the comparison-selection unit 2203 again selects a combination with a high correlation between the comparison signals and the adjacent pixel signal.

Then the prediction region extractor 204 generates at least one candidate prediction signal for the target pixel signal from the previously-reproduced images, based on the prediction adjacent regions belonging to the selected combination and the weighted averaging unit 2204 performs the weighted averaging of the candidate prediction signals using the set of weighting factors previously selected for the selected combination, to generate the prediction signal.

On the other hand, the entropy decoder 302, inverse quantizer 303, and inverse transformer 304 restore the residual signal from the compressed data input through the input terminal 301 and the adder 305 adds the prediction signal generated as described above, to the restored residual signal to generate the reproduced image signal. This enables the device to select the combination of candidate prediction signals and the set of weighting factors effective to generation of the prediction signal, without additional information, for each target block.

In the prediction signal generator 103*b*, the weighting factor setter 2201 calculates at least one set of weighting factors so that a smaller weighting factor is set with increase in the sum of absolute differences between the adjacent pixel signal and the pixel signals of the prediction adjacent regions belonging to the combination (e.g., as represented by Formula (7)), whereby it can calculate the appropriate set of weighting factors.

In the prediction signal generator 103b, the weighting factor setter 2201 preliminarily prepares the set of weighting factors determined according to the number of prediction adjacent regions belonging to the combination (as represented by Formula (6)), and derives at least one set of weighting factors based on the prepared set of weighting factors, whereby it can calculate the appropriate set of weighting factors.

In the prediction signal generator 103b, the weighting factor setter 2201 prepares the correspondence table to determine the set of weighting factors from the sum of absolute differences between the adjacent pixel signal and the pixel signals of the plurality of prediction adjacent regions belonging to the combination (as shown in FIG. 26) and derives at least one set of weighting factors using the correspondence table, whereby it can calculate the appropriate set of weighting factors.

The fourth embodiment is configured to perform the motion compensation, when compared with the third embodiment. For example, in the third embodiment the template matching unit 201 is configured to acquire a plurality of prediction adjacent regions of the same shape as the target adjacent region from each of the search regions of the previously-reproduced images, based on the target region or the target adjacent region adjacent to the target region, but, without having to be limited to this, it is also possible, for example, to acquire the prediction adjacent regions, based on the additional information such as motion vectors or identification numbers of reference images, which is added to the target region.

<Fifth Embodiment>

Figure 33:
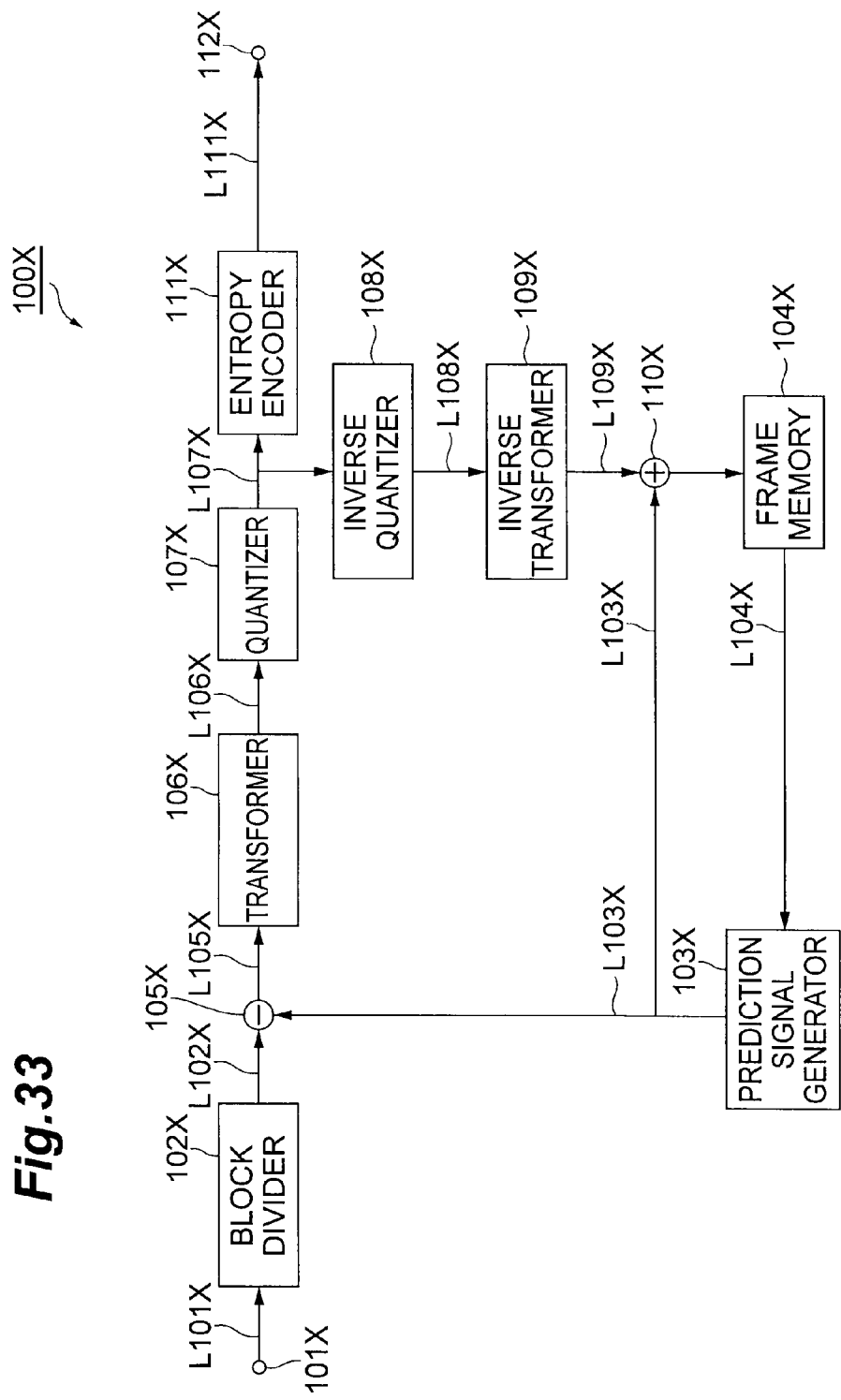
FIG. 33 is a block diagram showing an image predictive encoding device according to an embodiment of the present invention.

FIG. 33 is a block diagram showing an image predictive encoding device 100X capable of executing an image predictive encoding method according to an embodiment of the present invention. This image predictive encoding device 100X is constructed with an input terminal 101X, a block divider 102X(region dividing means), a prediction signal generator 103X(prediction signal generating means), a frame memory 104X, a subtracter 105X(residual signal generating means), a transformer 106X(encoding means), a quantizer 107X (encoding means), an inverse quantizer 108X, an inverse transformer 109X, an adder 110X, an entropy encoder 111X, and an output terminal 112X. The transformer 106X and quantizer 107X function as an encoding means.

The image predictive encoding device 100X constructed as described above will be described below as to its configuration.

The input terminal 101X is a terminal to which a signal of a dynamic image consisting of a plurality of pictures is input.

The block divider 102X divides an image as a target to be encoded, which is the signal of the dynamic image input from the input terminal 101X, into a plurality of regions. In the embodiment according to the present invention, the image is divided into blocks each consisting of 8×8 pixels, but the image may also be divided in any other block size or shape.

The prediction signal generator 103X is a part that generates a prediction signal for a target region (target block) as a target of an encoding process. Specific processing of this prediction signal generator 103X will be described later.

The subtracter 105X is a part that subtracts the prediction signal generated by the prediction signal generator 103X and input via a line L103X, from a pixel signal input via a line L102X and indicated by the target region obtained by the division by the block divider 102X, to generate a residual signal. The subtracter 105X outputs the residual signal obtained by the subtraction, via a line L105X to the transformer 106X.

The transformer 106X is a part that performs a discrete cosine transform of the residual signal obtained by the subtraction. The quantizer 107X is a part that quantizes transform coefficients obtained by the discrete cosine transform by the transformer 106X. The entropy encoder 111X compressively encodes the transform coefficients quantized by the quantizer 107X and outputs the compressively-encoded compressed data via a line L111X. The output terminal 112X outputs the compressed data being information input from the entropy encoder 111X, to the outside.

The inverse quantizer 108X inversely quantizes the quantized transform coefficients and the inverse transformer 109X performs an inverse discrete cosine transform thereof to restore the encoded residual signal. The adder 110X adds the restored residual signal to the prediction signal fed through the line L103X, to reproduce the signal of the target block to obtain a reproduced image signal, and stores this reproduced image signal in the frame memory 104X. Although the present embodiment employs the transformer 106X and inverse transformer 109X, these transformers may be replaced by any other transform processing; thus the transformer 106X and inverse transformer 109X are not always essential. For carrying out intra-picture prediction or inter-picture prediction for a subsequent target region, the compressed pixel signal of the target region is restored by the inverse process and the restored signal is stored in the frame memory 104X as described above.

The prediction signal generator 103X will be described below. The prediction signal generator 103X is a part that generates a prediction signal for a target region as a target of the encoding process (which will be referred to hereinafter as a target block). The present embodiment adopts three types of prediction methods. Namely, the prediction signal generator 103X generates the prediction signal by at least either one or both of an inter-picture prediction method and an intra-picture prediction method described later.

Figure 34:
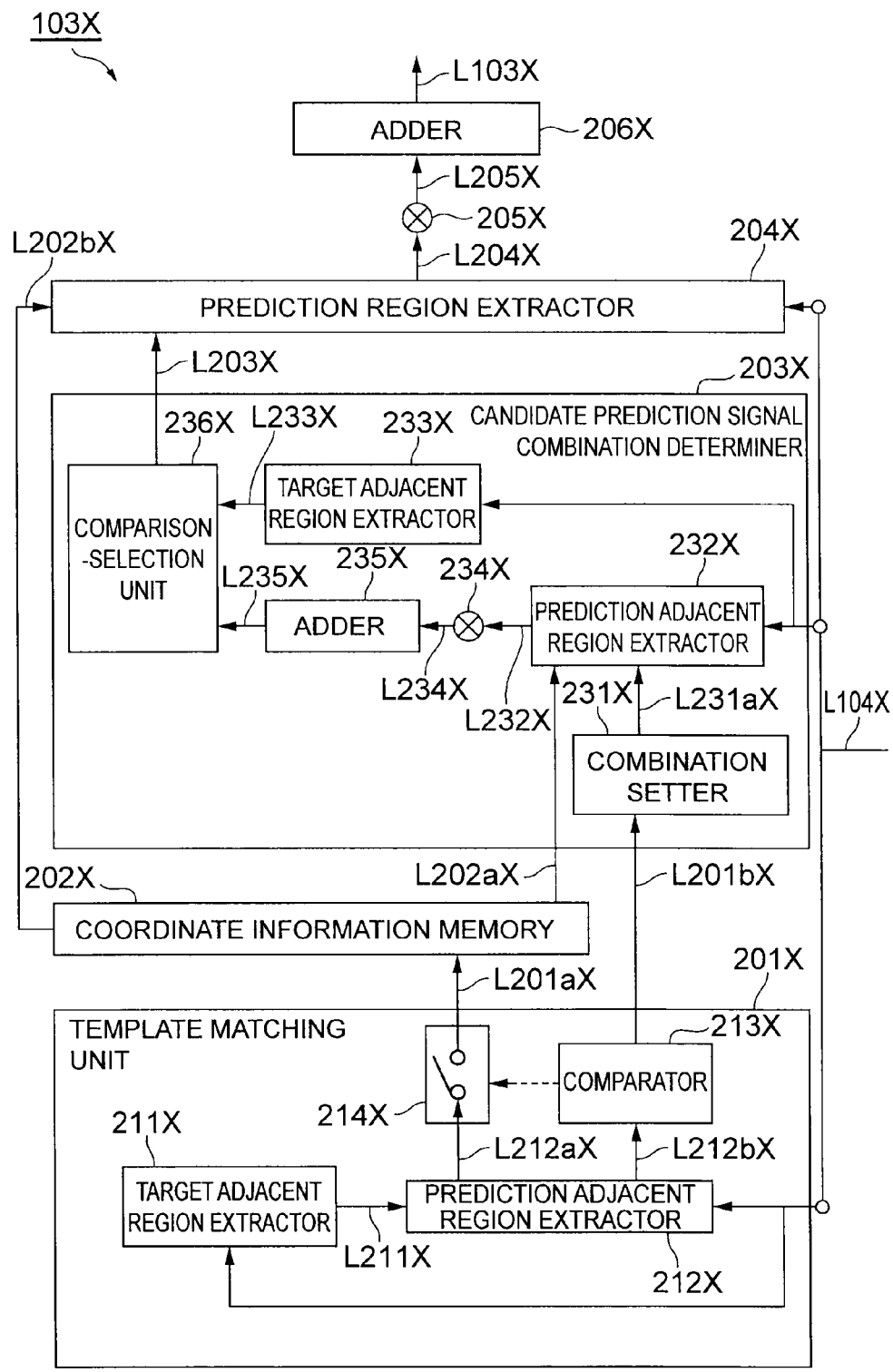
FIG. 34 is a block diagram showing a prediction signal generator 103X used in the image predictive encoding device.

The following will describe the processing of the prediction signal generator 103X in the present embodiment. FIG. 34 is a block diagram showing the prediction signal generator 103X used in the image predictive encoding device 100X according to the present embodiment, and the prediction signal generator 103X is constructed with a template matching unit 201X, a coordinate information memory 202X, a candidate prediction signal combination determiner 203X, a prediction region extractor 204X, a weighting unit 205X, and an adder 206X.

The template matching unit 201X receives an input image signal (reproduced image signal) previously reproduced by past processing, via a line L104X from the frame memory 104X, searches for candidates for the prediction signal (candidate prediction signals) for the target pixel signal of the target region by after-described template matching, and outputs coordinate information for access to the candidate prediction signals obtained by the search, via a line L201aX to the coordinate information memory 202X. At the same time, the template matching unit 201X outputs difference data (corresponding to the sum of absolute differences (SAD) described later) indicating a relation between the target region and each candidate prediction signal, via a line L201bX to the candidate prediction signal combination determiner 203X.

The candidate prediction signal combination determiner 203X sets a plurality of combinations of candidate prediction signals by making use of the difference data input via the line L201bX. Then the candidate prediction signal combination determiner 203X determines a combination of candidate prediction signals, using the pixel signals input via the line L104X from the frame memory in accordance with the coordinate information input via a line L202aX from the coordinate information memory 202X, and outputs the result as combination information of candidate prediction signals via a line L203X to the prediction region extractor 204X.

The prediction region extractor 204X acquires via a line L202bX the coordinate information of the candidate prediction signals belonging to this combination, in accordance with the combination information of candidate prediction signals input via the line L203X. Then the prediction region extractor 204X acquires the candidate prediction signals corresponding to the acquired coordinate information, via the line L104X from the frame memory 104X and outputs them to the weighting unit 205X on demand. The weighting unit 205X multiplies each candidate prediction signal input via a line L204X, by a weighting factor and outputs the result via a line L205X to the adder 206X. The adder 206X successively adds the weighted candidate prediction signals and outputs the result as a prediction signal via the line L103X to the subtracter 105X shown in FIG. 33. The operation of the weighting unit can be, for example, a technique of multiplying each candidate prediction signal by 1/N where N is the number of candidate prediction signals, but it may be any other technique.

Figure 35:
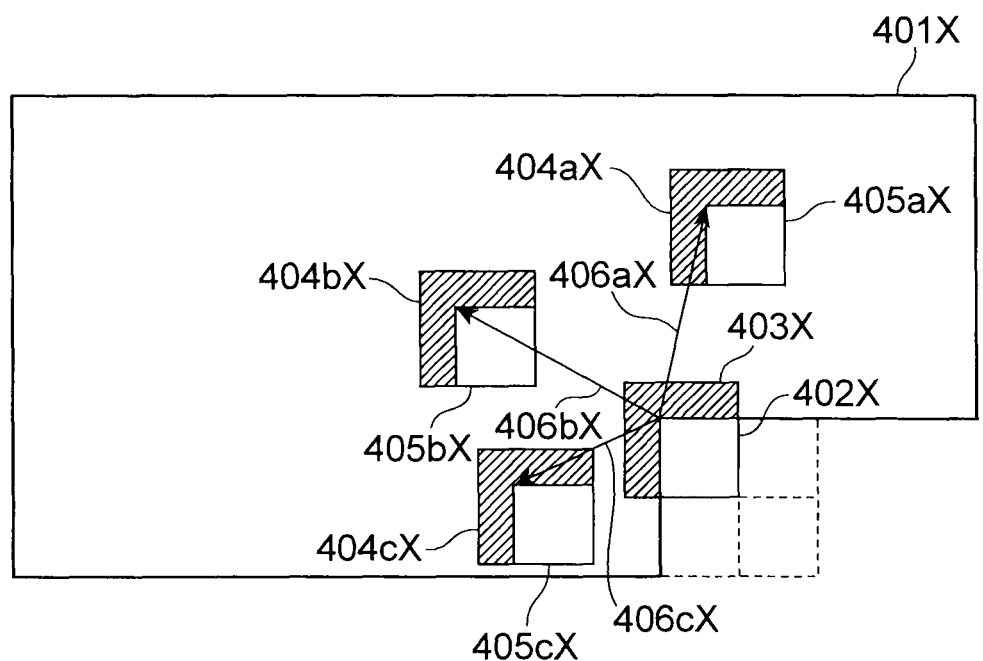
FIG. 35 is a schematic diagram for explaining a template matching process and a process of searching for candidates for prediction adjacent regions and prediction regions, in a template matching unit 201X.
Figure 36:
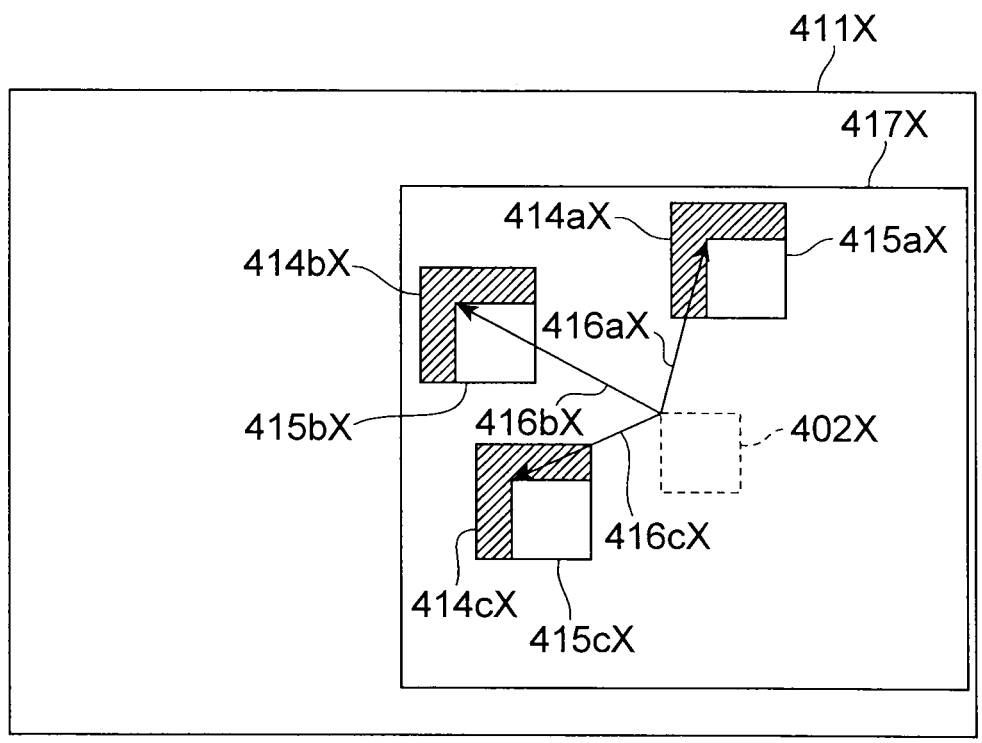
FIG. 36 is a second schematic diagram for explaining the template matching process and the process of searching for candidates for prediction adjacent regions and prediction regions, in the template matching unit 201X.

Furthermore, each of the configurations of the template matching unit 201X, candidate prediction signal combination determiner 203X, and prediction region extractor 204X will be described blow in detail. First, the details of the processing in the template matching unit 201X will be described. The template matching unit 201X accesses the reproduced image signals stored in the frame memory 104X, via the line L104X and performs matching processing. The below will describe this matching processing. FIG. 35 and FIG. 36 are schematic diagrams for explaining the template matching processing according to the embodiment of the present invention. The below will describe a process of generating candidate prediction signals for a target block 402X.

The first step is to set a "target adjacent region" (also called a template) and a "search region" for the target block by a predetermined method. In FIG. 35, a search region 401X is set to be a part (or, possibly, the whole) of a reproduced image being in contact with the target block 402X, reproduced earlier than it, and located within the same picture. The target block 402X herein is a subblock of 4×4 pixels obtained by dividing an encoding target block consisting of 8×8 pixels, but it may be divided in any other block size or shape or may not be divided.

Furthermore, in FIG. 36 a search region 417X is set to be a part of a reproduced image indicated by a picture 411X different from the target block 402X. It is also possible to provide a search region in each of pictures different from the target block 402X. A previously-reproduced pixel group (inverse L-shape region) 403X adjacent to the target block 402X is used as a "target adjacent region." In the present embodiment, the search regions are set in two pictures (FIG. 35 and FIG. 36), but the search regions may be set only in the same picture as the target block (FIG. 35) or only in the picture or pictures different from the target block (FIG. 36).

The search region 401X and the target block 402X do not have to be in contact with each other as shown in FIG. 35, but the search region 401X may be in no contact with the target block 402X at all. How to set the search region does not have to be limited to the way of setting the search region in one picture (picture 411X only) different from the target block as shown in FIG. 36, but the search region may be set in each of pictures (reference images which may include a future frame in a display order as long as it is a previously-reproduced one) different from the target block.

The target adjacent region 403X may be a region at least one pixel of which is in contact with the target block 402X. The shape of the target adjacent region herein is an inverse L-shape, but is not limited to it. Therefore, the target adjacent region may have an optional shape and number of pixels, which should be preliminarily defined, as long as it is constructed of previously-reproduced pixels around the target block 402X; the shape and size (number of pixels) of the template may be encoded in a sequence unit or in a frame unit or block unit.

The template matching unit 201X calculates the sum of absolute differences (SAD) between corresponding pixels, for each pixel group having the same shape as the target adjacent region 403X, in the search region 401X and the search region 417X or in either one search region, searches for M regions from the lowest SAD, and defines them as "prediction adjacent regions." The accuracy of the search may be an integer pixel unit, or it is also possible to generate pixels of decimal accuracy such as half pixels or quarter pixels and perform the search in the decimal pixel accuracy. The value of M may be arbitrary as long as it is preliminarily set. As shown in FIGS. 35 and 36, M=6, and the search results in finding the prediction adjacent regions 404aX, 404bX, 404cX, 414aX, 414bX, and 414cX. Without determining the number of prediction adjacent regions to be obtained by the search, the value of M may be determined by searching for regions the SAD of which is smaller than a certain threshold, or the value of M may be determined to be the smaller between the number of regions smaller than the threshold and the set number. At this time, the threshold does not always have to be applied to the values of SAD themselves, but may be applied to differences between the lowest SAD value and the second lowest and other SAD values. In the latter case, the template matching unit 201X can search for many prediction adjacent regions, without change in the threshold, even if the lowest SAD value is large. The upper limit and threshold of M may be preliminarily set, but appropriate values may be encoded in a sequence unit or in a frame unit or block unit.

Regions 405aX, 405bX, 405cX, 415aX, 415bX, and 415cX in contact with the prediction adjacent regions 404aX, 404bX, 404cX, 414aX, 414bX, and 414cX are determined as prediction regions for the target block 402X and pixel signals in the prediction regions are determined as candidate prediction signals. The positional relationship between the prediction adjacent regions and the prediction regions indicating the candidate prediction signals is the same as the positional relationship between the target region and the target adjacent region herein, but they may be different. In the present embodiment, the coordinate information to be stored in the coordinate information memory 202X is difference coordinates 406aX, 406bX, 406cX, 416aX, 416bX, and 416cX between the target adjacent region (and the target region) and the prediction adjacent regions (and the prediction regions) and identification numbers of the pictures (reference images) to which the prediction adjacent regions (and the prediction regions) belong, as access information for acquiring the respective prediction adjacent regions (and prediction regions) from the frame memory 104X.

The configuration of the template matching unit 201X for carrying out the operation as described above will be described below. The template matching unit 201X is constructed with a target adjacent region extractor 211X, a prediction adjacent region extractor 212X, a comparator 213X, and a switch 214X. First, the target adjacent region extractor 211X acquires the target adjacent region 403X via the line L104X from the frame memory 104X.

The prediction adjacent region extractor 212X acquires pixel signals of regions of the same shape as the target adjacent region from the search regions in the frame memory 104X via the line L104X and calculates their SAD values with respect to the pixel signal (adjacent pixel signal) of the target adjacent region acquired via a line L211X from the target adjacent region extractor 211X. The comparator 213X receives the calculated SAD values input via a line L212bX and compares each SAD value with the M-th lowest SAD value out of SAD values acquired heretofore. When the comparator 213X determines that the input SAD value is smaller, at the same time the comparator 213X stores the SAD value falling within the M-th lowest, and deletes the SAD value becoming the (M+1)th lowest. The comparator 213X sets a sufficiently large value with respect to ordinary SAD, as an initial value of SAD at a start of processing.

As performing this processing, the prediction adjacent region extractor 212X outputs via a line L202aX to the coordinate information memory 202X the coordinate information as information for access to the prediction adjacent regions (and prediction regions), under control on the switch 214X by the comparator 213X. On this occasion, since the coordinate information for the (M+1)th SAD value becomes unnecessary, the new information may be written over it to be stored in the coordinate information memory 202X. After completion of the search in the search regions by the prediction adjacent region extractor 212X, the comparator 213X outputs the M SAD values stored at the same time, via the line L201bX to the candidate prediction signal combination determiner 203X.

Next, the operation of the candidate prediction signal combination determiner 203X will be described. The candidate prediction signal combination determiner 203X is constructed with a combination setter 231X, a prediction adjacent region extractor 232X, a target adjacent region extractor 233X, a weighting unit 234X, an adder 235X, and a comparison-selection unit 236X.

The combination setter 231X sets a plurality of combinations of prediction adjacent regions, based on the M SAD values input via the line L201bX. The processing in the prediction adjacent region combination determiner 203X is, as detailed in the description of FIG. 38, to set a combination of N prediction adjacent regions from the lowest among the input SAD values. The value of N is a power of 2 smaller than M, and in the case of M=6, three combinations with N=1, 2, or 4 are made.

By making use of the combination processing of candidate prediction signals according to the present invention as described above, it becomes feasible to determine strength of smoothing of candidate prediction signals appropriate for each target block, i.e., the number of prediction candidate signals to be averaged. In other words, the candidate prediction signals suitable for generation of the prediction signal can be selected without additional information from the M candidate prediction signals obtained by the search, by defining N with the lowest SAD between the adjacent pixel signal and an target signal resulting from averaging of pixel signals of N prediction adjacent regions with lowest SAD being the sum of absolute differences from the adjacent pixel signal. The reason why the value of N is a power of 2 is that consideration is given to execution of the averaging process of signals by addition and shift operation only.

It is noted that the value of M, the value of N, and the combinations of N prediction signal regions do not have to be limited to those described above. The number of prediction adjacent regions included in one combination can be optionally set among numbers from 1 to M. For example, in a case where a combination is composed of N prediction adjacent regions smaller than M, it is also possible to select N regions from the M regions and set all combinations thereof. On this occasion, the value of N may be fixed, or two or more numbers may be selected between 1 and M to set the combinations. However, in order to automatically select the same combination of prediction adjacent regions in the image predictive encoding device 100X being an encoder and in an after-described image predictive decoding device 300X being a decoder, it is necessary for the two devices to use the same combination setting method.

When the prediction adjacent region extractor 232X receives an input of combination information of prediction adjacent regions via a line L231X, it acquires the coordinate information of the prediction adjacent regions included in the combination, via a line L202aX from the coordinate information memory 202X. Then the prediction adjacent region extractor 232X acquires the pixel signals of the prediction adjacent regions corresponding to the coordinate information, via the line L104X and outputs them to the weighting unit 234X on demand.

The weighting unit 234X multiplies the pixel signal of each prediction adjacent region input via a line L232X, by a weighting factor and outputs the result via a line L234X to the adder 235X.

The adder 235X cumulatively adds the weighted pixel signals of prediction adjacent regions to add them up to generate a comparison signal for comparison with the pixel signal of the target adjacent region (adjacent pixel signal), and outputs the generated comparison signal via a line L235X to the comparison-selection unit 236X. The operation of the weighting unit 234X can be, for example, a technique of multiplying the pixel signal of each prediction adjacent region by 1/N where the number of prediction adjacent regions is N, but may be any other technique. For example, a conceivable method is such that differences (the sum of absolute differences, the sum of squared differences, variance, etc.) are calculated between the pixel signals of N prediction adjacent regions and the adjacent pixel signal and weighting factors for the respective prediction adjacent regions are determined based on a ratio of the differences.

When the same weighting method is applied to the weighting unit 205X and the weighting unit 234X, an appropriate combination of candidate prediction signals (pixel signals of prediction regions) can be estimated using the prediction adjacent regions. Since the prediction adjacent regions can be shared between the encoder and the decoder, the after-described image predictive decoding device 300X, which is the decoder using this technique, has an effect of being capable of acquiring the combination of candidate prediction signals selected by the image predictive encoding device 100X being the encoder, without any additional information. It is noted that the weighting method of the weighting unit 234X does not always have to be the same as that of the weighting unit 205X. For example, an effective method for reduction in computation amount is such that a simple weighting process is applied to the weighting unit 234X and an adaptive weighting process according to a local signal feature is applied to the weighting unit 205X.

The target adjacent region extractor 233X acquires the pixel signal of the target adjacent region (adjacent pixel signal) via the line L104X from the frame memory 104X and outputs it to the comparison-selection unit 236X.

The comparison-selection unit 236X calculates SAD values between the adjacent pixel signal and the comparison signals corresponding to the plurality of combinations of prediction adjacent regions, and selects a combination of target adjacent regions with the lowest SAD value as a combination of candidate prediction signals. The selected combination of candidate prediction signals is output as the combination information of candidate prediction signals via the line L203X to the prediction region extractor 204X.

As described above, the present embodiment enables a combination of candidate prediction signals effective to generation of the prediction signal to be selected from a plurality of candidate prediction signals, without additional information, for each target block.

Figure 37:
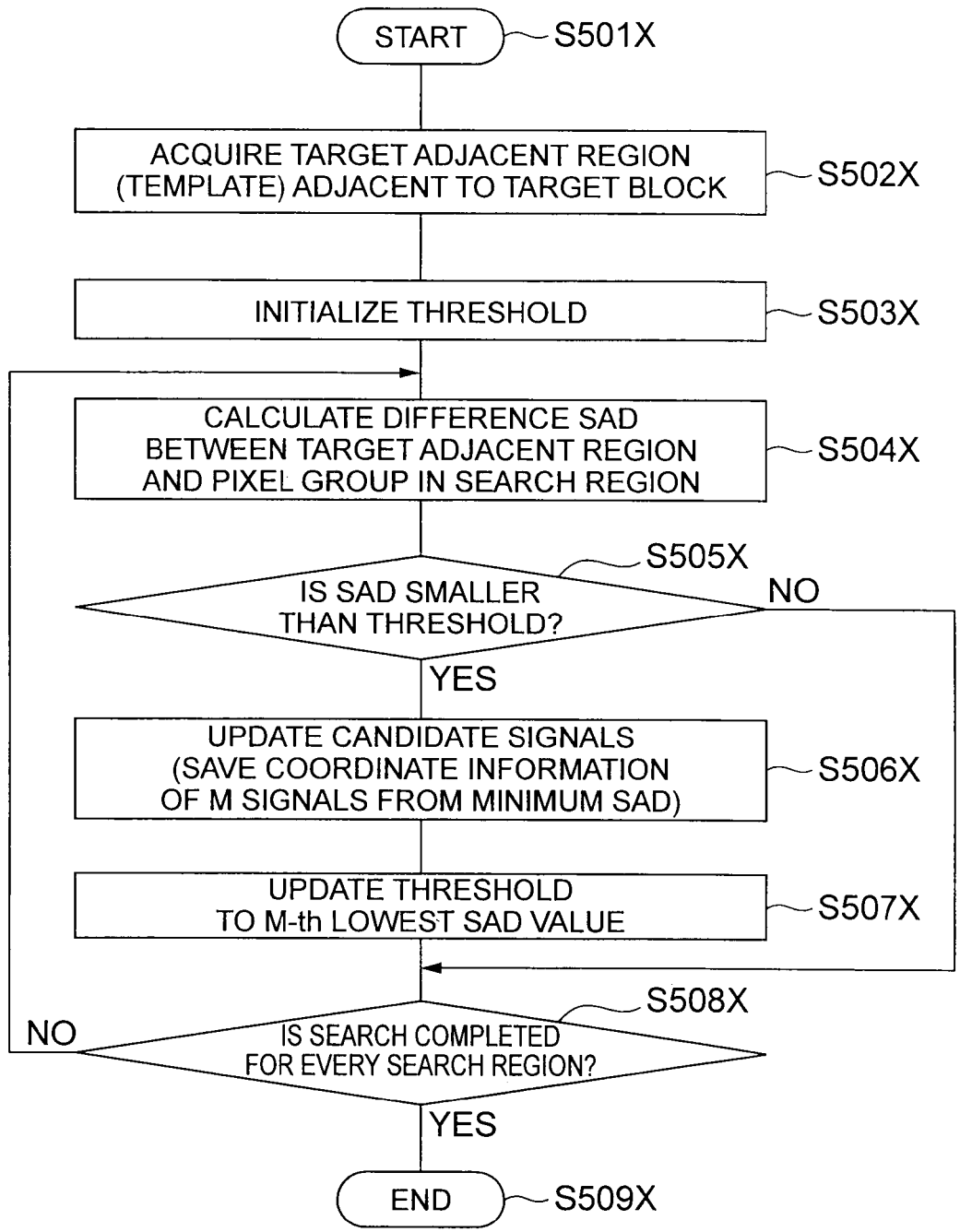
FIG. 37 is a flowchart for explaining a method of template matching and search for candidates for prediction adjacent regions and prediction regions in the template matching unit 201X.

FIG. 37 is a flowchart showing a method of searching for a plurality of (M) candidate prediction signals for the pixel signal of the target region (target block) (target pixel signal) and acquiring the coordinate information for access to the candidate prediction signals obtained by the search, in the template matching unit 201X according to the present embodiment. First, the target adjacent region extractor 211X acquires the target adjacent region (template signal) to the target block from the frame memory 104X(S502X).

Next, the template matching unit 201X initializes the threshold for selection of M candidate prediction signals to a sufficiently large value (S503X). The prediction adjacent region extractor 212X calculates the sum of absolute differences (SAD) between the target adjacent region and a pixel group of the same shape as the target adjacent region in a search region (S504X). The comparator 213X in the template matching unit 201X compares the SAD value with the threshold (S505X) and when the SAD value is determined to be smaller than the threshold, the processing flow goes to S506X; otherwise, the processing flow goes to S508X.

The comparator 213X in the template matching unit 201X compares the calculated SAD value with previous SAD values and when the calculated SAD value falls within the M-th rank from the lowest, the pixel group obtained by the search is added to the candidate prediction signals (and pixel signals of prediction adjacent regions), thereby updating the candidate signals. In the present embodiment, the coordinate information is updated by storing in the coordinate information memory 202X, spatial-temporal coordinate information (spatial position and an identification number of a picture including the pixel group obtained by the search) for access to the candidate prediction signal (and the pixel signal of the prediction adjacent region), instead of the candidate prediction signal (and the pixel signal of the prediction adjacent region), based on a changeover control by the switch 214X(S506X). At the same time, the template matching unit 201X updates the threshold to the M-th lowest SAD value (S507X).

Thereafter, the prediction adjacent region extractor 212X checks whether the search is completed for every search region (S508X). When it is determined that the search is not completed for every search region, the processing flow returns to S504X where the prediction adjacent region extractor 212X calculates the sum of absolute differences (SAD) between the target adjacent region and a next pixel group of the same shape as the target adjacent region in the search region.

After the search is completed for every search region, the template matching process for one target block is finished (S509X).

In this manner the processing by the template matching unit 201X permits the device to specify the high-ranking M prediction adjacent regions including the pixel signals highly correlated to the pixel signal in the target adjacent region.

Figure 38:
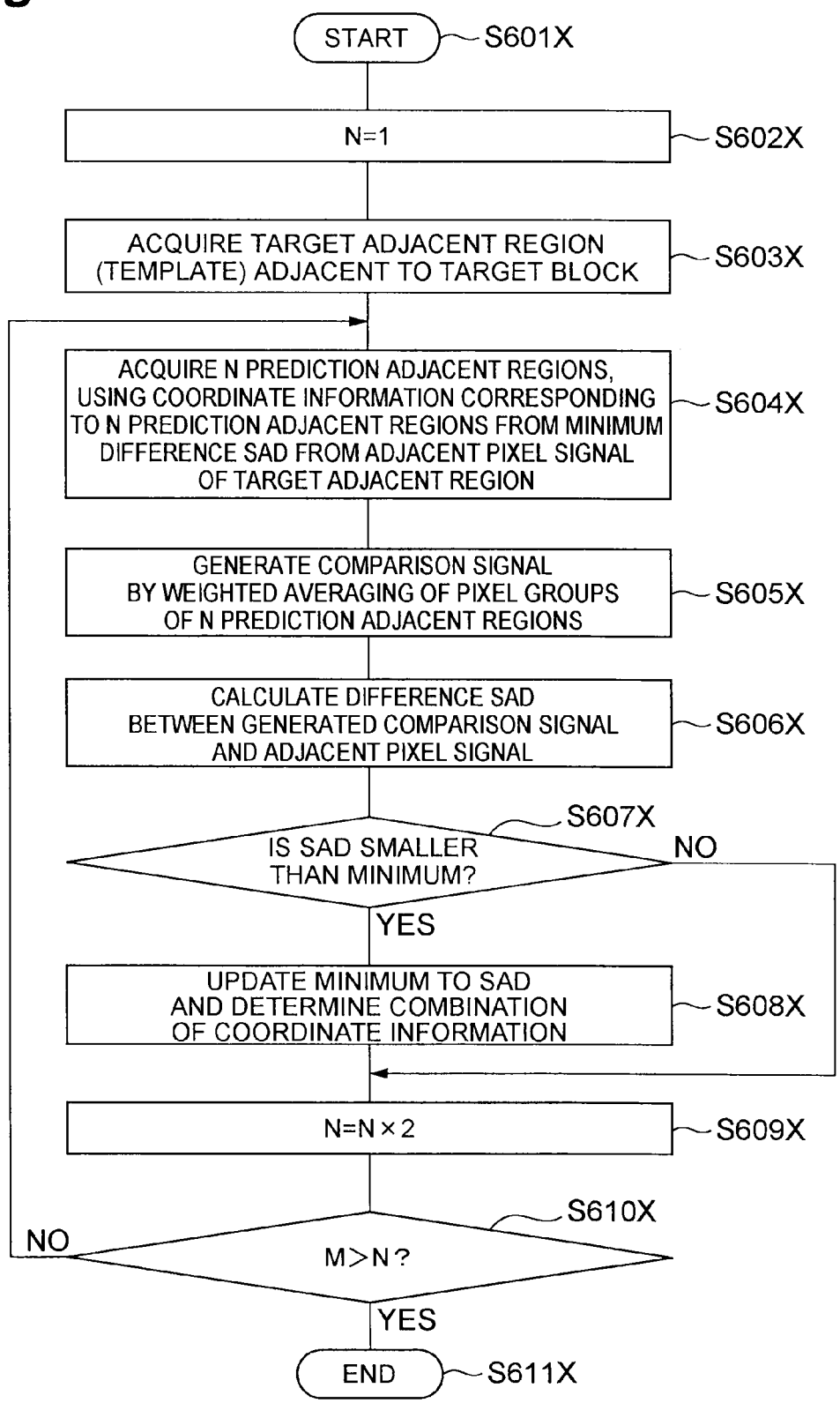
FIG. 38 is a flowchart for explaining a method of determining a combination of a candidate prediction signals in a candidate prediction signal combination determiner 203X.

Next, the processing of the candidate prediction signal combination determiner 203X will be described using the drawing. FIG. 38 is a flowchart showing a method of selecting a combination of N candidate prediction signals suitable for generation of the prediction signal by smoothing (weighted average) of a plurality of candidate prediction signals, in the candidate prediction signal combination determiner 203X according to the present embodiment. First, the combination setter 231X of the combination determiner 203X sets the number N of candidate prediction signals to 1 (S602X). Next, the target adjacent region extractor 233X acquires the target adjacent region (template signal) to the target block from the frame memory 104X (S603X).

Then the prediction adjacent region extractor 232X acquires N prediction adjacent regions belonging to a combination set by the combination setter 231X, via the line L104X. Specifically, the prediction adjacent region extractor 232X acquires from the coordinate information memory 202X a pixel signal of a target block and the coordinate information corresponding to the N prediction adjacent regions with lowest SAD being the difference with respect to the adjacent pixel signal of the target adjacent region to the target block. Then it acquires the N prediction adjacent regions corresponding to the acquired coordinate information from the frame memory 104X (S604X).

Thereafter, the weighting unit 234X and adder 235X generate a comparison signal by averaging (which may be weighted averaging) of the pixel signals of the N prediction adjacent regions (S605X) and the comparison-selection unit 236X calculates the SAD between the generated comparison signal and the adjacent pixel signal (S606X). At the same time, the comparison-selection unit 236X compares the calculated SAD value with the current lowest SAD value (S607X) and when the calculated SAD value is determined to be a minimum, the processing flow goes to S608X; otherwise, the processing flow goes to S609X. When it is determined in S607X that the calculated SAD value is the same as the current lowest SAD value, the processing flow goes to S609X; however, the processing flow may be arranged to go to S608X.

When the calculated SAD value becomes a new lowest SAD value, the comparison-selection unit 236X stores the combination of coordinate information acquired in S604X (S608X).

Then the combination determiner 203X updates the value of N to double (S609X). Then the updated N value is compared with M (S610X) and when the updated N value is smaller than M, the processing flow returns to S604X. When the updated N value is larger than M, the combination of coordinate information stored in S608X is determined as a combination of candidate prediction signals and the candidate prediction signal combination selecting process is then terminated (S611X).

By making use of the candidate prediction signal combination process in the present embodiment as described above, it becomes feasible to determine strength of smoothing of candidate prediction signals appropriate for each target block, i.e., the number of prediction candidate signals to be averaged. In other words, the candidate prediction signals suitable for generation of the prediction signal can be selected without any additional information, from the M candidate prediction signals obtained by the search, by determining N with the lowest SAD between the adjacent pixel signal and the target signal resulting from averaging of pixel signals of N prediction adjacent regions with lowest SAD values being differences from the adjacent pixel signal.

The reason why the value of N is a power of 2 is that consideration is given to executing the averaging process of signals by addition and shift operation only. In the present embodiment, the value of N does not have to be limited to a power of 2. Furthermore, the method of setting the combinations of prediction adjacent regions is not limited to the method in FIG. 38. The number of prediction adjacent regions included in one combination can be optionally set out of the numbers from 1 to M. For example, where a combination is composed of prediction adjacent regions numbering in N smaller than M, it is possible to set all the combinations to select N regions from the M regions. On this occasion, the value of N may be fixed, or it is also possible to select two or more values between 1 and M and set combinations. For allowing the encoder and the decoder to automatically select the same combination of prediction adjacent regions, it is necessary for the two devices to use the same combination setting method.

Figure 39:
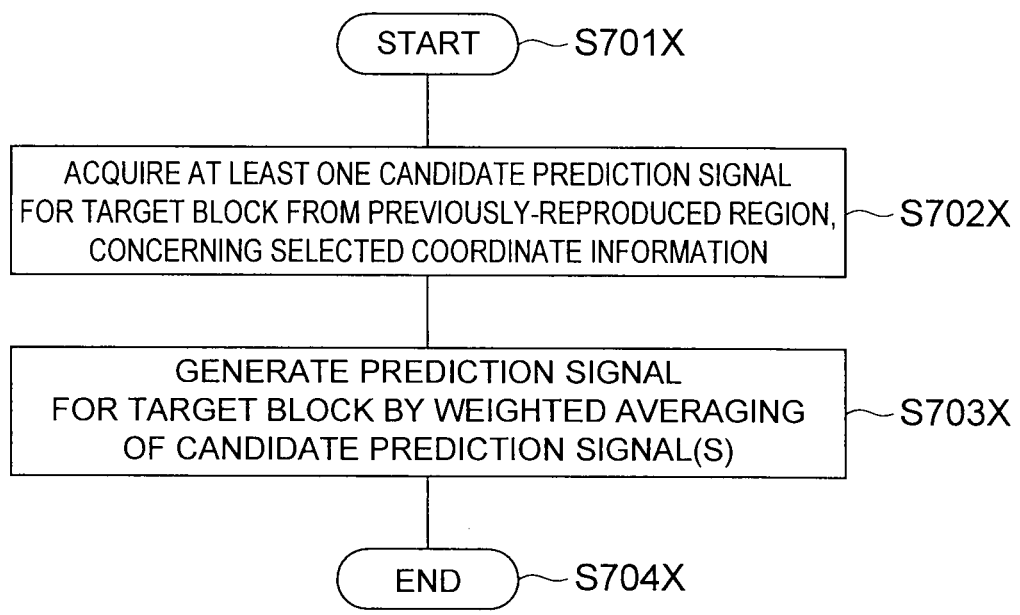
FIG. 39 is a flowchart for explaining a method of combining candidate prediction signals to generate a prediction signal.

FIG. 39 is a flowchart showing a method of generating a prediction signal by smoothing (weighted average) of candidate prediction signals according to the present embodiment.

The prediction region extractor 204X acquires one or more candidate prediction signals corresponding to a target block from the frame memory 104X, in accordance with the selected coordinate information (S702X). Then the weighting unit 205X and adder 206X perform weighted averaging of the acquired candidate prediction signals to generate a prediction signal for the target block (S703X). This completes the process for one target block (S704X).

Figure 40:
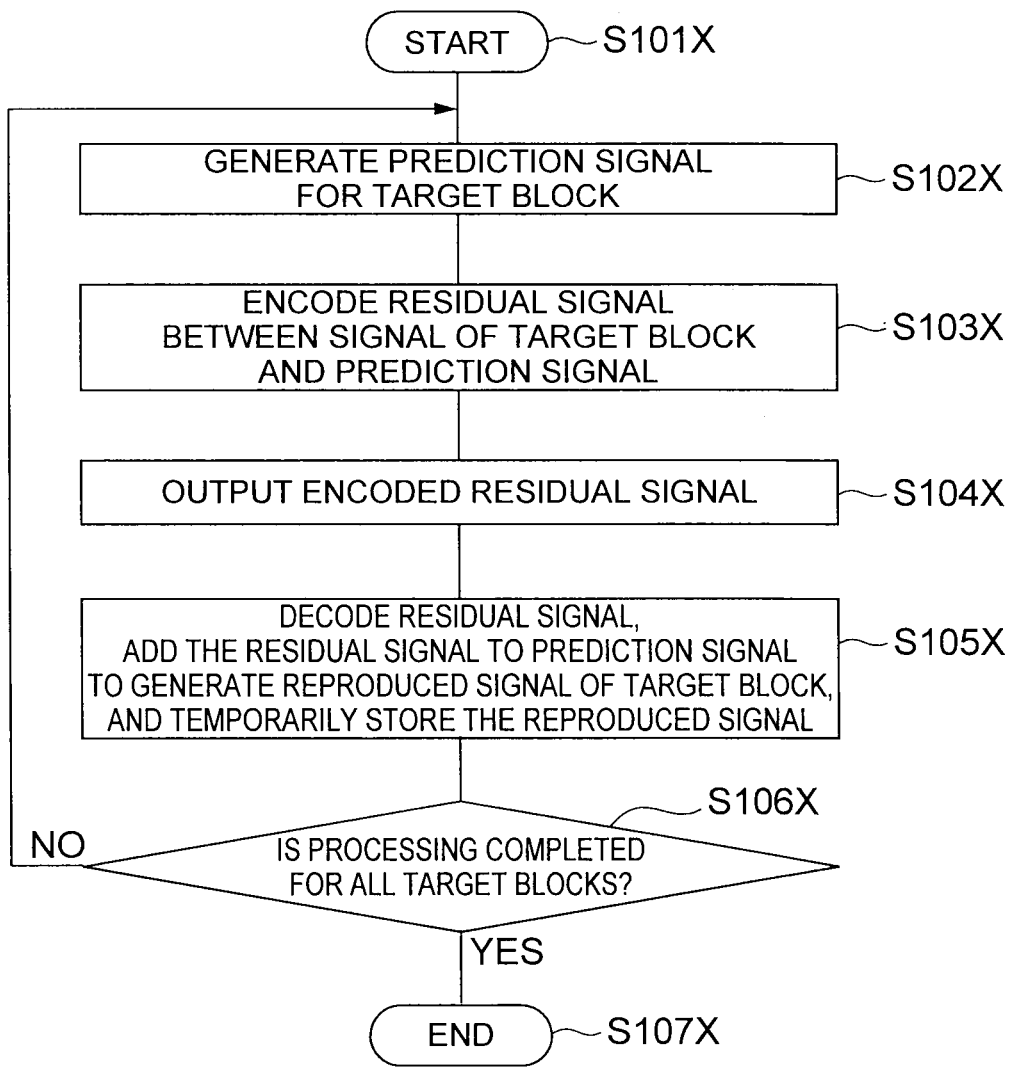
FIG. 40 is a flowchart showing an image predictive encoding method in the image predictive encoding device 100X.

FIG. 40 is a flowchart showing the image predictive encoding method in the image predictive encoding device 100X according to the present embodiment. First, the prediction signal generator 103X in FIG. 34 generates the prediction signal for the target block (S102X). Next, the transformer 106X, quantizer 107X, and entropy encoder 111X encode the residual signal indicating the difference between the signal of the target block and the prediction signal for the target block (S103X). Then the encoded residual signal is output via the output terminal 112X (S105X).

Thereafter, for predictive encoding of a subsequent target block, the encoded residual signal is decoded by the inverse quantizer 108X and inverse transformer 109X. Then the adder 110X adds the prediction signal to the decoded residual signal to reproduce the signal of the target block and the reproduced signal is stored as a reference image in the frame memory 104X(S106X). Unless the processing is completed for all target blocks, the processing flow returns to S102X to conduct the processing for the next target block; if the processing is completed, the processing is terminated (S107X).

As described above, the image predictive encoding device 100X of the present embodiment is able to obtain the prediction signal resulting from the smoothing using the plurality of prediction signals, without use of additional information.

Figure 41:
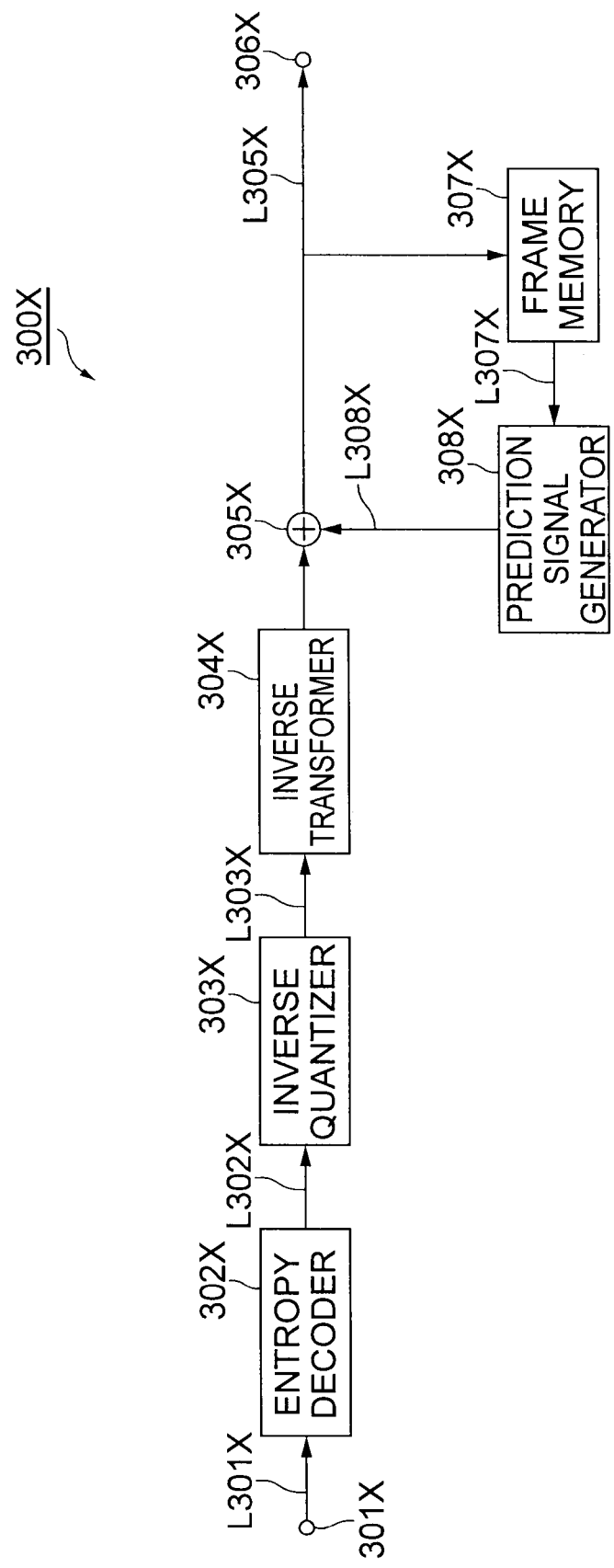
FIG. 41 is a block diagram showing an image predictive decoding device 300X.

The below will describe an image predictive decoding method in the present embodiment. FIG. 41 is a block diagram showing the image predictive decoding device 300X according to the present embodiment. This image predictive decoding device 300X is constructed with an input terminal 301X, an entropy decoder 302X(data decoding means), an inverse quantizer 303X(residual signal restoring means), an inverse transformer 304X(residual signal restoring means), an adder 305X (reproduced image signal generating means), an output terminal 306X, a frame memory 307X, and a prediction signal generator 308X(prediction signal generating means). The residual signal restoring means constituted by the inverse quantizer 303X and inverse transformer 304X may be any other means. The inverse transformer 304X is not indispensable. Each configuration will be described below.

The input terminal 301X is a terminal to which compressed data resulting from the compression encoding by the above-described image predictive encoding method is input. This compressed data contains the residual signal resulting from the prediction and encoding of the target block obtained by dividing an image into a plurality of blocks.

The entropy decoder 302X performs entropy decoding of the compressed data input through the input terminal 301X, to decode the encoded data of the residual signal of the target block.

The inverse quantizer 303X receives the input of the residual signal of the target block decoded, via a line L302X and inversely quantizes the residual signal. The inverse transformer 304X performs an inverse discrete cosine transform of the inversely quantized data. The inverse quantizer 303X and inverse transformer 304X output respective signals obtained by the inverse quantization and the inverse discrete cosine transform, as a residual signal (reproduced residual signal).

The prediction signal generator 308X basically has the same configuration as the configuration shown in FIG. 34 or a function equivalent thereto, and generates a prediction signal by the same processing as that of the prediction signal generator 103X in FIG. 34. The prediction signal generator 308X generates the prediction signal from only previously-reproduced signals stored in the frame memory 307X, and therefore is able to generate the same prediction signal as the prediction signal generator 103X in FIG. 33, by managing the input data into the frame memory 307X and the input data into the frame memory 104X in FIG. 33 by the same method. Since the details of the configuration of this prediction signal generator 308X are the same as those described in FIG. 34, the details are omitted herein. The prediction signal generator 308X to operate in this manner outputs the generated prediction signal via a line L308X to the adder 305X.

The adder 305X adds the prediction signal generated by the prediction signal generator 308X, to the residual signal (reproduced residual signal) restored by the inverse quantizer 303X and inverse transformer 304X and outputs the reproduced image signal of the target block via a line L305X to the output terminal 306X and the frame memory 307X. Then the output terminal 306X outputs the image signal to the outside (e.g., a display).

The frame memory 307X stores the reproduced image output from the adder 305X, as a reference image to be used as a reproduced image for reference for the subsequent decoding process. On this occasion, the reproduced image is managed by the same method as in the image predictive encoding device 100X in FIG. 33.

Figure 42:
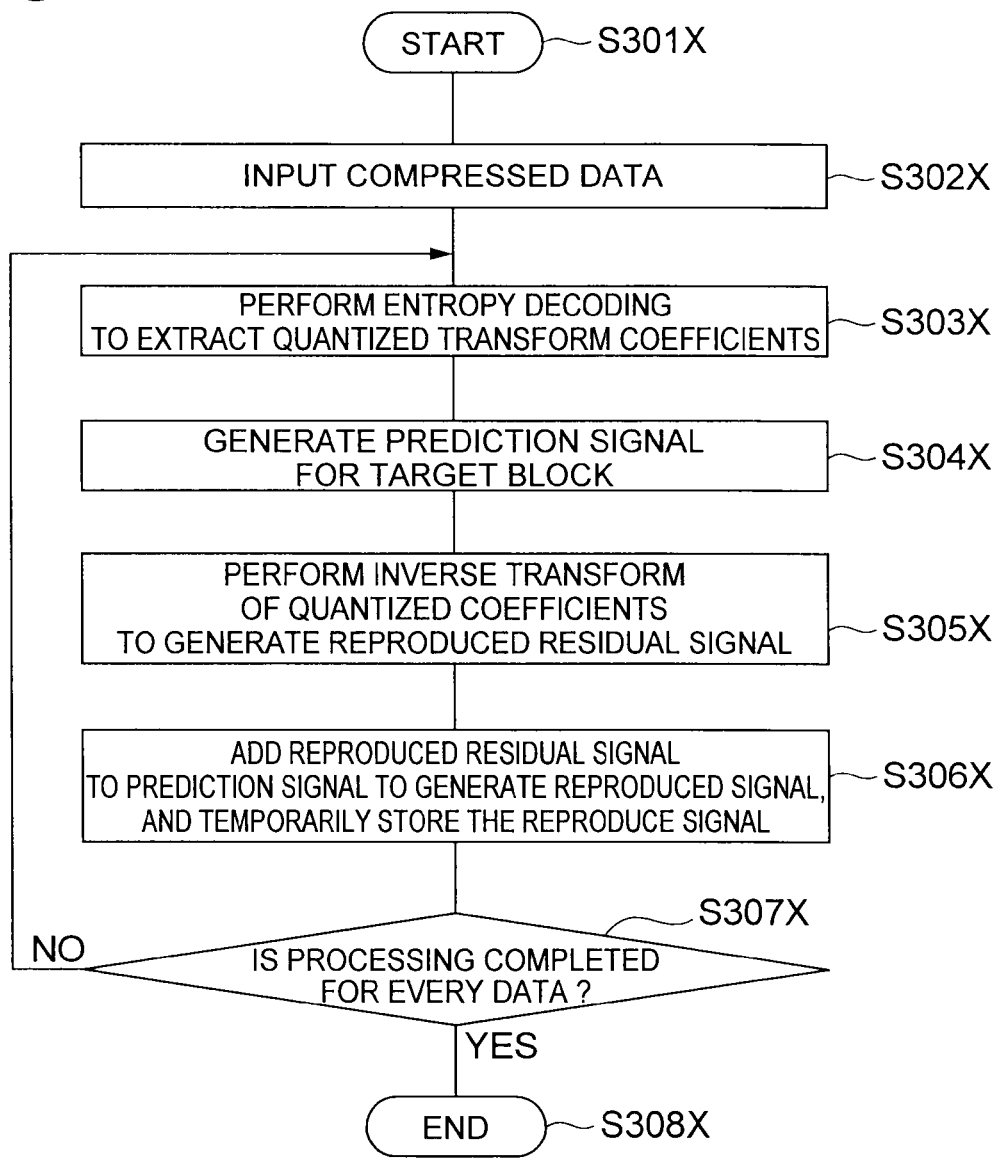
FIG. 42 is a flowchart showing an image predictive decoding method in the image predictive decoding device 300X.

Next, the image predictive decoding method in the image predictive decoding device 300X according to the present embodiment will be described using FIG. 42. First, the compressed data resulting from compression is input through the input terminal 301X(S302X). Then the entropy decoder 302X performs entropy decoding of the compressed data to extract quantized transform coefficients (S303X).

Then the prediction signal generator 308X generates a prediction signal (S304X). The process of S304X is basically the same as the process S102X in FIG. 40, to carry out the processing procedures in FIGS. 37 to 39.

On the other hand, the inverse quantizer 303X inversely quantizes the quantized transform coefficients using a quantization parameter and the inverse transformer 304X performs an inverse transform of the transform coefficients to generate a reproduced residual signal (S305X). Then the reproduced residual signal is added to the generated prediction signal to generate a reproduced signal, and the reproduced signal is stored in the frame memory, for reproduction of the next target block (S306X). If there is next compressed data, this process is repeated (S307X) and all the data is processed to the last (S308X). The method may be configured to retrieve compressed data while returning to S302X as occasion may demand.

The image predictive encoding method and image predictive decoding method in the present embodiment can be provided in the form of a program as stored in a recording medium. Examples of such recording media include recording media such as a floppy disk (registered trademark), CD-ROM, DVD, or ROM, or semiconductor memories.

Figure 43:
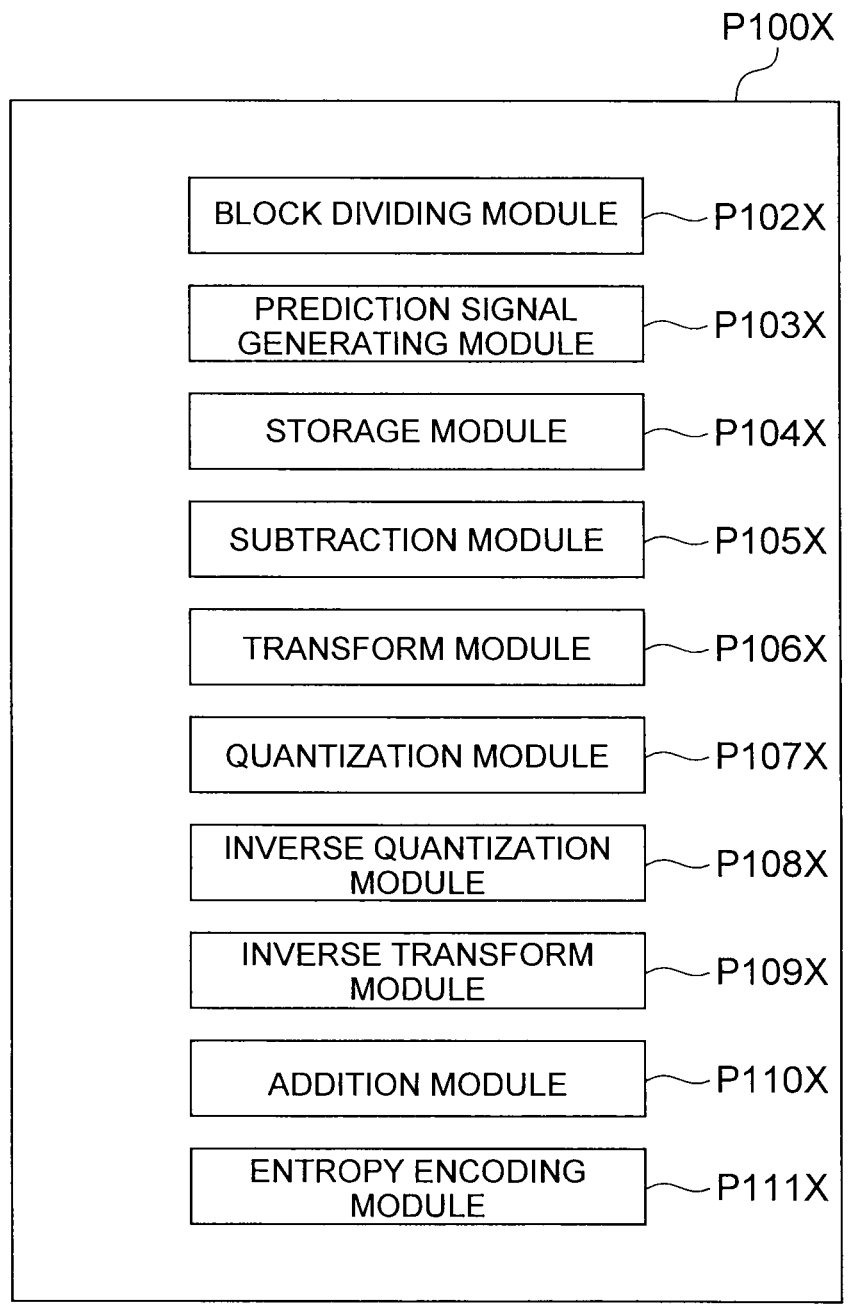
FIG. 43 is a block diagram showing modules of a program capable of executing the image predictive encoding method.
Figure 44:
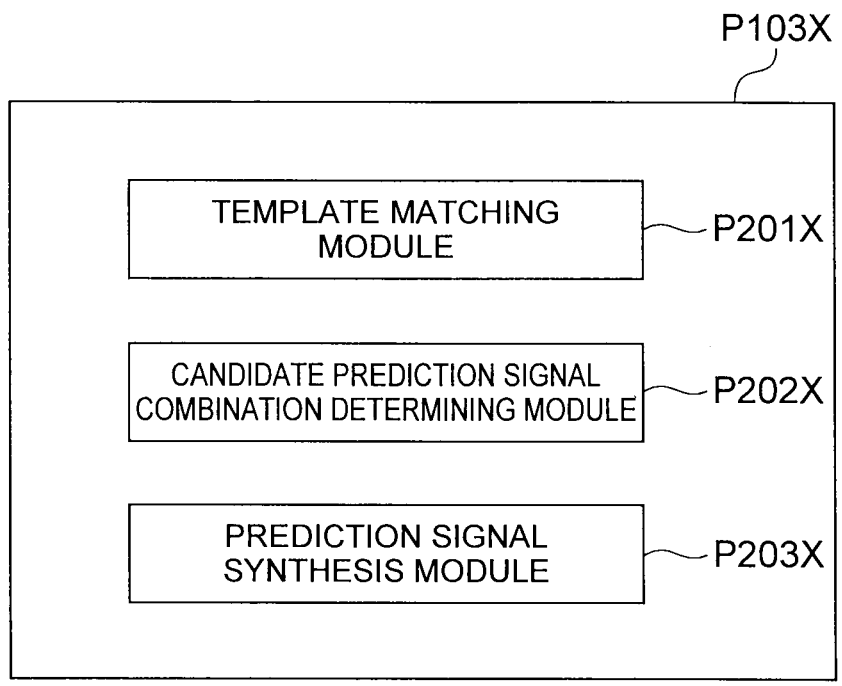
FIG. 44 is a block diagram showing modules of a prediction signal generating module P103X.

FIG. 43 is a block diagram showing modules of a program capable of executing the image predictive encoding method. The image predictive encoding program P100X is constructed with a block dividing module P102X, a prediction signal generating module P103X, a storage module P104X, a subtraction module P105X, a transform module P106X, a quantization module P107X, an inverse quantization module P108X, an inverse transform module P109X, an addition module P110X, and an entropy encoding module P111X. The prediction signal generating module P103X, as shown in FIG. 44, is constructed with a template matching module P201X, a candidate prediction signal combination determining module P202X, and a prediction signal synthesis module P203X.

The functions implemented by execution of the respective modules are the same as those of the respective components of the aforementioned image predictive encoding device 100X. Namely, the functions of the respective modules of the image predictive encoding program P100X are the same as the functions of the block divider 102X, the prediction signal generator 103X, the frame memory 104X, the subtracter 105X, the transformer 106X, the quantizer 107X, the inverse quantizer 108X, the inverse transformer 109X, the adder 110X, and the entropy encoder 111X, and the functions of the respective modules of the prediction signal generating module P103X are the same as the functions of the template matching unit 201X, the candidate prediction signal combination determiner 203X, and the prediction region extractor 204X to adder 206X for signal synthesis.

Figure 45:
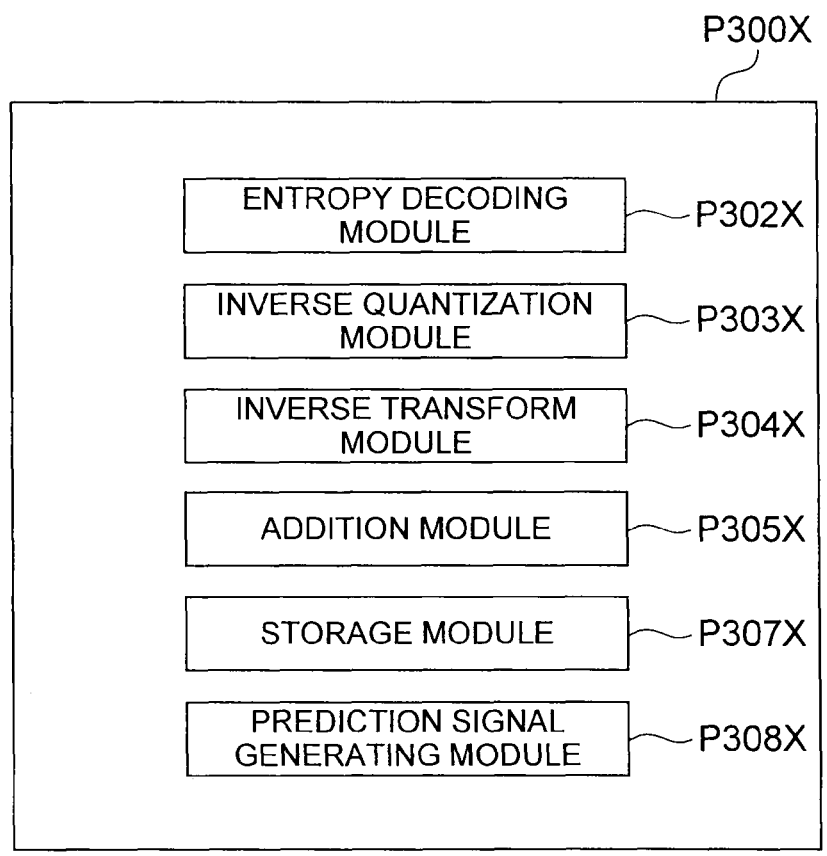
FIG. 45 is a block diagram showing modules of a program capable of executing the image predictive decoding method.
Figure 46:
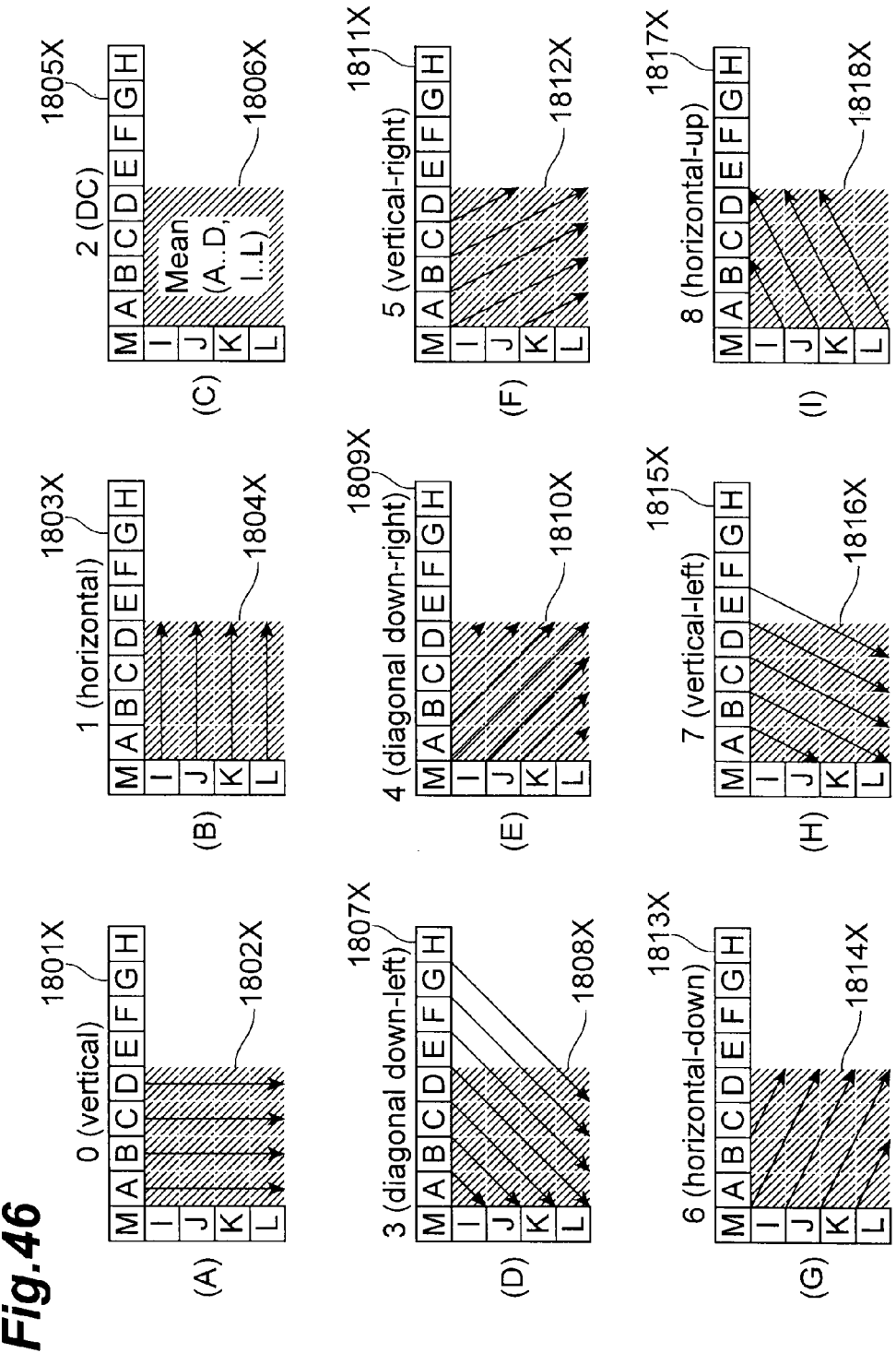
FIG. 46 is a schematic diagram for explaining an intra-picture prediction method.
Figure 47:
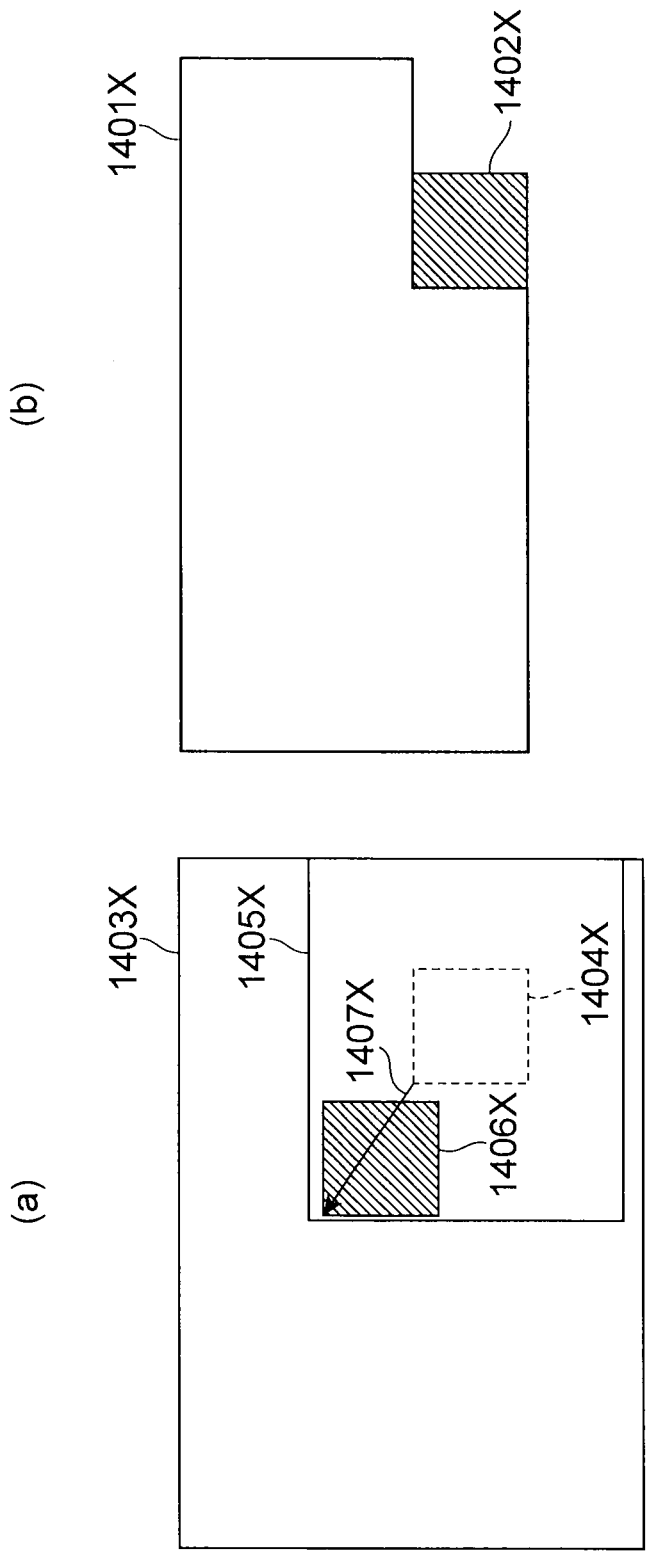
FIG. 47 is a schematic diagram for explaining a block matching process.

FIG. 45 is a block diagram showing modules of a program capable of executing the image predictive decoding method. The image predictive decoding program P300X is constructed with an entropy decoding module P302X, an inverse quantization module P303X, an inverse transform module P304X, an addition module P305X, a storage module P307X, and a prediction signal generating module P308X.

The functions implemented by execution of the respective modules described above are the same as those of the respective components of the aforementioned image predictive decoding device 300X. Namely, the functions of the respective modules of the image predictive decoding program P300X are the same as the functions of the entropy decoder 302X, inverse quantizer 303X, inverse transformer 304X, adder 305X, and frame memory 307X. The prediction signal generating module P308X has functions equivalent to those of the prediction signal generating module P103X in the image predictive encoding program P100X, and is provided with the functions of the template matching unit 201X, the candidate prediction signal combination determiner 203X, and the prediction region extractor 204X to adder 206X for signal synthesis.

The image predictive encoding program P100X or image predictive decoding program P300X configured as described above is stored in a recording medium 10X and executed by a computer described below.

Figure 48:
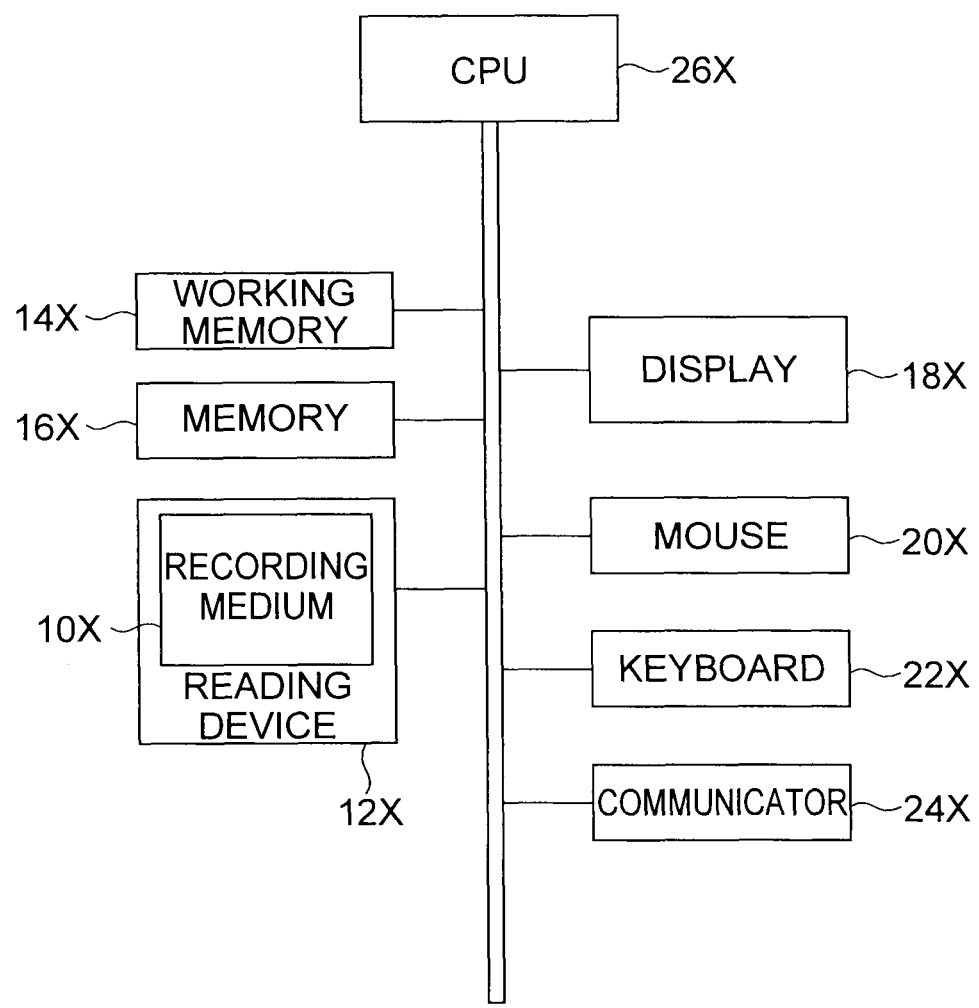
FIG. 48 is a drawing showing a hardware configuration of a computer for executing a program recorded in a recording medium.
Figure 49:
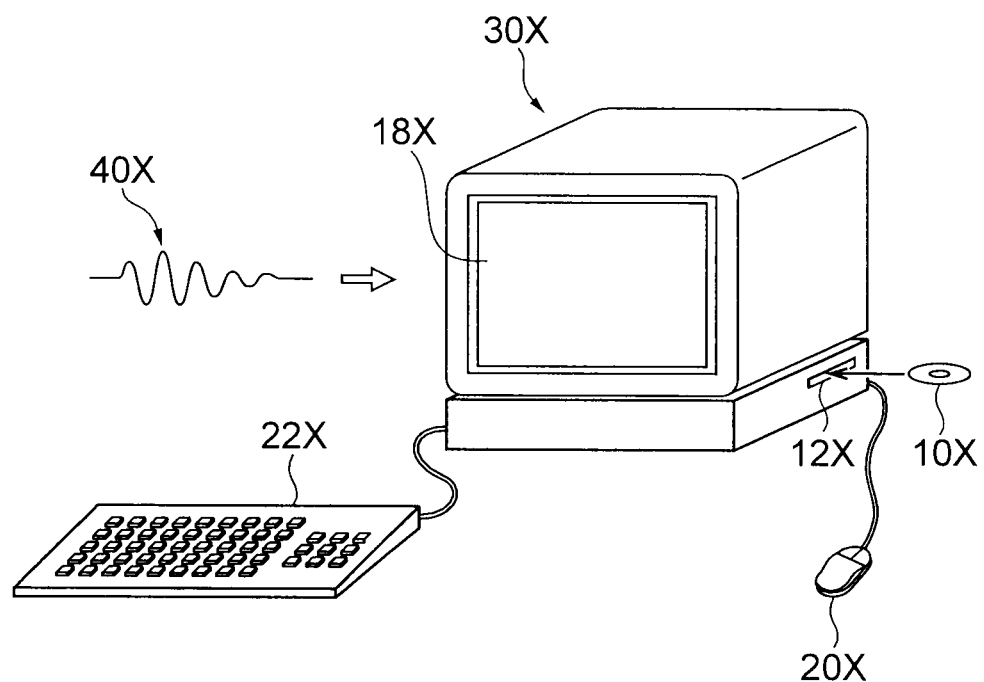
FIG. 49 is a perspective view of a computer for executing a program stored in a recording medium.

FIG. 48 is a drawing showing a hardware configuration of a computer for executing the program recorded in the recording medium and FIG. 49 a perspective view of the computer for executing the program stored in the recording medium. The computer embraces a DVD player, a set-top box, a cell phone, or the like provided with a CPU and configured to perform processing and control based on software.

As shown in FIG. 48, the computer 30X has a reading device 12X such as a floppy disk drive device, a CD-ROM drive device, or a DVD drive device, a working memory (RAM) 14X on which an operating system is resident, a memory 16X for storing the program stored in the recording medium 10X, a display device 18X such as a display, a mouse 20X and a keyboard 22X as input devices, a communication device 24X for transmitting and receiving data and others, and a CPU 26X for controlling execution of the program. When the recording medium 10X is inserted into the reading device 12X, the computer 30X becomes accessible to the image predictive encoding program P100X or the image predictive decoding program P300X stored in the recording medium 10X, through the reading device 12X and becomes able to operate as the image predictive encoding device 100X or the image predictive decoding device 300X in the present embodiment, based on the image predictive encoding program P100X or the image predictive decoding program P300X.

As shown in FIG. 49, the image predictive encoding program P100X or the image predictive decoding program P300X may be one provided as a computer data signal 40X superimposed on a carrier wave, through a network. In this case, the computer 30X stores the image predictive encoding program P100X or the image predictive decoding program P300X received by the communication device 24X, into the memory 16X and can execute the image predictive encoding program P100X or the image predictive decoding program P300X.

The present embodiment described above may be modified as described below. The candidate prediction signal combination determiner 203X shown in FIG. 34 is configured to calculate the SAD value (the sum of absolute differences) being the difference between the pixel signal of the target adjacent region to the target block and the target signal resulting from weighted averaging of pixel signals of adjacent prediction regions and to determine an optimal combination of candidate prediction signals, based thereon, but the determination of combination can also be implemented using the sum of squared differences (SSD) or variance (VAR) of the residual signal, instead of SAD. Computation amounts for the three evaluation criteria increase in the order of SAD, SSD, and VAR, whereas the accuracy of evaluation increases, with an expected effect of reduction in a code length of an error signal.

If there are a plurality of combinations obtained with the same SAD value as the difference between the target adjacent signal and the target signal, it is effective to adopt a method of determining a final combination by applying SSD or VAR. Specifically, when the SAD value calculated by the prediction adjacent region extractor 232X coincides with the minimum calculated heretofore, the comparison-selection unit 236X further compares their values of SSD or VAR as a comparison target to select the smaller between them. A combination determined as one with the smaller SSD or VAR is stored as a combination with the minimum by the comparison-selection unit 236X. In this case, the comparison-selection unit 236X calculates SSD or VAR as well as SAD and stores them at the same time.

Furthermore, it is also possible to adopt a method of calculating a variance for each of combinations of candidate prediction signals, instead of the pixel signals of the adjacent prediction regions, and using the calculation result for the determination of combination. Specifically, it can be implemented by replacing the prediction adjacent region extractor 232X, weighting unit 234X, and adder 235X in FIG. 34 by the prediction region extractor 204X, weighting unit 205X, and adder 206X, respectively. This modification example does not have to perform the processing of the target adjacent region extractor 233X and enables the prediction signal to be output from the comparison-selection unit 236X to the subtracter 105X in FIG. 33, thus achieving an effect of reduction in circuit scale.

The comparator 213X of the template matching unit 201X also uses the SAD for the evaluation between the target adjacent region to the target block and the pixel group of the same shape as the target adjacent region, which is obtained by the search, but SAD may be replaced by SSD or VAR, with expectation of the same effect as in the above case of the candidate prediction signal combination determiner 203X.

The prediction signal generator 103X in FIG. 33 is not limited to the configuration in FIG. 34. For example, FIG. 34 shows the configuration wherein for a plurality of candidate prediction signals obtained by the search by the template matching unit, the coordinate information for access to the signals is stored in the coordinate information memory 202X, but it is also possible to adopt a configuration wherein the candidate prediction signals and the pixel signals of the prediction adjacent regions are stored. This configuration increases the memory size in FIG. 34, but achieves an effect of reduction in access to the frame memory 104X. The template matching unit 201X is configured to output the SAD values being the differences between the target adjacent region and the M prediction adjacent regions via the line L201bX to the candidate prediction signal combination determiner 203X, but when the SAD values as the differences are not used for setting the combinations, the line L201bX is unnecessary.

In the present embodiment the target adjacent region is composed of previously-reproduced pixels, but it may be composed of a prediction signal of an adjacent block. This is effective to cases where the prediction regions are desired to be made smaller than an encoding block unit of an error signal and where the signal of the target adjacent region is desired to be generated without execution of the encoding or decoding process.

The present embodiment is applicable to a technique of searching for an unsettled number of candidate signals by template matching and selecting an appropriate number of candidate signals.

The below will describe the action and effect of the image predictive encoding device 100X and the image predictive decoding device 300X of the present embodiment.

In the image predictive encoding device 100 of the present embodiment, the template matching unit 201X searches the search regions 401X and 417X of previously-reproduced images for a plurality of prediction adjacent regions 404aX-404cX, 414aX-414cX highly correlated to the target adjacent region 403X consisting of the previously-reproduced adjacent pixel signal adjacent to the target region (target block) 402X consisting of the target pixel signal. The combination setter 231X in the candidate prediction signal combination determiner 203X derives at least two arbitrary combinations of prediction adjacent regions including at least one of the plurality of prediction adjacent regions 404aX-404cX, 414aX-414cX obtained by the search. Then the prediction adjacent region extractor 232X extracts the pixel signals of the prediction adjacent regions thus derived and the weighting unit 234X and adder 235X process the extracted pixel signals by the predetermined synthesis method, for example, by averaging to generate the comparison signal to the adjacent pixel signal for each combination. Then the comparison-selection unit 236X selects a combination with a high correlation between the comparison signal generated by the weighting unit 234X and others and the adjacent pixel signal acquired by the target adjacent region extractor 233X. The prediction region extractor 204X generates at least one candidate prediction signal for the target pixel signal, based on the prediction adjacent regions belonging to the selected combination, and the weighting unit 205X and adder 206X process the candidate prediction signal by the predetermined synthesis method to generate the prediction signal. The subtracter 105X subtracts the prediction signal thus generated, from the target pixel signal acquired through the block divider 102X to generate the residual signal and the transformer 106X, quantizer 107X, and entropy encoder 111X encode the residual signal thus generated.

This operation allows the combination of candidate prediction signals suitable for smoothing to be selected without increase in information amount, using the target adjacent region consisting of the previously-reproduced adjacent pixel signal adjacent to the target block, whereby the prediction signal can be generated with efficient consideration to local noise characteristics.

The comparison-selection unit 236X in the image predictive encoding device 100X of the present embodiment selects a combination of prediction adjacent regions with lowest SAD being the sum of absolute differences between the comparison signal and the adjacent pixel signal, whereby it can select the combination of candidate prediction signals more suitable for smoothing.

The weighting unit 234X and adder 235X in the image predictive encoding device 100X of the present embodiment generate the comparison signal by the weighted averaging of the pixel signals of the prediction adjacent regions belonging to the combination set by the combination setter 231X, whereby they can generate the comparison signal suitable for selection of the combination of candidate prediction signals more suitable for smoothing.

Since the combination of prediction adjacent regions set by the combination setter 231X in the image predictive encoding device 100X of the present embodiment contains the prediction adjacent regions as many as 2 to the power of n in decreasing order of correlation to the target adjacent region, the operation can be performed by addition and shift operation only and can be implemented by a simple configuration. The value of n is preferably an integer of not less than 0.

In the image predictive decoding device 300X of the present embodiment, the template matching unit 201X searches the search regions 401X and 417X of the previously-reproduced images for a plurality of prediction adjacent regions 404aX-404cX, 414aX-414cX highly correlated to the target adjacent region 403X consisting of the previously-reproduced adjacent pixel signal adjacent to the target region (target block) 402X consisting of the target pixel signal. The combination setter 231X in the candidate prediction signal combination determiner 203X derives at least two arbitrary combinations of prediction adjacent regions including at least one of the plurality of prediction adjacent regions 404aX-404cX, 414aX-414cX obtained by the search. Then the prediction adjacent region extractor 232X extracts the pixel signals of the prediction adjacent regions thus derived, and the weighting unit 234X and adder 235X process the extracted pixel signals by the predetermined synthesis method, for example, by averaging to generate the comparison signal to the adjacent pixel signal for each combination. Then the comparison-selection unit 236X selects a combination with a high correlation between the comparison signal generated by the weighting unit 234X and the others and the adjacent pixel signal acquired by the target adjacent region extractor 233X. The prediction region extractor 204X generates at least one candidate prediction signal for the target pixel signal, based on the prediction adjacent regions belonging to the selected combination, and the weighting unit 205X and adder 206X process the candidate prediction signal by the predetermined synthesis method to generate the prediction signal.

Then the entropy decoder 302X, inverse quantizer 303X, and inverse transformer 304X restore the residual signal from the compressed data input through the input terminal 301X, and the adder 305X adds the prediction signal generated as described above, to the restored residual signal to generate the reproduced image signal.

This operation permits the device to select the combination of candidate prediction signals suitable for smoothing without increase in information amount, using the target adjacent region consisting of the previously-reproduced adjacent pixel signal adjacent to the target block, whereby the prediction signal can be generated with efficient consideration to local noise characteristics.

The comparison-selection unit 236X in the image predictive decoding device 300X of the present embodiment selects the combination with lowest SAD being the sum of absolute differences between the comparison signal and the adjacent pixel signal, whereby it can select the combination of candidate prediction signals more suitable for smoothing.

The weighting unit 234X and adder 235X in the image predictive decoding device 300X of the present embodiment generate the comparison signal by weighted averaging of the pixel signals of the prediction adjacent regions belonging to the combination set by the combination setter 231X, whereby they can generate the comparison signal suitable for selection of the combination of candidate prediction signals more suitable for smoothing.

Since the combination of prediction adjacent regions set by the combination setter 231X in the image predictive decoding device 300X of the present embodiment contains the prediction adjacent regions as many as 2 to the power of n in decreasing order of correlation to the target adjacent region, the operation can be performed by addition and shift operation only and can be implemented by a simple configuration. The value of n is preferably an integer of not less than 0.

In the image predictive encoding program P100X of the present embodiment, the template matching module P201X searches the search regions 401X and 417X of the previously-reproduced images for a plurality of prediction adjacent regions 404aX-404cX, 414aX-414cX highly correlated to the target adjacent region 403X consisting of the previously-reproduced adjacent pixel signal adjacent to the target region (target block) 402X consisting of the target pixel signal. The candidate prediction signal combination determining module P202X derives at least two arbitrary combinations of prediction adjacent regions including at least one of the plurality of prediction adjacent regions 404aX-404cX, 414aX-414cX obtained by the search. Then the candidate prediction signal combination determining module P202X extracts the pixel signals of the prediction adjacent regions thus derived and processes the extracted pixel signals by the predetermined synthesis method, for example, by averaging to generate the comparison signal to the adjacent pixel signal for each combination. Then the prediction signal synthesis module P203X selects a combination with a high correlation between the generated comparison signal and the acquired adjacent pixel signal. The candidate prediction signal combination determining module P202X generates at least one candidate prediction signal for the target pixel signal, based on the prediction adjacent regions belonging to the selected combination, and processes the candidate prediction signal by the predetermined synthesis method to generate the prediction signal. The subtraction module P105X subtracts the prediction signal thus generated, from the target pixel signal acquired through the block dividing module P102X, to generate the residual signal and the transform module P106X, quantization module P107X, and entropy encoding module P111X encode the generated residual signal.

In the image predictive decoding program P300X of the present embodiment, the template matching module P201X searches the search regions 401X and 417X of the previously-reproduced images for a plurality of prediction adjacent regions 404aX-404cX, 414aX-414cX highly correlated to the target adjacent region 403X consisting of the previously-reproduced adjacent pixel signal adjacent to the target region (target block) 402X consisting of the target pixel signal. The prediction signal synthesis module P203X derives at least two arbitrary combinations of prediction adjacent regions including at least one of the plurality of prediction adjacent regions 404aX-404cX, 414aX-414cX obtained by the search. Then the prediction signal synthesis module P203X extracts the pixel signals of the prediction adjacent regions thus derived, and processes the extracted pixel signals by the predetermined synthesis method, for example, by averaging to generate the comparison signal to the adjacent pixel signal for each combination. Then the prediction signal synthesis module P203X selects a combination with a high correlation between the generated comparison signal and the acquired adjacent pixel signal. The prediction signal synthesis module P203X generates at least one candidate prediction signal for the target pixel signal, based on the prediction adjacent regions belonging to the selected combination, and the prediction signal synthesis module P203X processes the candidate prediction signal by the predetermined synthesis method to generate the prediction signal.

The entropy decoding module P302X, inverse quantization module P303X, and inverse transform module P304X then restore the residual signal from the input compressed data and the addition module P305X adds the prediction signal generated as described above, to the restored residual signal to generate the reproduced image signal.

<Sixth Embodiment>

The following will show another embodiment to enable smoothed candidate prediction signals to be provided diversity, concerning the candidate prediction signal combination determiner 203X(cf. FIG. 34) and the candidate prediction signal combination determining method (cf. FIG. 38). The embodiment of these has the same configuration as the prediction signal generator 103X in the fifth embodiment, except for the candidate prediction signal combination determiner 203X(cf. FIG. 34) and the candidate prediction signal combination determining method (cf. FIG. 38), and thus the description thereof is omitted herein. The invention of the present embodiment is applicable to the image predictive encoding device, the image predictive decoding device, the image predictive encoding method, the image predictive decoding method, the program capable of executing the image predictive encoding method, and the hardware configuration of the computer for executing the program recorded in the recording medium. The functions or methods denoted by the same reference symbols in FIGS. 34 and 38 are also the same operations and processes as above and therefore the description thereof will be omitted below. The present embodiment is applicable to the aforementioned image predictive encoding device 100X or the image predictive decoding device 300X.

Figure 50:
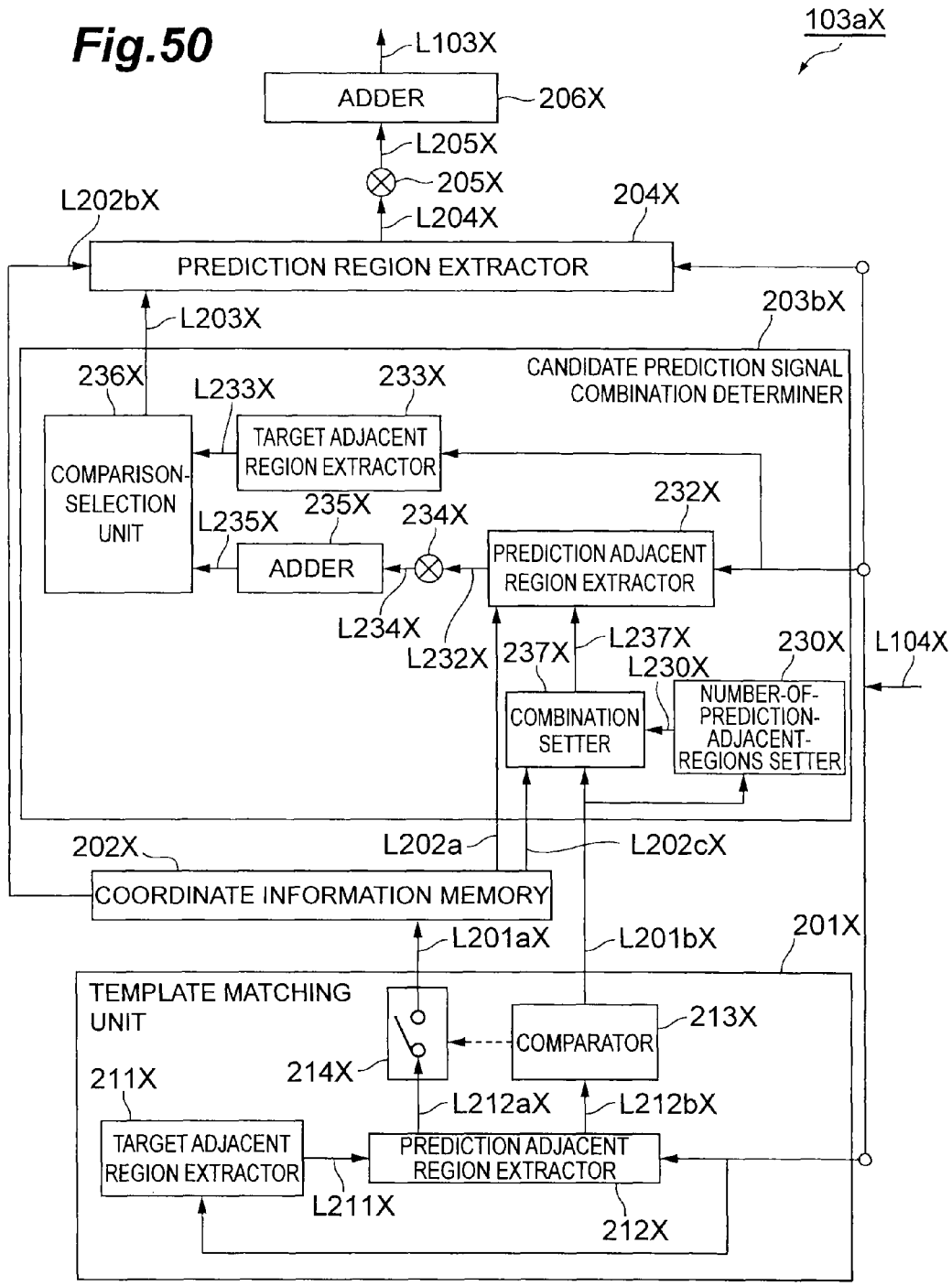
FIG. 50 is a block diagram showing a configuration of a prediction signal generator 103aX in the sixth embodiment.

FIG. 50 is a block diagram showing a configuration of the prediction signal generator 103aX in the sixth embodiment. This prediction signal generator 103aX is constructed with the template matching unit 201X, the coordinate information memory 202X, a candidate prediction signal combination determiner 203bX, the prediction region extractor 204X, the weighting unit 205X, and the adder 206X. The prediction signal generator 103aX is different in the configuration of the candidate prediction signal combination determiner 203bX from the prediction signal generator 103X in the fifth embodiment described above. Specifically, the candidate prediction signal combination determiner 203X in FIG. 34 is configured to set a combination of prediction adjacent regions, using the M SAD values (the sums of absolute differences between the target adjacent region and each of the M prediction adjacent regions) input via L201bX, whereas the candidate prediction signal combination determiner 203bX in FIG. 50 is configured to set a combination of prediction adjacent regions, using the M SAD values input via L201bX and the coordinate information of prediction adjacent regions input via L202cX.

More specifically, a configuration of the combination setter 237X in FIG. 50 is different from that of the combination setter 231X in FIG. 34, and the candidate prediction signal combination determiner 203bX in FIG. 50 is constructed with a number-of-prediction-adjacent-regions setter 230X in addition to the configuration of the candidate prediction signal combination determiner 203X in FIG. 34.

The number-of-prediction-adjacent-regions setter 230X is a part that determines candidates for the number of prediction adjacent regions to be subjected to smoothing, from the number M of prediction adjacent regions obtained by the search by the template matching unit 201X. Specifically, the number-of-prediction-adjacent-regions setter 230X receives the input of the number M of prediction adjacent regions obtained by the search by the template matching unit 201X, via the line L201bX. Then the number-of-prediction-adjacent-regions setter 230X calculates at least one N, a power of 2, smaller than M, and outputs N via a line L230X to the combination setter 237X while successively changing the value of N. For example, when M is 6, N=1, 2, or 4 is output; when M is 30, N=1, 2, 4, 8, or 16 is output.

The combination setter 237X is a part that selects N prediction adjacent regions, using the value of N input via the line L230X, the M SAD values input via the line L201bX, and the coordinate information of the M prediction adjacent regions input via a line L202cX. Then it successively outputs plural pieces of selection information (information to allow identification of selected prediction adjacent regions) as prediction adjacent region combination information, via a line L237X to the prediction adjacent region extractor 232X, while changing the combination of N prediction adjacent regions.

In the candidate prediction signal combination determiner 203bX, as described above, the combination setter 237X generates the prediction adjacent region combination information for different N values and selects one combination information according to the procedure described with FIG. 34.

Figure 51:
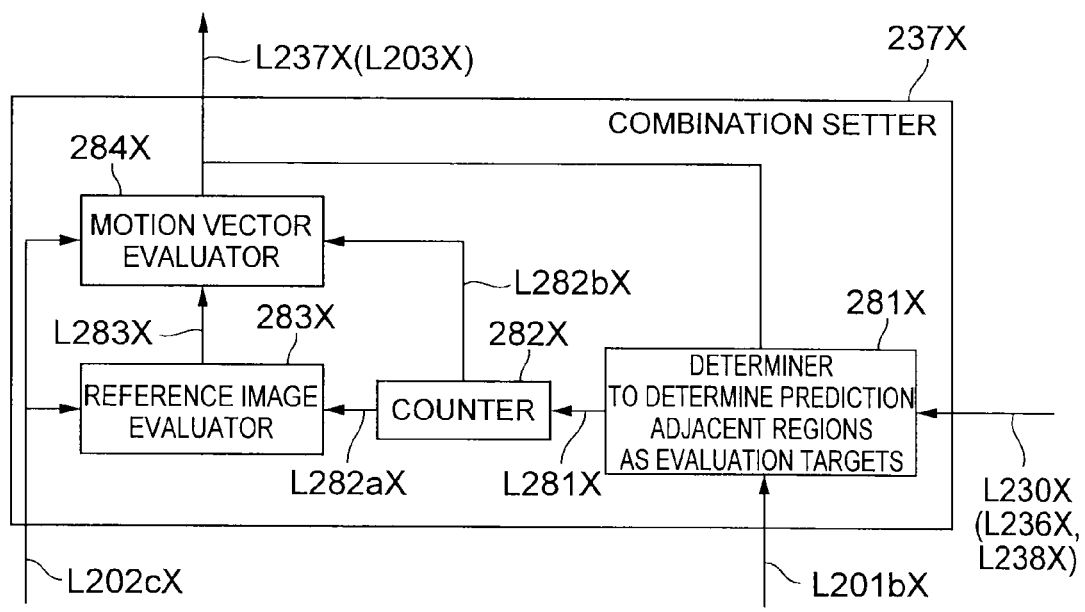
FIG. 51 is a block diagram showing a detailed configuration of a combination setter 237X.

FIG. 51 is a block diagram showing a detailed configuration of the combination setter 237X. This combination setter 237X is constructed with a prediction adjacent region determiner 281X to determine prediction adjacent regions as evaluation targets, a counter 282X, a reference image evaluator 283X, and a motion vector evaluator 284X. The combination setter 237X selects N prediction adjacent regions for each input value N, using the coordinate information of M prediction adjacent regions obtained by the search by the template matching unit 201X, and outputs the selection information as prediction adjacent region combination information. In the present embodiment, the prediction adjacent region combination consisting of N prediction adjacent regions is selected using the coordinate information, i.e., the identification numbers of reference images (reference image numbers), and spatial difference coordinates in a picture between the target adjacent region and the prediction adjacent regions (which will be referred to hereinafter as motion vectors), but the data to be used in the selection is not limited to the reference image numbers and motion vectors. The coordinate information can be any information that is associated with generation of each candidate prediction signal and that uniquely defines a prediction adjacent region, and information for access to the prediction adjacent region. For example, in a case where one prediction method is determined out of a plurality of predetermined prediction methods, using the pixel signals of prediction adjacent regions, the data to be used in the selection may contain the prediction method.

The prediction adjacent region determiner 281X to determine the prediction adjacent regions as evaluation targets is a part that restricts the number of prediction adjacent regions as targets of selection to R before N prediction adjacent regions are selected from the M prediction adjacent regions obtained by the search by the template matching unit 201X. This value R is a numerical value that is determined by counting the number of SADs not less than a predetermined threshold out of the M prediction adjacent regions as described below. The determination of this value R is effective to preventing a prediction adjacent region with a large SAD value from the target adjacent region from being selected when the N value is quite smaller than the M value.

The prediction adjacent region determiner 281X to determine the prediction adjacent regions as evaluation targets receives the input of M SAD values corresponding to the M prediction adjacent regions obtained by the search by the template matching unit 201X(which are difference data between the target adjacent region and the M prediction adjacent regions) via the line L201bX and simultaneously receives the input of the number N of prediction adjacent regions to be selected, via the line L230X. The prediction adjacent region determiner 281X to determine the prediction adjacent regions as evaluation targets compares the M SAD values with a predetermined threshold for the input N value and counts the number of SAD values smaller than the threshold. Then it outputs the number of SAD values smaller than the threshold, counted as described above, as the number R of prediction adjacent regions as evaluation targets via a line L281X to the counter 282X. However, when the R value is smaller than or equal to the N value, the selection of prediction adjacent regions is unnecessary and therefore the prediction adjacent region determiner 281X to determine the prediction adjacent regions as evaluation targets outputs the information as combination information of N (R) prediction adjacent regions via the line L237X to the prediction adjacent region extractor 232X. As described above, the determination of R value is effective to preventing a prediction adjacent region with a large difference from the target adjacent region from being selected when the N value is much smaller than the M value. Therefore, any means other than the threshold may be used for the determination of R value as long as this condition is met. For example, a conceivable method is such that a value of 2×N is compared with the M value and the smaller is output as the R value, or such that if the R value determined by the threshold processing is larger than the value of 2×N, the R value is limited to the value of 2×N. The threshold may be encoded, instead of being preliminarily determined.

When the counter 282X receives the R value as the number of prediction adjacent regions as evaluation targets input via the line L281X, the counter 282X outputs a counter value P via a line L282aX and via a line L282bX to the reference image evaluator 283X and to the motion vector evaluator 284X while updating the counter value P from 1 to R at intervals of 1.

The reference image evaluator 283X is a part that selects N reference image numbers from R reference image numbers, while taking diversity thereof into consideration. When this reference image evaluator 283X receives the input of the P value via the line L282aX, it first acquires a reference image number for access to a prediction adjacent region with the P-th lowest SAD value with respect to the target adjacent region, via the line L202cX from the coordinate information memory 202X. After acquisition of the R reference image numbers, the reference image evaluator 283X checks the number of prediction adjacent regions included in each reference image in the search region, Ref[i] (i=1, 2, ..., F; i is a reference image number, and F is the number of reference images as search targets in the template matching unit 201X). Next, the reference image evaluator 283X defines as an initial value a reference image number i to which a prediction adjacent region with the lowest SAD value with respect to the target adjacent region belongs, and carries out the following operation.

1) It selects the reference image number i.
2) It reduces the value of the number of prediction adjacent regions Ref[i] one by one. A reference image number with the number of prediction adjacent regions Ref[i] being 0 is excluded from selection targets.
3) It increases the reference image number i by 1. When i reaches F, i is reset to 1.

This operation is circularly repeated until N reference images are selected. The selected N reference image numbers are output via a line L283X to the motion vector evaluator 284X.

Figure 58:
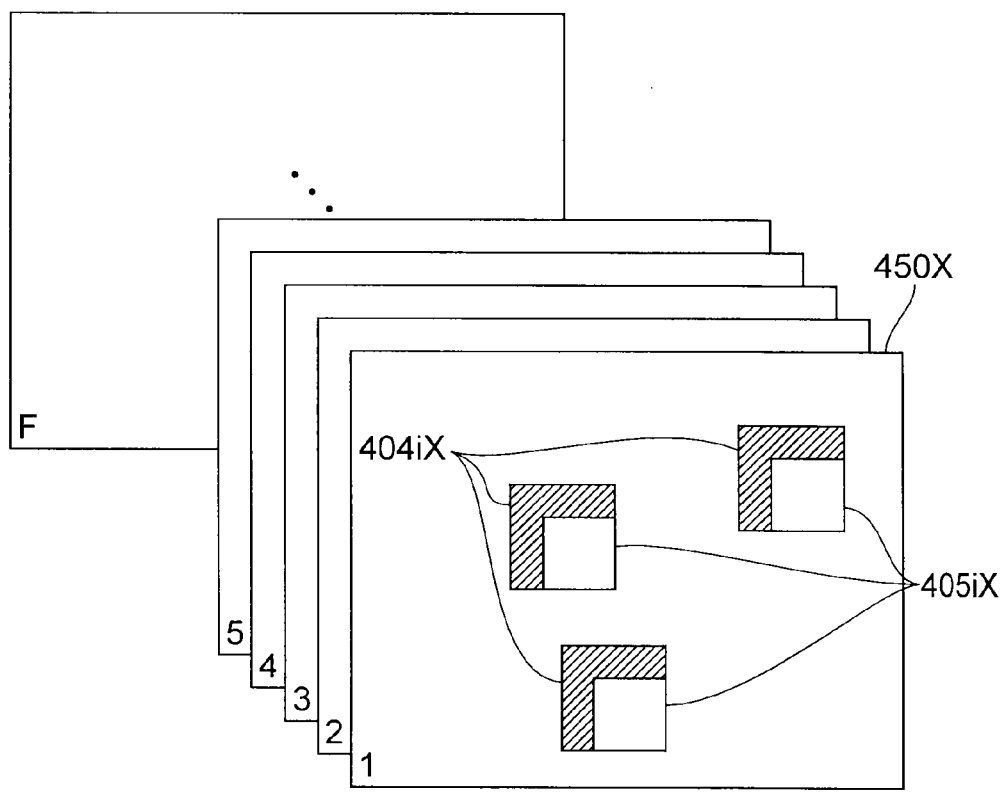
FIG. 58 is a conceptual diagram showing a processing concept of a reference image evaluator 283X.

For example, in a conceptual diagram of FIG. 58 showing a relation between reference image 450X and the number of prediction adjacent regions Ref[i], prediction adjacent regions are formed in each reference image. It shows that for the reference image number of 1, there are three prediction adjacent regions 404iX formed, and Ref[1]=3 in this case. The above operation of process 1)-process 3) is repeated to acquire high-ranking N reference image numbers as to the Ref[i] value.

Since it is sufficient for the reference image selection method to ensure the diversity of prediction adjacent regions, there are no restrictions on how to count up the identification number. For example, the reference images may be selected in consideration of a ratio Ref[i]/R of Ref[i] corresponding to the reference image number i. The reference images may be selected at a predetermined ratio in consideration of positions of the reference images (past, future, and present) relative to an encoding target image.

The motion vector evaluator 284X is a part that, with input of the N reference image numbers from the reference image evaluator 283X, selects N motion vectors from R motion vectors while taking diversity of motion vectors into consideration. The R motion vectors are those corresponding to the aforementioned R prediction adjacent regions. When the motion vector evaluator 284X receives the P value via the line L282bX, it acquires a reference image number for access to a prediction adjacent region with the P-th lowest SAD value with respect to the target adjacent region, and its motion vector information via the line L202cX. After acquisition of R motion vectors, the motion vector evaluator 284X checks a motion vector SMV[i] corresponding to a prediction adjacent region with the lowest SAD value with respect to the target adjacent region, in each reference image. Next, the motion vector evaluator 284X associates the motion vectors with the N reference image numbers input via the line L283X. Specifically, it performs the following operation.

4) It classifies the R motion vectors by the reference image numbers and calculates the number of motion vectors to be selected, NumMV[i], in each number.
5) It then selects SMV[i] of the reference image number i with NumMV[i] larger than 1.
6) Thereafter, it selects "NumMV[i]-1" motion vectors in decreasing order of the sum of absolute differences from SMV[i], for each reference image number i.

The motion vector evaluator 284X outputs information of N prediction adjacent regions corresponding to sets of motion vectors and reference image numbers selected as described above, as prediction adjacent region combination information via a line L237X to the prediction adjacent region extractor 232X.

FIG. 59 shows a processing concept of the processes 4) to 6) about motion vectors. Referring to FIG. 59, there are a plurality of prediction adjacent regions in each reference image and there are also motion vectors corresponding thereto. For example, in the example of FIG. 59, there are motion vectors MV1 and MV2 in the reference image number 1. In this case, NumMV[1]=2. For example, where the motion vector MV1 is smaller than MV2, the motion vector MV1 is selected as SMV[1]. Since the number of motion vectors NumMV[3]=0, the reference image number 3 is not selected in process 2) and the other reference image numbers 1, 2, 4, and 5 are selected.

Since it is sufficient for the selection method of motion vectors to ensure diversity, it is not limited to the above-described method. For example, it is also possible to adopt a method such that SMV[i] is updated by a motion vector of selected reference image i and a next selected motion vector is a motion vector with a large sum of absolute differences from the motion vector selected immediately before.

When the coordinate information (reference image number and motion vector) for access to each prediction adjacent region is used as shown in FIG. 51, it becomes feasible to select prediction adjacent regions with diversity in temporal and spatial directions. The above showed the combination setter 237X configured to select the N prediction adjacent regions from R prediction adjacent regions, but there is no need for selecting all the N regions using the coordinate information. For example, it is also conceivable to adopt a method of selecting prediction adjacent regions with lowest SAD values with respect to the target adjacent region by N/2, and in that case we can expect an effect of stabilizing prediction performance. It is also considered that the prediction performance can be stabilized by such means that a limit is set for the sum of absolute differences of each motion vector relative to SMV[i] and when the sum is larger than a predetermined threshold, the motion vector of interest is excluded from selection targets. The configuration in the combination setter 237X is not limited to that in FIG. 51. For example, where the R value is equal to the M value or where the R value is preliminarily set for the N value, the prediction adjacent region determiner 281X to determine the prediction adjacent regions as evaluation targets does not always have to be provided. In this case, the selection of prediction adjacent regions can be carried out using only the coordinate information, or motion parameters.

When the combination setter 237X capable of selecting a combination of prediction adjacent regions in consideration of diversity as shown in FIG. 51 is used in combination with the candidate prediction signal combination determiner 203bX (prediction signal generator 103aX), as shown in FIG. 50, capable of selecting the number of smoothed candidate prediction signals using the relation between the target adjacent region and the prediction adjacent regions as described above, it becomes feasible to carry out the operation of selecting the number of candidate prediction signals to be smoothed, while taking the spatial-temporal diversity into consideration. The configuration in the candidate prediction signal combination determiner 203bX is not limited to the configuration shown in FIG. 50. For example, the number-of-prediction-adjacent-regions setter 230X may be incorporated in the combination setter 237X.

Figure 52:
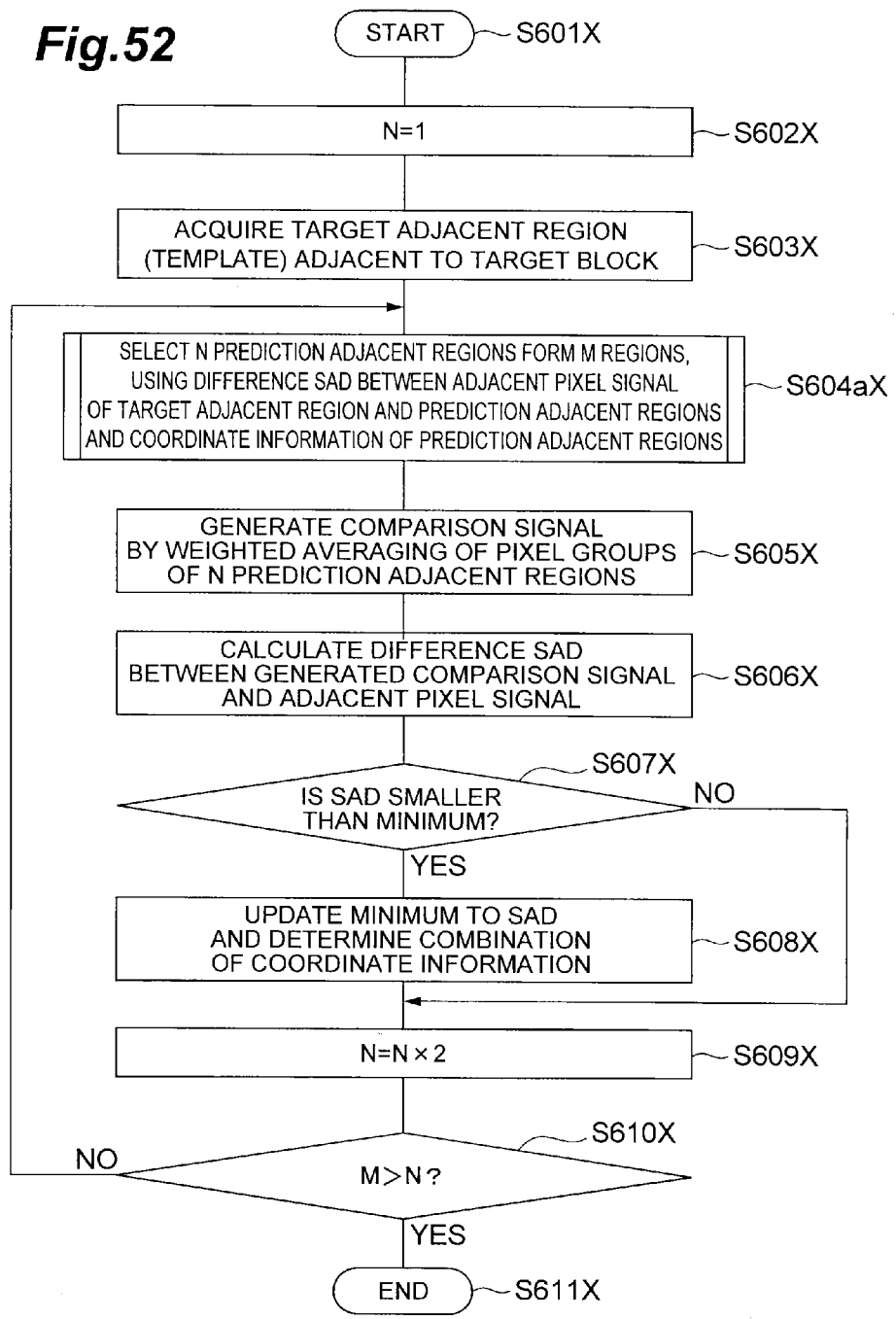
FIG. 52 is a flowchart showing an operation of the prediction signal generator 103aX using the combination setter 237X.

The below will describe a method of determining a combination of candidate prediction signals, which is the operation of the prediction signal generator 103aX shown in FIGS. 50 and 51. FIG. 52 is a flowchart showing the operation of the prediction signal generator 103aX using the combination setter 237X, which shows the method of determining a combination of candidate prediction signals for the purpose of providing the smoothed candidate prediction signals with diversity. In FIG. 52, different from FIG. 38, the number-of-prediction-adjacent-regions setter 230X carries out the process of setting the number N of candidate prediction signals (S602X, S609X).

First, the combination setter 237X of the combination determiner 203X sets the number N of candidate prediction signals to 1 (S602X). Then the target adjacent region extractor 233X acquires the target adjacent region (template signal) to the target block from the frame memory 104X(S603X).

On the other hand, the combination setter 237X selects N prediction adjacent regions using the coordinate information for access to the prediction adjacent regions (reference image numbers and motion vectors), and the SAD values between the target adjacent region and the prediction adjacent regions (S604aX). The subsequent processing is the same as in FIG. 38.

Specifically, the prediction adjacent region extractor 232X, weighting unit 234X, and adder 235X acquire pixel signals of the N prediction adjacent regions and generates the comparison signal by averaging (or, possibly, weighted averaging) (S605X), and the comparison-selection unit 236X calculates the SAD value being the difference between the generated comparison signal and the adjacent pixel signal (S606X). At the same time, the comparison-selection unit 236X compares the calculated SAD value with the current minimum SAD value (S607X); if the calculated SAD value is determined to be minimum, the processing flow goes to S608X; otherwise, the processing flow goes to S609X. If in S607X the calculated SAD value is equal to the current minimum SAD value, the processing flow goes to S609X, but the processing procedure may be configured to move to S608X.

When the calculated SAD value is smaller than the current minimum SAD, the comparison-selection unit 236X stores the combination of coordinate information acquired in S604X (S608X).

Then the combination setter 237X updates the N value to double (S609X). Then it compares the new N value with the M value (S610X); if the new N value is smaller than the M value, the flow returns to S604X; if the new N value is larger than the M value, the combination of coordinate information stored in S608X is determined as a combination of candidate prediction signals and the candidate prediction signal combination selecting process is then terminated (S611X).

Figure 53:
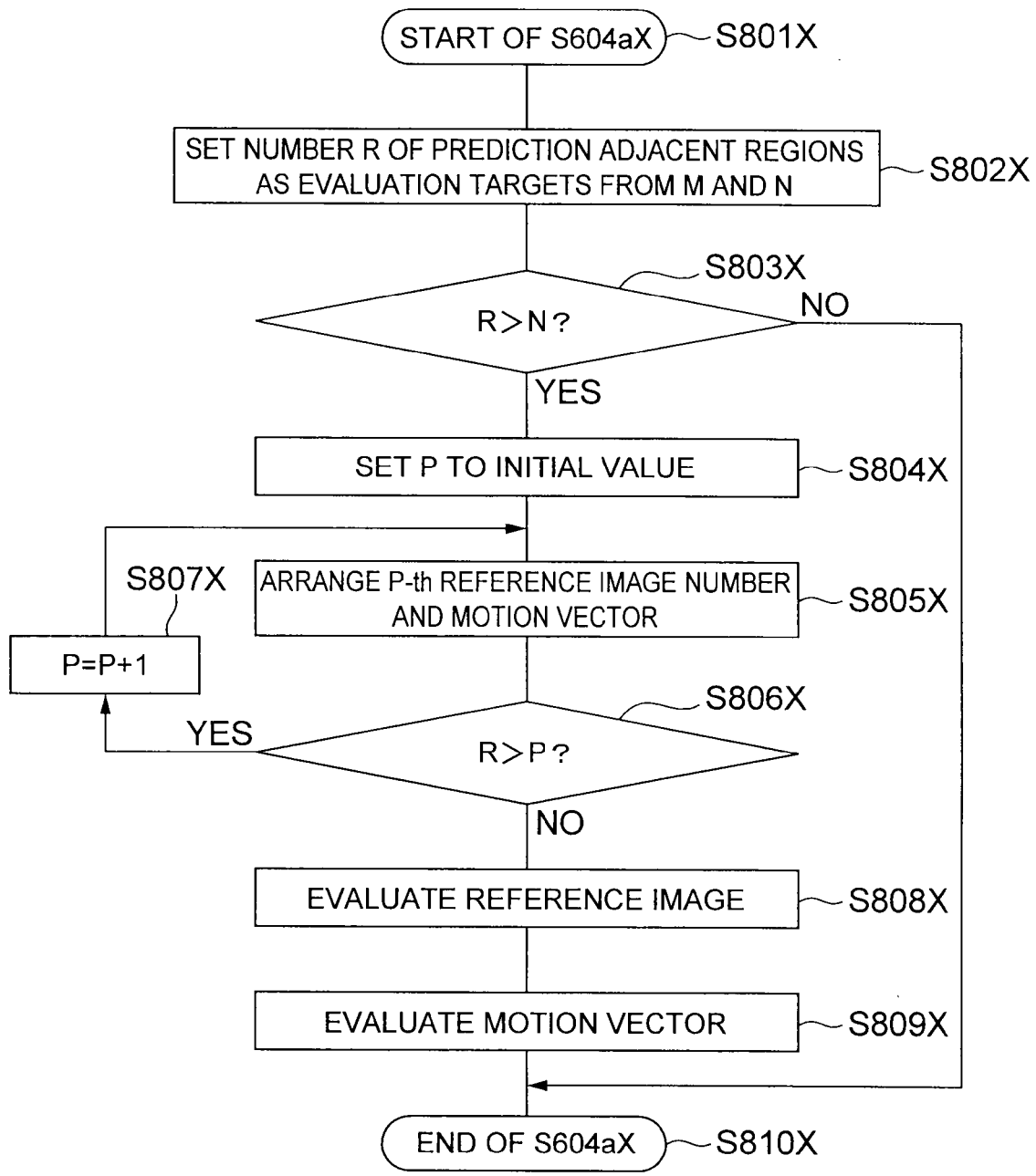
FIG. 53 is a flowchart showing an operation of the combination setter 237X in selecting N prediction adjacent regions using coordinate information of prediction adjacent regions.

The below will describe the detailed processing of the above-described process S604aX. FIG. 53 is a flowchart showing the operation of the combination setter 237X in selecting the N prediction adjacent regions using the coordinate information of prediction adjacent regions. In this processing, for the input value N, the N prediction adjacent regions are selected using the coordinate information of M prediction adjacent regions obtained by the search in the process of searching for candidate prediction signals by the template matching unit 201X (cf. FIG. 37).

The combination setter 237X in this embodiment is configured to select the combination consisting of N prediction adjacent regions using the coordinate information, i.e., the reference image numbers and motion vectors, but the data to be used in the selection is not limited to the reference image numbers and motion vectors. Any information that is associated with generation of each candidate prediction signal and that is uniquely determined using the prediction adjacent region may be included in the data to be used in the selection, and it is possible to adopt any information for access to the prediction adjacent region. For example, in a case where one prediction method is determined from a plurality of predetermined prediction methods using signals of prediction adjacent regions, the prediction method may be included in the data to be used in the selection.

First, the prediction adjacent region determiner 281X to determine the prediction adjacent regions as evaluation targets limits the number of prediction adjacent regions as targets to be selected, to R, prior to the selection of N prediction adjacent regions from the M prediction adjacent regions obtained by the search by the template matching unit 201X (S802X). This setting of R value is effective to preventing a prediction adjacent region with a large SAD value with respect to the target adjacent region from being selected when the N value is quite smaller than the M value. For this reason, any method other than the threshold may be used for the determination of R value as long as this condition is met. For example, a conceivable method is such that 2×N is compared with M and the smaller is output as R, or such that if R calculated by the threshold process is larger than 2×N, R is limited to 2×N. The threshold may be encoded, instead of being preliminarily determined.

Next, the prediction adjacent region determiner 281X to determine the prediction adjacent regions as evaluation targets compares the R value with the N value and when the R value is smaller than or equal to the N value, the selection of prediction adjacent regions is unnecessary and thus the selection process of prediction adjacent regions is terminated (S803X: NO). When the R value is larger than the N value, the counter 282X initializes the count value P (S804X). The reference image evaluator 283X and the motion vector evaluator 284X successively acquire from the coordinate information memory 202X, the reference image number to access to the prediction adjacent region with the P-th lowest SAD value with respect to the target adjacent region, and its motion vector (S805X). The P value is compared with the R value (S806X); if the P value is smaller than the R value (S806X: YES), 1 is added to the count value P (S807X) and the process of S805X is repeated.

When the P value reaches the R value (S805X: NO), the reference image evaluator 283X selects N reference image numbers from the R reference image numbers while taking the diversity thereof into consideration (S808X). Specifically, first, it checks the number of prediction adjacent regions in each reference image in the search region, Ref[i] (i=1, 2, . . . , F; i is the reference image number, and F the number of reference images as search targets by the template matching unit 201X), for targets of the R reference image numbers acquired. Then the reference image evaluator 283X carries out the below processing, using as an initial value the reference image number i to which the prediction adjacent region with the lowest SAD value with respect to the target adjacent region belongs.

1) It selects the reference image number i.
2) It reduces the value of the number of prediction adjacent regions Ref[i] one by one. A reference image number with Ref[i] being 0 is excluded from selection targets.
3) It increases the reference image number i by 1. When i reaches F, i is reset to 1.

This processing is circularly repeated until N reference images are selected. Since it is sufficient for the reference image selection method to ensure the diversity, there are no restrictions on how to count up the identification number. For example, the reference images may be selected in consideration of a ratio Ref[i]/R of the number of prediction adjacent regions Ref[i] corresponding to the reference image number i. The reference images may be selected at a predetermined ratio in consideration of positions of the reference images (past, future, and present) relative to an encoding target image.

Next, the motion vector evaluator 284X selects N motion vectors from R motion vectors while taking the diversity thereof into consideration (S809X). Specifically, first, the motion vector evaluator 284X checks the motion vector SMV [i] with the lowest SAD value with respect to the target adjacent region, in each reference image. Then the motion vector evaluator 284X associates motion vectors with the N reference image numbers selected in S808X. Specifically, the motion vector evaluator 284X carries out the following operation.

4) It classifies the R motion vectors by the reference image numbers and calculates the number of motion vectors to be selected, NumMV[i], in each number.
5) It then selects SMV[i] of the reference image number i with NumMV[i] larger than 1.
6) Thereafter, it selects "NumMV[i]-1" motion vectors in decreasing order of the sum of absolute differences from SMV[i], for each reference image number i. Since it is sufficient for the selection method of motion vectors to ensure diversity, it is not limited to the above-described method. For example, it is also possible to adopt a method such that SMV[i] is updated by a motion vector of the selected reference image i and a next selected motion vector is a motion vector with a large sum of absolute differences from the motion vector selected immediately before.

When the motion parameter for access to each prediction adjacent region is used in addition to the difference data between the target adjacent region and the plurality of prediction adjacent regions as described above, it becomes feasible to select the prediction adjacent regions with diversity in spatial and temporal directions. The above showed the selection of N prediction adjacent regions from R regions, but all the N regions do not have to be selected using the motion parameters. For example, the effect of stabilizing the prediction performance can be expected by a method of selecting prediction adjacent regions with lowest SAD value with respect to the target adjacent region by N/2. The effect of stabilizing the prediction performance can also be expected by a method of limiting the sum of absolute differences of each motion vector relative to SMV[i] and excluding one with the sum larger than a predetermined threshold from selection targets. When the R value is equal to the M value or when the R value is preliminarily set for the N value, the process S803X is unnecessary and in this case, the process of selecting the prediction adjacent regions can be carried out using only the coordinate information, or the motion parameters.

When the "process of selecting the combination of prediction adjacent regions in consideration of diversity" shown in FIG. 53 is used in combination with the "process of selecting the number of candidate prediction signals to be subjected to smoothing, using the relation between the target adjacent region and the prediction adjacent regions" shown in FIG. 52, it becomes feasible to carry out the process of selecting the number of candidate prediction signals to be subjected to smoothing, while taking spatial and temporal diversity into consideration.

Figure 60:
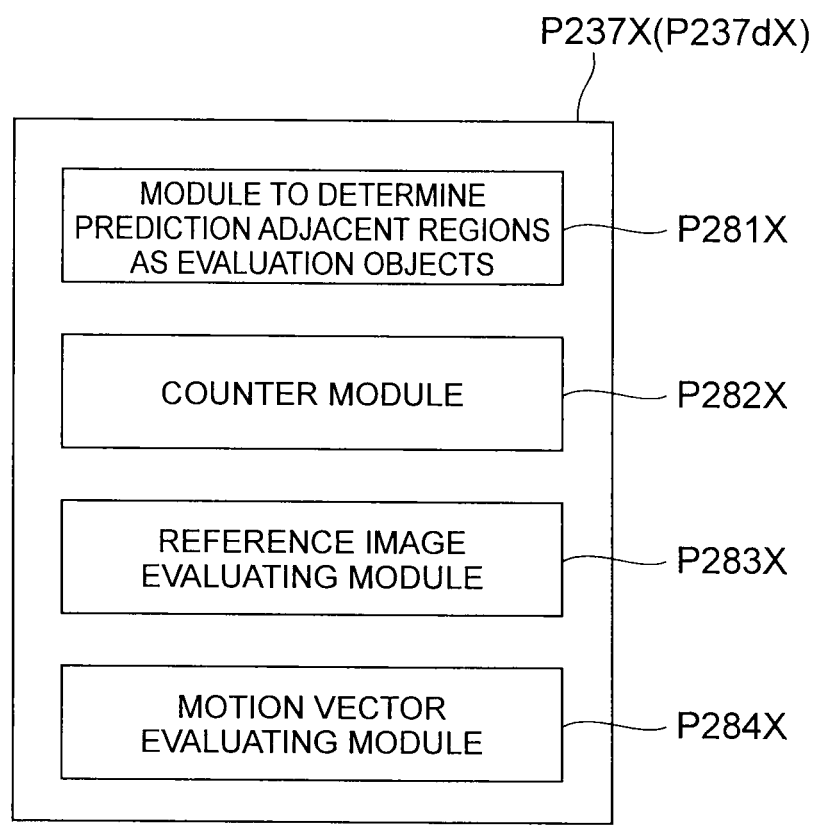
FIG. 60 is a block diagram showing a module configuration of a combination setting module P237X.

The image predictive encoding method and the image predictive decoding method in the present embodiment can be provided in the form of a program as stored in a recording medium. Examples of such recording media include recording media such as a floppy disk (registered trademark), CD-ROM, DVD, or ROM, or semiconductor memories. Specific module configurations thereof are as shown in FIGS. 43, 44, and 45. The function of the prediction signal generating module 103X corresponds to the aforementioned prediction signal generator 103aX herein. A combination setting module corresponding to the combination setter 237X is as shown in FIG. 60. FIG. 60 is a block diagram showing a module configuration of the combination setting module P237X. This combination setting module P237X is composed of a prediction adjacent region determining module P281X to determine the prediction adjacent regions as evaluation targets, a counter module P282X, a reference image evaluating module P283X, and a motion vector evaluating module P284X. These modules have respective functions equivalent to those of the prediction adjacent region determiner 281X to determine the prediction adjacent regions as evaluation targets, the counter 282X, the reference image evaluator 283X, and the motion vector evaluator 284X in the combination setter 237X shown in FIG. 51.

The image predictive encoding program P100X or the image predictive decoding program P300X configured as described above is stored in a recording medium 10 and executed in the aforementioned computer shown in FIGS. 48 and 49.

The below will describe the action and effect of the image predictive encoding device 100X and the image predictive decoding device 300X in the sixth embodiment.

The image predictive encoding device 100X of the sixth embodiment is provided with the block divider 102X for dividing an input image into a plurality of regions, the prediction signal generator 103X for generating the prediction signal for the target pixel signal of the target region being a processing target out of the plurality of regions obtained by the division, the subtracter 106X functioning as the residual signal generating means for generating the residual signal between the generated prediction signal and the target pixel signal, and the transformer 106X, quantizer 107X, and entropy encoder 111X for encoding the generated residual signal.

In the prediction signal generator 103aX, the template matching unit 201X searches the search regions 401X, 417X of previously-reproduced images for a plurality of prediction adjacent regions 404aX-414cX highly correlated to the target adjacent region 403X consisting of the previously-reproduced adjacent pixel signal adjacent to the target region 402X consisting of the target pixel signal. Then the combination setter 237X generates at least two combinations of prediction adjacent regions including the different numbers of prediction adjacent regions, using the coordinate information indicating at least the positions of the prediction adjacent regions.

The prediction adjacent region extractor 232X, weighting unit 234X, and adder 235X process the pixel signals of the prediction adjacent regions belonging to the combinations, by the predetermined synthesis method to generate respective comparison signals to the adjacent pixel signal. The comparison-selection unit 236X selects a combination of prediction adjacent regions with a high correlation between the comparison signal and the adjacent pixel signal and outputs it to the prediction region extractor 204X.

The prediction region extractor 204X generates at least one candidate prediction signal for the target pixel signal, based on the prediction adjacent regions belonging to the selected combination, and the weighting unit 205X and adder 206X process the candidate prediction signal by the predetermined synthesis method to generate the prediction signal.

This enables the device to provide the candidate prediction signals to be subjected to smoothing, with diversity, whereby the prediction signal can be generated with efficient consideration to local noise characteristics. Therefore, the encoded data can be efficiently generated.

The image predictive decoding device 300X of the sixth embodiment is provided with the entropy decoder 302X for decoding the encoded data of the residual signal concerning the target region as a processing target in the compressed data, the inverse quantizer 303X and inverse transformer 304X for restoring the reproduced residual signal from the signal obtained by the decoding, the prediction signal generator 308X for generating the prediction signal for the target pixel signal of the target region, and the adder 305X for adding the generated prediction signal to the restored reproduced residual signal to generate the reproduced image signal.

The prediction signal generator 103aX searches the search regions 401X, 417X of previously-reproduced images for a plurality of prediction adjacent regions 404aX-414cX highly correlated to the target adjacent region 403X consisting of the previously-reproduced adjacent pixel signal adjacent to the target region 401X consisting of the target pixel signal. Then the combination setter 237X generates at least two combinations of prediction adjacent regions including the different numbers of prediction adjacent regions, using the coordinate information indicating at least the positions of the prediction adjacent regions.

The prediction adjacent region extractor 232X, weighting unit 234X, and adder 235X process the pixel signals of the prediction adjacent regions belonging to the combinations, by the predetermined synthesis method to generate respective comparison signals to the adjacent pixel signal. The comparison-selection unit 236X selects a combination of prediction adjacent regions with a high correlation between the comparison signal and the adjacent pixel signal and outputs it to the prediction region extractor 204X.

The prediction region extractor 204X generates at least one candidate prediction signal for the target pixel signal, based on the prediction adjacent regions belonging to the selected combination, and the weighting unit 205X and adder 206X process the candidate prediction signal by the predetermined synthesis method to generate the prediction signal.

This enables the device to provide the candidate prediction signals to be subjected to smoothing, with diversity and the prediction signal can be generated with efficient consideration to local noise characteristics. Therefore, the encoded data resulting from encoding can be efficiently decoded.

<Seventh Embodiment>

In FIGS. 50 to 53, as described above, the "process of selecting the combination of prediction adjacent regions in consideration of diversity" was used in combination with the "process of selecting the number of candidate prediction signals to be subjected to smoothing, using the relation between the target adjacent region and the prediction adjacent regions." However, the "process of selecting the combination of prediction adjacent regions in consideration of diversity" is also effective even if it is used without being combined with the "process of selecting the number of candidate prediction signals to be subjected to smoothing, using the relation between the target adjacent region and the prediction adjacent regions." An embodiment thereof will be described below.

In the present embodiment, after the number FN of candidate prediction signals to be subjected to smoothing is set, the combination of candidate prediction signals can be determined by making use of the "process of selecting the combination of prediction adjacent regions in consideration of diversity." Specifically, the operation of the combination setter 237X shown in FIG. 51 and the processing of the process S604aX shown in FIG. 53 are carried out only for the determined number FN, and the combination setter 237X selects FN prediction adjacent regions from the M prediction adjacent regions. Then the weighted averaging process of FN candidate prediction signals is carried out based on the combination of FN prediction adjacent regions thus selected.

Figure 54:
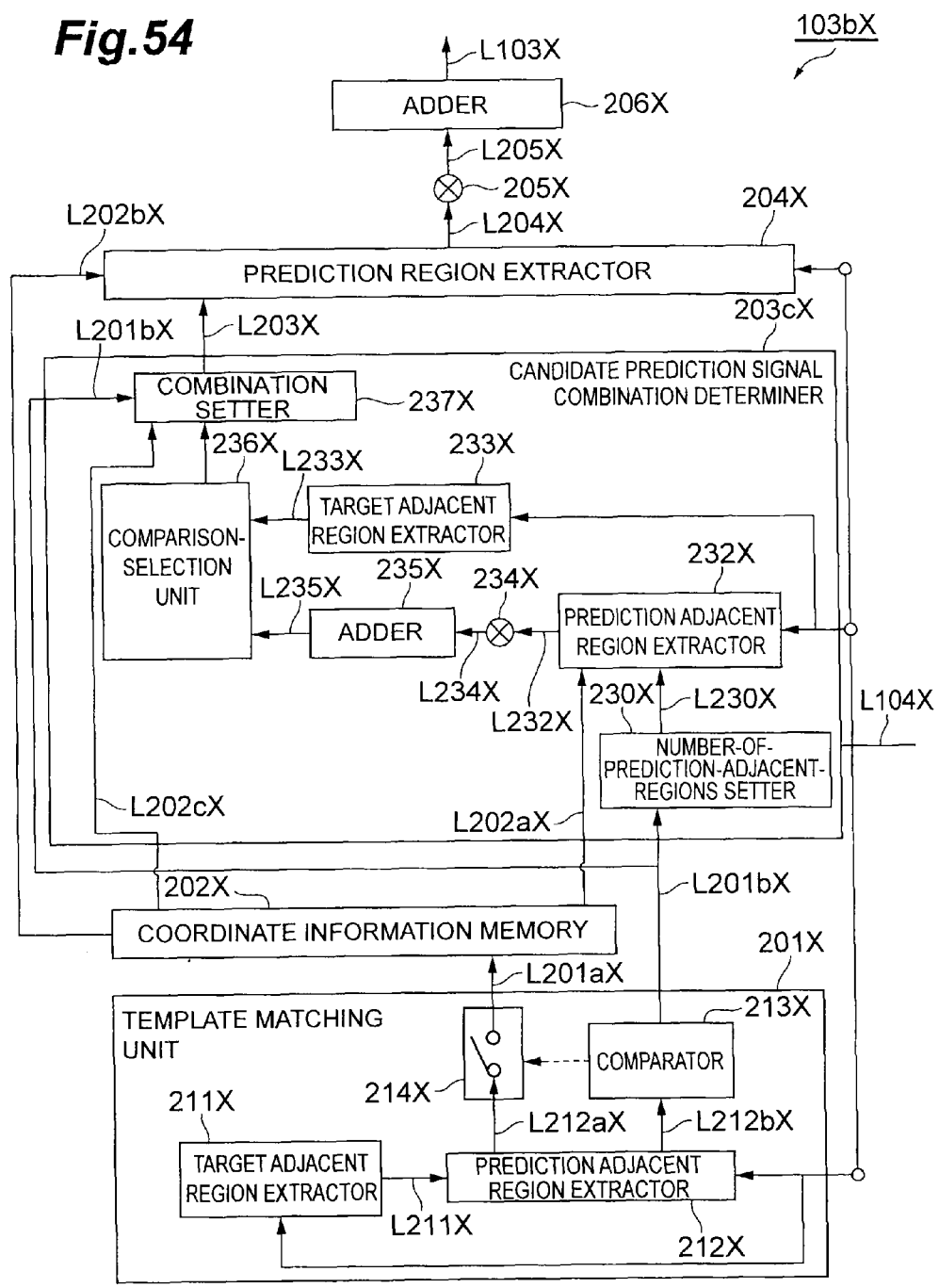
FIG. 54 is a block diagram showing a configuration of a prediction signal generator 103bX including a candidate prediction signal combination setter 237X, which is the seventh embodiment.
Figure 55:
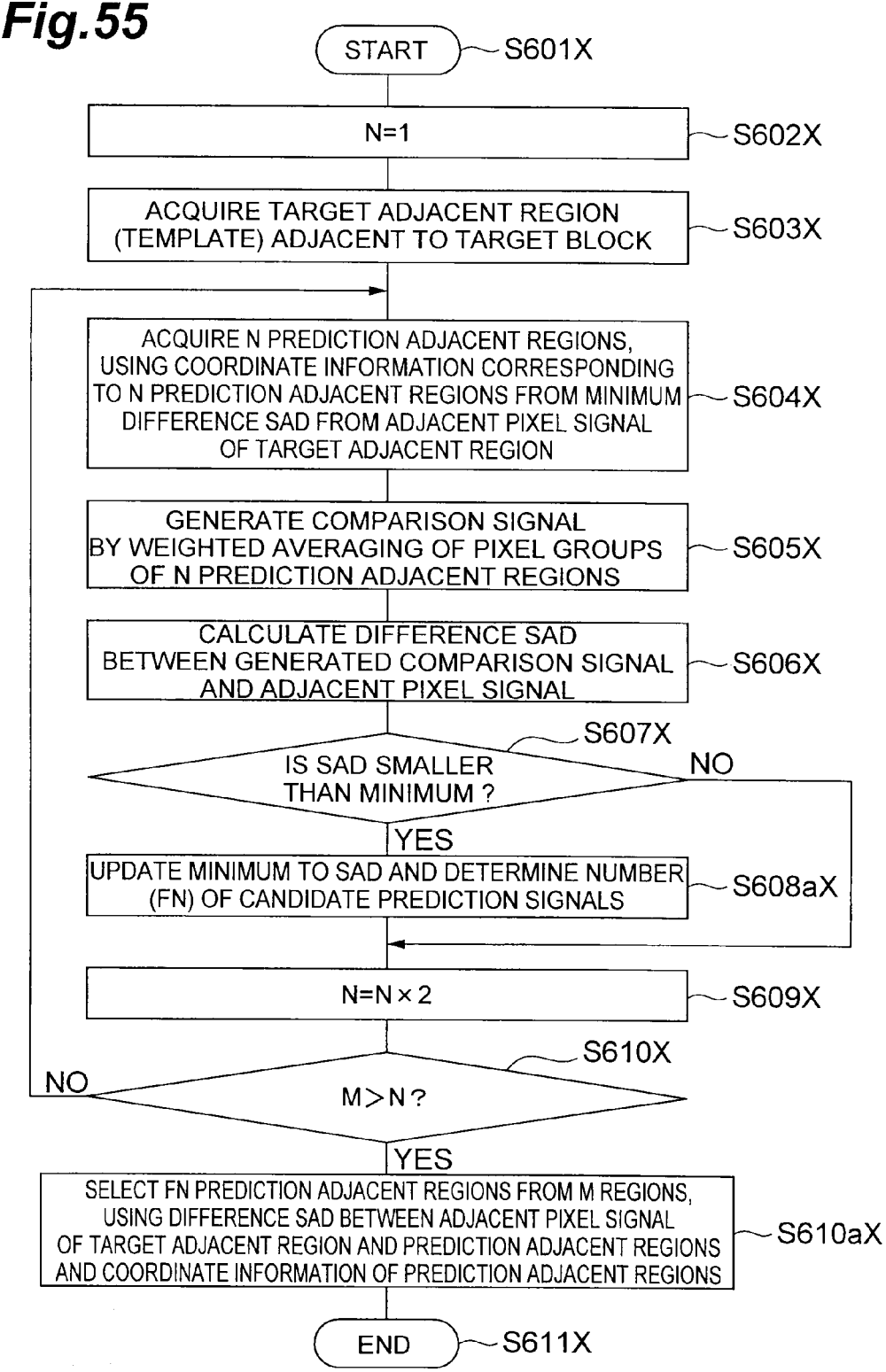
FIG. 55 is a flowchart showing a process of selecting prediction adjacent regions by the prediction signal generator 103bX according to the seventh embodiment.

FIGS. 54 and 55 show an embodiment of the case where the number of candidate prediction signals to be subjected to smoothing is selected using the relation between the target adjacent region and the prediction adjacent regions. The below will describe the difference between the prediction signal generator 103aX in the sixth embodiment and the prediction signal generator 103bX in the present embodiment. It is a matter of course that the prediction signal generator 103bX of the present embodiment can be applied to the image predictive encoding device 100X and the image predictive decoding device 300X described in the fifth embodiment.

FIG. 54 is a block diagram showing a configuration of the prediction signal generator 103bX including the candidate prediction signal combination setter 237X, which is the seventh embodiment. In the candidate prediction signal combination determiner 203cX in FIG. 54, different from the candidate prediction signal combination determiner 203bX in FIG. 50, the number-of-prediction-adjacent-regions setter 230X feeds a plurality of different N values (N prediction adjacent regions) directly to the prediction adjacent region extractor 232X, without passing them through the combination setter 237X.

As described with FIG. 34, the number-of-prediction-adjacent-regions setter 230X outputs the N values to the prediction adjacent region extractor 232X with change in N value (or change in power N of 2 smaller than the M value), and the prediction adjacent region extractor 232X, weighting unit 234X, and adder 235X perform the weighted averaging of N prediction adjacent regions with lowest SAD values with respect to the target adjacent region using the plurality of N values (N prediction adjacent regions), to generate a plurality of comparison signals for respective combinations of N prediction adjacent regions. The comparison-selection unit 236X compares the plurality of comparison signals for the different N values with the target adjacent region, determines the N value with the lowest difference as the FN value, and outputs it to the combination setter 237X. The comparison-selection unit 236X performs the above-described processing while changing the N value until it exceeds the M value, and thereby updates the minimum SAD value.

The combination setter 237X selects FN prediction adjacent regions from the M prediction adjacent regions, using the determined FN value, the M SAD values input via the line L201bX, and the coordinate information of the prediction adjacent regions input via the line L202cX. Specifically, the combination setter 237X counts the number of SAD values smaller than a threshold preliminarily determined corresponding to the FN value, and selects FN prediction adjacent regions on the basis of the counted value. The detailed processing thereof is as shown in FIG. 51.

Then the combination setter 237X outputs the combination of prediction adjacent regions as the combination information of candidate prediction signals via the line L203X to the prediction region extractor 204X. The operation in the combination setter 237X is as described above with FIG. 51.

Then the prediction region extractor 204X acquires the coordinate information of the candidate prediction signals belonging to the combination, via the line L202bX in accordance with the combination information of candidate prediction signals input via the line L203X. Then the prediction region extractor 204X acquires the candidate prediction signals corresponding to the acquired coordinate information via the line L104X from the frame memory 104X and outputs them to the weighting unit 205X on demand. The weighting unit 205X multiplies the candidate prediction signals input via the line L204X, by respective weighting factors and outputs the weighted signals via the line L205X to the adder 206X. The adder 206X successively adds up the weighted candidate prediction signals and outputs the sum as a prediction signal via the line L103X to the subtracter 105X in FIG. 33.

FIG. 55 is a flowchart showing the processing of selection of the prediction adjacent regions by the prediction signal generator 103bX, which is the seventh embodiment. In this method, similar to the processing shown in FIG. 38, the number-of-prediction-adjacent-regions setter 230X sets the number N of candidate prediction signals to 1 (S602X), the target adjacent region extractor 233X acquires the target adjacent region (template signal) to the target block from the frame memory 104X(S603X), and the prediction adjacent region extractor 232X acquires the N prediction adjacent regions belonging to the combination set by the number-of-prediction-adjacent-regions setter 230X, via the line L104X (S604X).

Thereafter, the prediction adjacent region extractor 232X, weighting unit 234X, and adder 235X perform averaging (or, possibly, weighted averaging) of the pixel signals of the N prediction adjacent regions to generate the comparison signal (S605X) and the comparison-selection unit 236X calculates the SAD value being the difference between the generated comparison signal and the adjacent pixel signal (S606X). At the same time, the comparison-selection unit 236X compares the calculated SAD value with the current minimum SAD value (S607X); if the calculated SAD value is determined to be minimum, the processing flow goes to S608aX; otherwise, the processing flow goes to S609X. If in S607X the calculated SAD value is equal to the current minimum SAD value, the processing flow goes to 5609X, but the processing flow may be configured to move to S608aX.

When the comparison-selection unit 236X determines that the SAD value calculated in S606X is smaller than the minimum of SAD values calculated before, the minimum is updated to the newly calculated SAD value and the N value at that time is determined as the number FN of candidate prediction signals (S608aX).

Then the N value is updated to double (S609X); if the new N value is smaller than the M value, the flow returns to S604X; if the new N value is larger than the M value, the combination of coordinate information determined in S608aX is determined as a combination of candidate prediction signals. Then the combination setter 237X selects FN prediction adjacent regions from the M prediction adjacent regions, using the coordinate information (reference image numbers and motion vectors) for access to the prediction adjacent regions, and the SAD values between the target adjacent region and the prediction adjacent regions, and defines reproduced signals of the FN prediction adjacent regions as candidate prediction signals for the target region (S610aX). This processing of S610aX is the same as S604aX (cf. FIG. 53) and thus the description thereof is omitted herein.

The image predictive encoding method and the image predictive decoding method in the present embodiment can be provided in the form of a program as stored in a recording medium. Examples of such recording media include recording media such as a floppy disk (registered trademark), CD-ROM, DVD, or ROM, or semiconductor memories. Specific module configurations thereof are as shown in FIGS. 43, 44, 45, and 60. The function of the prediction signal generating module 103X corresponds to the aforementioned prediction signal generator 103bX. The image predictive encoding program P100X or the image predictive decoding program P300X configured as described above is stored in a recording medium 10X and executed in the aforementioned computer shown in FIGS. 48 and 49.

The below will describe the action and effect of the image predictive encoding device 100X and the image predictive decoding device 300X in the seventh embodiment.

The image predictive encoding device 100X of the seventh embodiment is provided with the block divider 102X for dividing an input image into a plurality of regions, the prediction signal generator 103X for generating the prediction signal for the target pixel signal of the target region being a processing target out of the plurality of regions obtained by the division, the subtracter 106X functioning as the residual signal generating means for generating the residual signal between the generated prediction signal and the target pixel signal, and the transformer 106X, quantizer 107X, and entropy encoder 111X for encoding the generated residual signal.

In the prediction signal generator 103X, the template matching unit 201X searches the search regions 401X, 411X of previously-reproduced images for a plurality of prediction adjacent regions 404aX-414cX highly correlated to the target adjacent region 403X consisting of the previously-reproduced adjacent pixel signal adjacent to the target region 402X consisting of the target pixel signal.

On the other hand, the number-of-prediction-adjacent-regions setter 230X sets the number N of prediction adjacent regions to be selected.

Then the combination setter 237X selects the prediction adjacent regions by the set number from the search regions, using the coordinate information indicating at least the positions of the prediction adjacent regions. The prediction region extractor 204X generates the set number of candidate prediction signals for the target pixel signal on the basis of the selected prediction adjacent regions and the weighting unit 205X and adder 206X process the candidate prediction signals by the predetermined synthesis method to generate the prediction signal.

In the present embodiment, the prediction adjacent region extractor 232X, weighting unit 234X, and adder 235X generate the comparison signal, based on the number N of prediction adjacent regions set by the prediction adjacent region 230X. The value of N is changed according to circumstances and input into the prediction adjacent region extractor 232X, and comparison signals are generated according to N values. Based on the comparison signals, the comparison-selection unit 236X selects a comparison signal with the lowest SAD value with respect to the pixel signal of the target adjacent region and the N value for specifying the N prediction adjacent regions as a basis of the selected comparison signal is output to the combination setter 237X.

This enables the device to provide the candidate prediction signals to be subjected to smoothing, with diversity, and the prediction signal can be generated with efficient consideration to local noise characteristics. Therefore, the encoded data can be efficiently generated.

The image predictive decoding device 300X of the seventh embodiment is provided with the entropy decoder 302X for decoding the encoded data of the residual signal concerning the target region as a processing target in the compressed data, the inverse quantizer 303X and inverse transformer 304X for restoring the reproduced residual signal from the signal obtained by the decoding, the prediction signal generator 308X for generating the prediction signal for the target pixel signal of the target region, and the adder 305X for adding the generated prediction signal to the restored reproduced residual signal to generate the reproduced image signal.

In the prediction signal generator 103X, the template matching unit 201X searches the search regions 401X, 411X of previously-reproduced images for a plurality of prediction adjacent regions 404$a$X-414$c$X highly correlated to the target adjacent region 403X consisting of the previously-reproduced adjacent pixel signal adjacent to the target region 402X consisting of the target pixel signal.

On the other hand, the number-of-prediction-adjacent-regions setter 230X sets the number N of prediction adjacent regions to be selected.

Then the combination setter 237X selects the prediction adjacent regions by the set number from the search regions, using the coordinate information indicating at least the positions of the prediction adjacent regions. The prediction region extractor 204X generates the set number of candidate prediction signals for the target pixel signal on the basis of the selected prediction adjacent regions and the weighting unit 205X and adder 206X process the candidate prediction signals by the predetermined synthesis method to generate the prediction signal.

In the seventh embodiment, the prediction adjacent region extractor 232X, weighting unit 234X, and adder 235X generate the comparison signal, based on the number N of prediction adjacent regions set by the prediction adjacent region 230X. The value of N is changed according to circumstances and input into the prediction adjacent region extractor 232X, and comparison signals are generated according to N values. Based on the comparison signals, the comparison-selection unit 236X selects a comparison signal with the lowest SAD value with respect to the pixel signal of the target adjacent region and the N value for specifying the N prediction adjacent regions as a basis of the selected comparison signal is output to the combination setter 237X.

This enables the device to provide the candidate prediction signals to be subjected to smoothing, with diversity, and the prediction signal can be generated with efficient consideration to local noise characteristics. Therefore, the encoded data resulting from encoding can be efficiently decoded using this prediction signal.

<Eighth Embodiment>

Figure 56:
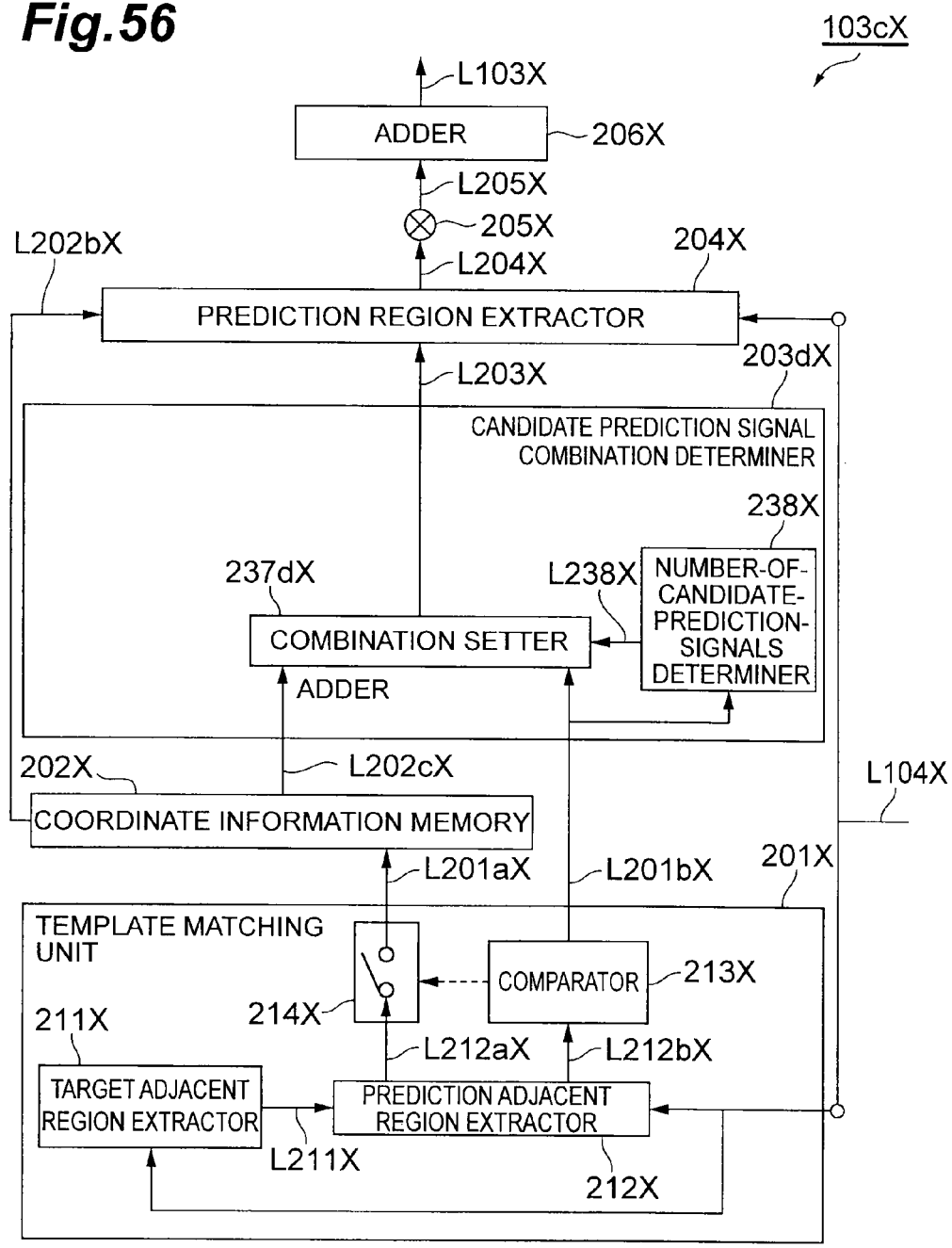
FIG. 56 is a block diagram showing a configuration of a candidate prediction signal combination determiner being the eighth embodiment.

FIG. 56 is a block diagram showing a configuration of the candidate prediction signal combination determiner as the eighth embodiment. This eighth embodiment is an embodiment where the number of candidate prediction signals to be subjected to smoothing is determined by a threshold process using SAD values between the target adjacent region and prediction adjacent regions. The prediction signal generator 103$c$X in this eighth embodiment is different in the candidate prediction signal combination determiner 203$d$X from the other prediction signal generator 103X, 103$a$X, or 103$b$X. The candidate prediction signal combination determiner 203$d$X which is the difference will be described below.

The candidate prediction signal combination determiner 203$d$X in FIG. 56 is constructed with a number-of-candidate-prediction-signals determiner 238X and a combination setter 237$d$X.

The number-of-candidate-prediction-signals determiner 238X receives input of M SAD values between the target adjacent region and each of M prediction adjacent regions via the line L201$b$X and calculates the number of SAD values smaller than a predetermined threshold. Then it defines the number of SAD values smaller than the threshold, as a number FN of candidate prediction signals to be subjected to smoothing, and outputs it to the combination setter 237$d$X.

The combination setter 237$d$X has the configuration shown in FIG. 51, and is configured to select FN prediction adjacent regions from the M prediction adjacent regions, using the coordinate information of the prediction adjacent regions, and to output the combination of prediction adjacent regions as combination information of candidate prediction signals via L203X to the prediction region extractor 204X. More specifically, this combination setter 237$d$X performs such processing that when the FN value is determined to be smaller than the M value, the combination setter 237$d$X selects FN prediction adjacent regions from the M prediction adjacent regions, using the coordinate information of the prediction adjacent regions, and defines reproduced signals of FN prediction regions adjacent thereto, as candidate prediction signals for the target region. When the FN value is equal to the M value, the selection process is not carried out and the combination of FN prediction adjacent regions is output.

Figure 57:
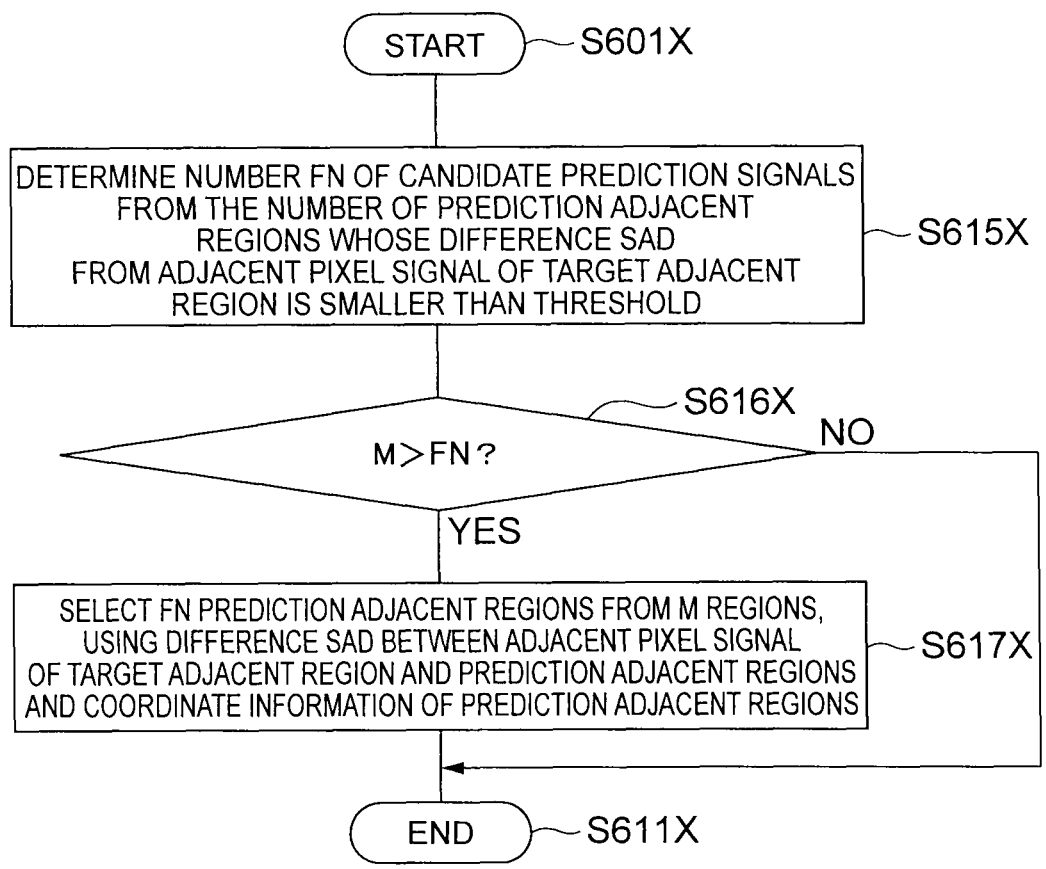
FIG. 57 is a flowchart showing an operation of a candidate prediction signal combination determiner 203dX.

The below will describe the operation of the candidate prediction signal combination determiner 203$d$X. FIG. 57 is a flowchart showing the operation of the candidate prediction signal combination determiner 203$d$X.

The number-of-candidate-prediction-signals determiner 238X compares the SAD values between the target adjacent region and each of the M prediction adjacent regions with the predetermined threshold and determines the number of SAD values smaller than the threshold, as the number FN of candidate prediction signals to be subjected to smoothing (S615X). Then the combination setter 237X compares the FN value with the M value (S616X). When the combination setter 237X determines that the FN value is smaller than the M value, FN prediction adjacent regions are selected from the M prediction adjacent regions, using the coordinate information of the prediction adjacent regions, and reproduced signals of FN prediction regions adjacent thereto are defined as candidate prediction signals for the target region (S617X).

The process S617X herein is the same as the process S610$a$X in FIG. 55. When the FN value is equal to the M value (S616X: NO), the selection process is not carried out and the combination of M prediction adjacent regions is output to the prediction region extractor 204X as it is; then the processing in the number-of-candidate-prediction-signals determiner 238X is terminated.

As described above with FIGS. 50 to 57, the "operation and processing to generate the combination of prediction adjacent regions with diversity in spatial and temporal directions, using the coordinate information and motion parameters" is applicable to all devices and methods for selecting the designated number of candidate prediction signals or combinations of prediction adjacent regions.

Furthermore, the above showed the method of individually evaluating N reference frames and N motion vectors and performing the selection, but the present invention is not limited to this evaluation method. The P-th prediction adjacent signal may be simultaneously evaluated using an evaluation function like the sum of absolute differences of $\lambda$*("P−1"th selected reference image number—reference image number of an evaluation target)+("P−1"th selected motion vector—motion vector of an evaluation target) (where $\lambda$ is a conversion factor).

Furthermore, since the output data from the combination setter 231X in FIG. 34 and the output data from the candidate prediction signal combination determiners shown in FIGS. 50, 54, and 56 both are the combination information of prediction adjacent regions, the combination setter 231X in FIG. 34 can be configured so as to include the functions in FIGS. 50, 54, and 56. Namely, it is possible to adopt a configuration wherein the combination setter 231X in FIG. 34 and the combination setter 237X(237dX) in FIGS. 50, 54, and 56 generate information of at least two combinations of prediction adjacent regions to be output and wherein the candidate prediction signal combination determiner 203X in FIG. 34 selects one of them.

The image predictive encoding method and the image predictive decoding method in the present embodiment can be provided in the form of a program as stored in a recording medium. Examples of such recording media include recording media such as a floppy disk (registered trademark), CD-ROM, DVD, or ROM, or semiconductor memories. Specific module configurations thereof are as shown in FIGS. 43, 44, 45, and 60. The function of the prediction signal generating module 103X corresponds to the aforementioned prediction signal generator 103cX herein. The image predictive encoding program P100X or the image predictive decoding program P300X configured as described above is stored in a recording medium 10X and executed in the aforementioned computer shown in FIGS. 48 and 49.

The below will describe the action and effect of the image predictive encoding device 100X and the image predictive decoding device 300X in the eighth embodiment. The image predictive encoding device 100X of the eighth embodiment is provided with the block divider 102X for dividing an input image into a plurality of regions, the prediction signal generator 103X for generating the prediction signal for the target pixel signal of the target region being a processing target out of the plurality of regions obtained by the division, the subtracter 106X functioning as the residual signal generating means for generating the residual signal between the generated prediction signal and the target pixel signal, and the transformer 106X, quantizer 107X, and entropy encoder 111X for encoding the generated residual signal.

In the prediction signal generator 103cX, the template matching unit 201X searches the search regions 401X and 417X of previously-reproduced images for a plurality of prediction adjacent regions 404aX-414cX highly correlated to the target adjacent region 403X consisting of the previously-reproduced adjacent pixel signal adjacent to the target region 402X consisting of the target pixel signal. Then the combination setter 237X selects at least one prediction adjacent region from the plurality of prediction adjacent regions obtained by the search, using the coordinate information indicating at least the positions of the prediction adjacent regions, e.g., the reference image numbers and motion vectors.

The prediction region extractor 204X generates at least one candidate prediction signal for the target pixel signal, based on the selected prediction adjacent region, and the weighting unit 205X and adder 206X process the candidate prediction signal by the predetermined synthesis method to generate the prediction signal.

In the eighth embodiment, the number-of-candidate-prediction-signals determiner 238X sets the number N of prediction adjacent regions and the combination setter 237X selects the set number of prediction adjacent regions.

This enables the device to provide the candidate prediction signals to be subjected to smoothing, with diversity, and the prediction signal can be generated with efficient consideration to local noise characteristics. Therefore, the encoded data can be efficiently generated.

The image predictive decoding device 300X of the eighth embodiment is provided with the entropy decoder 302X for decoding the encoded data of the residual signal concerning the target region as a processing target in the compressed data, the inverse quantizer 303X and inverse transformer 304X for restoring the reproduced residual signal from the signal obtained by the decoding, the prediction signal generator 308X for generating the prediction signal for the target pixel signal of the target region, and the adder 305X for adding the generated prediction signal to the restored reproduced residual signal to generate the reproduced image signal.

In the prediction signal generator 103X, the template matching unit 201X searches the search regions 401X and 417X of previously-reproduced images for a plurality of prediction adjacent regions 404aX-414cX highly correlated to the target adjacent region 403X consisting of the previously-reproduced adjacent pixel signal adjacent to the target region 402X consisting of the target pixel signal. Then the combination setter 237X selects at least one prediction adjacent region from the plurality of prediction adjacent regions obtained by the search, using the coordinate information indicating at least the positions of the prediction adjacent regions, e.g., the reference image numbers and motion vectors.

The prediction region extractor 204X generates at least one candidate prediction signal for the target pixel signal, based on the selected prediction adjacent region, and the weighting unit 205X and adder 206X process the candidate prediction signal by the predetermined synthesis method to generate the prediction signal.

This enables the device to provide the candidate prediction signals to be subjected to smoothing, with diversity, and the prediction signal can be generated with efficient consideration to local noise characteristics. Therefore, the encoded data resulting from encoding can be efficiently decoded using this prediction signal.

The invention claimed is:

1. An image predictive encoding device comprising:
  circuitry configured to:
    divide an input image into a plurality of regions;
    generate a prediction signal for a target pixel signal of a target region being a processing target out of the plurality of regions resulting from the dividing;
    generate a residual signal between the target pixel signal and the prediction signal; and
    encode the residual signal, wherein:
    the generating of the prediction signal includes:
      searching a search region comprising a previously-reproduced image, for a plurality of prediction adjacent regions highly correlated to a target adjacent region consisting of a previously-reproduced adjacent pixel signal adjacent to the target region consisting of the target pixel signal;
      deriving at least two arbitrary combinations of prediction adjacent regions including at least one of the plurality of prediction adjacent regions obtained by the search, processing pixel signals of the prediction adjacent regions belonging to the derived combinations, by a predetermined synthesis method, the predetermined synthesis method being a weighted averaging method, thereby generating a comparison signal corresponding to the adjacent pixel signal for each of the derived combinations, and selecting a combination with a high correlation between the comparison signal and the adjacent pixel signal; and generating at least one candidate prediction signal for the target pixel signal, based on the prediction adjacent regions belonging to the selected combination, and processing the candidate prediction signal by the predetermined synthesis method, thereby generating the prediction signal; and each of the combinations of prediction adjacent regions derived in generating the prediction signal includes up to $2^n$ prediction adjacent regions in decreasing order of correlation to the target adjacent region, and a value of said n is an integer of not less than 2.

2. The image predictive encoding device according to claim 1, wherein the generating of the prediction signal further includes selecting a combination with a lowest sum of absolute differences between the comparison signal and the adjacent pixel signal.

3. The image predictive encoding device according to claim 1 or 2, wherein the generating of the prediction signal further includes performing weighted averaging of pixel signals of the prediction adjacent regions belonging to each of the combinations, thereby generating the comparison signal.

4. An image predictive decoding device comprising:
circuitry configured to:
decode encoded data of a residual signal related to a target region being a processing target in compressed data;
restore a reproduced residual signal from a signal obtained by the decoding;
generate a prediction signal for a target pixel signal of the target region; and add the prediction signal to the reproduced residual signal to generate a reproduced image signal, wherein:
the generating of the prediction signal includes:
searching a search region comprising a previously-reproduced image, for a plurality of prediction adjacent regions highly correlated to a target adjacent region consisting of a previously-reproduced adjacent pixel signal adjacent to the target region consisting of the target pixel signal;
deriving at least two arbitrary combinations of prediction adjacent regions including at least one of the plurality of prediction adjacent regions obtained by the searching, processing pixel signals of the prediction adjacent regions belonging to the derived combinations, by a predetermined synthesis method, the predetermined synthesis method being a weighted averaging method, thereby generating a comparison signal corresponding to the adjacent pixel signal for each of the derived combinations, and selecting a combination with a high correlation between the comparison signal and the adjacent pixel signal; and
generating at least one candidate prediction signal for the target pixel signal, based on the prediction adjacent regions belonging to the selected combination, and processing the candidate prediction signal by the predetermined synthesis method, thereby generating the prediction signal; and
each of the combinations of prediction adjacent regions derived in generating the prediction signal includes up to $2^n$ prediction adjacent regions in decreasing order of correlation to the target adjacent region, and a value of said n is an integer of not less than 2.

5. The image predictive decoding device according to claim 4, wherein the generating of the prediction signal further includes generating the comparison signal corresponding to the adjacent pixel signal and selecting a combination with a lowest sum of absolute differences between the comparison signal and the adjacent pixel signal.

6. The image predictive decoding device according to claim 4 or 5, wherein the generating of the prediction signal further includes performing weighted averaging of pixel signals of the prediction adjacent regions belonging to each of the combinations, thereby generating the comparison signal.

7. An image predictive encoding method comprising:
dividing an input image into a plurality of regions;
generating a prediction signal for a target pixel signal of a target region being a processing target out of the plurality of regions resulting from the dividing;
generating a residual signal between the target pixel signal and the prediction signal; and
encoding the residual signal, wherein:
the generating of the prediction signal includes:
searching a search region comprising a previously-reproduced image, for a plurality of prediction adjacent regions highly correlated to a target adjacent region consisting of a previously-reproduced adjacent pixel signal adjacent to the target region consisting of the target pixel signal;
deriving at least two arbitrary combinations of prediction adjacent regions including at least one of the plurality of prediction adjacent regions obtained by the searching, processing pixel signals of the prediction adjacent regions belonging to the derived combinations, by a predetermined synthesis method, the predetermined synthesis method being a weighted averaging method, thereby generating a comparison signal corresponding to the adjacent pixel signal for each of the derived combinations, and selecting a combination with a high correlation between the comparison signal and the adjacent pixel signal; and
generating at least one candidate prediction signal for the target pixel signal, based on the prediction adjacent regions belonging to the selected combination, and processing the candidate prediction signal by the predetermined synthesis method, thereby generating the prediction signal; and
each of the combinations of prediction adjacent regions derived in generating the prediction signal includes up to $2^n$ prediction adjacent regions in decreasing order of correlation to the target adjacent region, and a value of said n is an integer of not less than 2.

8. An image predictive decoding method comprising:
decoding encoded data of a residual signal concerning a target region being a processing target in compressed data;
restoring a reproduced residual signal from a signal obtained by the decoding;
generating a prediction signal for a target pixel signal of the target region; and adding the prediction signal to the reproduced residual signal, thereby generating a reproduced image signal, wherein:
the generating of the prediction signal includes:
searching a search region comprising a previously-reproduced image, for a plurality of prediction adjacent regions highly correlated to a target adjacent region consisting of a previously-reproduced adjacent pixel signal adjacent to the target region consisting of the target pixel signal;

deriving at least two arbitrary combinations of prediction adjacent regions including at least one of the plurality of prediction adjacent regions obtained by the searching, processing pixel signals of the prediction adjacent regions belonging to the derived combinations, by a predetermined synthesis method, the predetermined synthesis method being a weighted averaging method, thereby generating a comparison signal corresponding to the adjacent pixel signal for each of the derived combinations, and selecting a combination with a high correlation between the comparison signal and the adjacent pixel signal; and generating at least one candidate prediction signal for the target pixel signal, based on the prediction adjacent regions belonging to the selected combination, and processing the candidate prediction signal by the predetermined synthesis method, thereby generating the prediction signal; and each of the combinations of prediction adjacent regions derived in generating the prediction signal includes up to $2^n$ prediction adjacent regions in decreasing order of correlation to the target adjacent region, and a value of said n is an integer of not less than 2.

9. A non-transitory computer-readable medium including an image predictive encoding program recorded thereon, the image predictive encoding program being configured to perform on a computer, the image predictive encoding program comprising:

a region dividing module for dividing an input image into a plurality of regions;

a prediction signal generating module for generating a prediction signal for a target pixel signal of a target region being a processing target out of the plurality of regions resulting from the dividing by the region dividing module;

a residual signal generating module for generating a residual signal between the target pixel signal and the prediction signal generated by the prediction signal generating module; and an encoding module for encoding the residual signal generated by the residual signal generating module, wherein:

the prediction signal generating module is configured to:

search a search region comprising a previously-reproduced image, for a plurality of prediction adjacent regions highly correlated to a target adjacent region consisting of a previously-reproduced adjacent pixel signal adjacent to the target region consisting of the target pixel signal;

derive at least two arbitrary combinations of prediction adjacent regions including at least one of the plurality of prediction adjacent regions obtained by the search, process pixel signals of the prediction adjacent regions belonging to the derived combinations, by a predetermined synthesis method, the predetermined synthesis method being a weighted averaging method, thereby generating a comparison signal corresponding to the adjacent pixel signal for each of the derived combinations, and select a combination with a high correlation between the comparison signal and the adjacent pixel signal; and generate at least one candidate prediction signal for the target pixel signal, based on the prediction adjacent regions belonging to the selected combination, and process the candidate prediction signal by the predetermined synthesis method, thereby generating the prediction signal; and each of the combinations of prediction adjacent regions derived in generating the prediction signal includes up to $2^n$ prediction adjacent regions in decreasing order of correlation to the target adjacent region, and a value of said n is an integer of not less than 2.

10. A non-transitory computer-readable medium including an image predictive decoding program recorded thereon, the image predictive decoding program being configured to perform on a computer, the image predictive decoding program comprising:

a data decoding module for decoding encoded data of a residual signal concerning a target region being a processing target in compressed data;

a residual signal restoring module for restoring a reproduced residual signal from a signal obtained by the decoding by the data decoding module;

a prediction signal generating module for generating a prediction signal for a target pixel signal of the target region; and a reproduced image signal generating module for adding the prediction signal generated by the prediction signal generating module to the reproduced residual signal restored by the residual signal restoring module, thereby generating a reproduced image signal, wherein:

the prediction signal generating module is configured to:

search a search region comprising a previously-reproduced image, for a plurality of prediction adjacent regions highly correlated to a target adjacent region consisting of a previously-reproduced adjacent pixel signal adjacent to the target region consisting of the target pixel signal;

derive at least two arbitrary combinations of prediction adjacent regions including at least one of the plurality of prediction adjacent regions obtained by the search, process pixel signals of the prediction adjacent regions belonging to the derived combinations, by a predetermined synthesis method, the predetermined synthesis method being a weighted averaging method, thereby generating a comparison signal corresponding to the adjacent pixel signal for each of the derived combinations, and select a combination with a high correlation between the comparison signal and the adjacent pixel signal; and generate at least one candidate prediction signal for the target pixel signal, based on the prediction adjacent regions belonging to the selected combination, and process the candidate prediction signal by the predetermined synthesis method, thereby generating the prediction signal; and each of the combinations of prediction adjacent regions derived in generating the prediction signal includes up to $2^n$ prediction adjacent regions in decreasing order of correlation to the target adjacent region, and a value of said n is an integer of not less than 2.

11. The image predictive encoding device according to claim 1, wherein each of the prediction adjacent regions has an inverse L-shape.

12. The image predictive encoding device according to claim 1, wherein each of the prediction adjacent regions has a L-shape.

13. The image predictive decoding device according to claim 4, wherein each of the prediction adjacent regions has an inverse L-shape.

14. The image predictive decoding device according to claim 4, wherein each of the prediction adjacent regions has a L-shape.

15. The image predictive encoding method according to claim 7, wherein each of the prediction adjacent regions has an inverse L-shape.

16. The image predictive encoding method according to claim 7, wherein each of the prediction adjacent regions has a L-shape.

17. The image predictive decoding method according to claim 8, wherein each of the prediction adjacent regions has an inverse L-shape.

18. The image predictive decoding method according to claim 8, wherein each of the prediction adjacent regions has a L-shape.

19. The non-transitory computer-readable medium according to claim 9, wherein each of the prediction adjacent regions has an inverse L-shape.

20. The non-transitory computer-readable medium according to claim 9, wherein each of the prediction adjacent regions has a L-shape.

21. The non-transitory computer-readable medium according to claim 10, wherein each of the prediction adjacent regions has an inverse L-shape.

22. The non-transitory computer-readable medium according to claim 10, wherein each of the prediction adjacent regions has a L-shape.

\* \* \* \* \*